(12) United States Patent
Greene et al.

(10) Patent No.: US 7,428,723 B2
(45) Date of Patent: Sep. 23, 2008

(54) AGGREGRATING RELATED EVENTS INTO A SINGLE BUNDLE OF EVENTS WITH INCORPORATION OF BUNDLE INTO WORK PROTOCOL BASED ON RULES

(75) Inventors: William S. Greene, Fairview, TX (US); Sanjiv Singh, Garland, TX (US)

(73) Assignee: Verizon Business Global LLC, Ashburn, VA (US)

( * ) Notice: Subject to any disclaimer, the term of this patent is extended or adjusted under 35 U.S.C. 154(b) by 838 days.

(21) Appl. No.: 10/113,543

(22) Filed: Mar. 29, 2002

(65) Prior Publication Data

US 2002/0165745 A1 Nov. 7, 2002

Related U.S. Application Data

(62) Division of application No. 09/863,456, filed on May 22, 2001, now Pat. No. 6,922,685.

(60) Provisional application No. 60/206,564, filed on May 22, 2000.

(51) Int. Cl.
*G06F 9/44* (2006.01)
(52) U.S. Cl. .................... 717/103; 705/8; 709/201
(58) Field of Classification Search .................. 717/103; 705/7, 8; 709/201
See application file for complete search history.

(56) References Cited

U.S. PATENT DOCUMENTS

| | | | |
|---|---|---|---|
| 5,019,961 A | 5/1991 | Addesso et al. | |
| 5,111,391 A | 5/1992 | Fields et al. | |
| 5,117,353 A | 5/1992 | Stipanovich et al. | |
| 5,467,268 A | 11/1995 | Sisley et al. | |
| 5,515,531 A | 5/1996 | Fujiwara et al. | |
| 5,560,006 A | 9/1996 | Layden et al. | |
| 5,640,556 A | 6/1997 | Tamura | |
| 5,680,530 A * | 10/1997 | Selfridge et al. | 345/440 |
| 5,692,125 A * | 11/1997 | Schloss et al. | 705/9 |
| 5,721,913 A * | 2/1998 | Ackroff et al. | 707/103 R |
| 5,734,837 A * | 3/1998 | Flores et al. | 705/7 |
| 5,761,499 A | 6/1998 | Sonderegger | |
| 5,764,906 A | 6/1998 | Edelstein et al. | |
| 5,774,656 A | 6/1998 | Hattori et al. | |
| 5,774,661 A * | 6/1998 | Chatterjee et al. | 709/203 |
| 5,799,297 A * | 8/1998 | Goodridge et al. | 707/1 |
| 5,848,393 A * | 12/1998 | Goodridge et al. | 705/8 |
| 5,920,846 A | 7/1999 | Storch et al. | |
| 5,940,804 A * | 8/1999 | Turley et al. | 705/9 |
| 5,958,013 A | 9/1999 | King et al. | |
| 5,960,194 A | 9/1999 | Choy et al. | |
| 5,968,121 A | 10/1999 | Logan et al. | |
| 5,999,910 A * | 12/1999 | Rosenfeld et al. | 705/7 |
| 6,006,193 A * | 12/1999 | Gibson et al. | 705/8 |
| 6,009,464 A | 12/1999 | Hamilton et al. | |
| 6,044,355 A | 3/2000 | Crockett et al. | |
| 6,049,776 A | 4/2000 | Donnelly et al. | |
| 6,052,711 A | 4/2000 | Gish | |
| 6,070,142 A | 5/2000 | McDonough et al. | |
| 6,085,030 A | 7/2000 | Whitehead et al. | |
| 6,092,061 A | 7/2000 | Choy | |
| 6,098,093 A | 8/2000 | Bayeh et al. | |
| 6,104,717 A | 8/2000 | Coile et al. | |
| 6,125,382 A | 9/2000 | Brobst et al. | |
| 6,141,773 A | 10/2000 | St. Pierre et al. | |
| 6,167,449 A | 12/2000 | Arnold et al. | |
| 6,170,011 B1 | 1/2001 | Macleod | |
| 6,222,856 B1 | 4/2001 | Krishnan et al. | |
| 6,223,182 B1 | 4/2001 | Agarwal et al. | |
| 6,237,009 B1 | 5/2001 | Waldo et al. | |
| 6,260,078 B1 | 7/2001 | Fowlow | |
| 6,269,373 B1 | 7/2001 | Apte et al. | |
| 6,289,340 B1 | 9/2001 | Puram et al. | |
| 6,289,372 B1 * | 9/2001 | Vyaznikov | 709/206 |
| 6,327,622 B1 | 12/2001 | Jindal et al. | |
| 6,334,133 B1 | 12/2001 | Thompson et al. | |
| 6,341,289 B1 | 1/2002 | Burroughs et al. | |
| 6,349,238 B1 | 2/2002 | Gabbita et al. | |
| 6,367,034 B1 | 4/2002 | Novik et al. | |
| 6,381,640 B1 | 4/2002 | Beck et al. | |
| 6,385,626 B1 | 5/2002 | Tamer et al. | |
| 6,401,109 B1 | 6/2002 | Heiney et al. | |
| 6,405,367 B1 | 6/2002 | Bryant et al. | |
| 6,412,014 B1 | 6/2002 | Ryan | |
| 6,403,564 B1 | 8/2002 | Judge et al. | |
| 6,442,549 B1 | 8/2002 | Schneider | |
| 6,442,564 B1 | 8/2002 | Frey et al. | |
| 6,473,503 B1 | 10/2002 | Karau et al. | |
| 6,477,566 B1 * | 11/2002 | Davis et al. | 709/223 |
| 6,536,935 B2 * | 3/2003 | Parunak et al. | 700/99 |

(Continued)

OTHER PUBLICATIONS

SNAP Using the SNAP Communication Component, Template Software, 1998, Whole Manual.*

(Continued)

*Primary Examiner*—Todd Ingberg

(57) ABSTRACT

The aggregator service associates/correlates a primary event with related events and bundles them together, determines what other related information is needed and builds a work document from the bundled events and the other related information, runs rules to determine the cause of the problem, and controls the life of the work to be done. The aggregator service receives an event from an information bus where the event relates to a state change, identifies primary events and correlates primary events with relates lesser events it receives by applying rules that deal with the understanding or categorization of the problem and binds the events together to produce a work document according to a predetermined organization of work integration. The rules are held in an easily-modifiable form in a rules service and runtime loaded to the aggregator service, thus the rules can be updated or modified at any time by expert problem-solving personnel and not developers.

60 Claims, 44 Drawing Sheets

U.S. PATENT DOCUMENTS

| | | | |
|---|---|---|---|
| 6,557,003 B1 | 4/2003 | Powers | |
| 6,564,216 B2 | 5/2003 | Waters | |
| 6,574,229 B1 | 6/2003 | Takahashi et al. | |
| 6,574,633 B1 | 6/2003 | Jamalabad et al. | |
| 6,611,822 B1 * | 8/2003 | Beams et al. | 706/11 |
| 6,611,840 B1 | 8/2003 | Baer et al. | |
| 6,640,249 B1 * | 10/2003 | Bowman-Amuah | 709/228 |
| 6,668,353 B1 | 12/2003 | Yurkovic | |
| 6,684,087 B1 | 1/2004 | Yu et al. | |
| 6,684,136 B2 | 1/2004 | Sinex | |
| 6,697,848 B2 | 2/2004 | Hamilton et al. | |
| 6,708,171 B1 | 3/2004 | Waldo et al. | |
| 6,718,515 B1 | 4/2004 | Conner et al. | |
| 6,728,759 B1 | 4/2004 | Na | |
| 6,735,293 B2 | 5/2004 | Doherty et al. | |
| 6,757,912 B1 | 6/2004 | Vaughan et al. | |
| 6,769,000 B1 | 7/2004 | Akhtar et al. | |
| 6,772,131 B1 * | 8/2004 | Francis et al. | 705/35 |
| 6,789,252 B1 * | 9/2004 | Burke et al. | 717/100 |
| 6,850,895 B2 | 2/2005 | Brodersen et al. | |
| 6,859,523 B1 | 2/2005 | Jilk et al. | |
| 6,868,441 B2 | 3/2005 | Greene et al. | |
| 6,892,230 B1 | 5/2005 | Gu et al. | |
| 6,901,518 B1 | 5/2005 | Scheifler et al. | |
| 6,917,976 B1 | 7/2005 | Slaughter et al. | |
| 6,922,685 B2 | 7/2005 | Greene et al. | |
| 6,970,829 B1 | 11/2005 | Leamon | |
| 7,017,159 B1 | 3/2006 | Baker | |
| 7,065,493 B1 * | 6/2006 | Homsi | 705/8 |
| 7,072,967 B1 | 7/2006 | Saulpaugh et al. | |
| 7,127,713 B2 | 10/2006 | Davis et al. | |
| 7,155,439 B2 * | 12/2006 | Cope | 707/100 |
| 7,171,664 B2 * | 1/2007 | Wang et al. | 718/100 |
| 7,184,967 B1 * | 2/2007 | Mital et al. | 705/8 |
| 2001/0013038 A1 | 8/2001 | Purcell | |
| 2001/0042122 A1 | 11/2001 | Cote et al. | |
| 2001/0043600 A1 | 11/2001 | Chatterjee et al. | |
| 2001/0049741 A1 | 12/2001 | Skene et al. | |
| 2002/0069272 A1 | 6/2002 | Kim et al. | |
| 2002/0077876 A1 | 6/2002 | O'Meara et al. | |
| 2002/0091703 A1 | 7/2002 | Bayles | |
| 2002/0091827 A1 | 7/2002 | King et al. | |
| 2002/0138649 A1 | 9/2002 | Cartnell et al. | |
| 2002/0143774 A1 | 10/2002 | Vandershuis | |
| 2002/0169890 A1 | 11/2002 | Beaumont et al. | |
| 2002/0188720 A1 | 12/2002 | Terrell et al. | |
| 2003/0140119 A1 | 7/2003 | Acharya et al. | |
| 2004/0003058 A1 | 1/2004 | Trossen | |
| 2004/0073601 A1 | 4/2004 | Darago et al. | |
| 2006/0031237 A1 | 2/2006 | DeAnna et al. | |

OTHER PUBLICATIONS

The XML Handbook, Goldfarb et al., 1998, pp. 3-18, 101-118.*
Using the Web Component, Tmeplate Software 1997, Cahpters 1-3.*
Workflow Template Training Course, Version 8.0, 1997, Section A.*
Developing a WFt Workflow System, Template Software, 1998, Whole Manual.*
Using the WFT Development Environment, Template Software, 1998, Whole Manual.*
M2 Presswire, Template & Winstar deploy first cuistimer centric services ordering & provisioning system, Oct. 21, 1998.*
Winstar Communications selects Template Software to Deliver Industry Leading Service solution, Business Wire, Feb. 11, 1998.*
Template Software and Winstar Telecommunications Announce Deployment of Industry's First Customer Centric Ordering & Provisioning System, Business Wire, Oct. 5, 1998.*
Building Enterprise Web Transactions using VisualAge Generator JavaBeans and APIs, IBM, May 2000, Whole Manual.*
WFMC Workflow Management Coalition Document Index, Issue 5.0 Mar. 1999, 7 pages.*
WFMC Workflow Management Coalition, Workflow and Internet Catalysts for Radical Change, 1998, 32 pages.*
WFMC Workflow Management Coalition, White Paper Events, Apr. 1999, 11 pages.*
WFMC Workflow Management Coalition, Interface 1: Process Definition Interchange Q&A and Examples, , Jan. 1999, 48 pages.*
Orfali et al., "The Essential Distributed Objects Survival Guide", John Wiley & Sons, Inc., Chapter 19, pp. 325-338, published Sep. 14, 1995.
Anthes, Gary, "Bellcore in Search of New Ideas", Computerworld, Feb. 25, 1991, vol. 25, No. 8, pp. 83, 86[13].
Lynch, Dan, "SMDS: Dial tone for Data", Data Communications, Oct. 1991, vol. 20, No. 14, p. 222[13].
Collins et al., "Automated Assignment and Schedule of Service Personnel", IEEE Expert, Apr. 1994, vol. 9, No. 2, pp. 33-39[13].
Lesaint et al., "Dynamic Workforce Management", AI for Network Management Systems, IEEE, Apr. 1997[13].
Lesaint et al., "Dynamic Workforce Scheduling for British Telecommunications plc Interfaces", vol. 30, Jan.-Feb. 2000, pp. 45-56[13].
Pipkins.com web pages, Pipkins, Inc., Nov. 1999, printed Oct. 10, 2006[13].
ServicePlus.com Web Pages, ServicePlus, Oct. 2000, printed Dec. 7, 2004[13].
Arnold, "The Jini Architecture: Dynamic Services in a Flexible Network", ACM, 1999, pp. 157-162.

* cited by examiner

Point-to-Point
Prior Art

Hub and Spoke
Prior Art

Stovepipe Applications Levels to Layers
Prior Art

Independent Systems' Stovepipe Relationships
Prior Art

NewWave Physical Environment

NewWave Operating Environment
VM Containers Deployed on Servers

NewWave Distributed Concepts

NW Service Launch and Registration in Local Domain and Enterprise

Local Domain Level Lookup

NW Service Registration in Enterprise and Non-Local Find

NW Service Launch and Registration in Local Domain and Enterprise

Local Find

Enterprise Level Lookup

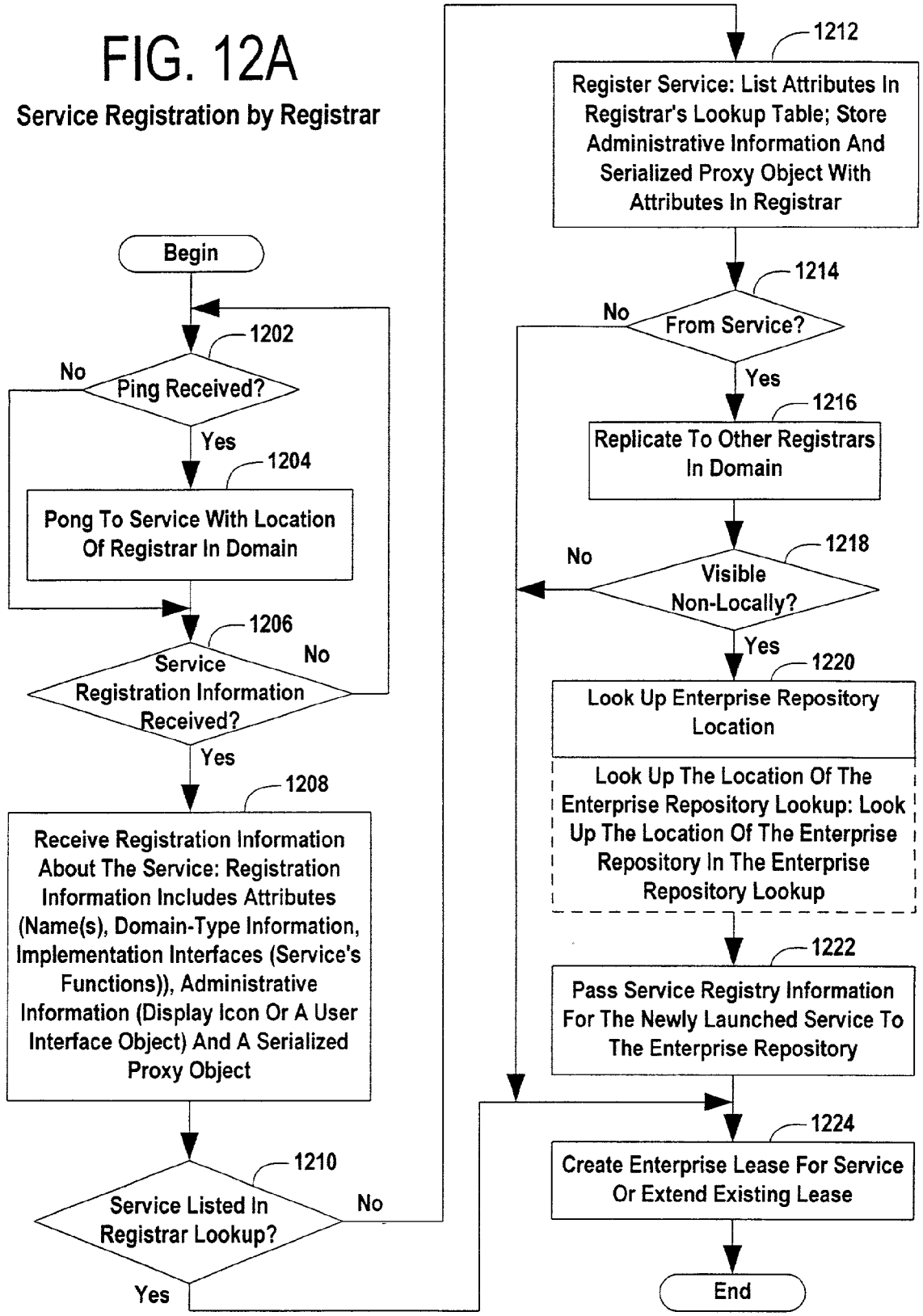

Enterprise Leasing through Registrar

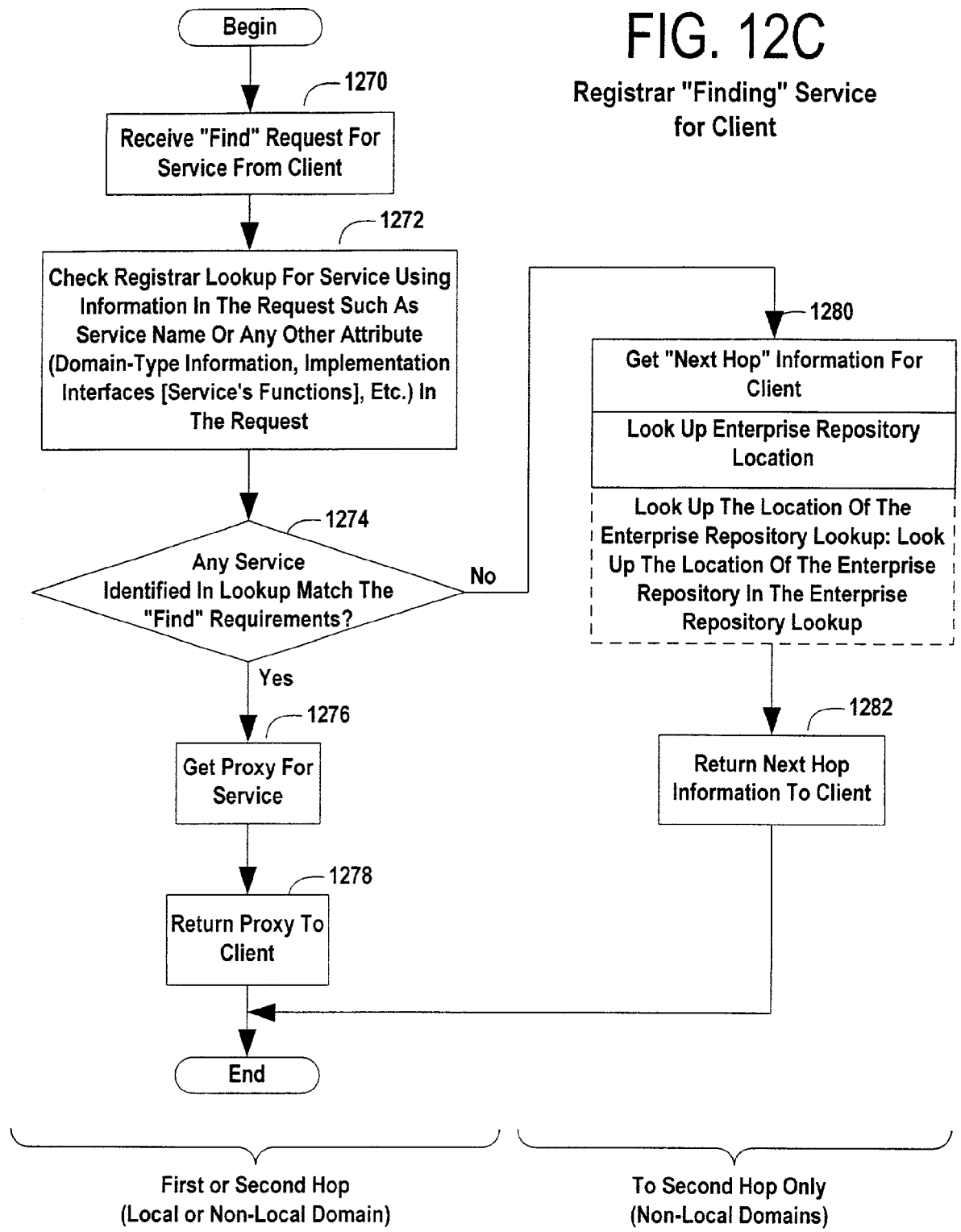

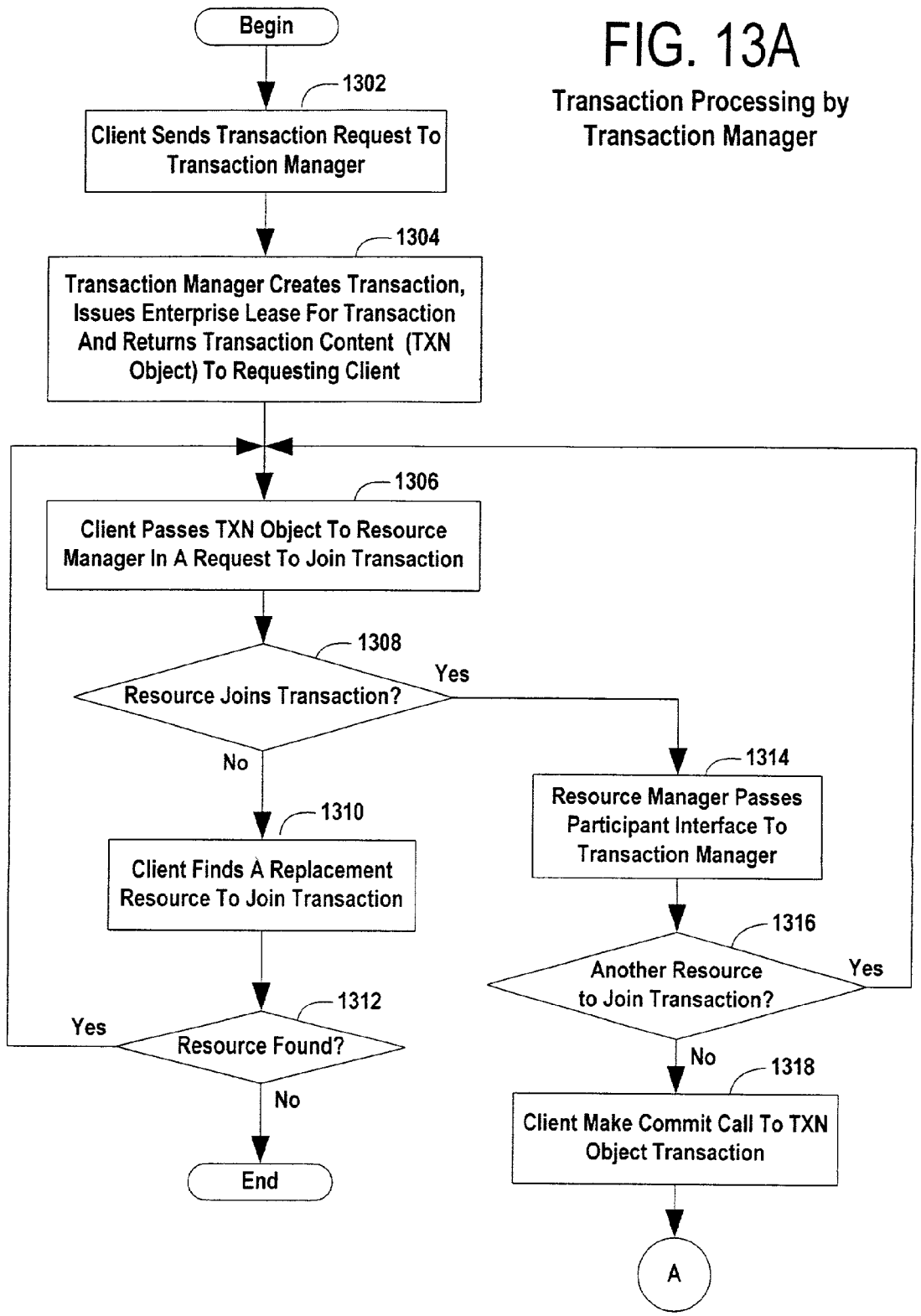

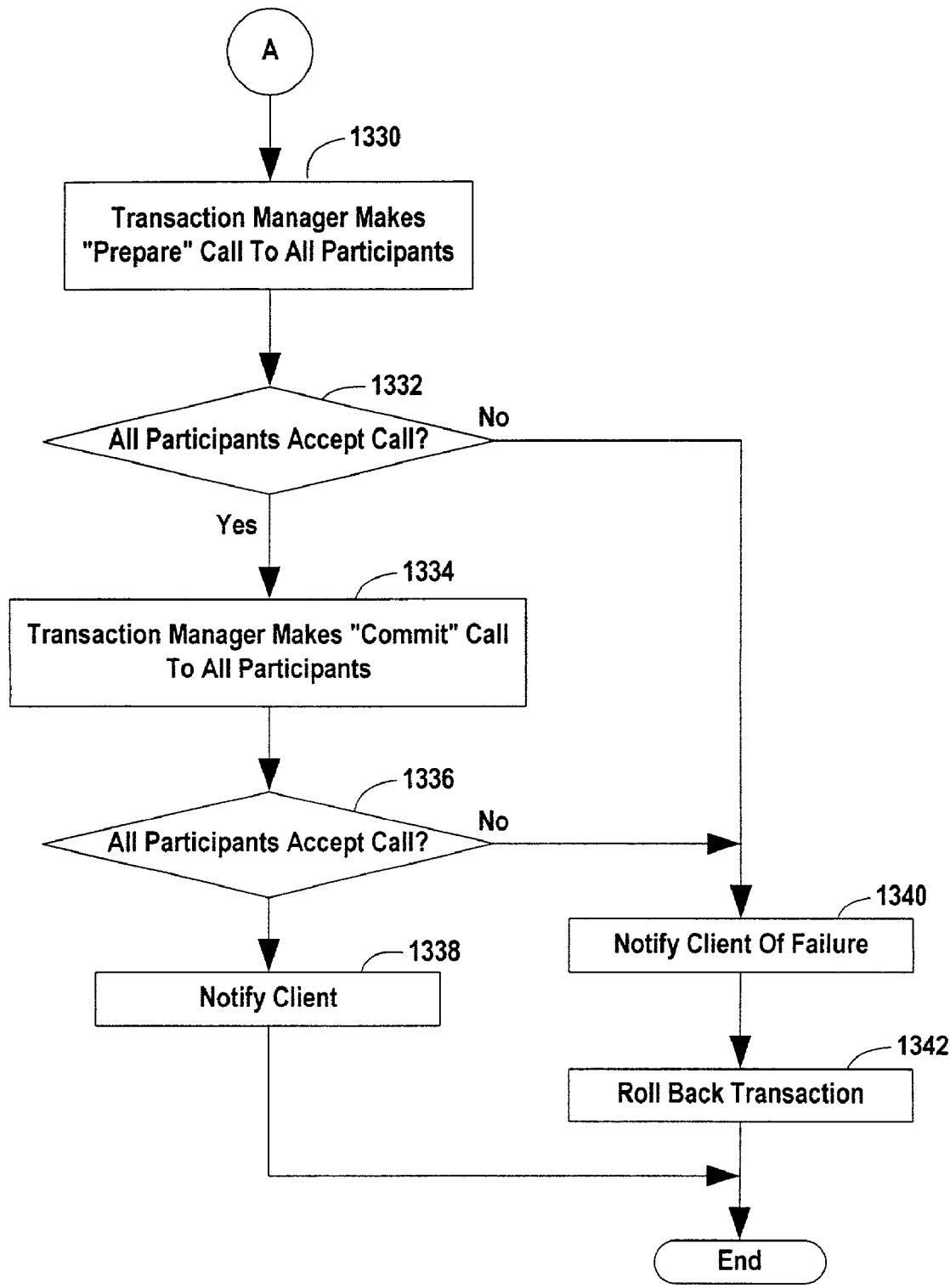

Self-Healing

Service Re-Starting Service

Self-Healing Proxy References

Two-Tiered DataBus

Entity-Relationship Model

Entity and Associations Mapped to Engines

Partitioning of Containers and Storage

Partitioning of Entities Across Separate Storage Servers

Create Entity Instance in Partition

Create Entity Instance in Partition

Cache Server Approach

Steamed Out Read/Write Copy Approach

Optimistic Concurrency Control with Read/Write Copies

Event Notification to Read Only Copies

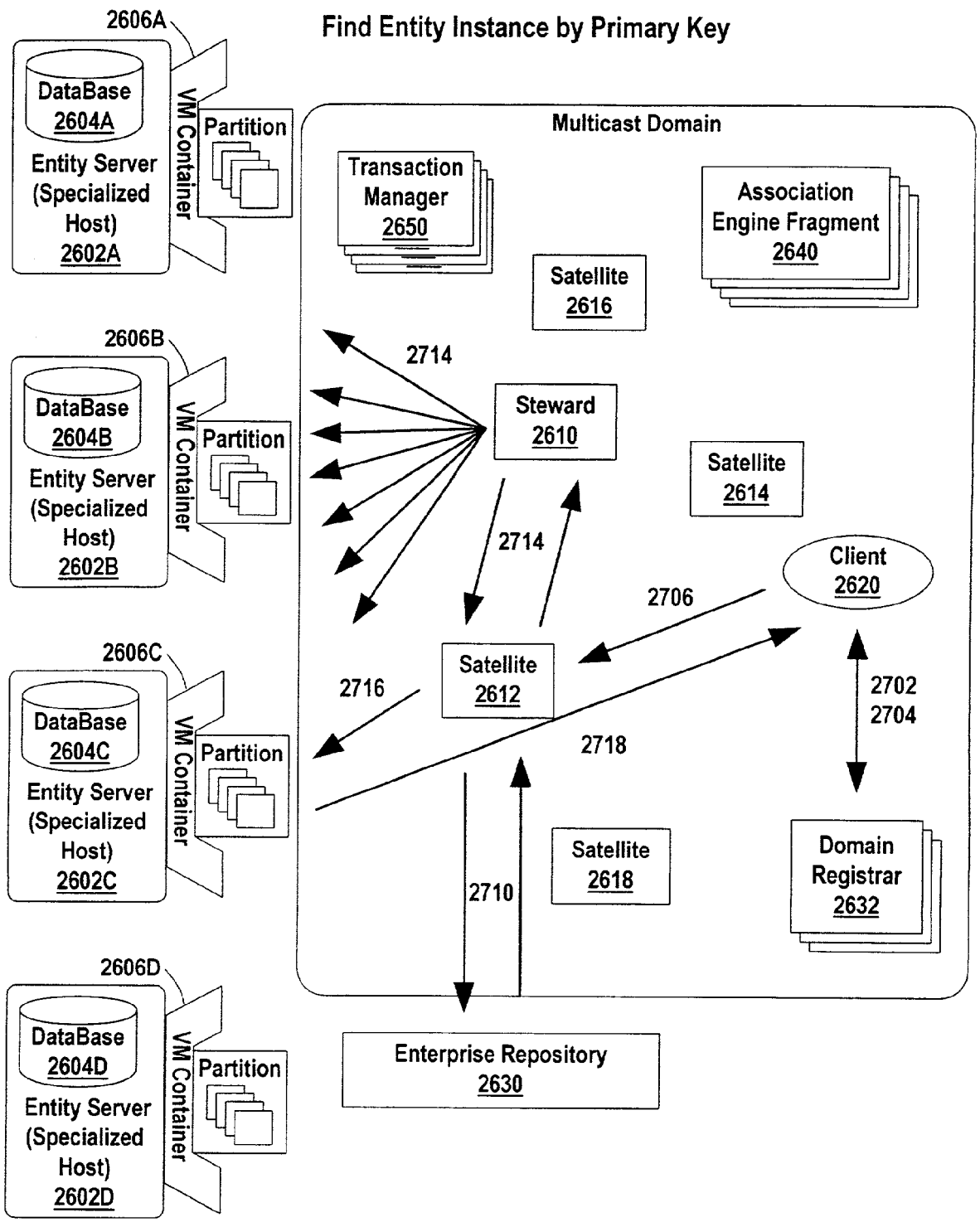
FIG. 26 — Find Entity Instance by Primary Key

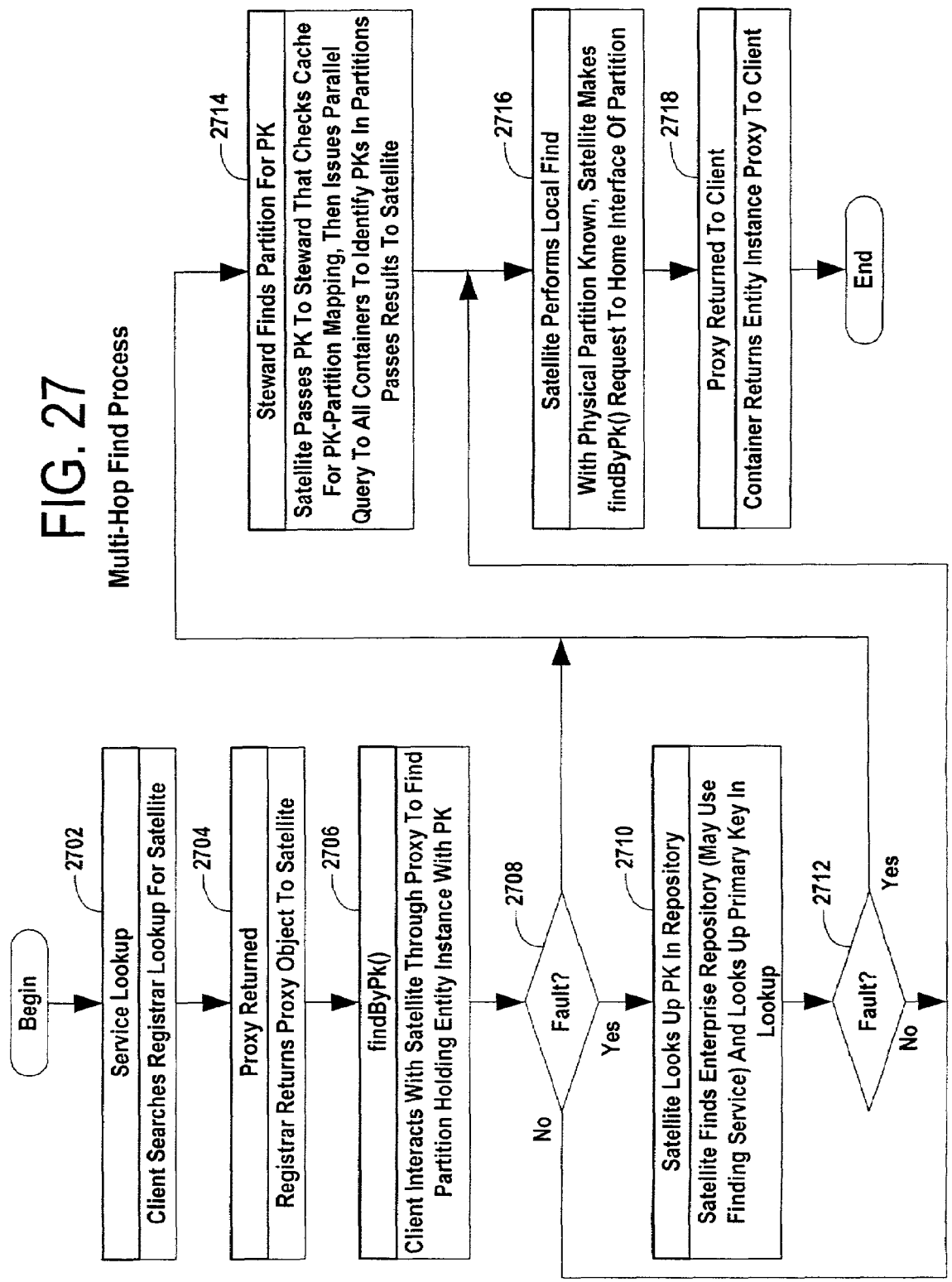

Logical Domains

External Association Service

Get all Account Instances that Are Associated with An Identified Customer Instance Get all Account Instances that Are Associated with An Identified Customer Instance MOC AND NewWave Services User Avatar Lookup

AGGREGATING RELATED EVENTS INTO A SINGLE BUNDLE OF EVENTS WITH INCORPORATION OF BUNDLE INTO WORK PROTOCOL BASED ON RULES

CROSS REFERENCES TO RELATED APPLICATIONS

The present application is a divisional application of co-pending U.S. patent application Ser. No. 09/863,456 entitled "METHOD AND SYSTEM FOR MANAGING PARTITIONED DATA RESOURCES," filed on May 22, 2001, now U.S. Pat. No. 6,922,685, which claims the benefit of provisional U.S. patent application No. 60/206,564 filed on May 22, 2000. The present application is related to the following non-provisional U.S. patent applications: "METHOD AND SYSTEM FOR IMPLEMENTING A GLOBAL ECOSYSTEM OF INTERRELATED SERVICES," U.S. patent application Ser. No. 10/112,373 filed on Mar. 29, 2002; "METHOD AND SYSTEM FOR IMPLEMENTING A MANAGEMENT OPERATIONS CENTER IN A GLOBAL ECOSYSTEM OF INTERRELATED SERVICES," U.S. patent application Ser. No. 10/113,213 filed on Mar. 29, 2002; "METHOD AND SYSTEM FOR REALIZING AN AVATAR IN A MANAGEMENT OPERATIONS CENTER IMPLEMENTED IN A GLOBAL ECOSYSTEM OF INTERRELATED SERVICES," U.S. patent application Ser. No. 10/113,662 filed on Mar. 29, 2002; "METHOD AND SYSTEM FOR REALIZING A RENDEZVOUS SERVICE IN A MANAGEMENT OPERATIONS CENTER IMPLEMENTED IN A GLOBAL ECOSYSTEM OF INTERRELATED SERVICES," U.S. patent application Ser. No. 10/113,471 filed on Mar. 29, 2002; "METHOD AND SYSTEM FOR IMPLEMENTING IMPROVED CONTAINERS IN A GLOBAL ECOSYSTEM OF INTERRELATED SERVICES," U.S. patent application Ser. No. 10/113,691 filed on Mar. 29, 2002; "METHOD AND SYSTEM FOR IMPLEMENTING A GLOBAL LOOKUP IN A GLOBAL ECOSYSTEM OF INTERRELATED SERVICES," U.S. patent application Ser. No. 10/113,969 filed on Mar. 29, 2002; "METHOD AND SYSTEM FOR USING MOBILE CODE IN A GLOBAL ECOSYSTEM OF INTERRELATED SERVICES," U.S. patent application Ser. No. 10/113,968 filed on Mar. 29, 2002; "METHOD AND SYSTEM FOR IMPLEMENTING A DATA BUS IN A GLOBAL ECOSYSTEM OF INTERRELATED SERVICES," U.S. patent application Ser. No. 10/110,000 filed on Mar. 29, 2002; and "METHOD AND SYSTEM FOR IMPLEMENTING A GLOBAL INFORMATION BUS IN A GLOBAL ECOSYSTEM OF INTERRELATED SERVICES," U.S. patent application Ser. No. 10/113,472 filed on Mar. 29, 2002; which are assigned to the assignee of the present invention. The above-identified applications are incorporated by reference in their entirety.

BACKGROUND OF THE INVENTION

1. Field of the Invention

The present invention relates to providing ubiquitous access to data resources even where such data resources are maintained in separate stores and by entirely separate processes.

2. Description of Related Art

The operation of a modern large business enterprise relies heavily upon the processing, storing, communicating and manipulation of vast amounts of information. This is particularly true of a large service company, such as a global telecommunications company. The types of information vary widely and may include, for example, customer data, employee data, account information, traffic and revenue statistics, and engineering data such as network topology and provisioning data. The vital information that supports a large enterprise may even include the software instructions that drive various elements and systems in a telecommunications network. Some information is relatively static, such as the name or address of a customer, whereas other forms of information, such as the momentary operational status of a network element, can change abruptly and must be communicated as quickly as possible to points where the information is needed.

Traditionally, the various types of information that support a large enterprise have been treated separately. Each principal function in the company, such as human resources, customer service, or engineering, has been self-contained in its use and maintenance of the data needed by that function. Each function typically selects its own tools (software applications and hardware platforms), populates its own data store, and institutes its own procedures with little regard to the remainder of the enterprise. In cases where there has been limited sharing of data between functions, the implementation has often been an ad hoc gateway between divergent systems and approaches.

It is becoming widely recognized in the field of information technology that it is not only advantageous, but essential to use a comprehensive approach to managing the data in a large enterprise.

Various approaches have been applied in an attempt to achieve ubiquitous access to data. One approach is to maintain all of the data in one central location. As the amount of data grows, this approach rapidly leads to a bottleneck at the servers as many "clients" attempt to simultaneously access the body of data. Furthermore, the remote access to the data requires a communications infrastructure and may consume considerable bandwidth.

To relieve these constraints, a different approach involves replicating the data at many distributed sites. In most cases, it is usually not known beforehand what particular data may be needed at a given site, so the entire data store must be replicated at each site. While this divides the demands upon the access to the data, this approach introduces problems in maintaining synchronization among the copies of the data Furthermore, the replication multiplies the overall storage resources needed, which can be very substantial. If a design is chosen that replicates the data as needed to maintain a certain level of performance in accessing the data, then the overall storage may actually grow as the square of the data size.

As a compromise between centralization and replication, a caching approach can be used wherein local data stores are used to partially duplicate only those portions of the overall data that are needed locally. Typically, in response to requests from points of use that rely on the cache, the local cache selectively downloads data only on an as-needed basis. The cache will accumulate a self-forming subset of the overall data. Once loaded, a particular data item in the local cache may be held indefinitely or may be discarded after a time according to a caching algorithm. Schemes have also been deployed for ensuring that data in the cache is kept current as changes occur in the corresponding data in the master data store. Although a distributed approach introduces some complexities, there are some advantages to be gained.

BRIEF SUMMARY OF THE INVENTION

The present invention is directed to a method and system whereby data entities, even in a highly distributed and partitioned environment, may be readily accessed by client applications across an enterprise.

A new approach is required in the context of a partitioned body of data wherein separate data stores are maintained by separate computing processes and separate business functions and are usually physically separated. When data resides in a single space, such as data tables in a relational database, it is easy to represent relationships among data elements.

For example, in a database, a first table may contain employee information and each record might have as separate fields, an employee number, a social security number, a hire date, and a salary grade. There may be a second table wherein each record maps an employee number to a (project number) department number and internal mail location. Yet, a third table may have social security numbers mapped to an employee's name and home address.

It is even possible to express (or enforce) that a one-for-one or a one-for-many relationship exists between the corresponding data elements. For example, a relationship may be built that enforces a one-for-one relationship between employee number and social security number. Another relationship may allow the same department number to be claimed for many different employees.

Once a correspondence among data fields is established, useful information may be extracted drawing upon the collective set of tables. In the above example, a database designer may explicitly establish that the employee number field in the first table corresponds to the employee number field in the second table and that, where matching values are found in these two fields, the remainder of the fields in the associated records can be effectively joined to form a composite record. Thereafter, a report may be easily created listing the salary grades of the employees in a given department, despite the fact that the pieces of information are maintained in separate tables. Properly designed, this separation of data into related tables lends advantages in efficiency and flexibility as is well known in the field of relational database technology.

Combining table contents based on a correspondence among fields is referred to as a "table join" and is fairly easy to accomplish when the tables are maintained in a common file or are accessible by a common application or process.

Beyond the realm of relating tables in a database, it is also necessary to cause data objects in a computing environment to be associated with one another in some fashion so that they can cooperatively provide a desired function. As is well known in computing science, an association among two data objects may be formed by, for example, having either or both of the objects contain a reference or handle or pointer to the other object. This tends to happen inherently where a first object causes the dynamic creation or "instantiation" of a second object. After the second object is created, the first object maintains a memory address for the newly-created second object for the purpose of subsequently accessing the data or invoking the methods of the second object and for ensuring that the second object is properly removed from the memory space when it is no longer needed.

Associations among data entities, such as database tables or streamable data objects in a distributed computing environment, may also be formed and maintained externally without the associations being imbedded in the objects themselves. Externalized associations have been proposed whereby a first data object and a second data object may be associated by an external entity which maintains a reference to both objects and has a description of how the objects are related. This implies the use of an external association engine which must be involved whenever a computing task involves cooperation between the first data object and the second data object. In this approach, the first and second objects need not "know" about one another nor contain any provisions for pointing to one another. Indeed, the association among the first and second data objects may occur well after the objects have been designed and implemented. Associations may later be formed as needed, as in response to requirements that were not apparent at the time the data objects were initially implemented. Of course, this enables tremendous flexibility in the growth of a distributed computing environment.

In a large computing domain, such as a global enterprise or a government, data objects may be highly partitioned. To fulfill a needed function, an application may need to draw upon data and functionality from many sources that are separately maintained and often logically or geographically remote from one another. In fact, even a single data object, offering some particular useful functionality or a particular view of the global data, may itself be partitioned and distributed among many sources. In the context of highly-partitioned data, there is a desire to support the creation of such composite objects which transcend being located in any one data store.

While an externalized association engine may at first be contemplated to fulfill this need, the aforementioned problems with centralization make the externalized association engine impractical for large scale implementations. Recall that the externalized association engine must support the interaction among objects, including the assembly of composite partitioned objects, for the entire computing environment. It is foreseen that even attempts to moderately distribute the function of a unified, externalized association engine will introduce difficulties and invite the potential for catastrophic failures.

Therefore, there is a need for a method and system which supports ubiquity of data access, subject to security constraints, of course, across a large enterprise wherein the data may be highly distributed and partitioned.

Overall resources may be conserved and availability of data enhanced if the data store is allowed to remain naturally partitioned, with each portion of the data store maintained nearest the original source of the data or nearest the highest volume of interaction with the data.

It is an important advantage of the present invention that an application needing access to data anywhere in the enterprise does not need to know where such data may be located. The application calls for the data without having to specify where to look. Furthermore, the data needed is readily accessed without undue delays, as if all of the data were local to the application. The mechanism taught by the present invention automatically handles the finding and retrieval of requested data without burdening the application. This readily-available and seemingly-ubiquitous access to the data at large has been referred to as a "data dial tone" by the present inventors, drawing an analogy to the ability of a telephone caller to place a call to anyone without knowing how the call will be routed nor even exactly where the call will be received. The term "data layer" has also been inspired to refer to this style of accessing the enterprise-wide collection of data without regard for location.

A further advantage of the present invention is that, due to the manner in which associations are made and data objects are found, associations may transcend simple object-object linkages. Associations may be defined by "fuzzy" criteria and may cause useful information to be retrieved beyond what a requesting application would have known to explicitly ask for.

In accordance with an exemplary embodiment of the present invention, association forming entities are a) maintained as objects in a like manner to the data objects being associated, and are b) themselves partitioned objects comprising two or more association fragments, each association fragment being mostly concerned with the interfaces to a particular data object participating in the association.

In accordance with an exemplary embodiment of the present invention, each association fragment affiliated with a particular data object is stored in a location that enhances the ease of interaction between the association fragment and the data object. For example, where a first data object and second data object are maintained in data stores at some distance from one another, physically or logically, then a first association fragment will be located with or near to the first data object and a second association fragment will be located with or near the second data object, at least within the same partition. This arrangement may be preferable because the volume of interaction between a data object and its respective association fragment may far outweigh the interaction needed among the two association fragments. This arrangement may also be preferable as the volume of interaction between a client application and both the data object and respective association fragment may exceed the interaction needed among the two association fragments. Some interactions will employ only one of the association fragments with the net result being a reduction in communications requirements and an improvement in performance.

The present invention further provides for defining logical domains which are arbitrary and entirely orthogonal to partitions.

In accordance with an exemplary embodiment of the present invention, an aggregator service is presented for a management operations center (MOC) implemented in a global ecosystem of interrelated services. Essentially, the aggregator service associates/correlates a primary event with related events and bundles them together, determines what other related information in needed and builds a work document from the bundled events and the other related information, runs rules to determine the cause of the problem, and controls the life of the work to be done. The aggregator service receives an event from an information bus where said event relates to a state change or a problem with a telecommunications network, subnet, extranet or some component thereof. The aggregator service correlates primary events with related lesser events it receives by applying rules that deal with the understanding or categorization of the problem and binds the events together to produce a work document according to a predetermined organization of work integration. The rules are held in a easily-modifiable form in a rules service and runtime loaded to the aggregator service, thus the rules can be updated or modified at any time by expert problem-solving personnel and not developers. The aggregator service contains the templates for different documents associated with different primary events that are based on different problem-solving criteria, such as different functional areas/teams. The aggregator service simultaneously builds multiple work documents; therefore, a single event might be bound into several work documents. Associated corporate business objects that are useful, or somehow related to an event, are also bound into the work document. Finally, the aggregator service looks for milestones for the events. Additionally, many different aggregators may exist and run simultaneously providing different work documents to different teams.

BRIEF DESCRIPTION OF THE DRAWINGS

The novel features believed characteristic of the invention are set forth in the appended claims. The invention itself, however, as well as an exemplary mode of use, further objectives and advantages thereof, will best be understood by reference to the following detailed description of an illustrative embodiment when read in conjunction with the accompanying drawings, wherein:

The present invention is illustrated by way of example, and not by way of limitation, in the Figures of the accompanying drawings and in which like reference numerals indicate similar elements and in which:

FIG. 12A is a flowchart depicting the process employed by the registrar for registering services in accordance with an exemplary embodiment of the present invention;

FIG. 12C is a flowchart depicting a process employed by the registrar for looking up a service in accordance with an exemplary embodiment of the present invention;

FIGS. 13A-13B are flowcharts depicting the transaction process employed by the transaction manager is illustrated in accordance with a preferred embodiment of the present invention;

FIG. 26 is a diagram depicting DataBus components necessary for performing the multi-hop find process in accordance with an exemplary embodiment of the present invention;

FIG. 27 is a flowchart depicting a multi-hop find process in accordance with exemplary of the present invention;

Figure 1A:
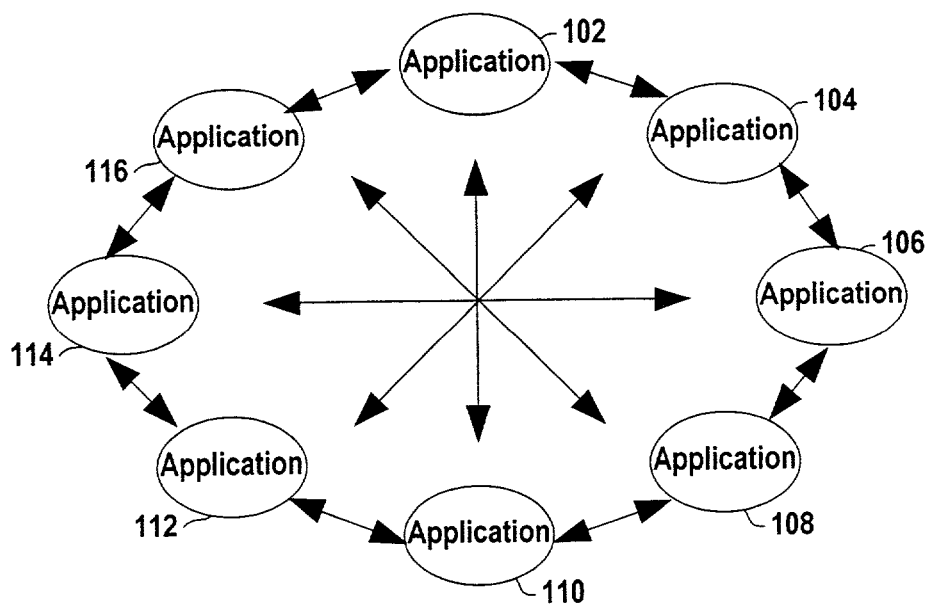
FIG. 1A depicts a point-to-point architecture where applications message one another directly according to prior art messaging techniques.

Other features of the present invention will be apparent from the accompanying drawings and from the detailed description which follows.

DETAILED DESCRIPTION OF THE INVENTION

The present invention relates to data processing. More particularly, the present invention relates to the management of information technologies.

The automation of manual business processes was one of the first important tasks for which computers were employed. Prior to integrating the business processes in computer applications for execution on computer-implemented systems, business processes were typically segmented along departmental lines, so naturally the computer business process applications that automated those business processes were likewise segmented along departmental lines. The resulting computer-implemented applications/systems were characterized as having narrow scope, rarely doing little more than automating the same steps and procedures that comprised the manual business process. Because of a lack of interoperability, they seldom integrated with other systems which likewise made sharing resources impossible. Normally, this way of providing answers to an enterprise can only tailor the answer from the perspective of the department that manages the stovepipe. An enterprise answer, or a solution to an enterprise level problem, might require that an enterprise user access several, or even all departmental stovepipe applications for the departmental perspective view in order to get a "piece" of the entire enterprise level solution. It would then be left to the user to coalesce the departmental answers from the respective stovepipe applications into a unified enterprise level solution by integrating the disparate departmental perspective answers into an enterprise level solution.

Currently, within enterprises exist many stovepipe applications that address and solve very narrow problems within departments. For example, human resources, finance, timekeeping and even resume-tracking applications within human resources are natural stovepipe applications that address particular problems within an enterprise. Moreover, vendors of specialized stovepipe applications often become extremely proficient at solving penumbra issues that cross enterprise boundaries and are adopted by widely-diverse enterprises. An enterprise might be thought of as consisting of having umbra and penumbra functions, umbra being methods, processes and the associated resources necessary for accomplishing core enterprise charter goals, and penumbra being methods, processes and the associated resources necessary for accomplishing and supporting the charter goals. Alternatively, an enterprise's core functions can be described as revenue centers, while support functions can be characterized as cost centers. Examples of umbra stovepipe applications include inventory control applications and sales tracking applications that exist within a sales organization; reservoir management applications, downhole logging applications and production and field control applications that exist within an oil production company; admissions and discharge applications, medical record keeping applications and laboratory applications that exist within a healthcare provider; and even legal instrument-drafting applications, docketing applications and litigation toolkit applications that exist within a law firm. These applications came about when traditional mainframe systems failed to solve individual departmental problems or, more likely, were not flexible enough to solve the problems in a timely fashion. Because of this failure, a "departmentalized" solution ensued and critical, mission-critical departments implemented their own systems. These systems owned, maintained and protected the applications, hardware and resources necessary to efficiently perform their missions, resulting in an enterprise made up of independent "islands" of special purpose applications, hardware and resources.

Even though departments were protective toward their stovepipe systems, that did not mean that departmental users did not want to share information or resources with the remainder of the enterprise. Instead, it was merely indicative of the processes, data and resources existing within a single department. Incontrovertibly, this reality demonstrated that the enterprise parts, or departments, were automated without regard for the enterprise level needs. Information, process and resource sharing among enterprise departments were rarely considered when selecting a vendor's stovepipe application/system. As a result, there were no open application programming interfaces (APIs), open architectures, or other mechanisms that allowed for ready access to the processes and data existing within these stovepipe systems. In order to achieve acceptable results with a department's stovepipe system, an enterprise user had to be proficient with a department's stovepipe application, system and GUI, as well as understand how the application managed its resources.

Traditional systems (also known as "legacy systems") are applications that exist as stovepipes, such as departmental or vendor stovepipes, in a centralized enterprise environment. Mainframe-based systems make up a majority of traditional systems, while minicomputers and large UNIX-based systems might also be correctly referred to as traditional systems. The characteristics that define the traditional system include centralized processing, unshared resources and terminal-based access. Traditional systems typically support a large user and processing load on both database and business processes that exist together within the same environment. While these systems may support thousands of users concurrently accessing the same application, sharing processes and resources between applications is uncommon. Moreover, sharing processes and resources to applications outside the system is unheard of; however, simultaneous access to an application across a single platform is a powerful incentive for businesses. The total cost on ownership (TCO) for these systems is relatively low when compared to PCs and workstations. Therefore, rather than becoming extinct, these systems not only continue to sell, but older applications leveraging traditional systems have demonstrated significantly more staying power than originally anticipated. The prior art's answer to the shortcomings of stovepipe applications was to implement Enterprise Application Integration (EAI) between stovepipe applications.

In general, applications serve two primary purposes: (1) they perform routine business processes that support a business function; and (2) they access, process, and/or display data. At the highest level of abstraction, applications can be organized by the functions they perform and the data they process. EAI, in its most idealistic form, involves the unrestricted sharing of business processes throughout an enterprise's networked applications or data sources. Software programs in areas such as inventory control, human resources, sales automation and database management which were custom built in the technology of the day were designed to run independently for addressing a specific need and do not share. Many times the applications were implemented as proprietary systems, with no interaction between the systems and thus did not share. EAI's popularity can be attributed, in part, to the need for maintaining the older stovepipe applications, while simultaneously integrating them within a new enterprise application infrastructure. As the enterprises grow and recognize the need for their information and applications to have the ability to be transferred across and shared between systems, companies invest in EAI in order to streamline processes and keep all the elements of the enterprise interconnected.

The focus of EAI is primarily directed into four major categories: database linking, application linking, data warehousing and virtual systems approach. Database linking involves implementing EAIs between departmental databases for sharing information with each other and duplicating information as needed based on a set of rules. Application linking involves the enterprise sharing business processes and data between two or more applications. Data warehousing involves data being extracted from a variety of resources (data sources) and compiled in a specific database for analysis. This unified collection of data better supports management decision making by allowing enterprise users to view resource data from a variety of stovepipes from an enterprise perspective. Data warehouses contain a wide variety of data that present a coherent picture of business conditions for the enterprise at a single point in time. The final category of EAI is a common virtual system which involves using EAI in all aspects of enterprise computing, tying applications, resources and data together so that they appear as a unified application to a client.

EAI is often referred to as "middleware" because EAI software functions as a conversion or translation layer. It is also a consolidator and integrator. Custom-programmed middleware solutions have been developed for decades to enable one application to communicate with another that either runs on a different platform or comes from a different vendor or both. Middleware is software that translates commands or data between different software programs.

EAI exists in two popular architectures, point-to-point and hub and spoke. Typically, point-to-point architectures are referred to as messaging EAIs, while hub and spoke architectures are referred to as middleware EAIs. Both variants allow existing enterprise applications to supply existing business processes and resources to other enterprise applications. With respect to the first type of architecture, point-to-point applications directly access data and resource data from other applications. FIG. 1A depicts a point-to-point architecture where applications 102-116 message one another directly. Each enterprise application must be modified with a messaging agent, a queue and a relationship application table for listing other enterprise applications and the data and resources that they own. Java applications may require further modification with a multi-valued attribute, a "codebase," for storing the location of the object's class definition. An application interacts with the messaging agent whenever the application determines that it needs access to data or resources that it does not own. The messaging agent accesses the relationship table for the location of an application that owns the needed resource. An initial request message is sent to the application that owns the resource for specific resource data. Here, several potential transitions may take place depending on the requestor application (e.g., temporary use of the resource, updating the resource, etc.) However, the resource owner application might be busy at the time the request is received, so the request is queued until the application is free to process the request. Once the response message is sent to the recipient, the recipient application might also be too busy to process the incoming message thread. In that case, the resource data in the response is also queued in anticipation of a processor freeing up and the process thread needing the resource being executed. At some point, the thread is executed in accordance with the application's processes. The messaging agent is responsible for the message and data integrity that it sends and/or receives, so if the transaction is not completed, the messaging agent must repeat the transaction.

As can be understood from the foregoing, each application requires significant modifications for point-to-point EAI to be effective. If an enterprise application is upgraded, modified or even migrated to a different physical location, it and any application that it relies on, or that relies on it, must also be modified for subsequent point-to-point messaging transactions to be successful. In addition, each individual enterprise stovepipe application is a potential bottleneck as the individual applications are usually not scalable for messaging responses. Finally, inter-application messages can either be in the form of some proprietary messaging protocol or may, instead, take advantage of existing messaging protocols and messaging specification. If the enterprise utilizes proprietary messaging protocols, the protocol specification must be formalized within the enterprise and maintained and a corresponding message transport devised. If, on the other hand, existing protocols are to be used, then the enterprise's existing message transports that utilize those protocols will be called on for handling the added burden of the point-to-point messages.

The second EAI architecture improves on existing point-to-point middleware by utilizing a message broker that manages communications among all enterprise stovepipe applications. The message broker communicates directly with each participating application and thus forms the "hub" of a hub and spoke messaging architecture. Message-broker processing is a mixture of schema and content transformation, rules processing, message splitting and combining, as well as message routing. Once the processing is complete, the information is sent to any target system that needs to receive that information using whatever native format the target application can understand (e.g, eXtensible Markup Language (XML), IDoc, Java Message Service (JMS) message, proprietary, etc.).

Figure 1B:
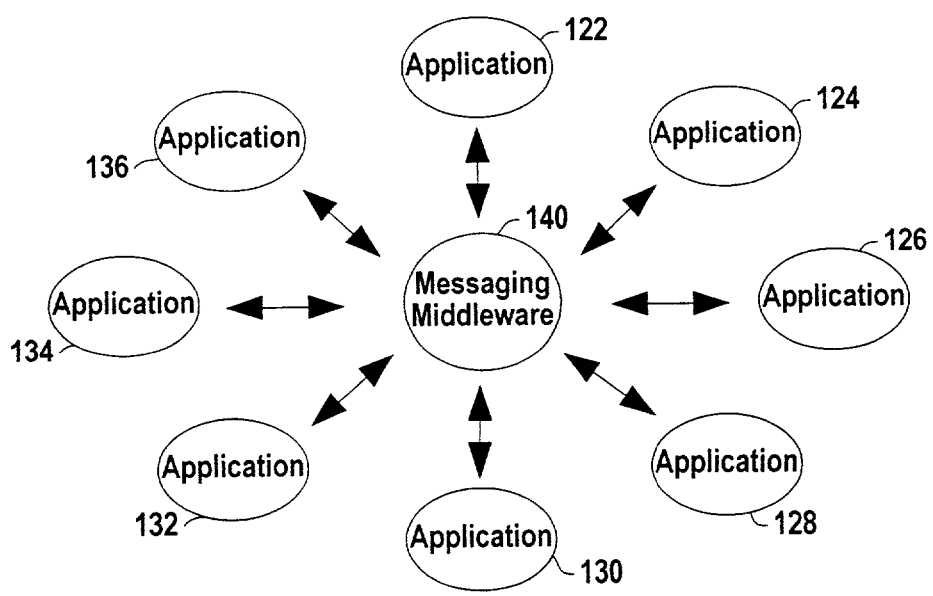
FIG. 1B depicts a hub and spoke messaging architecture according to an exemplary embodiment.

FIG. 1B depicts a hub and spoke messaging architecture wherein messaging middleware 140 serves as a central point of communication between enterprise applications 122-136 for transferring messages between applications. Hub and spoke architecture has the advantage that the participating applications require somewhat less custom programming because messaging middleware 140 acts as a messaging broker for providing an interface between stovepipe applications, thus allowing them to asynchronously send data back and forth to each other. Data sent by one application is stored in a middleware queue and then forwarded to a receiving application when that application becomes available to process it. In addition to a transport means, the messaging broker provides stovepipe applications with distribution rules for forwarding messages and formatting rules for reformatting data from a sending application's format to a receiving application's format. A rules engine analyzes incoming messages and makes routing decisions, while a formatting engine converts the data into the structure required by the receiving application. The messaging broker provides disparate stovepipe applications with a common message transport and queuing system, thereby relieving applications from the responsibility of ensuring that the data sent is properly received.

In practice, a messaging broker can be either a complete messaging system or software that works with existing messaging transports in order to add routing intelligence and data conversion capabilities. While the hub and spoke architecture represents a significant advancement over independent stovepipes and an improvement over point-to-point messaging, the hub-and-spoke EAI solution is resource-constrained because all the processing takes place on a single server. Eventually, the number of connected systems and the information traffic will saturate the available resources of the integration server (memory, processor, and disk) resulting in reduced performance. Bottlenecks can and do occur and scheduling can become problematic for enterprise applications. Moreover, once an application signals its intent to process resource data from the messaging queue in the hub, the messaging broker may be busy and thus unavailable to pass the necessary resource data to the requesting application prior to the receiving application timing out. In that case, the application thread is held up waiting for the resource data to arrive and might in fact timeout prior to the messaging broker responding to the application. If a timeout occurs, the resource data remains queued until the application is again freed up. Overloads on the messaging broker have led to the development of a "federated architecture" wherein the applications connect to a single integration server or hub statically and are able to exchange information with each other. This means that all information produced or consumed from a particular application is available only for processing within a particular hub. Since the hubs are interconnected, each hub appears to the other hubs as connected applications, thus producing and consuming messages. However, messages produced from a single application may process only on a single hub because they are statically bound to that hub. This architecture does not allow hubs to share the message-processing load, or nor does it allow other hubs to process messages from applications that are not directly connected.

In general, applications serve two primary purposes: (1) they perform routine business functions that support a business process; and (2) they access, process, and/or display data. At the highest level of abstraction, applications can then be organized by the functions they perform and the data they process. A representative diagram of an application is depicted on FIG. 2 as any of applications 202A-202N. Since an application is the building block of an information system, it can be expressed as a collection of software programs that execute user interface 204A, business rules 206A, and data access operations 208A, all of which are necessary to execute a business process. Typically, application 202A consists of a plurality of services that perform these operations. Services are any predefined, specialized results which are produced from specific software programs designed to perform explicit data processing operations when called upon. Services might be considered as either business logic services or infrastructure services. Business application services are designed and developed to provide specific computational, input/output, or data access operations when called upon at execution time, while infrastructure services provide computer platform operating systems, database management systems, or network platforms for supporting business applications.

Figure 2:
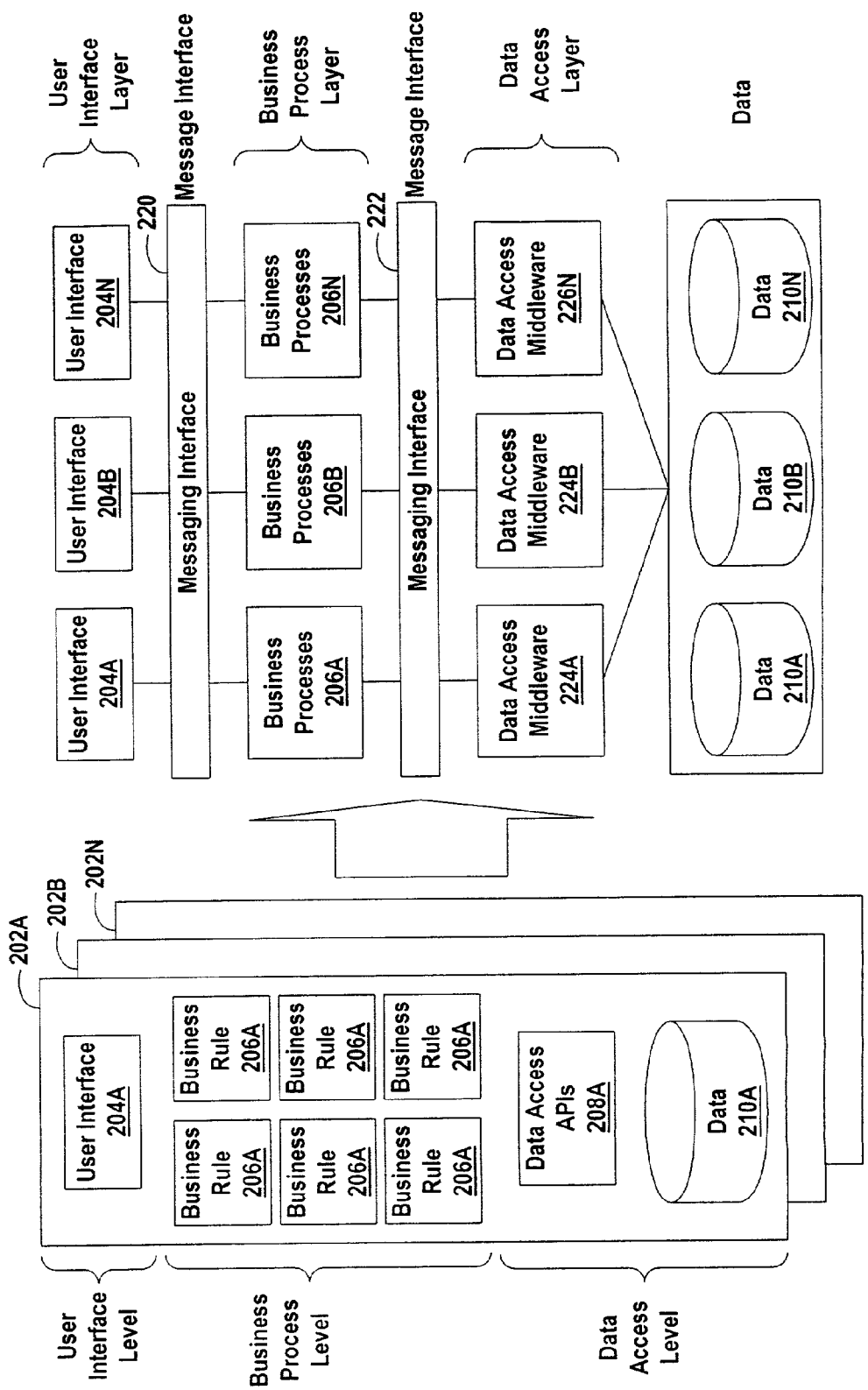
FIG. 2 is a representative diagram of an application.

Returning to FIG. 2, application 202A uses business rules 206A as a logical specification for the business' requirements. Business rules 206A define computational algorithms and operations to perform explicit data processing operations that are necessary to implement a business process. Also shown in FIG. 2 is a logical representation of another prior art mechanism utilizing the aforementioned messaging architecture for handling stovepipe applications. Stovepipe applications 202A-N are the defined logical layers that provide practical boundaries for physically segmenting the application into smaller, more manageable program segments. The interactions between logical layers of an application can be accomplished through messaging and middleware services as described above. The logical layers of an application are defined as a user interface layer, a business logic layer and a data access layer.

The user interface layer of an application interacts directly with end-user input/output devices (e.g., Windows workstations or a printer/fax device). The user interface layer is the most visible aspect of the business process supporting the end user. It encompasses a variety of operations, such as window or screen management, keyboard and mouse handling, end-user help functions, general input editing and data type validation, or formatting data for output to a laser printer or plotter device.

The business process (logic) layer of an application implements the particular requirements of a business process based on a set of business rules. The business rules may be no more than developer guidelines, but more often are generic algorithms that can be tailored to a business' needs by the user selection of values for parametric constraint variables. Typical operations at this layer consist of controlling the logical flow of interaction between the end user (via the user interface layer), access and manipulation of data or information (via the data access layer), and specific computational algorithms to be performed (via the business logic layer).

Finally, the data access of an application includes the operations needed to store, access and maintain data or information necessary to support a business process. The data accessed within this layer can include both structured and unstructured formats, depending upon the application requirements. For the most part, a commercial relational database management (RDBMS), or proprietary file access system, provides the services performed within this layer.

The division of applications A-N into logical layers and the inherent physical program design characteristics necessitate services that enable communication between logical and physical layers via messaging services and data access middleware and operate fundamentally as described above. The intent of the logical layer concept is to stratify applications by their analogous functional levels while maintaining the unique character of each application A-N. Application management becomes more of a concern because the natural tendency of programmers is to offload processing tasks to other, more capable applications while focusing their efforts on the core functional aspects of an application. This distributed concept tends to centralize certain services at key applications. Failures and modifications of those key applications can result in disastrous effects across the enterprise.

Separating an application into discrete layers permits application services to be scaled and positioned where appropriate and reduces the complexity inherent in single-platform solutions. Specialized application components can be combined to achieve the best results, and similarly, different combinations of clients and servers allow for a computing fix to these specialized application components. However, the layered application approach suffers from all of the above-described shortcomings attributable to the messaging and middleware EAIs. The user interface and business process application levels must be internally modified for messaging interfaces, user interface messaging interface 220, and business process messaging interface 222 for communications between the respective application levels, while data resources are handled by a completely different architecture. Data, while being accessible to any application within the enterprise, is still owned by a single application. Resource access bottlenecks become more prevalent at the enterprise level so data access middleware 224A-224N is regularly configured as federated architectures. In short, while the layered application concept somewhat distributes services in layers across an enterprise, the stovepipe application structure is maintained because each application remains responsible for providing its own necessary services and managing its own resources and data.

Another prior art means for sharing services between applications is through the use of distributed object systems such as Common Object Request Broker Architecture (CORBA)-enabled processes. CORBA-enabled processes can be placed and run on the same machine or on any machine in a network enterprise differing from messaging middleware in that they cause processes (components/objects) to be executed in real-time rather than sending data. Examples of these CORBA applications and other similar distributed object systems include System Object Model (SOM) and Distributed System Object Model (DSOM) from IBM Corporation, One New Orchard Road, Armonk, N.Y. 10504; or Component Object Model (COM) and Distributed Component Object Model (DCOM) from Microsoft Corporation, One Microsoft Way, Redmond, Wash. 98052.

CORBA provides a way to execute programs (objects) written in different programming languages running on different platforms no matter where they reside in the network using an "object bus" or "software bus," a software-based communications interface through which objects are located and accessed. Objects reside on various machines throughout the distributed environment and are tasked with performing duties defined by their implementation.

Figure 3:
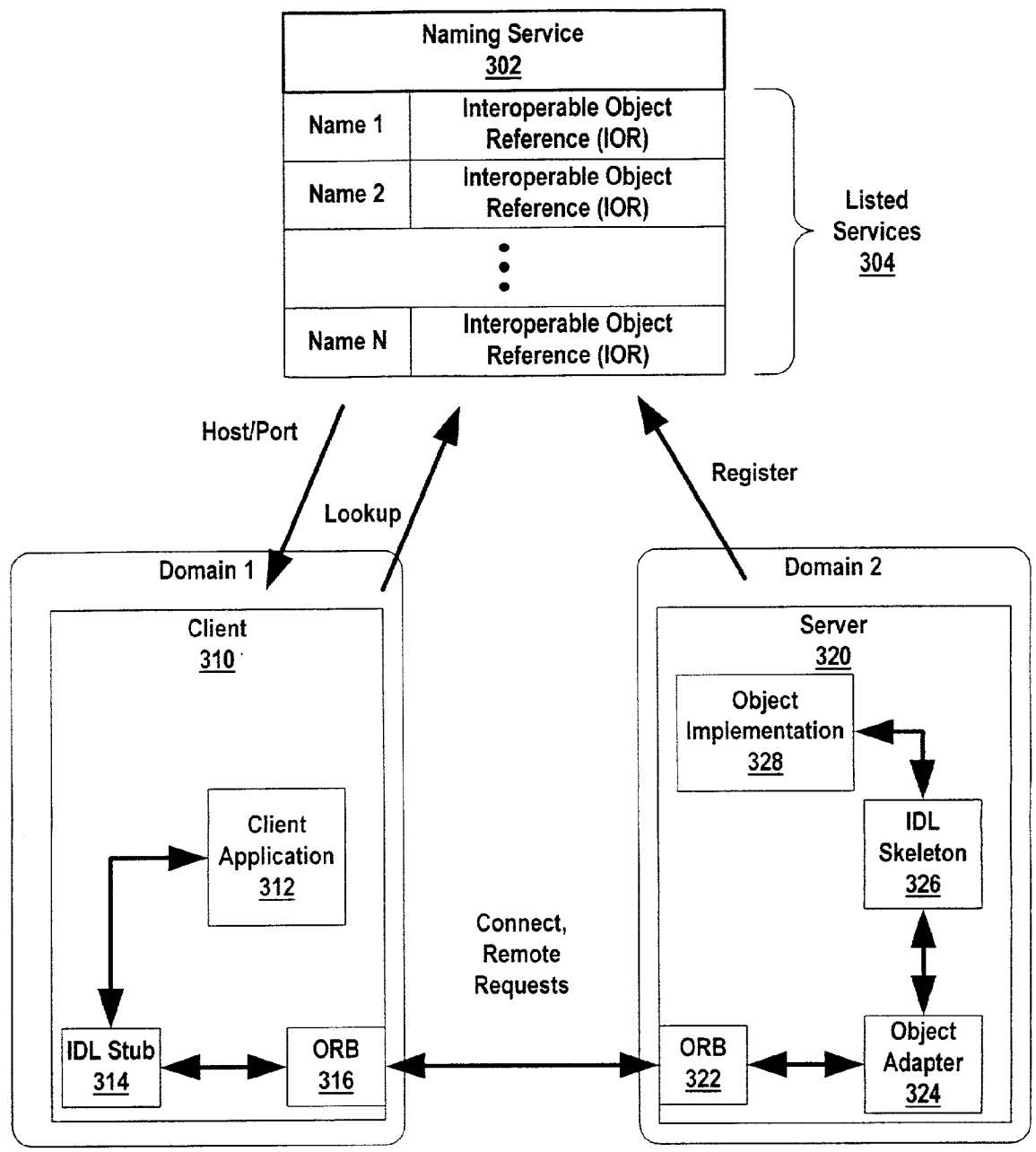
FIG. 3 is a logical diagram of an enterprise network containing CORBA-enabled processes distributed in both domain 1 and domain 2.

FIG. 3 is a logical diagram of an enterprise network containing CORBA-enabled processes distributed in both domain 1 and domain 2. CORBA objects are defined by an Interface Definition Language (IDL) that describes the processing (methods) the object performs and the format of the data sent and returned. IDL definitions are stored in an interface repository (not shown) which can be queried by client application 312 to determine what objects are available on the bus. However, unlike such standard servers, objects have the ability to move around if needed. A client communicates with an object through an object reference. This is a pointer to the object that allows requests for operations and data access to be sent from the client to the server via an object request broker (ORB). In the Figure, the ORB is depicted as client ORB 316 and server ORB 322, but could be conceptually represented as an ORB bus between client 310 and server 320 and connected to a plurality of objects (or object implementation). At runtime, CORBA client 310 makes requests to remote CORBA object 328 via an ORB 316. ORB 316 provides a proxy object in the client's address space which creates the illusion that remote object 328 is a local service or process. ORBs 316 and 322 manage the interactions between client 310 and object implementation 328. Client 310 issues a request and invokes methods of object implementations. Client 310 and server 320 communicate by exchanging messages defined by the General Inter-ORB Protocol (GIOP). When client 310 calls a CORBA operation, client ORB 316 sends a GIOP message to server 320.

The client-side architecture provides client 310 with interfaces to ORB 316 and object implementations. A dynamic invocation (not shown) allows for the specification of requests at runtime whenever the object interface is not known at runtime and utilizes the interface repository. Each CORBA implementation comes with one or more IDL compilers (not shown) that know the language mapping for the language in which they were designed (i.e., that used by client application 312). It is the IDL compiler's job to turn the IDL into stub and skeleton files 314 and 326, respectively. These files are used in distributed applications to make object communication almost transparent. Stubs and skeletons are all language- and ORB-dependent so the same IDL file is used to generate the stubs and skeletons for each language and ORB implementation. IDL stub 314 is used in client processes to communicate with server 320. Stub files 214 consists of functions generated by the IDL interface definitions and linked into client application 312 for a mapping between client application 312 and ORB 316. Client application 312 uses stub 314 to make calls to the server objects. Functions needed by client 312 are called just as if they were local objects. However, stub object acts only as a proxy that forwards requests to and responses from a CORBA process on a remote server.

The implementation-side interface consists of server ORB 322, IDL skeleton files 326 and object adapter 324. Skeleton files 326 are the converse of stub files 312. They are what the server-side applications use to seamlessly receive distributed requests. It is the skeleton's job to receive requests from ORB 322, call the proper implementation, which in this case is object implementation 328, and return the results. ORB 322 calls method skeletons to invoke the methods that were requested from client application 312. Object adapter 324 provides the means by which object implementation 328 accesses most ORB services. Object adapter 324 isolates object implementation 328 from ORB 322. A server may have a variety of object adapter types, each providing specific services.

In short, client application 312 connects directly to ORB 316 through its stub 314. Object implementation 328 on server 320 connects directly to object adapter 324 through skeleton files 326. Object adapter 324 then connects to server ORB 322. A request from client application 312 is next sent through client stub 314, across ORBs 316 and 322 to the proper object adapter and through server 320's object adapter 324 and skeleton files 326, eventually reaching implementation 328. The return value of the implementation follows the same route in reverse.

Every object on the ORB has an Interoperable Object Reference (IOR) which is a global identifier string that identifies the machine on which its associated object is located and the interface that the object supports. It has encapsulated the IP, PID and other values required by the client to connect. Client 310 can use IOR for an object and standard function calls on ORB 316 to find an object reference. Client ORB 316 uses the IOR to determine what type of object is being referenced and the identity of the server for routing requests. In single machine domains, the client can write its own IOR to a file and get all server objects on the ORB since the ORB stays within the domain of the client machine. The client could then read the IOR from this file and have the ORB resolve it into an object reference. However, when the server object is in a different domain from that of the client machine, the client must receive a reference to the object from an independent service. Usually, this is accomplished by writing server 320's IOR to a Server IOR File and placing it in a well-known location, using http, shared file system or ftp. At start up, client 310 merely accesses the file system for the server's IOR. This method for bootstrapping, although simple to understand and test, has several disadvantages, notably the need for the client and the server to share access to a file system.

Another method for locating an object server is for the enterprise to employ naming service 302. Naming service 302 uses a standard CORBA object which contains operations that bind, resolve, and unbind human-readable names with an IOR. When a service object is created, it binds its IOR with a name in naming service 302. By looking up the associated name, any other object on the ORB, or with access to the naming service, can retrieve that object reference from the naming service server. Client application 312, needing a connection to server 320, merely retrieves a reference to naming service 302 and accesses server 320's IOR by the server's name. Then, server 320's IOR is resolved into the identity of the server for routing requests.

A stovepipe application is a stand-alone program. It implies an application that does not integrate with or share data or resources with other applications. Many current systems have been built as "stovepipe" applications, meaning that they do not communicate easily with other enterprise systems. Moreover, these stovepipe applications form their own system "islands" with their own hardware platforms, development languages, protocols and resources (e.g., rules, databases, etc.) Corporations are demanding new systems changes at an astounding rate, and unfortunately, these old legacy systems do not adapt well to change. A telecommunications company, for example, might have had separate systems for plain-old telephone service (POTS) customers, interexchange carrier (IXC) customers and wireless customers.

Figure 4:
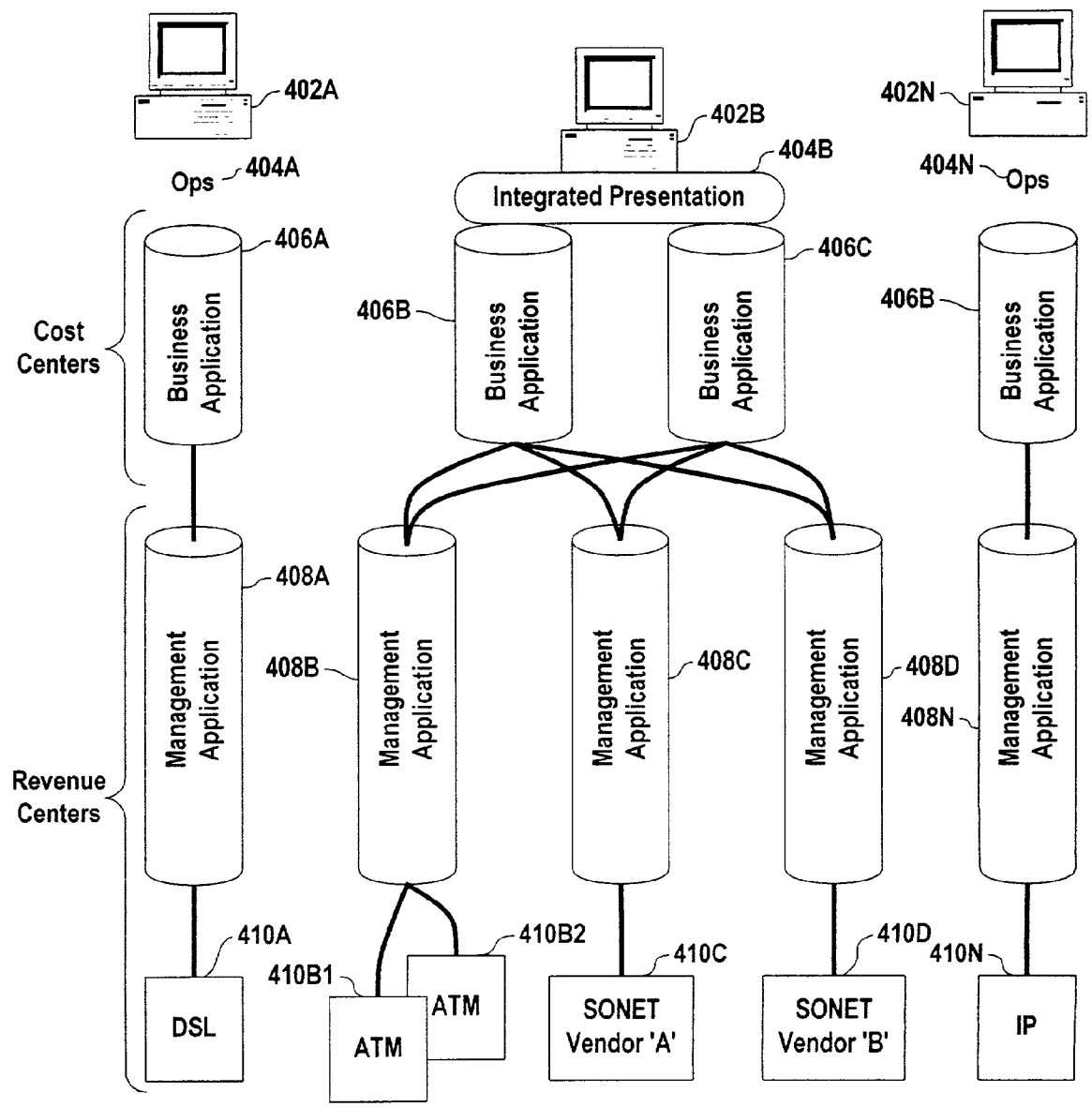
FIG. 4 is a diagram representing independent systems' stovepipe relationships as might be expected in a telecommunications enterprise according to the prior art.

FIG. 4 is a diagram representing independent systems' stovepipe relationships as might be expected in a telecommunications enterprise according to the prior art. Current day "independent systems'" stovepipes are represented in the Figure as stovepipes A-N. Telecommunications enterprises implement specific telecommunications systems in a effort to provide their customers with profit-generating services. The telecommunications services provided to the enterprise's customers are represented in the Figure as Digital Subscriber Line service (DSL 410A), Asynchronous Transfer Mode network services (ATM 410B1 and 410B2), Synchronous Optical NETwork (SONET) fiber-optic transmission system services (vendor "A" 410C and vendor "B" 410D), and Internet Protocol services (IP). As will be understood from the figure, each of the enterprise's services 410A-410N must be managed by its own specialized management applications, represented in the Figure as management applications 408A to 408N. The combination of the services and management applications define the enterprise's profit centers. While many of the management applications 408A to 408N may own services and/or resources identical to those owned by any of the other management applications in the enterprise, the enterprise's management applications are tightly coupled and therefore do not share services and resources. As discussed above, this happens because a particular management application, for instance management application 408A, is developed for a unique enterprise service, which in this case is DSL 410A, without any thought of sharing the application's resources and services with any other management application within the enterprise. Other enterprise management applications were developed for enterprise systems in a similar ad hoc fashion.

Each of management applications 408A-408N performs specific management tasks associated with a corresponding service provided by the enterprise to its customers; however, rarely does a management application provide the services necessary to cost center applications (i.e., tracking and billing customers and accounts for the service usage). Therefore, in addition to developing a management application 408A for specific enterprise services, it was often necessary for an enterprise to stovepipe a business application, represented in the Figure by business application 406A, to the management application for providing cost center services and functionality not provided by the profit center application. The combination of corresponding independent cost center applications and profit center applications form independent systems' stovepipe applications. Events and information are communicated between individual management and business application stovepipe systems using point-to-point messaging architectures as described above. However, each application owns the resources and data necessary to carry out its functionality. Application services are not shared between business and management applications but instead, data and events are merely passed up the stovepipe system. For the most part, information is transferred to and from an administrator working in Operations Center (Ops) 404A on client 402A through either business application 406A or management application 408A.

Notice that the stovepipe systems for DSL 410A and IP 410N are fairly analogous and symmetric. However, as discussed above, in certain situations, EAI is possible between the business applications and the management applications. Notice, for instance, that the administrator on client 402B may receive an integrated presentation from each of business applications 406B and 406C. Notice also that rather than business applications 406B and 406C being stovepiped directly to a separate management application, that each of business applications 406B and 406C communicate directly to each of management applications 408B-D. This is possible through the use of enterprise application integration between independent stovepipe systems for similar enterprise services as management application 408B handles a synchronous transfer mode routers through ATMs 410B1 and 410B2, while management application 408C manages a particular vendor's version of synchronous optical networks (SONET) and management application 408E handles a second vendor's SONET 410E. Here, rather than each management application having its own stovepipe business application, the enterprise is able to consolidate business applications from three independent stovepipe business applications to only two, 406B and 406C. Thus, the enterprises achieved processing and storage efficiency by handling only two independent stovepipes for the three management applications. Notice, however, that true resource integration has not been accomplished. In fact, the only point at which resource data is truly integrated is in the integrated presentation 404B to client 402B. Thus, while the enterprise has realized a certain amount of reduction in scale due to reducing the duplicative business application processes and resources, none of management applications 408A to 408E share any services or resources whatsoever. In fact, with regard to the telecommunications enterprise depicted in FIG. 4, it should be apparent that the only true data integration occurs at the presentation level. For instance, by integrated presentation means 404B for client 402B. Thus, rather than applications 406B and 406C sharing resource data, the data is actually fed to integrated presentation means 404B.

From the representative stovepipe relationships in FIG. 4, it is apparent that any of management applications 408A to 408N may have duplicative services from any of the other management applications, as none of the management applications communicate with one another, and instead communicate only along their own independent stovepipe lines. Those services would be under-utilized with respect to the enterprise and require that more enterprise resources be devoted for housing those services. The same is true of resources needed for the execution of the services within management applications 408A to 408N. While it is true that the various enterprise services 410A to 410N may require different resources be available to the management applications, it may also be true that various resources may be common among the various management applications. Network elements compound the stovepipe issue by requiring multiple control interfaces at the element. For example, Juniper routers require both Simple Network Management Protocol (SNMP)

and XML to perform a full suite of network management functions. Therefore, the enterprise must again house and manage duplicative management resources only because the independent stovepipe systems' own services, resources and data do not share with one another.

NewWave Concepts

NewWave (NW) network management is a next generation management concept that adapts the most advanced concepts from distributed computing to build a global application infrastructure. NW fuses virtual machine spontaneous networking, mobile code, directories, rules engines, and extended transAction (XA) transaction standards to deliver a fine-grained set of services on which management applications are re-engineered. NW leverages leading edge technologies for achieving a cross-domain technology management system which separates applications from technology. The individual stovepipe systems that evolved for network equipment, hosts and servers, and applications can all be integrated into a coherent management regime.

Figure 5:
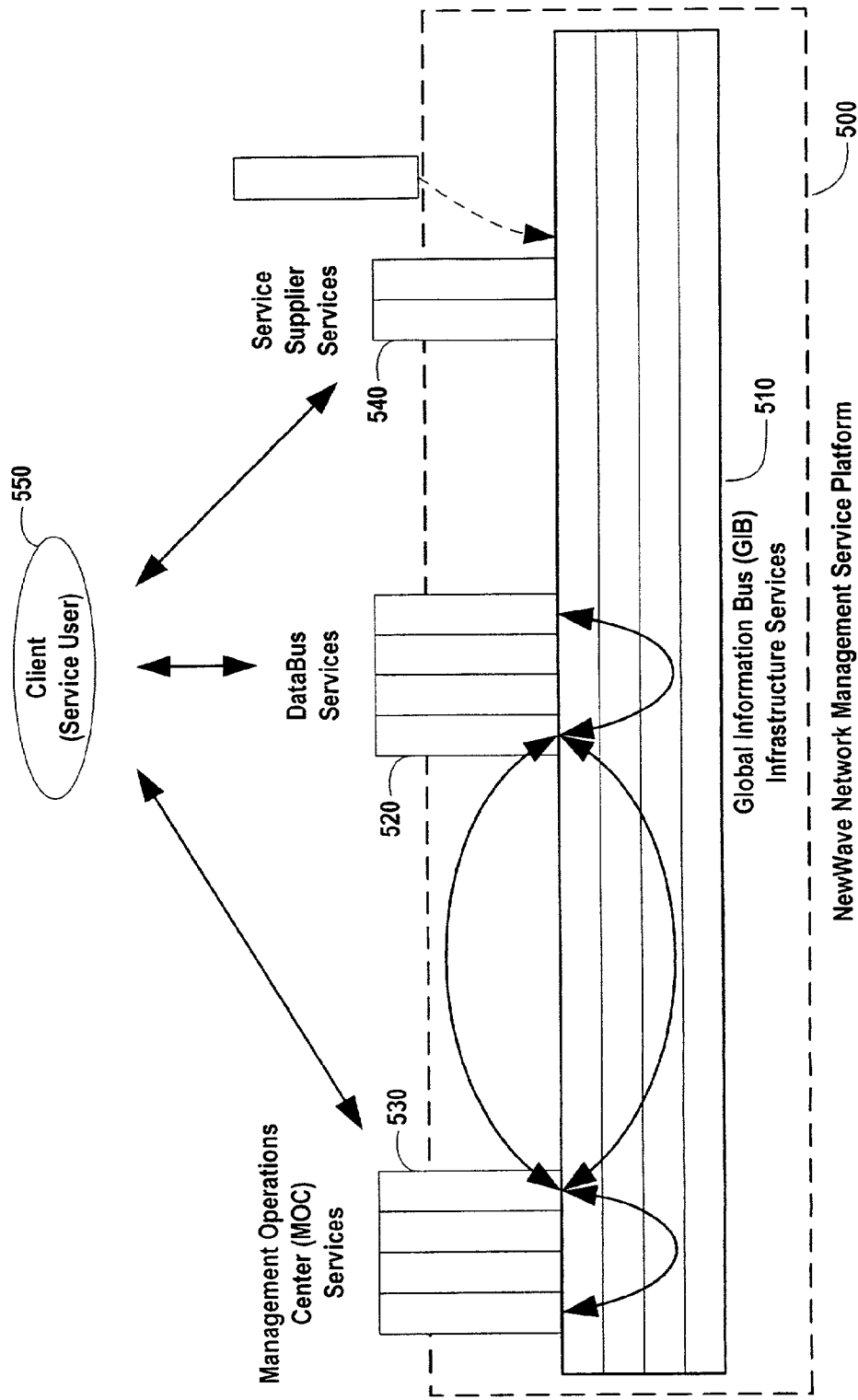
FIG. 5 is a diagram of the NewWave network management concept in accordance with an exemplary embodiment of the present invention.

FIG. 5 is a diagram of the NW network management concept in accordance with an exemplary embodiment of the present invention. NW might be analogized to a schema for presenting services to a service user, such as client 550. The term "client" will be understood to represent any consumer or user of a service, notably, many clients or other services, but may instead be any application, software module or tool that utilizes the processes of a service. NW network management service platform 500 (NewWave NM) is comprised of Global Information Bus 510 (GIB) is necessary to make services (along with the resources needed by the services) available to client 550. DataBus 520 is a mechanism for decoupling data from the applications that have historically owned the data and make the data available to all authorized users, such as making all data in an enterprise owned by the enterprise and then available to all (authorized) enterprise uses. Finally, Management Operations Center 530 (MOC) utilizes service provided by both GIB 510 and DataBus 520 for monitoring and operating a network. NewWave NM service platform 500 itself consists of a group of NW infrastructure services and procedures necessary to support NW services.

GIB 510 is best described as a global ecosystem of inter-related services. The GIB architecture is an infrastructure for deploying and managing individual services on a global scale. GIB 510 provides an infrastructure on which to build services that can run on many platforms. The physical infrastructure is high scalable allowing for new capacity to be easily added, almost invisibly, with a low cost-per-capacity. GIB 510 deployment infrastructure enables software distribution and service configuration and deployment to be accomplished without direct access to the physical servers within the enterprise. Distribution, configuration and deployment are centralized operations, but the effect to consumers is distributed. GIB 510 also utilizes a runtime infrastructure for distributed computing, including discovery of services, distributed transaction management and self-healing and also incorporates a management infrastructure for keeping the state of the ecosystem stable.

Finally, GIB 510 includes a distributed communication infrastructure which supports multiple types of interaction between services. These interactions may be totally decoupled, message-based communication in which sender and receiver are unaware of the existence of the other, slightly coupled, wherein message-based communication in which the sender and receiver are aware of each other, but never gain direct access to each other. Also, GIB 510 distributed communication infrastructure supports generic coupling, event-based communication in which the receiver registers interest in certain events with the sender (the sender is physically coupled to the receiver, but does not know anything specific about it) and fully coupled, remote-procedure call communication in which the sender must find the receiver to make the call (GIB 510 also supports methodologies for finding each other).

DataBus 520 is a data management architecture for NW service platform 500. It presents an architecture for creating a consistent, enterprise-wide data persistence layer which allows clients to access shared enterprise data. DataBus 520 achieves this enterprise-wide look by decoupling shared enterprise data from specific applications (breaking down the stovepipes) and opening up the data layer to across-the-enterprise access (given proper authorization). DataBus 520 architecture is designed from the ground up for global scalability and accommodation of evolving business data models in a highly-distributed physical deployment. Scaling is realized predominantly through the partitioning, while individual partitions are mapped to logical data domains that are defined along more relevant dimensions than entity-type dimensions (e.g., geography, line of business, etc.), and cut across traditional entity boundaries.

MOC 530 is a set of NW-enabled services intended to provide support for addressing problems similar to those handled in a Network Operations Center (NOC), but not limited to only network problems. As such, it is intended to support problem management in many forms, including those typically handled by customer support centers and tactical assistance centers. MOC 530 represents a tool that assumes a fundamental re-engineering of the processes and tools used in these environments. MOC 530 is an example of the NW approach to designing and managing applications. Rather than building monolithic stovepipe application systems, the "application" is a collaboration of many smaller services acting on common objects, possibly without knowledge of each other, but with their actions affecting each other. MOC 530 makes extensive use of rules external to code executed by rules engines. These rules, being uncoupled from specific applications' processes and code, can be presented in a more human-readable form. Additionally, novel uses of finite state-machines and logic gates are used to integrate information and provide behavioral responses to a follow of events and/or data. This allows for changing the system's behavior without changing the code. Those behaviors which represent organizational policy are removed into rules which can then be managed by experts in those organizations. Those rules which encode structural information can be managed, augmented and altered separate from the overall system's responses and actions.

Fundamental to the concept is a behavioral approach to rules and application logic. Behavioral in this context means that "events generate responses." Instead of elaborately designed processes and procedures, which must be successively decomposed into more and more refined detail, individual use cases are directly programmed (in isolation) using only their own context scope of applicability and the domain of their effect. This results in a bottom up aggregation of behavior from small to large (instead of from large to small). Change can proceed without overarching knowledge and with lessened effect on surrounding applications (increased isolation of design and development). This is achieved via re-use of common framework services with different procedural behaviors attached.

NewWave NM service platform 500, largely through the use of GIB infrastructure services 510, spawns many small components (services and resources) that act largely independently of each other rather than a single monolithic application. These services may directly interact with shared resources by, for example, registering for notification of updates to shared resources. The small services find each other and communicate by using GIB infrastructure services 510, (specifically registration and lookup services) and may also publish messages using the GIB's publish/subscribe services. In general, without directly modifying existing components, the overall behavior of any NW-supported architecture can be changed by adding new components. Sometimes this will be a whole new framework service, at other times a specialization of a common service with specific behavior and scope. Since all components, services in particular, are NW-enabled services utilizing registration, lookup and enterprise lookup services, new services, such as services 540, can be added to NewWave NM service platform 500 from outside vendors and entrepreneurs. Moreover, because new added services 540 may unknowingly invoke existing enterprise cost center services, such as customer tracking and billing, vendor-supplied services provide a rich source of revenue for an enterprise without adding infrastructure normally associated with traditional stovepipe systems.

The NW network management service platform relies on the ability to deploy services on many different platforms that run on many different server types. Java (a trademark of and available from Sun Micro Systems, Inc., Palo Alto, Calif.) is a programming language designed to generate applications that can run on all hardware platforms, small, medium and large, without modification and thus provide a means to develop on one platform, but deploy on many. In practice, the Java 2 platform (JDK 1.2) has been the basis for this multi-platform deployment, but one skilled in the art would readily recognize that other developer kits are available for specific platforms. The Java programming language allows developers of services to be unconcerned with the platform on which the service will be deployed.

The NewWave architecture exists separate and apart from the Information Technology used to build the architecture. The architecture and design predate the selection of deployment technology. The reference application uses Java language and Jini distributed applications infrastructure, both Sun technology. There are many reasons why this technology is especially adapted to the NewWave architecture and its reliance on "plug and play" and code mobility. However, other systems can implement this architecture and several have been used in the Worldcom Lab including Sun JMX, IBM Aglets, IBM WebSphere EJB, and Objectstream Voyager products. Nevertheless, there are real and distinct synergies between design and the target implementation technology. Many aspects of NewWave would be much more laborious to achieve on technologies other than Java and Jini. Further, we expect application infrastructures to evolve and in a few years, better implementations technologies will arrive. NewWave anticipates these and expects to deploy on each successive wave of distributed computing that achieves product status.

The Physical Machine Layer—Ubiquitous Server Machines

The NW network management service platform is deployed on large numbers of small, rack-mounted servers of varying platforms. Some exemplary platforms include Solaris for Netra (available from Sun Microsystems, Inc.), IBM AIX (available from International Business Machines Corporation), HP UX all of which are UNIX-based platforms. UNIX is a trademark of the American Telephone and Telegraph Company Corporation of New York, N.Y. NT and Linix systems are also in use. The NW network management service platform could be deployed on larger servers as well. However, the cost of scale may go up with larger servers, as those physical boxes are on an entirely different cost curve.

The NW physical environment consists of thousands of these small to medium size servers deployed throughout the physical boundaries of an enterprise. These servers could, in the case of a telecommunications enterprise, be deployed on the edges of the network in Point of Presence connections (POPs) as close to the user as possible and even on user premises in user enterprise domains. Data centers and major network hub intersections are also used in the physical deployment model. A NW-enabled server is configured with one of a small number of standard configurations. Standard configurations include generic servers with no special features, and resident application servers with Commercial Off the Shelf Technology (COTS). Resident servers in use include, but are not limited to: database servers with specific database products installed, directory servers with directory applications installed, security servers with security applications and rules services with a rules engine installed. Basically, native services are relocatable and can migrate to any generic container. Integration with resident applications (each fixed to a specific server or servers) is achieved by representing the interface to the service a NewWave service.

Figure 6:
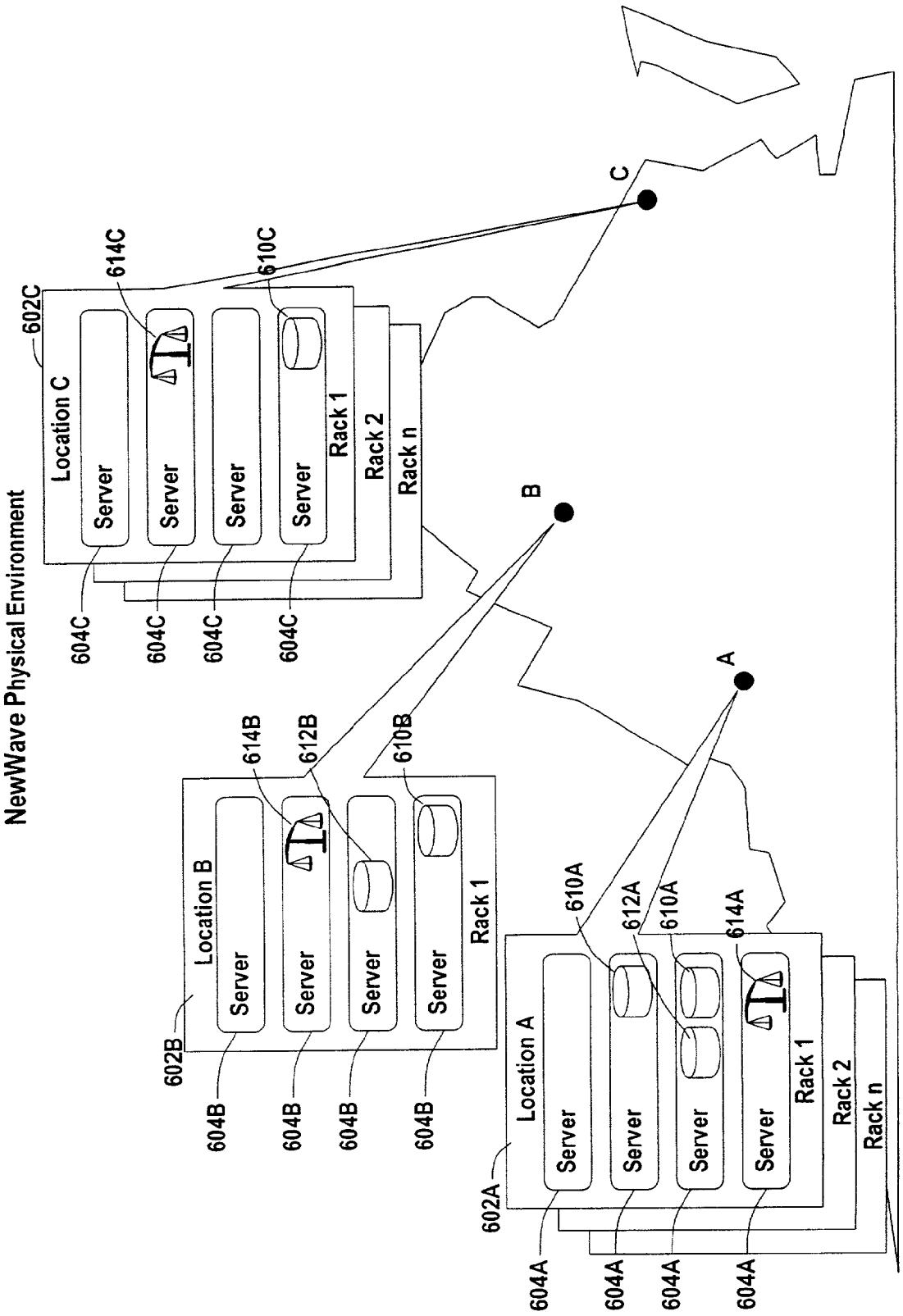
FIG. 6 is a diagram illustrating the concept of many, small generic servers in many geographic locations distributed for enterprise use in accordance with an exemplary embodiment of the present invention.

FIG. 6 is a diagram illustrating the NW concept of many, small generic servers in many geographic locations distributed for enterprise use. For example, an exemplary territory is exhibited in the state of Virginia where three sites have been designated for the distribution of physical hardware denoted hereon in the Figure as geographic sites A, B and C. Each geographic site contains racks of physical hardware, racks 1-n, including various servers 604A-C available from a variety of original equipment manufacturers (OEMs). In accordance with the exemplary embodiment of the present invention, servers 604A-C are not larger multi-processor servers, but instead are smaller rack-mounted servers which may support various platforms such as Solaris, IBMAIX, Windows NT, Linux, etc. However, larger servers can be easily configured in accordance with the exemplary embodiments. For instance, at location A, racks 1-n, 602A contain a plurality of servers 604A. Each of servers 604A may be from a single vendor or instead might be from multiple vendors. Associated with one or more of servers 640A are particular resources managed by that particular server. For instance, databases 610A are particular vendor's databases, while database 612A is another vendor's database, each of which are managed by a server in a rack at location A. Another resource, which will be discussed in more detail below, is a rules engine 614A which may also be managed by one or more servers 604A. Notice that racks 602B at geographic location B and 602C at geographic location C are similarly configured as those at geographic location A, thereby having large numbers of small generic servers 604B and 604C, respectively. Similarly, some of servers 604B and 604C may host various vendor's data resources 610B, 610C or 612B, along with the rules engines 614B and 614C. The importance of this concept is that any server in any geographic location can process any service needed by any client in any other geographic area.

In its broadest sense, NewWave releases the application and the data from the physical server and also from the bounds of that single location. NewWave produces a global scale computing system where the telecommunications data network replaces the traditional computer backplane and the individual server and the containers on it substitute for each of the chips in a multi-processor enterprise system. Immense scalability is archived at greatly improved efficiency for organizations that require large scope business activities.

The Virtual Machine Layer

The operating system of each physical server is not used directly in the NW operating environment. Instead, each server must have the capability of running a platform-independent programming language virtual machine (VM) on top of the operating system that converts Java bytecode into machine language and executes it. The Java Virtual Machine (JAM) (a trademark of and available from Sun Microsystems, Inc.) is currently the most popular software that converts the Java intermediate language into machine language, but other vendors supply their own versions. For example, the Microsoft Virtual Machine (available from Microsoft Corporation in Redmond, Wash.) is also a Java interpreter.

A VM is a multi-threaded processing environment that encapsulates all access to the underlying computing platform. As such, a Solaris Netra looks the same as a Windows NT to a process being executed by the VM. A VM is, in fact, a single computing process, but it supports the running of many "mini" processes (threads) within. Thus, the NW operating environment is actually thousands of VMS deployed on small physical server machines throughout the world.

Other approaches to abstraction of the application environment from the underlying system were explored, most notably IBM's Aglets. Java and the DIV have provided the best platform to date. Other platforms used the VM approach in the past, most notable the IBM VM system and the Honeywell Multicast systems. In the future, NewWave expects to use other platforms as these reach the market and provide similar dynamics.

Containers

In the NW environment, services are remote processing entities that are managed remotely, configured remotely, load their code remotely, and found and communicated with remotely. To facilitate these requirements, the NW service platform includes a container technology for providing a runtime operating environment for services. At the heart of the container scheme is the concept of a generic service container—a CPU process into which arbitrary software services may be homed to a host server at runtime. Each VM runs a small set of code which identifies it as a VM container and makes the VM container able to be found and communicated with remotely. VM containers are realized as VM heavyweight processes which are launched from boot scripts as the server is booted. VM service containers are the multi-threaded servers that provide a place in which multiple-service instances reside, each executing its own thread or threads of execution.

A VM container is also a service itself. More correctly, a VM container may be thought of as a "service container service running on a VM." The service provided by a VM container is the launching of other services within itself. It behaves much like the services it contains in the way it can be found remotely and communicated with. Thus, like any other service, a VM container must register itself with a domain registrar and/or enterprise repository to be visible in its home domain and with the enterprise repository to be visible to services across the enterprise. The registration and finding of services will be discussed in greater specificity below. The salient point is that, like services, VM containers can be found remotely from anywhere in the world and requests can be programmatically made of them. VM containers report their own statistics and can be asked to shut down.

The main difference between a VM container and all other services supported by the NW service platform is in how a VM container, or more properly, the container service, is launched. A VM container is launched from the operating system and not from within another container. It cannot be launched from a remote location programmatically according to the NW conventions. In a similar fashion as other services, containers are not intended to be launched by NW clients. Rather, conceptually it could be considered as an integral part of the operating environment and launched by one of the following means:

1. manually, by telneting into the server and running a script;
2. as part of the startup of the host server's operating system;
3. using an operating system-specific scheduling mechanism, such as Unix crontab or Windows services; or
4. using Remote Method Invocation (RMI) activation (a Java-specific remote procedural call that requires the RMI Daemon to be running), which itself would have to be started via operating system-specific means.

Once running, a VM container must register itself to be visible to clients, services and administrators in the enterprise that may need the VM container for running a service.

Although every VM container is truly generic in nature, a VM container runs a small set of code in which the VM container can designate itself as a particular type of container. Some containers might designate themselves for running essential NW infrastructure services or other enterprise services such as GIB, DataBus or MOC services, or perhaps the container designation may relate to the type of host server running the VM container. Designating a container as being of a particular type might also be based on the server resources available in a logical domain. Depending upon the total quantity of VM containers in a domain, their reliability and domain loading factors, an administrator can designate a pre-defined number of containers as being NW infrastructure-type, GIB infrastructure-type, and so on. The composition of VM container-type designations is based on the priority of the hosting center and intended to assure that VM containers are always available for crucial enterprise objectives, such as re-homing services that are essential to the enterprise. Therefore, key services, while they may run in a generic-type VM container, do not depend on a generic-type VM container being available for self-healing of dead or dying services because other VM containers have been pre-designated for restarting those services. Thus, in the case of an essential infrastructure service, or any service for that matter, a predetermined quantity of VM containers can be pre-designated for running only those essential infrastructure services (self-healing capabilities will be discussed in greater detail below).

A key technical aspect is the storage of the configuration of the system and the container off board of the system and the container. In NW systems, this occurs in the registry. This is implemented in this generation via Jini Lookup and Directory (LDAP) services. However, any abstract and external service can implement the off board registration. By being separate from the container, all or part of the configuration can be transferred efficiently to another container as needed. Enterprise wide operations can occur on the configuration, without reference to the physical/server location it describes.

It should be understood at this point that a logical domain within the enterprise may be of at least two types—management and network—and these domain types are not necessarily synonymous. A management domain is generally defined from servers that are physically located at a physical hosting facility. On the other hand, a logical network domain is based on the transmission topology of a network defined around, for instance, a unicast or multicast routing table and may not be physically located at a single facility. Furthermore, some self-healing services use service lookup services that utilize management domains, while others use service lookup services that utilize network domains. Therefore, if the intent of the VM container is to designate itself as a type compatible with self-healing services, the VM container must ensure that it is listed in the lookup service being used by the particular self-healing service monitoring the services to be run by the VM container.

With respect to still another criteria, a VM container can designate itself as a particular type of container based on the resources available from the host server running the container. Services must be run in a container, but some services need additional resources aside from the container, such as a particular type of database, rules engine, etc. A service provider must be apprised of the resources available at a server host before attempting to launch a service on a host that is not equipped to run the provider's service.

Finally, a VM service container amounts to a heavyweight CPU process. Allowing service threads belonging to different service suppliers to coexist in the same process space is an open invitation to adverse interactions (e.g., modification of a non-final static variable used by both services). For the sake of isolation, each VM container is uniquely owned by a single service supplier business entity. While APIs might be used by a customer who supplies services to lease a service container, the container may also designate itself as a container type to be used by a particular supplier. In that way, only services supplied by a single-service supplier business entity will be able to run in a particular container. Thus, a VM container can be designated to services supplied by a particular supplier.

Note that domain registrar and/or enterprise registry are not the only means for finding a handle to a service container. Another option is to register the service containers within RMI registry. The URL address for connecting to a specific service container (e.g., "rmi://lambic.wcomnet.com/service-Container13/") is stored within the inventory database. A service supplier would query the inventory database for the URL address and then perform a conventional RMI lookup against that URL address.

Figure 7:
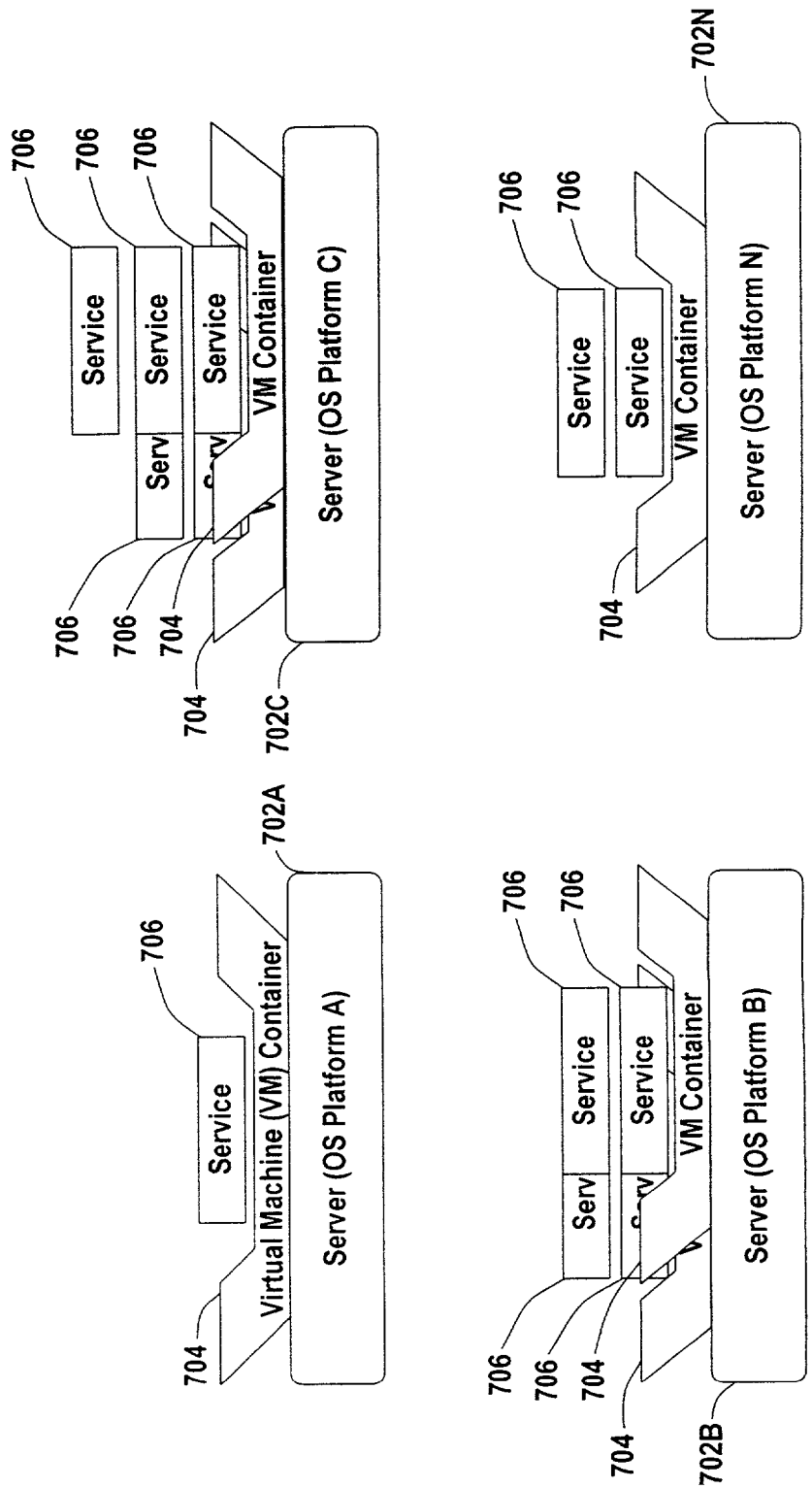
FIG. 7 is a diagram illustrating various typical configurations of the small servers running various operating systems in which VM containers are running on host servers in accordance with an exemplary embodiment of the present invention.

FIG. 7 is a diagram illustrating various typical configurations of the small servers running various operating systems in which VM containers are running on host servers in accordance with an exemplary embodiment of the present invention. Here, four servers 702A, B, C and N are shown, each having a unique operating system platform such as operating systems A, B, C and N. Running on each of servers 702A to N are one or more generic VM containers 704. Every CPU host in an enterprise hosting facility will run at least one VM container processes such as servers 702N and 702A). Service deployers may inject the code for their services at any one of the VM containers. As can be seen from the Figure, it is expected that the VM containers 704 are multi-threaded, multi-tasked containers allowing for the concurrent execution of various services 706 on each container 704. Further, each server platform 7021A-N may run multiple VM containers 712.

High Level Overview of the NewWave Platform

Figure 8:
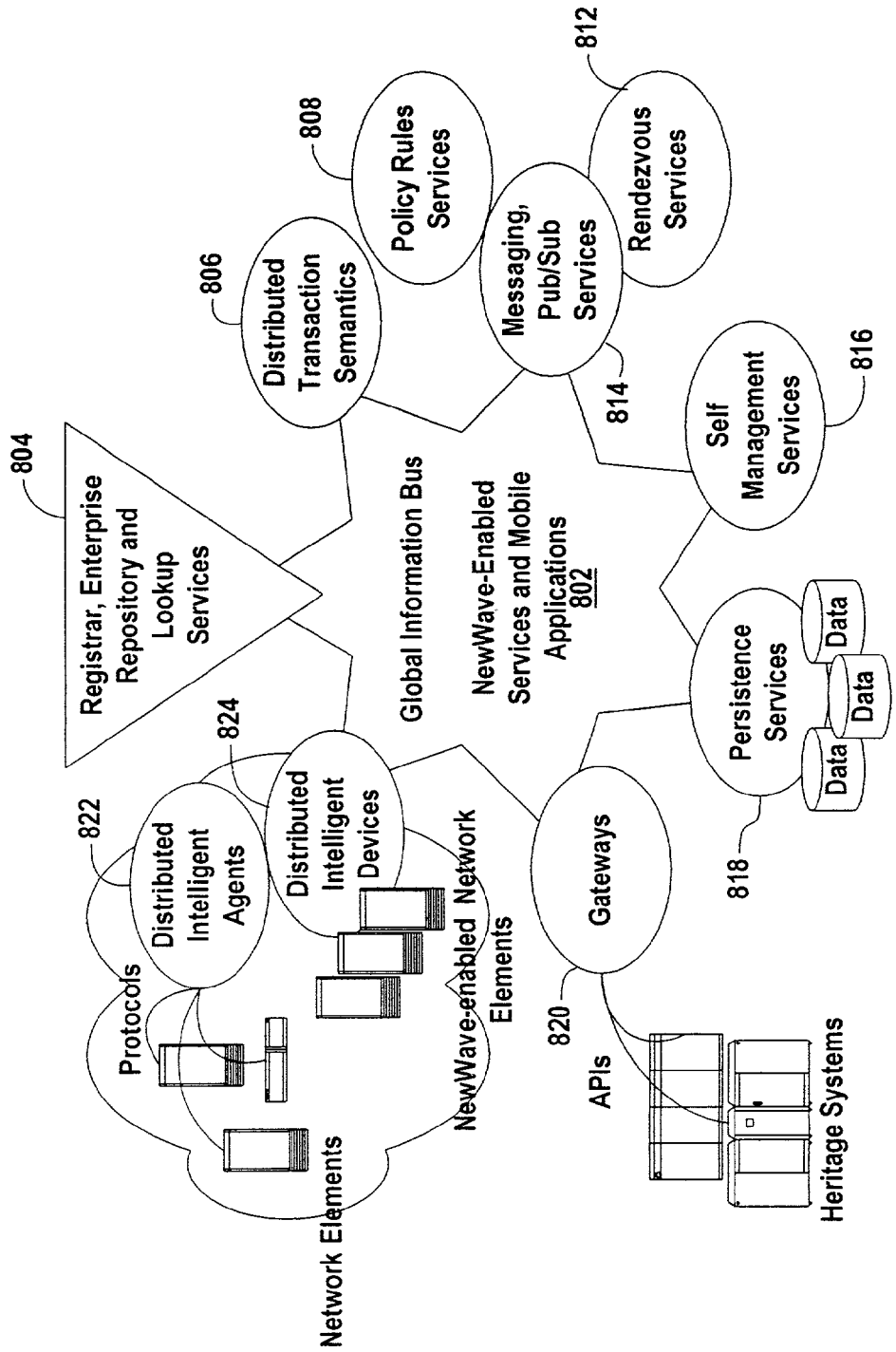
FIG. 8 is a conceptual diagram of distributive concepts for managing an ecosystem of interrelated services in accordance with an exemplary embodiment of the present invention.

With respect to FIG. 8, a conceptual diagram of NW distributive concepts is illustrated in accordance with an exemplary embodiment of the present invention. General Information Bus (GIB), also called the Global Information Bus (GIB), 802 can be conceptually described as an information bus containing NW-enabled services and mobile applications available for use by clients as needed. Essentially, the GIB is a set of specific, yet extensible, Framework Services, implemented on a scoped (local, regional, global) distributed computing infrastructure.

The heart of GIB 802 is the manner in which it allows deployment of services into the operating environment in a very flexible and easy-to-administer manner. GIB 802 is a series of services that may change from one execution to another, finding and collaborating with other services dynamically. This system of collaborating services starts to resemble an ecosystem, and the job of the GIB architecture is to maintain the interconnectedness and stability of this ecosystem as it continually changes. Almost all GIB components are implemented as services, even if they support no externally-available requests because all components must support certain administrative requests mandated by the NW. The administration and management of the ecosystem depends upon this capability. Although the component is acting as a service in the traditional sense of the word, it is deployed as a service. For this reason, even though GIB components come in many different flavors, at one level they all appear as services and follow many of the same conventions. The different flavors include the following and are depicted in the Figure below:

services that are part of the GIB infrastructure;

services that are parts of applications;

services that provide access to persistent DataBus objects; and services that act as agents representing external entities such as devices, gateways to external (non-GIB) systems and even people, or are built directly into devices.

Services

All services must conform to certain conventions to be a well-behaved service. These include the following:

a service must exhibit the greatest degree of mobility possible;

a service must discover and register with all local registrars, renewing its own registration lease;

a service should register with a proxy which can handle simple loss of connection to the service, re-finding the service and continuing processing without interruption;

a service must implement certain management-related requests, including ping( ), healthcheck( ), shutdown( ), quiesce( ), reset( ); and a service must accept requests for notification of events, and notify listeners, at a minimum, of certain administrative events; additionally, the service could define other types of events.

To the greatest extent possible, a service must be mobile, which is the single most important characteristic of a service. This is to say that there are as few restrictions as possible to the deployment of a service on any machine anywhere as quickly as possible without human intervention. The limitations of this goal are primarily the provisioning of a service by:

installing software needed for the service to run;

establishing local configuration parameters;

installing resources upon which the service depends; and performing the actual launching of the service on a particular machine (requiring human intervention or establishing scheduling options on the machine running the service).

Services in the NW environment must overcome these limitations. As such, NW services must be able to be launched on a server without any code specific to the service and without any configuration information being pre-installed on the server. All resources used by the service, if possible, must be able to be remotely accessed and not depend upon the resource being present on the local machine. Databases used by NW services must be able to be created on the fly by the service. So, while a service might depend on the existence of a local database server, it cannot depend on that database having been configured to have certain tables. It must be able to create the tables from a schema which is remotely loadable and to populate the database from remote sources. If the data cannot be remotely loaded, then the database must have a mirror copy which the service can re-home to. Finally, a NW service must be able to be launched on a server without a human logging onto the server to initiate the launch and, in the event of a failure, a service must be able to be re-homed at runtime from one server to another without human intervention.

The NW infrastructure provides an operating environment for services which is similar to the public Internet or an intranet. Instead of many client machines, the NW service platform is deployed on large numbers of small, rack-mounted servers. Instead of web browsers running Virtual Machines, there are VM containers, and instead of running applets in the web browser VM, there are services running in container VMs. When an applet is launched from a web page, it has a "codebase" identifying the location of the class files (server) that need to be loaded before the applet can run. In the NW infrastructure, each service has a codebase identifying from where its class files should be loaded from. To create this environment, the NW service platform deploys many Hyper-Text Transport Protocol (HTTP) servers in place to serve up code, that is, Java class files and resources. The class files and resources are installed on the HTTP servers. An HTTP server which is employed to serve up code is called a "code server."

When a service is launched in a VM container, the container is provided with certain configuration information, including the service's codebase. The codebase contains the address(es) (usually URL(s), but it could be URI(s)) of the code servers which are able to serve up the service's code. So, when the service is launched, its code is loaded from a remotely-located code server. As services are generally long-running, code located remotely, even if it is a large amount of code, is a reasonable cost. Additionally, caching techniques are used to locally store the class files, checking each time to ensure that they have not been modified on the code server. In this way, installing a new version of a service's classes does not involve any type of software distribution technique involving the servers on which the services will run. Instead, it involves only pushing the new software out to the HTTP servers, which is a much more manageable task.

Consumers of services must run software that is consistent with the service. Whenever a service is used, there is a piece of code, the proxy, which is used to access the service. The proxy is referred to herein as a client proxy, proxy object and service object alternatively and will be more fully described below. In some environments, notably the CORBA environment described above, the proxy is the Achilles' heel to software distribution. However, in the NW environment, the proxy is also remotely downloaded. When a proxy is registered with an enterprise registrar, it too is given a codebase from which any client using the proxy should load the code. In this way, the client and the service always use consistent copies of the service and the proxy. In implementation, the Java Jini proxy is used with specific semantics and augmentation for NewWave service inter-working.

Regardless, a client must have initially loaded an "interface" for interacting with the proxy. This code also must be consistent with the interface presented by the service. One solution is to launch client applications that use NW services with a similar remote loading approach. Specifically, an "Application Launcher" that launches an application using a specified remote codebase. One such application launching tool is Web Start (available from Sun Microsystems, Inc.).

A service must be mobile from the point of view of class and resource files, as well as from the point of view of configuration information. Configuration information, like class and resource files, cannot be tied to a specific machine. To accomplish this, configuration information is made available at the enterprise level, thus NW services can be launched using configuration information that is not local to the service. As will be more fully described below, all configuration information is stored in an enterprise level repository (the enterprise repository) and then replicated to identical repositories throughout the geographic extent of the enterprise. Application launchers access the configuration information in the repository, and then forward the configuration information to the VM container selected for running the service. The information includes both configuration information needed by the container to launch the service and information needed by the service itself.

The NW infrastructure provides for remotely-located resources. Reference files and other resources used by a service are remotely loaded at runtime using the same techniques described above used for class loading. These resources may include EXtensible Markup Language (XML) files, properties files, images and the like. These resources are installed on the HTTP code servers in a similar manner as the class files. However, some services that use a resource require a local resource to be local, therefore the local resource must be provisioned automatically to accommodate the reference files and other resources that will be loaded remotely at runtime. For example, a service that uses a database locally, must be able to start with a completely empty database, and then add the necessary database tables, remotely and on the fly. However, the local resource must be prepared for the remotely-loaded tables with suitable database definitions for the structure and the type of contents that each data element that the local resource can contain (i.e., the database schema). An HTTP server could be used for storing schema information in a similar fashion as the resources and code files. Another solution is to use an enterprise level directory that is visible to all services. The schema information can then be remotely loaded from the enterprise directory, after which the source data for populating the newly-defined tables is loaded from a remotely-located HTTP server.

Returning to FIG. 8, the functionality of GIB 802 requires certain services to be available for all other services. These services are generally referred to as GIB infrastructure services including registrar, enterprise repository and lookup services 804; distributed transaction services and semantics 806; policy rule services 808; messaging and publication subscription services 814; rendezvous services 812; and self-management services 812. The GIB is designed to be extensible, and additional framework services are continuously being defined; these incorporate seamlessly. Enterprise repository and lookup services 804 provide a means for client to locate a needed service without knowing where that service is currently running. Whenever a service is launched in a container, that service registers itself with its domain registrar in order to make itself visible to the client in its own domain. A service registered with a domain registrar is visible only in the domain the service is running, so in order for a service to be visible to all clients in the enterprise, a service must register with an enterprise level registry, the enterprise repository. Clients needing a particular service do not need to know where the service is running or even if the service is available in the client's own domain. Instead the client merely looks the service up with the registrar. If the needed service is not listed in the registrar, the client can be directed to a enterprise repository lookup for the location of an enterprise repository within the enterprise. Registrar, enterprise repository and lookup services 804 also manage VM container leases. These and other functions of registrar, enterprise repository and lookup services 804 will be described in more detail below.

Distributed transaction services and semantics 806 manage transactions between the NW services running in the enterprise, with distributed transaction coordination and without the heavy, monolithic character of traditional Transaction Processing (TP) monitors. Distributed transaction services and semantics 806 ensure that processes which need transactional atomicity (several operations complete in their entirety or not at all) can get it. The transaction manager oversees a two-phase commit protocol to coordinate the commit of all containers and association engines that joined the transaction.

Policy rule services 808, or behavior services, are employed by GIB 802 for applying policy outside of the normal flow of processing logic to interactions between services. This is accomplished through the use of rules engines that allow the specification of policy-based rules outside of the processing logic. This allows organizations knowledgeable of operations support, instead of programming organizations, to be in control of the behaviors implementing operations support policy.

NW messaging and publication subscription services 814 provide NW components the means for communicating between NW services. There is no single answer as to how services should communicate. There are different levels of coupling between services desired, depending on the type of service. Services publish events, subscribe to event topics and receive events to which they have subscribed for notification of various events which may need service. Generally, the communication service is dynamic with run-time announcements of producer and consumer registrations, including topics. (Traditionally, these communications' channels were fixed by the logical, initial configuration and physical deployment of a distributed system.)

Rendezvous services 812 recognize and combine patterns of events which may require further service. One important factor when processing events is to know if the event is already being handled. Rendezvous services 812 recognize that events are being handled, thus preventing an event which has gone directly to a state machine from also creating a new state machine. Event patterns are also recognized which allows work documents already started to be merged together.

NW services, once substantiated, must remain running on a server, or at least some server, and register for clients needing the services to be located. Therefore, GIB 802 also employs a group of self-management services 816 for monitoring the state of essential NW infrastructure services, or any services for that matter, on their separate servers. Notification of a dead service to a re-homing service ("arch-angel" service) is primarily a function of the leasing service provided by the domain registrar. The re-homing service then re-launches the dead service in another container, possibly on another server. Clients using a dead or dying service are left in the lurch as they cannot then complete processing even though the dead service might have been restarted in another container. The solution involves the use of self-healing proxy references that look to the registrar whenever a request to a service results in a stale exception. Here again, each of the GIB infrastructure services will be discussed in greater detail with respect to the Figures below.

One feature of the present invention involves separating data and resources that have been traditionally tied or owned by a particular application, from that application, thus breaking down the stovepipe. These resources are managed by persistent services 818, particularly DataBus services, and may be used by clients and enterprise users via GIB 802. However, persistent services 818 make enterprise data directly available to the enterprise users, depending on authorizations, and not from a data-owning application. Data can be organized by broad business domains such as the classification based on "tiles" or the TeleManagement Forum's BAC/SIM classification. However, any organization principle can be used. Current implementation uses the DMTF CIM/DEN information model. Deployment of data is generally "holographic" and randomly distributed within a named domain. [But policy-based distribution and resource capacity is also used] Domain names are based on geography, technology, and line-of-business; yet, any number of domain dimensions can be created allowing business extensibility.

Although data objects and data storage tiers are shared across the enterprise and de-coupled from applications, they are still available via simple, transactional APIs. Essentially, each kind of data is a service. Although finding data is somewhat more complex that finding a running service, the method is similar to the two-hop method employed with services. First, look to a local domain registrar for the location of a data object. If the data is not local, then look to an enterprise directory for the data object. The present invention achieves enormous scalability via a high degree of partitioning where data is flexibly mapped to a persistence layer of hundreds of mixed vendor databases and occasionally to other persistence technologies such as directories and tuple spaces. File storage is also supported via integration of Jiro (Sun product) or other Jini enabled disks. This provides for development of remote storage products such as NSPs and similar services within the NW infrastructure.

Finally, enterprise devices and heritage systems are provided access to NW services and resources via heritage system gateway 820 which translates heritage services into NW services. This is accomplished by implementing NW services acting as agents which represent external entities enterprise devices to other NW services. A similar mechanism is used for enterprise network elements. Enterprise network elements access NW services on GIB 802 in either of two ways by: 1) being NW-enabled themselves (i.e., by incorporating NW distributive intelligence services onboard that can directly access GIB 802); or 2) utilizing distributed intelligent agents 822 which are similar to non-network devices described above and that interact with the resident protocol for the network elements to access NW services on GIB 802.

The GIB Infrastructure Architecture

The GIB is an ecosystem of NW services interacting in a highly-distributed fashion requiring special technologies to help services discover each other and keep the ecosystem healthy and stable. As independent stovepipe systems are deconstructed, new challenges are unearthed that are unaddressed by the prior art. Neither the EAI initiatives, the CORBA and EJB standards nor Sun's J2EE platform and Jini technology provide a holistic solution to the problems encountered in such a highly interactive-distributed environment as NW.

NewWave Service Platform Infrastructure

Figure 9:
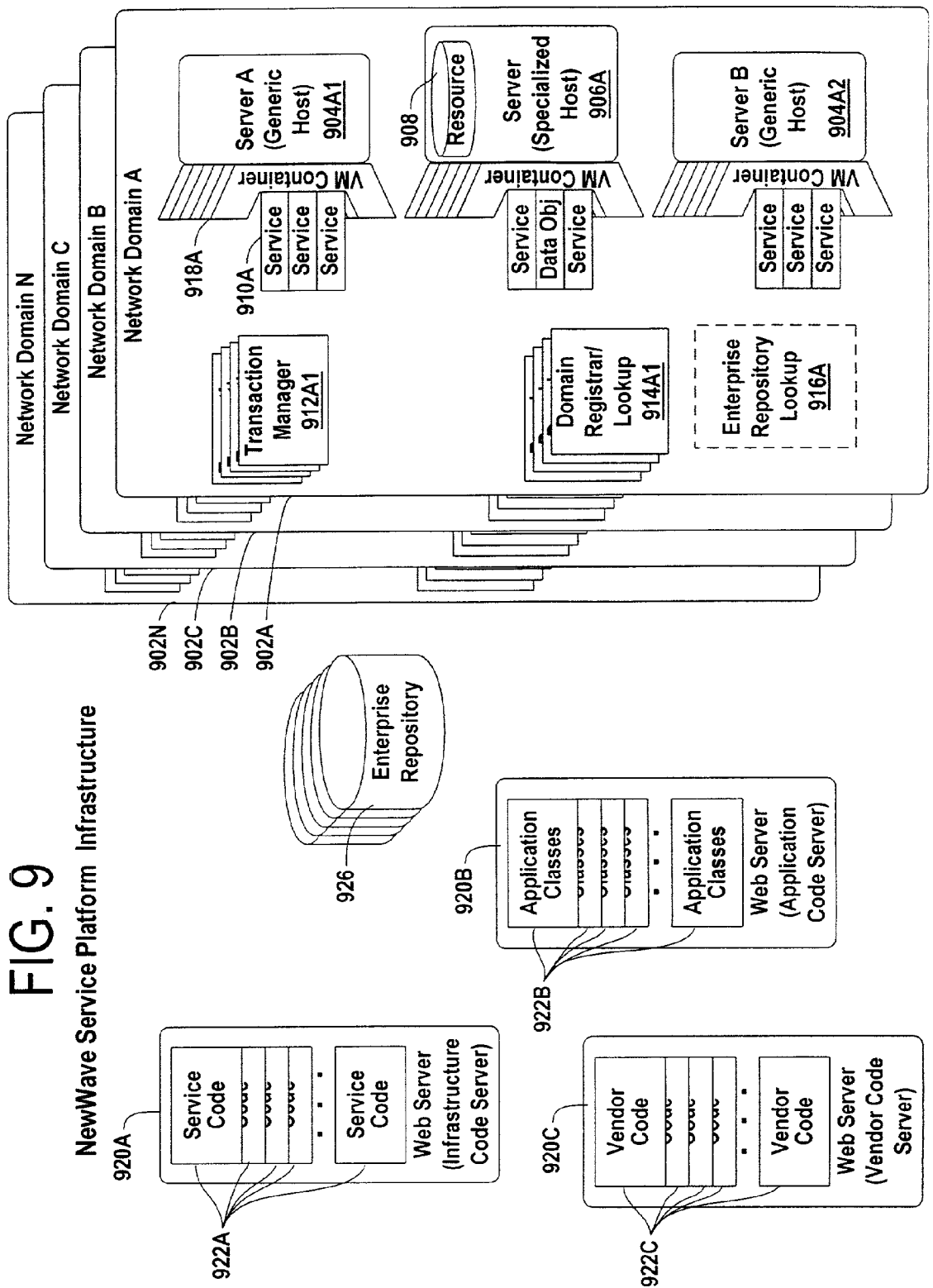
FIG. 9 is a diagram of service platform infrastructure of interrelated services relating to an enterprise is illustrated in accordance with an exemplary embodiment of the present invention.

Before discussing FIG. 9 in depth, a brief discussion of the underlying principle of the glue that binds the NW infrastructure would be helpful. NewWave, unlike prior art attempts, is a highly distributive environment based on an enterprise (or global) model and is not merely a domain level model of service distributions. Virtually every NewWave component can be embodied as a NewWave service so the NewWave principles described below apply to most, if not all NewWave components. [When a non-native application is integrated into the NewWave service environment, a surrogate or proxy NewWave service is created which maintains the specialized interface/communication; the marketplace of other NW services sees only another NW service interface.] In order for the ecosystem to remain in balance, whenever a service is launched, that service finds all services with which it needs to interact and also makes itself visible to all clients (service consumers, usually other services) that need to interact with it. Clients and services running in a domain are listed in all local lookup directories (directory services running in that domain). So, a newly-launched service spontaneously discovers all domain directories for registering itself to be found by services needing to interact with it, and finding services with which it needs to interact. The present invention, in contrast to the prior art, utilizes a "two-hop" discovery process to discover all local directory services and all enterprise level directory services. Through this two-hop process, a newly-launched service can discover and register with all local directories. Having discovered the local directories, the service can "find" any and all local services with which its needs to interact. One service is a "find" service which is used by a newly-launched service to find non-local directories (enterprise level directories) to make itself visible to non-local service consumers. Similarly, the local directory and find services can be used to look up services the newly-launched service needs, locally from the local directory and globally via the find service.

This method is generally extensible and can be extended to three or more hop implementations if extremely large or extremely refined scope delineations are required by business circumstance or by the specifics of an alternate/future implementation technology. For instance, extension of the NewWave domain beyond a single global company to a marketplace of many global companies can be realized via an "extranet" service registrar which could be implemented as a third hop. In this manner, the NW infrastructure could be extended to a pandemic, global computing platform treating applications and data similarly to how the international financial infrastructure deals with products and money. Data in the system could be traded, deposited, withdrawn and even willed to heirs. Application services can be found via service directories (like phone numbers are today) and leased to other users. These service extensions and products are in development.

Returning to FIG. 9, a diagram of NW service platform infrastructure of interrelated services relating to an enterprise is illustrated in accordance with an exemplary embodiment of the present invention. It is expected that an enterprise network is geographically widespread and serviced by a plurality of logical network domains, represented as network domains A-N. Logical domains are conceptually "local" to all services and clients within the domain. Everything not in a domain is "not local" to that domain and those services and clients. Local NW components in domain A (902A) include all locally-running VM containers 918A and other NW services 910A, domain registrar(s) 914A1-914AN, transaction managers(s) 912A1-912AN and enterprise repository lookup 916A. "Local," from the perspective of a component, means it is in the same multicast radius. Therefore, network domains A-N define separate multicast domains. NW components in domain A would be local to other components in domain A but non-local to NW components in any of logical domains B-N. Enterprise repository(ies) 926, on the other hand, is non-local to all other services and resources, no matter the domain. It should be understood that the enterprise consists of a plurality of domains, local and non-local, but the present invention of the invention will be described, heretofore, with respect to NW components in logical domain A (902A). The term "client" will be understood to represent any consumer or user of a service, notably, many clients are other services, especially another service that builds upon more primitive services, but may instead be any application, software module or tool that utilizes the processes of a service or might even be an end-user in the enterprise.

In each logical domain, such as domain A, services 910A are deployed on a plurality of host servers, 904A, 904A1 and 904A2 and running in a plurality of VM containers 906 (as described above with respect to FIG. 7). When deployed, servers 904 are loaded only with Java and the container code, these servers being "generic hosts," depicted as server A 904A1 and server B 904A2. However, special resources such as database 908 and rules engines (not shown), can be locally added to generic servers that transform the generic host into a "specialized host" or server, such as that depicted server 904A. Within each of VM containers 906A, one or more services 910 may be launched and continue running while awaiting requests from clients. However, enterprise clients must be able to find a service in order to utilize its functionality. While prior art technology makes the client responsible for knowing where to look for the service, by address usually, the present invention utilizes domain registrar(s) 914A for tracking the addresses (URL address, URI addresses or host name) of services in accordance with an exemplary embodiment of the present invention.

Domain Registrars

Each of domains A-N has at least one domain registrar, but as many as N registrars may be located in any one domain. A domain registrar can be embodied as a service and thus launch, discover and be discovered as any other service. Domain registrar 914 provides up to four primary services for the NW infrastructure: 1) a listing/lookup service for NW services running in its local domain, the services being listed and looked up in a lookup table by type and attribute, a proxy to the service is also listed that is streamed out to clients that lookup the corresponding service; 2) a leasing service for services running to lease resources in their local domain; 3) an enterprise level listing/lookup service allowing local services an client to bridge the gap to the enterprise level; and 4) a replicating service to replicate its tables or merely change in its tables to other registrars, or in fact to any service that has a need for registration or leasing information, for example, re-start services, trawling services, find services, enterprise level listing/lookup service, and other registrars in the local domain.

1. Discovery and Registration

In the NW environment, when service 910A is launched, it spontaneously "discovers" all nearby registrars 914A1-914AN (i.e., all domain registrars in its local domain). The newly-launched service 910A then registers itself with the all newly-discovered domain registrars 914A1-914AN. In accordance with one exemplary embodiment of the present invention, the NW infrastructure uses multicast packets to allow both services and consumer services (clients) to spontaneously discover any of domain registrars 914A1-914AN within a local domain defined by a multicast radius, thus bootstrapping the process of finding and registering services. Thus, discovery is accomplished without obtaining any specific information about domain registrars 914A, such as a URL address or host name. Similarly, whenever a new domain registrar is deployed, the domain registrar signals its availability for registering services within the local domain by broadcasting a multicast message to all nodes in the multicast domain (this is expected because a registrar is a NW service). All services 910A running in domain A strive to remain registered with all local domain registrars 914A1-914AN, and so upon receiving the broadcast message, all services in the domain register with the newly-launched registrar.

This method utilizes Java Jini functional facilities. Other lookup methods can be supported in specific circumstances or environments. One such method utilizes a mobile agent approach where an active mobile service agent deposits information in each lookup or enterprise registration facility. Circumstances which can invoke these alternate methods are generally the result of technical or logical barricades such as company boundaries, security domains, or non-IP transport networks.

A. Local Registration

Once local domain registrars 914A1-914AN have been discovered, local registration is a two-step process, providing registration information about the service and making an enterprise lease for resources needed by the service. Local registration makes service 910A visible to other NW services and clients (collectively service consumers or merely consumers) in the local domain. When a service registers itself, it provides a number of attributes in the registration that makes it easier for others (potential consumers) to find. These attributes may include one or more names, domain-type information, the interfaces which the service implements (i.e., what function a service can be requested to do). Thus, a client can match a service listed in registrar 914A according to their interface type or by matching one or more attributes with which service 910A registered itself.

Additionally, service 910A can also include administrative information in the registration information provided to registrar 914A (i.e., administrative information for interacting with the service administratively, such as an icon for display or a user interface object).

Finally, service 910A must provide registrars 914A an object which is a proxy, or a service object, to service 910A, during registration. The proxy is an object (or objects) that allows clients to access a service. The proxy is streamed to registrar 914A where it is stored in serialized form. When a consumer of service 910A looks up that service, the proxy is, in turn, streamed out to the consumer. A proxy contains codebase with a URL of an HTTP server, the service code (usually Java byte-code) that implements the proxy object can be served up from that HTTP server by its URL, which is located arbitrarily in or outside the geographical domain of the enterprise.

The above-described approach to registering a service proxy in a local service registrar that employs a leasing approach to registration constitutes prior art, specifically embodied by the Jini technology suite from Sun Microsystems. This approach to proximity-based, local service lookup is itself not a part of the present invention, but is used by the present invention in conjunction with novel techniques that expand the visibility of network services to enterprise scope.

B. Proxies

In its simplest form, a proxy merely forwards requests from a consumer, for instance, on to service 910A. However, the proxy might also contain any code that could be executed in a client environment before, after or instead of forwarding the request. Such a proxy is known as a "smart proxy." This model is in sharp contrast to CORBA, where a registry simply stores a reference (a sort of address) that allows a consumer of a CORBA service to make a connection to some remotely-deployed service process. The present invention allows proxies that implement the service interface to be moved out to consumers at runtime.

The technique of using smart proxies in the context of distributed object systems was known within the CORBA development community (and explicitly discussed in Iona CORBA documentation). However, the approach taken to implementing smart proxies within a CORBA context was highly constrained and awkward. A developer needed to manually insert source-code modifications into the stubs that were generated by the IDL compiler, an inelegant workaround. The Jini technology from Sun Microsystems, greatly added to the state-of-the-art with regard to the usefulness, power and practicality of smart proxies. This storage of serialized smart proxies within service lookup engines, and the streaming of such proxies to service consumer processes obviated the need to manually modify generated stub code, as well as freeing client applications from the requirement to link in required stub implementation code at program build time. The current invention makes extensive use of smart proxies, for example, in its handles to remote entity instances and the interfaces to logical association engines (discussed in depth below). However, such smart proxy techniques themselves are part of the prior art that is used in novel ways to support and enable the current invention.

The proxy that gets stored in domain registrar 914A, and subsequently streamed out to clients, can be absolutely any object that is serializable. A smart proxy can do anything that can be done in Java code. This model of moving smart proxies and service code to clients at runtime is different from CORBA, where a stub object can only act as a proxy that forwards requests to and responses from a remote server process. According to the one embodiment of the present invention, a smart proxy may perform computations that are purely local within the client's process space. According to another embodiment of the present invention, it might store state information local to the client. Alternatively, and in accordance with still another embodiment of the present invention, it might interact with a remote server process (outside its local domain)—the real implementor of a service.

Essentially, the client proxy hides code from the client, thus when the client makes a request for a NW service, a smart proxy will be returned with service interaction code that is hidden from the client. The client might "think" it is interacting with the requested service, while in fact the smart proxy provides the client with a means for executing the service locally, or interacting with the requested service, or interacting with services, sequentially or concurrently, without the client being aware of the interactions. The client proxy can hide any code, thus allowing the client to communicate with a remote service using any protocol or middleware or many services. Alternatively, client proxy can hide any code allowing the client to perform all logic locally or even implement an entire client application, including GUI.

It should be understood that even in the degenerate case, where the service object simply forwards requests to a remote process, NewWave services become roughly equivalent to CORBA or RMI services. One of the most common forms of NW services uses an RMI stub object as the proxy object that is downloaded from a domain registrar's lookup to a client. But this is simply the most common case. A smart proxy encapsulates code that interacts with a remote service using any one of a variety of protocols or middleware, such as sockets, RMI, CORBA, IBM MQSeries, and the like. Or a smart proxy interacts with two or more remote services using the same or even different middleware or protocols. Or a smart proxy interacts with zero remote processes, implementing the entire service interface locally within the client's process space. Over the course of time, a smart proxy might have an implementation that changes to a different communications protocol, unbeknownst to the client. For example, as vendors and vendor services evolve, the implementation code in the smart proxy changes to reflect new services. Alternatively, the proxy might communicate with one or another remote server processes, depending upon the time of day, lading or other configurable factors. In still another example, the proxy might parasitically use the communication channel of an object that is passed to it as an argument, not using its own communication channel.

Recall that looking up a service means fetching the service code for the service from a code server located remotely. The proxy contains a codebase that includes the address(es) (URL(s)) of code server(s) 922A which are able to serve up the code for the proxy. Thus, the proxy code is loaded remotely in the client space through its codebase. Through this proxy clients can access the service via the remotely-located service code that is streamed to the client. In contrast with the prior art, looking up a service means fetching the service's proxy from registrar 914 and the proxy's service code is streamed out to the client from HTTP server 920A.

C. Non-Local Registration

Once a service has registered in a local domain (and acquired an enterprise lease), the service is visible to any local client looking for a service of a similar type of attributes (potential service consumers) listed in domain registrar 914A's lookup. Non-local clients have no mechanism for perusing registrar directories that are non-local to themselves (i.e., in a non-local domain). Therefore, registration with a registrar only ensures that a service is visible to local clients. Registering in non-local domains requires that a service list itself with an enterprise level directory that is accessible by all clients in the enterprise. In accordance with an exemplary embodiment of the present invention, a service that wishes to be visible to non-local passes the URL address(es) local registrar(s) to enterprise repository 926 to make itself visible to clients in non-local domains. The present invention envisions multiple methods of registering with enterprise repository 926. One mechanism involves the use of enterprise repository trawler services that trawl all the registrars' lookups for services that indicate the intention to be visible non-locally. The trawler service then returns the registration information, at least the service's attributes, and the registrar's URL address, to the enterprise repository(ies). Another mechanism involves the service itself finding an enterprise repository lookup service. The enterprise repository lookup service then finds an enterprise level repository and registers the service with it by depositing registration information and the registrar's URL address, to the enterprise repository(ies). However, a salient point here with regard to non-local registration is that enterprise repository 926 lists, at least, the service's attributes and a URL to a local registrar that contains other registration information, such as administrative information and the proxy.

Finally, there might be cases when a service is running and yet must become invisible to potential consumers, for instance, when a service is executing processes on all available threads. Therefore, in accordance with another embodiment, registrars 914 track the amount of services running on threads of another service, especially container services, in the local domain. Once a threshold number of running services is reached, registrar 914 makes the service unavailable for potential consumers of the service and notifies the enterprise repository, using one of the techniques described above, that the service is no longer available to clients. Of course, this may be run on a separate service that communicates with the registrar directly. Services that need a service with the particular attributes of a service that is unavailable must either find another service with those attributes, wait for the service to free up, or initiate a process to start another instance of the service on another (or possibly the same) VM container.

2. Enterprise Leasing

Another important facet of the NW service architecture is the notion of enterprise leasing. The leasing mechanism, in general, allows enterprise resources to be reserved on behalf of a requesting client (or any consumer of the resource) in the enterprise. These enterprise resources may include services, databases, enterprise engines (rules, etc.), transaction managers, and communications (publish and subscribe, messaging, event, etc.). With respect to registrars 914, the enterprise leasing mechanism allow services 910 to bind themselves to the registrar's directory and lookup, and then periodically renew their binding to the directories of registrars 914. It should be understood that if the client is responsible for registering with all registrars in a domain, it is also responsible for contracting with each registrar for an enterprise lease. The act of enterprise leasing reserves registrar resources to the service that are necessary for the service to make itself visible to service consumers.

Any time resources are reserved on behalf of some participant in the enterprise, the reservation of those resources adheres to a leasing convention, sometimes known as time-limited resource allocation. In accordance with one embodiment, the client that requests the reservation of resources may specify a lease duration, a time period over which a client-party can assume the resource reservation will be maintained. The requesting client will be issued a lease object that indicates the amount of time for which the lease has been granted (a duration that might be shorter than that requested). Alternatively, the enterprise lease duration is set at a default time period which is known to all participants in a domain. Once a lease is established with a resource, it is the responsibility of the client reserving the resource to know the lease duration and then to renew the lease, if necessary, prior to the known time period elapsing. Whenever it is necessary to maintain the resource past the term of the original lease, the requesting party should always request a lease renewal before the lease expires. In practice, this might entail requesting several lease renewals from various registrars in the local domain. If the requesting party should fail to renew the lease and it expires, the provider of the resource will do whatever cleanup is appropriate. For registrars 914, cleanup includes deleting the service from the lookup table, including removing all attributes, administrative information and proxies (service objects).

This technique of enterprise leasing facilitates the implementation of self-healing services. If a process, on whose behalf a resource is leased, should abruptly crash, the lease will eventually expire and the system can de-allocate the resource. Things get cleaned up all by themselves. Moreover, with respect to the registrar, whenever an enterprise lease for service expires, the registrar can notify the self-healing services of the lease expiration. The self-healing services can then attempt to restart the service, either in the same or different container. In certain cases, a process might include several transactions that are dependent on one another. If, as will be discussed below, a transaction has not been completed, the participants will be instructed by transaction manager 912 to roll back the process to a state prior to the commencement of the transaction, thus the participants are unaffected by a failure during a transaction. However, if several transactions have been successfully accomplished, the results of those transactions might be cached to a storage resource awaiting further processing. If the service hosting the resource fails, or even if a service fails that is crucial to the remaining transactions, it is likely that the cached data will not be recoverable. In the best case, the client can restart the process for the beginning and reestablish the data. In the worst case, the states of the service resources being used have been changed during the previous transactions making restarting the process impossible. The solution is a mirror resource that mirrors inter-process results for a running process. In case of a failure resulting in a lease expiration (service, communications or resource), the client or the client proxy maintains an object for the mirror and when the self-healing services restart the service(s), the client can continue the process with the mirrored interim results.

In accordance with one embodiment of the present invention, individual registrars may be responsible for tracking the enterprise leases for all services listed in their respective lookups. In accordance with another embodiment of the present invention, the registrars are responsible for notifying each other through replication and the like (and possibly the enterprise repository) of a lease to a expiring service. Finally, in accordance with still another embodiment, specialized enterprise leasing services track individual leases for services and notify the directories (domain level and possibly enterprise level) whenever an enterprise lease expires. With regard to NW service leases, the main construct is to de-list any service that has failed in any directory that the service is visible to clients (i.e., domain registrars and enterprise repositories).

The premise is that all enterprise leases are managed in the local domain that the service is running. Some component(s) in the local domain (i.e., one or all local domain registrars or a leasing service) must recognize that a service's enterprise lease has expired. The service must then be de-listed from local directories that client can access and then re-listed in non-local directories that clients can access. Enterprise leases are managed at the domain level while the resources that they reserve might concern a service that is available to clients across the enterprise. Such is the case when a service registers itself locally, making itself visible to local clients, and then makes itself visible to non-local clients (i.e., clients in non-local domains). Registering in non-local domains requires that a service list itself with enterprise repository 926 to make itself visible to clients in non-local domains. Therefore, whenever an enterprise lease expires in a local registrar, that service must be de-listed from the local registrar(s) and then the lease expiration must be communicated to enterprise level directories in order to make that service invisible to potential clients. Several mechanisms are useful for this task depending on the functionality of registrar 914.

The first leasing mechanism involves an individual registrar managing only the enterprise leases for service that it registered. It is expected that self-contained registrar models that operate only at the domain level, such as Jini technology registrars, will utilize this mechanism. In accordance with this mechanism, when a lease expires in a registrar, clean up is automatic and the registrar does not communicate the lease expiration to either other registrars in the local domain or to the enterprise repository. In this case, each registrar is responsible for managing its own leases as eventually the failed service's enterprise leases will expire in all of the registrars that it registered (i.e., local registrars 914A1-914AN). However, if the service was listed in enterprise repository(ies) 926, it will remain listed until the repository is notified that of the lease expiration. Notifying enterprise repository(ies) 926 of lease expirations is the job of the enterprise repository scavenger services. Recall that trawler services originally found all services listed in local domain registrars that intended to be visible non-locally and returned the service's attributes and the URL address(es) of the registrar(s) in which the services were listed. Scavengers are the antithesis of the trawler services as these scavenger services de-list services that leases expired in a domain registrar from the enterprise repository (ies). Recall also that a service might be listed in an enterprise repository with one or several URL address(es) for the registrars with which the service is registered. A scavenger daemon is a background service that compares the contents of registrar's lookup table between scheduled checks. Registrar entries for services that have been cleaned up between checks, for whatever reason (i.e., enterprise lease expiration, explicit shutdown, etc.), will be communicated to enterprise repository 926. Enterprise repository 926 can then de-list the service from the registrar's address from its directory. If the service has only one associated URL, then the service is completely de-listed from the enterprise repository's lookup and the service will be rendered invisible to potential consumers.

In accordance with another mechanism, each of registrars 914A1-914AN communicate lease expirations from their respective directories directly to enterprise repository 926. Direct communications between registrar 914 and enterprise repository 926 is possible only if registrar 914 maintains a reference or address for enterprise repository 926 itself (or possibly for enterprise repository lookup 916, which can then be accessed by the registrar). In that case, when a service's lease expires, registrar 914 communicates the lease expiration to enterprise repository 916. Enterprise repository 916 can then de-list the reference to the registrar from its lookup or, if only one URL address/reference is listed, enterprise repository 916 can then de-list the service completely as described immediately above.

3. Enterprise Level Listing/Lookup

Clients seeking services outside their local domain and services wishing to be visible outside their local domain must have a mechanism to utilize a non-local directory. The present invention uses an enterprise repository for global service listing thereby making services visible from outside their local domain. As alluded to above, registrar 914 may or may not provide clients and consumers with a reference or location information (URL) for enterprise repository 926. Certain domain level registrars, notably Jini technology registrars, do not themselves provide multi-tiered domain structures (i.e., a local level and non-local or enterprise level). Those domain level registrars cannot be easily modified themselves, but can be integrated with enterprise-scoped directory services to expand service visibility to enterprise range. Therefore, in accordance with one embodiment of the present invention, a reference to a "find" service such as enterprise repository lookup service 916A, is held in the registrar's lookup. Enterprise repository lookup service 916A is then utilized by local clients and service for finding enterprise level directories, and finding or listing service in those directories. In the case of service, enterprise lookup service 914A looks up an enterprise repository and then registers the service by listing the service's attributes and the service's registrars' URLs in the enterprise repository. In the case of a global client, enterprise lookup service 914A looks up an enterprise repository and finds a service listed in enterprise repository 926 based on the attributes listed for the service. Enterprise lookup service 914A either returns the service's registrars' URLs to the client and the client accesses the registrar for the service proxy, or alternatively enterprise lookup service 914A accesses one of the service's registrars directly and causes that registrar to pass the service's proxy to the client.

In accordance with an alternative embodiment of the present invention, enterprise repository 926 is treated like any other service and a reference for enterprise repository 926 is copied directly into registrars 914. In this case, enterprise repository lookup 916 would check for enterprise repositories starting up or shutting down and list or de-list the repositories accordingly. Newly-launched services, as well as local consumers, can then discover enterprise repository 926 from the reference in the registrar without having to access a separate lookup service for the address. In addition, once having a reference to the enterprise repository, registrars 914A1-914AN can replicate service registration information and lease updates directly to enterprise repository 926 without the need for trawling and scavenger services.

What is novel about this approach to enterprise service lookup is that, by combining multicast-based local service lookup with enterprise-scope directory services, the client can bootstrap its way to finding a service anywhere in the enterprise. This bootstrapping occurs without an a priori knowledge of the IP address, URL, DNS host name or other detailed location information detailing how to connect to the enterprise service directory. Prior approaches to finding enterprise services, such as CORBA naming or RMI Registry, require the client to know, or be able to find, the contact information for the enterprise service directory. Other service location technologies, based upon multicast discovery (notably Jini technology) enable spontaneous discovery of services without such a priori address knowledge, but are limited to local service discovery, unless augmented by additional techniques. The NW multi-stage approach to enterprise service lookup achieves a "best of both worlds," allowing spontaneous bootstrapping by the client to find services anywhere in the enterprise.

4. Replication

Replication between registrars 914A1-914AN is unnecessary if services are responsible for discovering all registrars in their respective local domains (e.g., registrars 914A1-914AN in local domain A), and if the individual registrars are responsible for their own lease management. Otherwise, the separate registrars' lookups must be reconciled with one another by including one another's updates. The simplest means for rectifying registration and leasing information between registrars is through a replication mechanism. Therefore, in accordance with one embodiment of the present invention, registrars 914A1-914AN provide a replicating service for replicating listing changes (i.e., registrations, lease expirations, lease renewals, explicit shutdown or reset, etc.) to each of the other registrars in the domain.

As mentioned above, registrar 914 may have a reference to enterprise repository 926. If so, then the enterprise repository could also be updated from the registrar during replication. In that case, domain services 910 would then be relieved from the responsibility of registering with all of registrars 914A1-914AN in the domain, as well as renewing leases with all registrars in the domain. A service merely discovers one registrar in the domain and registers with it. The registrar replicates the registration information throughout the domain and to enterprise repository 926 if necessary. However, if the registrar known to the client fails or becomes unresponsive to the client, the client must discover and register with another registrar prior to the enterprise lease expiring.

Alternatively, the individual services are responsible for replicating service related information throughout the local domain. Services discover all running registrar services in their local domain and then register themselves with each registrar. Additionally, services make and renews enterprise leases with the individual domain registrars. In that case, the client also registers with all newly-launched registrar services in its local domain and, through a process that will be described below, registers with enterprise repository 926 if the service desires to be visible and usable by non-local clients. In accordance with still another embodiment of the present invention, a series of enterprise repository services are responsible for trawling the registrars 914 for registrations and promoting any enterprise-visible service registration up to the enterprise level. Enterprise lease expirations are handled by comparing the content of the registrar's lookup between trawls.

Enterprise Directory Services

NW services may make themselves visible to clients in their local domain or may intend to the visible to all enterprise clients, whether local or non-local. Enterprise repository 926 provides a lookup service for clients, but at an enterprise level (non-local) rather than domain level (local) registration provided by domain registrar 914. As described above, registering a service outside its local domain is the responsibility of either the service itself, enterprise repository lookup service 916A or a series of enterprise registrar services that trawl local registrars 914 for registrations. Each of these mechanisms promote any service wishing to be visible outside its local domain the means to be enterprise-visible, through registration at the enterprise level.

In addition to being a registry, enterprise repository 926 is a directory for clients needing a service. Enterprise repository 926 provides a means for non-local clients to access services that are not available in their own domains. Therefore, the lookup for enterprise repository 926 must include, at a minimum, all attributes for listed services, along with addresses (URL addresses or host names or some other references) for the services' registrars. With that information, a potential consumer can look up a needed service by its attributes and, by using the associated URL, go to one of the service's registrars for a proxy to the service.

The enterprise utilizes multiple enterprise repositories 926 that are strategically located around the enterprise's geographic domain. A potential service consumer might access any of enterprise repositories 926 for finding a service. Therefore, each of enterprise repositories 926 must list all running services in the enterprise that wish to be visible to clients in non-local domains (i.e., at the enterprise level). Thus, enterprise repository 926 must replicate service information received from enterprise registrars with every other enterprise repository in the enterprise.

The Lightweight Directory Access Protocol (LDAP) is a protocol used to access directory listings and is supported by web browsers and e-mail programs, and the like, which can query a LDAP-compliant directory. LDAP provides a common method for searching e-mail addresses on the Internet, similar to a global white pages. LDAP is a sibling protocol to HTTP and FTP and uses the ldap://prefix in its URL, thus familiar to use. LDAP provides good replication around the world and therefore provides the necessary level of replication needed for an enterprise repository. However, the LDAP protocol and directory also have shortcomings which make them unsuitable for use as an enterprise repository in the present invention.

It is not possible to support the full range of attributes and lookup required by enterprise registrar 914 in an LDAP directory as LDAP directories do not support all of the configuration information for a container that is necessary for launching a service in that container. The LDAP directory is not able to store logical domain mappings that are defined along any relevant dimensions (e.g., geography, line-of-business, etc.). This aspect of the present invention will be discussed below with the description of the DataBus service.

In an effort to overcome the above shortcomings of the LDAP and its directory, and in accordance with an exemplary embodiment of the present invention, enterprise repository 926 supports all service attributes that may be used by a client for finding a service. These attributes are available to local clients in registrars 914A1-914AN and therefore must be available in enterprise repository 926 for a client to find a service in a non-local domain. It should be remembered that a client finds a service that it needs by comparing the type and attributes for the services running in the enterprise and are listed in a lookup to the attributes needed by the client. Service lookup is based on type and attributes and not on unique name, and therefore the enterprise repository must support service type and attribute information.

Another shortcoming with LDAP is that it was never intended to store database schema. Services that use a resource which must be local must be able to automatically provision that resource. For instance, if a service uses a database locally, it must be able to start with a completely empty database, adding the tables needed on the fly. To do this, database schema information is stored in enterprise repository 926 by any method, including proprietary. XML-based schemas (Extensible or XML Structure Definitions (XSD)) are popular because they can be created with any XML tools.

NW service must be mobile from the point of view of machine-specific configuration information. Configuration information cannot be tied to a specific machine because the service might run anywhere, and configurations cannot be redefine at runtime. It must be available from anywhere in the world, and a service must be able to be launched using configuration information that is not local to the service. To do this, all configuration information is stored in enterprise repository 926 and replicated throughout the world on other enterprise repositories. Launch scripts access enterprise repository 926 to get the configuration information and forward the configuration information to VM container 910A where the service is launched. Therefore, in accordance with another exemplary embodiment of the present invention, enterprise repository 926 supports all configuration information needed by a VM container to launch a service and the configuration information needed by the service itself.

Recall that a VM container is actually a running NW service that is launched from the operating system and not from within another container. Conceptually, VM container services might be considered as an integral part of the operating environment. Other NW services, such as those that run inside VM containers, must be programmatically launched from a remote location according to the NW conventions. In order to launch a service in a specific container, the administrator must have the configuration information for the VM container that the service will run in, as well as configuration information concerning the service itself. Thus, enterprise repository 926 contains all configuration information for every VM container service currently running in the enterprise, so an administrator merely accesses the repository for all container configure information. In actuality, when a service is launched in a container, the container is provided with certain configuration information, including the service's codebase. The codebase contains the URLs of the code servers which are able to serve up the service's code. Therefore, when the service is launched, its code is loaded from HTTP servers at a remote location, for instance from HTTP server 920A.

Finally, the enterprise repository supports logical domain mapping information in accordance with an exemplary embodiment of the present invention. In accordance with the present invention, enterprise data is no longer owned by an application but instead is owned by the enterprise. Enterprise data is, however, stored at various locations around the enterprise in specialized resource servers called "entity" servers. Separate entities will generally be housed in separate storage servers. Even a given entity is likely to be physically partitioned across many separate storages. Partitions of a given entity are often collocated at a given operations center, but the same entity might alternatively be physically partitioned across geographically distributed sites, for example, by siting one subset of customer data in the U.S. and another in Europe. Logical domains are used to narrow the context of an operation to a scope that is smaller than the entire enterprise. Logical domains are, in a sense, orthogonal to the dimension of entity type or subject area, and thereby cut across different entity boundaries. These could be along geographic lines or along lines of business, or according to some other classification. With the entities being highly partitioned across distributed data stores, the multi-hop finder is used for finding any particular data object of interest. Entity instances can then be found from anywhere in the enterprise, no matter where it is physically located, by a Primary Key (PK). A multi-stage finder strategy allows the navigation to any entity instance from anywhere in the enterprise given its primary key. This strategy, of course, requires that a primary key is mapped onto the partition number where the entity is stored. Mappings from the PKs onto respective partition numbers that uniquely identifies a relevant container where the entity is stored are then stored on the enterprise repository.

Also included in each of domains A-N are enterprise repository lookups 916A-N, respectively. Enterprise repository lookup 916 is an alternative embodiment as its functionality may be incorporated directly into each of domain registrars 914A1-914AN and is therefore represented in the Figure as a dashed block. As discussed immediately above, the sole function of enterprise repository lookup 916 is to track the location of at least one enterprise repository 926 for newly-launched services wishing to be visible outside their local domains, and for clients needing to find a service from outside their local domains. It is the function of the enterprise repositories to track every service running to the enterprise, at least those running services that wish to be visible enterprise-wide, and make that information available, either directly or indirectly, to clients that cannot find a needed service in the client's own domain. Notice that, in accordance with an exemplary embodiment of the present invention, N enterprise repositories are used which tends to prevent the administrative interactions and discovery/registration and find stages from becoming a bottleneck.

HTTP Servers

NewWave services are mobile, in other words, the services can be quickly deployed on any machine, anywhere, without human intervention. As such, NW services can be launched on a server without any code specific to the service being pre-installed on the server and without any configuration information being pre-installed on the server. All resources used by the service can be accessed remotely and are not dependent on the resource being present on the local machine. Databases can be created on the fly by a service which creates the necessary database tables from a schema that is likewise remotely loaded. Additionally, NW services can be launched on a server without an administrator logging onto the server to initiate the launch. Re-homing of services is also performed at runtime from one server to another without human intervention.

To create this environment, the NW service platform deploys many HyperText Transport Protocol (HTTP) servers in place to serve up code, that is, Java class files and resources. In addition to the NW components described above, a plurality of web servers 920A to 920D are also located in the enterprise. Each HTTP web server (HTTP Daemon) 920A-920C holds a plurality of mobile code 922A-922C including, for example, service code 922A, application classes 922B and vendor code 922C. Through administrative APIs, the service supplier indicates the URL address that identifies where which one of servers 920A-920C service code 922 resides, which can be essentially anywhere on the Internet. The API method allows a requestor to start a service executing in the service container, supplying parameters that identify the URL for the code-base of the service code, the fully-qualified class name of the Java object that is the service's root object, and initialization payload object. Other methods are provided to allow a service to be abruptly shut down, allow the service to be gracefully quiesced (requested to stop accepting incoming requests, but carry to completion in-flight requests), and allow one to query whether the service is in a quiescent state. A generic service container service, such as VM container 918A loads code 922 via one of HTTP web servers 920A-920C and runs the service in its own thread of control.

Transaction Managers

Notice that within each local domain a plurality of transaction managers 912A1-912AN are available for creating transactions which are used for the purpose of transacting with host servers. In accordance with an exemplary embodiment of the present invention, transaction managers 912A1-912AN are NewWave service and as such discover and register with local registrars 914A1 as any other service. In an environment in which a function is the collaboration of many services taking action cooperatively, an important ingredient is the notion of a distributed unit-of-work. A unit-of-work is managed by transaction managers 912A at the domain level. The NW approach to transaction semantics relies on a transaction that is passed around like a football each time a service request is made. There is no central transaction manager managing the transaction, to be a bottleneck, instead a client finds any transaction manager in the domain and creates a transaction. Finally, resource managers must support bidirectional communications between a transaction manager (TP monitor) and resource managers such as eXtended transActions (XA) for providing two-phase commit to persistence.

The distributed nature of transaction managers 912A is facilitated by the highly-distributed world of the NW services. Any service, running anywhere, needs only to find a transaction manager running close by. If load is high, up to N transaction managers may be deployed across a domain thereby allowing highly-distributed services to gain access to a transaction manager and for scalability—as load increases the transaction manager does not become a bottleneck. In accordance with another exemplary embodiment of the present invention, all transactions have a lease associated with them, similar to the NW services described above. A transaction has a predetermined time-to-live. Transaction manager 912 issues enterprise leases on newly-created transactions in much the same manner as registrar 914 issues enterprise leases on services. However, the participants in the transaction can renew the lease if the activity takes longer than expected, but absent a renewal, an uncommitted transaction will expire and roll back. Any NW service which maintains state about other services or clients should implement a leasing scheme to keep its state clean.

Because of the use of Jini transactions, resources used in the GIB that are expected to participate in transactions must be managed by resource managers exposing a two-phase commit interface, such as XA or the Jini transaction participant interface. A typical resource manager is a database management system, for example, Oracle or Versant. However, recall that in FIG. 8 enterprise network elements might be NW-enabled and thus access NW services on GIB 802 by incorporating NW distributive intelligence services 824 onboard. In those cases, network elements 824 plug directly into GIB 802. In those cases, the network elements implement the relevant XA interfaces XAResource and XAConnection so that it could participate in the transaction as part of a transaction.

NewWave Functionality

In the NewWave environment, an application is a collection of services operating in concert with each other. These NW services may or may not know of each other, but their collective action makes up the functional whole that is an application. To work as an application, NW services "find," communicate and function with one another.

1. Find

NW services can be found, either locally (within a multicast domain), within a non-local domain, or anywhere in the enterprise. Services register in lookups by their respective attributes and interfaces, and thus they are found by whatever attributes with which they service registers. Locally, a service registers with all domain registrars in the service's local domain. Non-locally, a service that wishes to be visible to clients from outside the local domain registers with an enterprise level registration and lookup service, the enterprise repository. The transition from local level to enterprise level visibility is bridged by an enterprise repository lookup that provides a reference to an enterprise repository for services and clients in a local domain.

2. Communication

NewWave services communicate differently, depending on the type of service and the level of coupling between services desired. A distributed intelligent agent for network elements, for instance, is normally highly de-coupled, depending on little and thus able to continue processing regardless of the state of other NW services. It generally relies on highly, de-coupled forms of communication. The following different forms of communication are supported in the GIB:

Tightly Coupled: The service implements a remote interface with exposed methods. Clients find the service and make specific requests of it by calling methods on the interface. The coupling is reduced by registrar lookup, thus still a code-level dependency between client and service.

Two-Way Tight Coupling: The client opens a session of some sort with the service. The service maintains state about the client. There is then a runtime dependency that exceeds a single request.

Moderate Coupling, Event Notification: A client registers with a service to be notified when certain events occur. There is a direct runtime dependency, as the service will hold a reference to the client (listener). However, the reference will be generic. The service will not know the actual interface of the client beyond the listening interface. This minimizes compile-time dependency, but still has runtime dependency. This essentially is a session between client and service, the service could be blocked while the notification is sent, and transaction semantics must be handled carefully. This is good is some circumstances to reduce messaging traffic by having notifications directly from the source to the listener with no intermediary.

Loosely Coupled, Peer-To-Peer: Messages are sent through an intermediary, but directed to a particular destination by name. In this case, client and service know about each other, but only via a destination name as they can never directly access each other.

Loosely Coupled, Publish-Subscribe: Messages are sent to a topic queue and are delivered to destinations that have issued subscriptions for particular kinds of messages. The sender and receiver of the message are never aware of each other at all. The only coupling is on message topic and message attributes.

Loosely Coupled, XML: Messages are sent via publish-subscribe or peer-to-peer, but contains only XML, no objects. This removes any class-level dependencies. This is good when unrelated components are involved.

3. Interactions

Tightly Coupled Interactions

In a tightly-coupled interaction, a client or service acting as a client finds a target service via a registrar lookup or some other means, obtains a proxy to the target service, and calls methods on the proxy. A proxy, in accordance with the present invention, may communicate to the target service by any means. One exemplary method is Java Remote Method Invocation (RMI). The proxy communicates back to its service via direct sockets, IIOP, HTTP, JMS messages or any other middleware. However, the communication method selected for these transactions must be able to be reasonably effected from the client meaning that it cannot rely on the installation of any runtime component on the client. Code is remotely loaded from the codebase, but must be limited in size. It can be reasonably assumed that sockets, IIOP and HTTP would be generally available. RMI provides remote loading of arguments to the method call via the codebase.

Moderately Coupled Interactions Using an Event Model

All services must support a standardized event model, the Jini event model or the like. NW services accept requests to receive notifications from listeners and are used for certain administrative events. However, a service can use this model to extend the way in which it interacts with all clients. In this model, NW services maintain event notification registrations, and directly call each listener when an event occurs matching the event registration. Each listener must first find a service and then makes a registration. All event registrations are maintained and the service accepts lease renewals and cleans out registrations when their lease expires. Services have the proxies to the listeners loaded in their respective virtual machines, requiring the remote loading of all required classes and the services will block waiting on a reply from each listener. This mode of interaction is moderately coupled because the interaction is through standard listener interfaces, rather than specific service interfaces, but it is more coupled than the loosely coupled approaches below. However, it is appropriate for some types of interactions as it is faster than the more loosely coupled approaches and useful when the client must find the service anyway.

Loosely Coupled Interactions Using Publish-Subscribe or Peer-To-Peer Messaging

Messaging involves the sending of peer-to-peer and publish-subscribe messages through an intermediary. A variety of messaging services are available, including the Java Message Service (JMS) specification as the interface for messaging (available from Sun Microsystem Corporation). A client could publish a message to a topic queue or send a message to a logical destination. Subscribers would receive a publication if their subscription matched the message published. Loosely coupled interactions can be made even looser by using XML as the primary message format. JMS messages can include objects, but this adds a code-level dependency between sender and receiver; however, XML schemas or XML document-type definitions are not code level dependent.

Launching and Registering a Service

In enterprise computing, the platform provider, the supplier of services (programs) and the consumers of services are often all the same corporate entity, residing within the same enterprise. The NewWave infrastructure fills the gap left by other paradigms by providing a dynamic service deployment architecture, that is not domain bound. Essentially, a service provider/supplier launches its services onto host servers at their own enterprise facilities, or at a third-party facility, through the exercising of administrative APIs and/or an administrative console application. This model of dynamic service deployment onto awaiting facilities is radically different from more traditional hosting arrangements that might involve extensive business negotiations. Thus, a service provider deploying its services onto live hosts out on the network amounts to API calls—not phone calls to support personnel. This model of service deployment is termed "frictionless" because of its ease of interaction. It allows service providers/suppliers to get tomorrow's services running in the field in Internet time. The concept of frictionless, dynamic deployment of services onto the network is all enabled by the constructs of code-mobility. As discussed above, code-mobility allows NewWave systems (HTTP servers) to move code out to consumers of services. By the same token, this mobility allows developers of services to also dynamically load the code that implements their services onto these third party host servers. This is very much analogous to the way that Java applets are streamed out to a user's PC web browser and run in a virtual machine process that serves as a sort of software container for applet code. The present invention service deployment platform simply applies this software container concept to backend-hosted services. Every server in a hosting facility runs at least one of generic container processes (VM container) into which service deployers inject the code for their services. The actual implementation code gets served up from any ordinary web server (http daemon) located anywhere in the Internet.

Figure 10A:
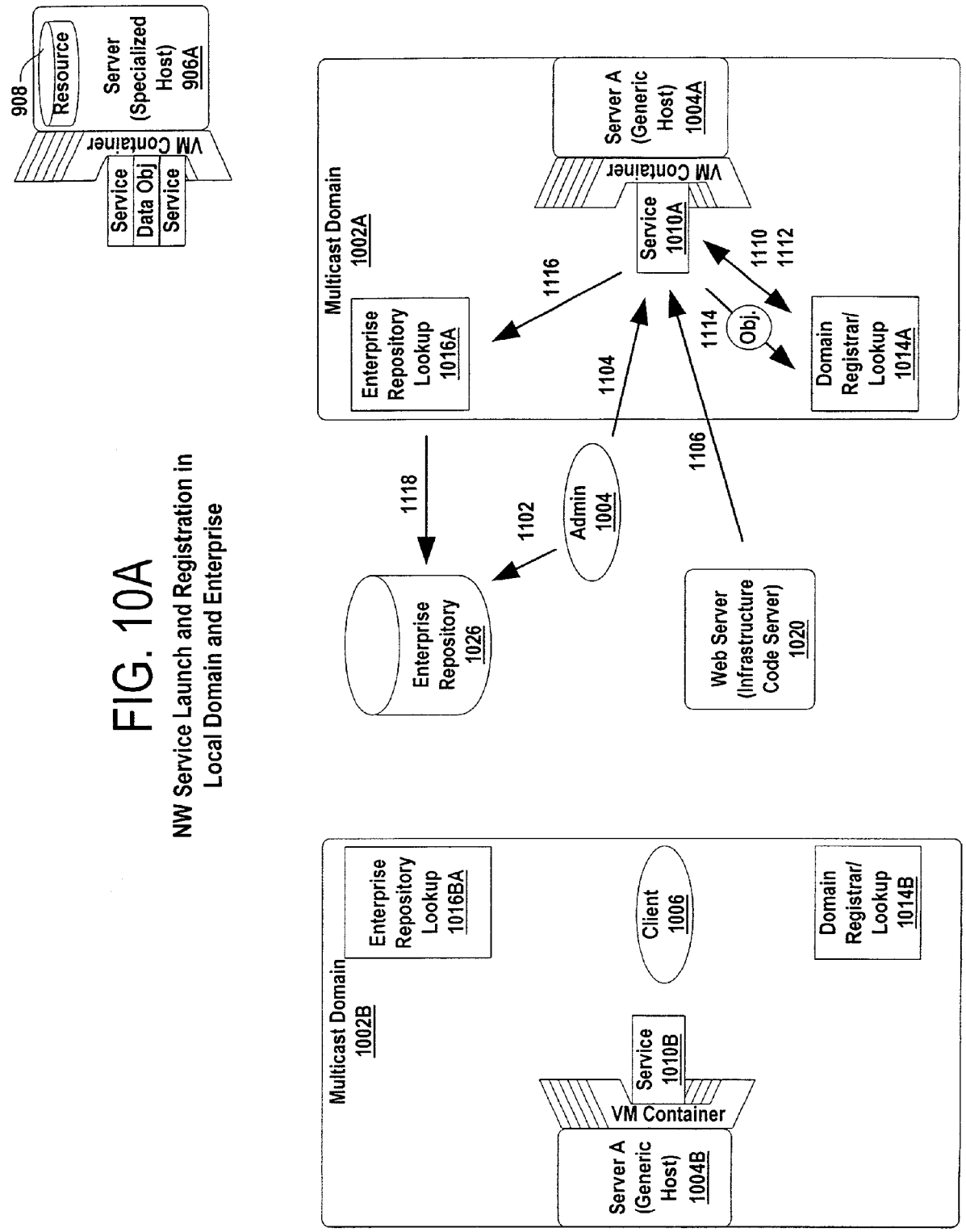
FIG. 10A is a diagram depicting launching and registering service in a global ecosystem of interrelated services in accordance with an exemplary embodiment of the present invention.
Figure 10B:
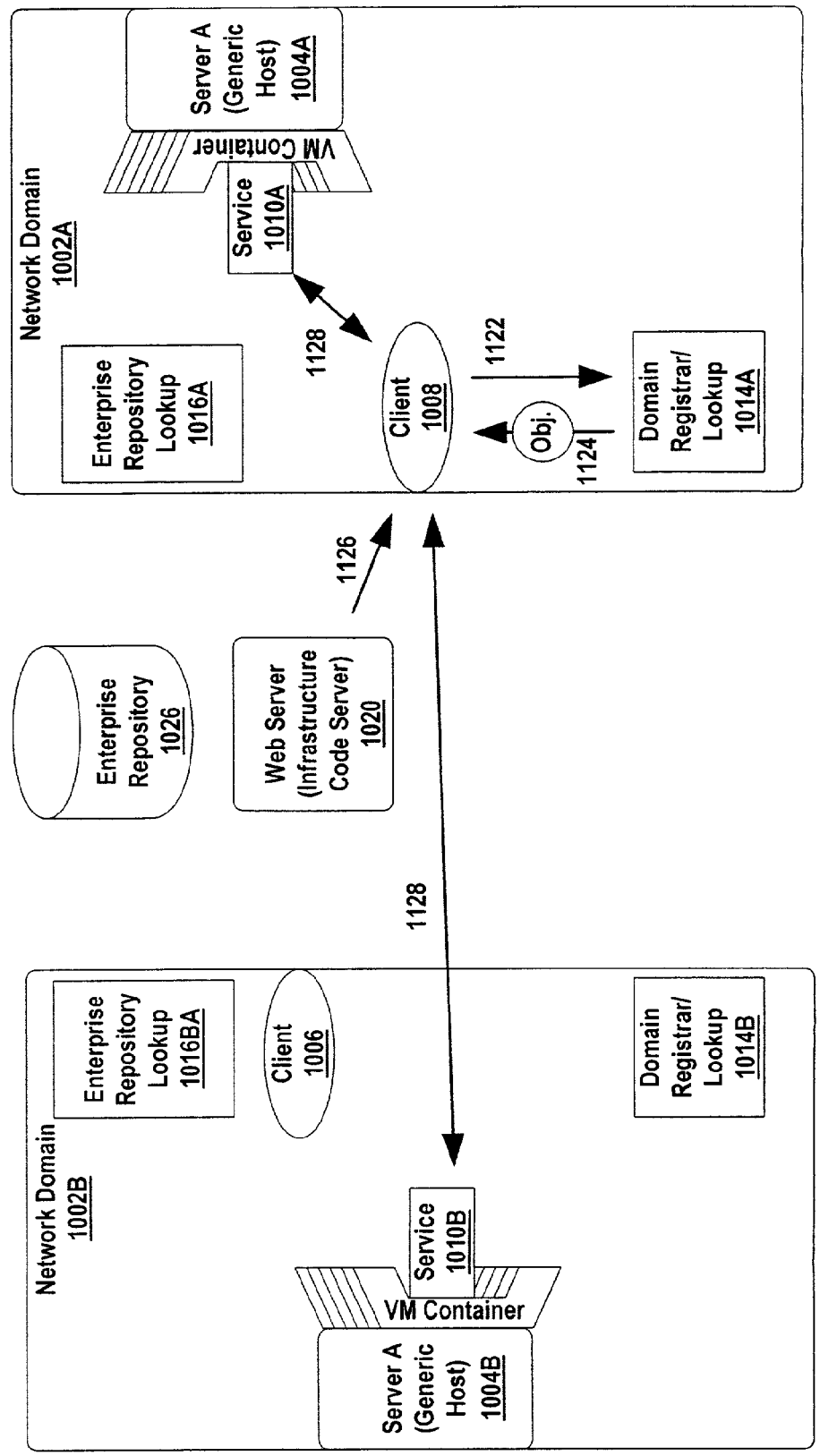
FIG. 10B is a diagram depicting finding and implementing a local service in a global ecosystem of interrelated services in accordance with an exemplary embodiment of the present invention.
Figure 10C:
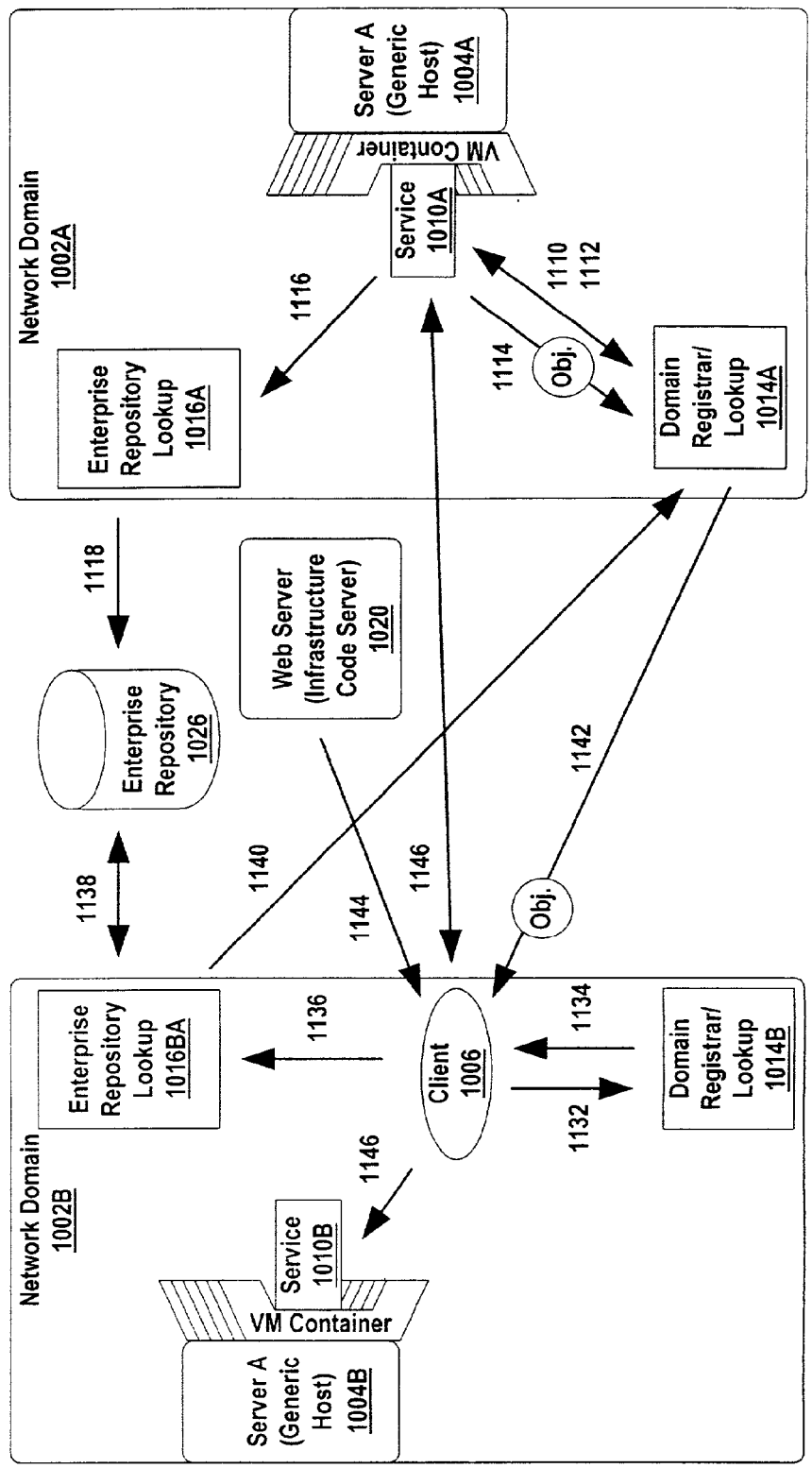
FIG. 10C is a diagram depicting finding and implementing a non-local service in a global ecosystem of interrelated services in accordance with an exemplary embodiment of the present invention.
Figure 11A:
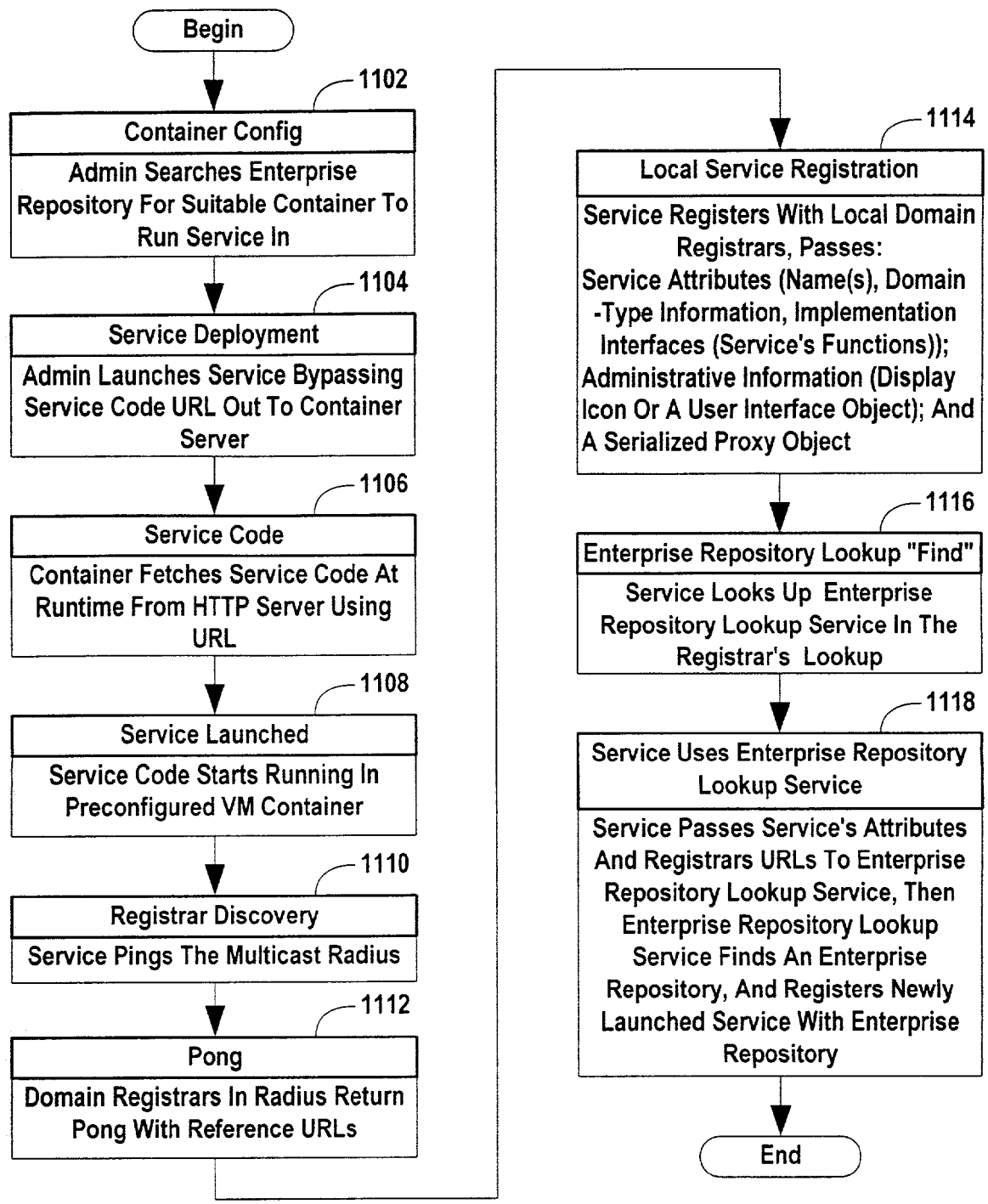
FIG. 11A is a flowchart depicting a process for launching and registering service in a global ecosystem of interrelated services in accordance with an exemplary embodiment of the present invention.
Figure 11B:
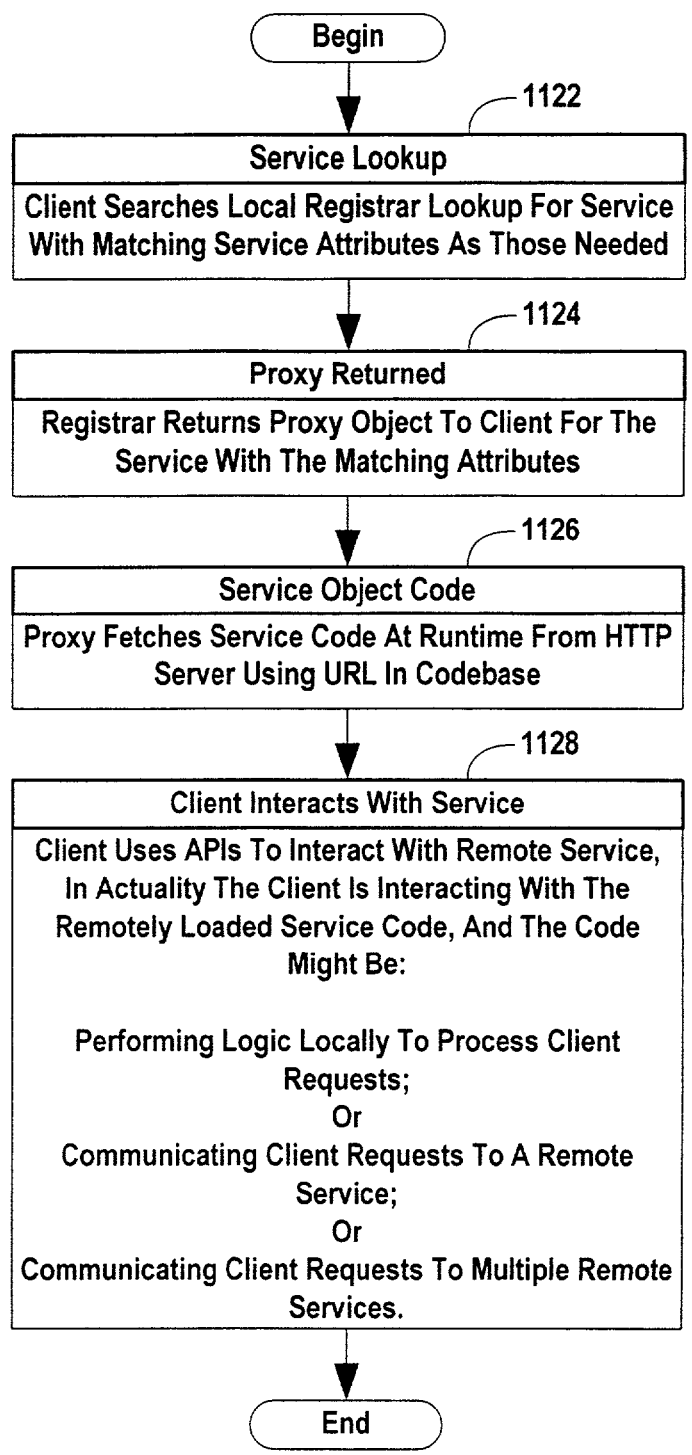
FIG. 11B is a flowchart depicting a process for finding and implementing a local service in a global ecosystem of interrelated services in accordance with an exemplary embodiment of the present invention.
Figure 11C:
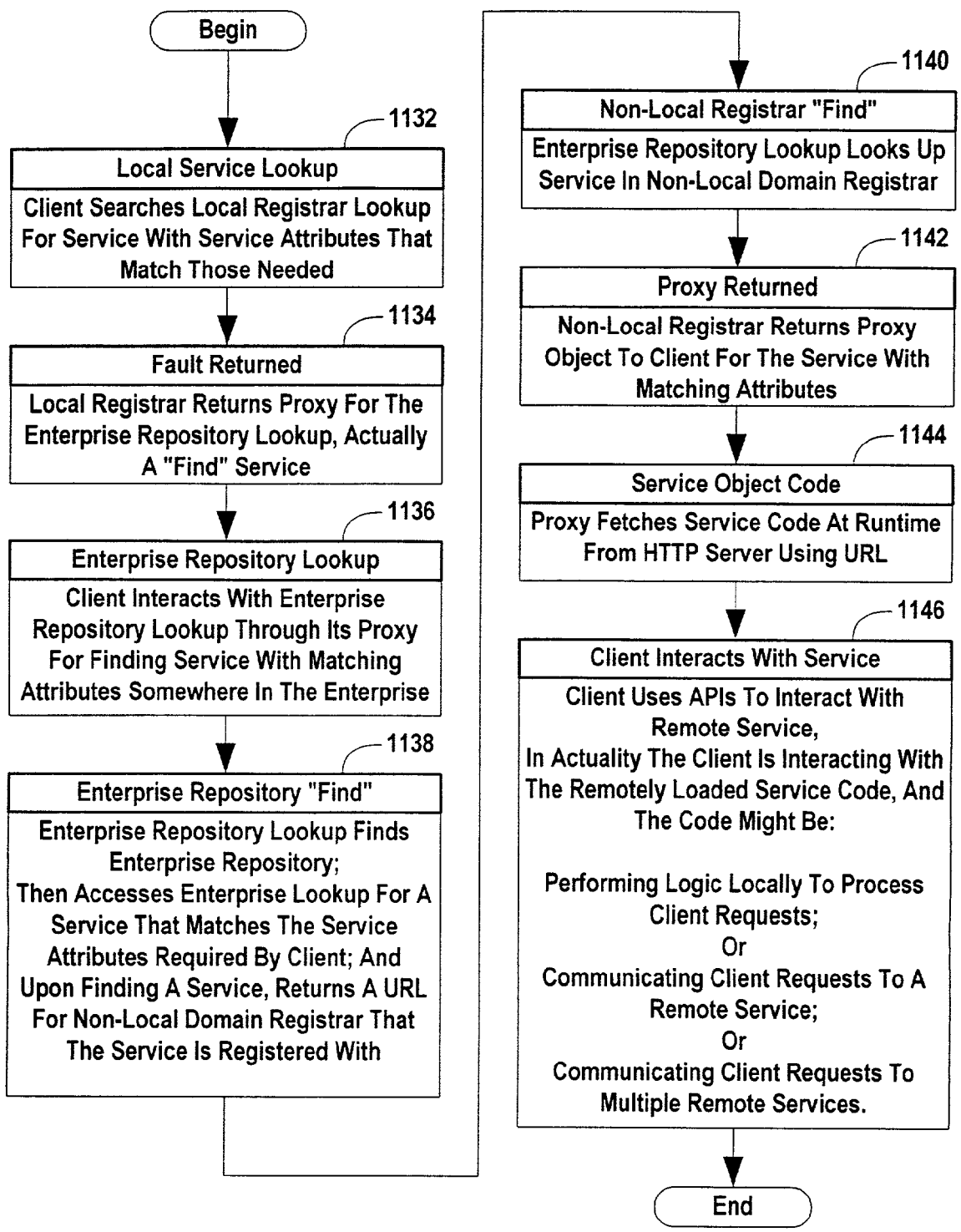
FIG. 11C is a flowchart depicting a process for finding and implementing a non-local service in a global ecosystem of interrelated services in accordance with an exemplary embodiment of the present invention.

Through administrative APIs, the service supplier indicates the URL that identifies where the service code resides out there somewhere on the Internet. The generic service container process loads the code via the HTTP server and runs the service in its own thread of control. FIGS. 10 and 11 depict launching and registering service in a local domain or the enterprise, as and well as looking up a service that is running either locally or non-locally, and then interacting with the service in accordance with an exemplary embodiment of the present invention. FIGS. 10A-10C at diagrams that depict the logical flow of the processes depict on corresponding flowcharts in FIGS. 11A-11C.

FIGS. 10A and 11A are a diagram and flowchart, respectively, depicting a process for launching and registering service in a global ecosystem of interrelated services in accordance with an exemplary embodiment of the present invention. The process begins with an administrator 1004 searching enterprise repository 1026 for suitable VM container to run a service (step 1102). Recall that a VM container is merely a service and, as such, can be defined by name or as a set of attributes under which it is registered. While some NW services defer enterprise visibility, it is expected that due to the unique nature of VM container processes, as compared to most other NW services, containers will be registered, and thus visible, at the enterprise level for ease of interaction with service providers that need specific VM container attributes. For example, many services, perhaps most, run perfectly well in a generic VM container. Others, however, need a particular resource to be local to the service as it runs (e.g., as database, rules engine, etc.) The administrator can, therefore, analyze all enterprise VM container services for necessary attribute and select only the VM container(s) that have attributes matching the service's requirements. Once administrator 1104 has selected a group of candidate VM containers, the administrator can further differentiate between specific VM containers by logical location based on the URL address of the containers matching the requirements. By making service containers enterprise-class services, one can centralize administration in an enterprise, while nonetheless making service deployment highly distributed.

Once an appropriate VM container is selected, administrator 1004 launches the service in the selected VM container by passing a reference (URL address or host name) for the HTTP server holding the service code to the VM container (step 1104). With URL, the VM container fetches the service code from the HTTP server at runtime (step 1106) and the service begins running in the container (step 1108).

Once running, service 1010A must make itself visible to potential consumers of the service, whether the consumers are located locally or non-locally to the container. In accordance with an exemplary embodiment of the present invention, NewWave uses multicast packets to allow service provider processes and consumer processes to spontaneously discover lookup servers within multicast radius, thus bootstrapping the process of registering and finding services. Local registration involves the service broadcasting of a message to all registrars in the domain and then registering with them. Enterprise registration involves service 1010A using a "Find" service to find an enterprise level directory and then registering there. Local registration begins with registrar discovery, or service 1010A broadcasts multicast "ping" into the multicast radius that defines the local domain, domain 1002A (step 1110). All domain registrars that are "listening" in domain 1102A will return a "pong" with their address information, usually URL addresses or host names (step 1112). As depicted in the Figure, only domain registrar 1014A is present, but any quantity of registrars could actually be present in accordance with the present invention.

With the addresses of local domain registrar 1014A, service 1010A can register locally with registrar 1014A. Service 1010A registers by passing information to registrar 1014A that makes service 1010A visible to clients looking for a service in domain 1002A and information that facilitates clients' interaction with service 1010A step 1114. Service 1010A registers with local domain registrar 1014A by passing registration information to registrar 1014A, including service attributes (name(s), domain-type information and implementation interfaces). The registration information may also include administrative information such as display icons or user interface objects for an administrator to use. Finally, service 1010A must pass a serialized proxy object (Obj. in the Figure) to registrar 1014A which will be passed to clients looking up the service. The proxy includes code and a codebase for fetching service code for implementing the proxy. The service code is remotely located in an HTTP server, server 1020 for example, and the codebase contains an address for that server. At this point, service 1010A is registered locally with registrar 1014A making it visible to any clients looking in registrar 1014A.

However, service 1010A is not visible clients located in non-local domains. To be visible to more than just local clients, service 1010A must register at the enterprise level in an appropriate enterprise directory—enterprise repository 1026 is such a directory. However, hopping from a local level domain to an enterprise level has been a shortcoming of the prior art that heretofore has been insurmountable. Services can discover only those services that are within their own multicast domain because the multicast message is not transmitted beyond the multicast radius. Therefore, another mechanism is necessary for "finding" non-local directories in order to make service 1010A visible to clients which look up service in them. In accordance with one embodiment of the present invention, a service wishing to be registered at the enterprise level utilizes a "find" service to find enterprise level components, such as enterprise repository 1026, that are not in their multicast domain.

The "find" service is represented in the Figure as enterprise repository 1016A and as a service running in domain 1002A and it is listed in domain registrar 1014A. Therefore, a service wishing to be visible to a client located outside its local domain need only look up enterprise repository lookup service 1016A while registering with the registrar (step 1116). As will be described below, service 1010A retrieves a proxy from the registrar for interacting with enterprise repository lookup service 1016A (not shown in the Figure). Service 1010A then requests enterprise repository lookup service 1016A to service "finds" enterprise repository 1026 and register it with the repository (step 1118). Service 1010A passes its registration information, usually limited to its service attributes and also the address of all registrars with which it is registered, registrar 1014A (URLs) to enterprise repository lookup service 1016A. Enterprise repository lookup service 1016A then finds an enterprise repository in the current example enterprise repository 1026 and registers a newly-launched service with that enterprise repository. Service 1010A is now running in domain 1002A and registered for clients that may be located in local domain 1002A or any non-local domain.

Finding a Local Service

The reciprocal of registering a service in the NewWave environment is finding a running service. FIGS. 10B and 11B are a diagram and flowchart, respectively, depicting a process for finding and implementing a local service in a global ecosystem of interrelated services in accordance with an exemplary embodiment of the present invention. Recall that the term "client" is used herein to represent any consumer or user of a service, notably, many clients or other services, especially another service that builds upon more primitive services. A client may also be any application, software module or tool that utilizes the processes of a service, or alternatively, a client might refer to an end-user in the enterprise. A client perceives a need to invoke a process, but in accordance with an exemplary embodiment of the present invention, the client need not identify the service by its interface, as is common in the prior art. Instead, client 1008 might identify the service process by some service attribute that is important to the client.

Therefore, in accordance with an exemplary embodiment of the present invention, a client need not know the identity of the service it wishes to invoke or even where the service is running in the enterprise. Client 1008 uses the identical multicasting processes described above with respect to FIGS. 10A and 11A to find registrar 1014A (not shown). Thus, a NewWave client may come up cold and discover registrars and services in its local domain. The lookup process begins with client 1008 perusing one of the local domain registrar, here domain registrar 1014A, for a needed service (step 1122). Client 1008 searches local domain registrar 1014A's lookup for services with service attributes matching those needed. Once a service is identified, client 1008 has no information whatsoever about the running service (e.g., its location, its configuration information, implementing code). Therefore, client 1008 retrieves, and registrar 1014A returns, a proxy or object (Obj. in the Figure) to use for interacting with the selected service, service 1010A (step 1124). The code for the proxy is loaded remotely in the client space through its codebase. Thus, once implemented in the client, the proxy fetches service code at runtime from HTTP server 1020 using URL in the proxy's codebase (step 1126). This code in invisible to client 1008. Client 1008 uses a series of APIs to interact with the proxy, but the client actually intends to interact with a remote service (step 1128). This does not always happen, even though the client 1008 "thinks" it is communicating with the service. In fact, several interactions are possible and each one is hidden from client 1008. Client 1008 might actually be communicating client requests to remote service 1010A as its thinks. Alternatively, client 1008 may be interacting only with the remotely-loaded service code and the code is locally performing logic to process the client requests in the client's own space. Finally, client 1008 may be communicating client requests to multiple remote services, via the service code, which may or may not be the service selected by client 1008. This feature allows a client's requests to be processed anywhere and in any manner that is convenient to the enterprise. For example, since the client did not identify the service by a specific interface, the service may have been provided by any vendor that produces service with attributes that matches the client's needs. Alternatively, while the attributes listed with the registrar's lookup might remain constant, throughout the lifecycle of the service its functionally or resource requirements might change (i.e., a service that utilized a particular OEM's resource might switch to another's resource). Loading and scope parameters can be managed by hooks implemented in the service code that interact with different services based on dynamic parameters, such as the time of day, day of week, frequency of use, bus loading, service loading, history, complexity of the application running the service.

Finding a Non-Local Service

One shortcoming of the prior art is that instances of services, other than infrastructure services, must be running in every domain that a consumer for that service is located. If not, the consumer will not be able to provide some aspect of its functionality. The other alternative is to eliminate logical domain demarcations and make all services available to all consumers in the enterprise. However, here bandwidth and directory listing become an impediment to efficiency. The present invention eliminates the need for either unnecessary duplication of service or eliminating logical domains by providing a mechanism for services and service consumers to see each other outside their own local domains. This has been referred to above as the "two-hop" process, a local hop, and a non-local or enterprise hop. FIGS. 10B and 11B illustrate a mechanism for finding and implementing a service that is local (the local hop or first hop) while FIGS. 10C and 11C illustrate a mechanism for finding and implementing a service that is not local (referred to alternatively as the non-local, enterprise or second hop) in a global ecosystem of interrelated services in accordance with an exemplary embodiment of the present invention. With respect to FIGS. 10C and 11C, service 1010A registers itself with domain registrar 1014A in exactly the same manner as was described with respect to FIGS. 10A and 11A, above. However, with respect to FIG. 10C, client 1006, located in domain 1002B, must find and implement a service. The process begins with client 1006 searching local domain registrar 1014B's lookup for a service that matches service attributes needed to accomplish some task (step 1132). However, rather than finding a service, local domain registrar 1014B returns a fault. In practice, whenever a service cannot be located in a client's local domain registrar, either the registrar or the client initiate a "find" service that will ultimately lead to finding a non-local service. However, client 1006 cannot see outside its local domain, so client 1006 must implement a local service for finding an enterprise level directory; that service is enterprise repository lookup 1016B. Client 1006 looks up enterprise repository lookup service 1016B in domain registrar 1014B's lookup and returns a proxy for enterprise repository lookup 1016B that is used to interact with the service (step 1134). Client 1006 then interacts with enterprise repository lookup 1016B, through its proxy, for finding the service it needs somewhere in the enterprise (step 1136).

Here, enterprise repository lookup 1016B searches for an enterprise repository from which to access its lookup and find a service (step 1138). Enterprise repository lookup 1016B finds enterprise repository 1026, and then accesses its lookup for a service that matches the service attributes required by client 1006. Upon finding a matching service, enterprise repository lookup 1016B returns an address (URL address, host name or some other reference) for the non-local domain registrar with which the service is registered, domain registrar 1014A. Next, enterprise repository lookup 1016B attempts to find a service that matches the requirements of client 1006 in domain registrar 1014A's lookup (step 1140). Domain registrar 1014A returns a proxy object (Obj. in the Figure) for matching service 1010A to client 1006 (either directly or via enterprise repository lookup 1016B) (step 1142). The code for the proxy is loaded remotely in the client space through the proxy's codebase. Thus, once implemented in the client, the proxy fetches service code at runtime from HTTP server 1020 using URL in the proxy's codebase (step 1144). Again, this code in invisible to client 1006, and although client 1006 intends to interact with remote service 10101A using APIs for the service, the code might redirect or locally process the calls (step 1146). Thus, while client 1006 might intend to communicate with service 1010A, the actual computations may be performed by logic in the service code locally, in the client's own space. Alternatively, client 1006's request might be processed by remote service 1010A, or by some combination of remote services such as service 1010B (that is actually local to the client).

Registrar Functionality

Figure 12B:
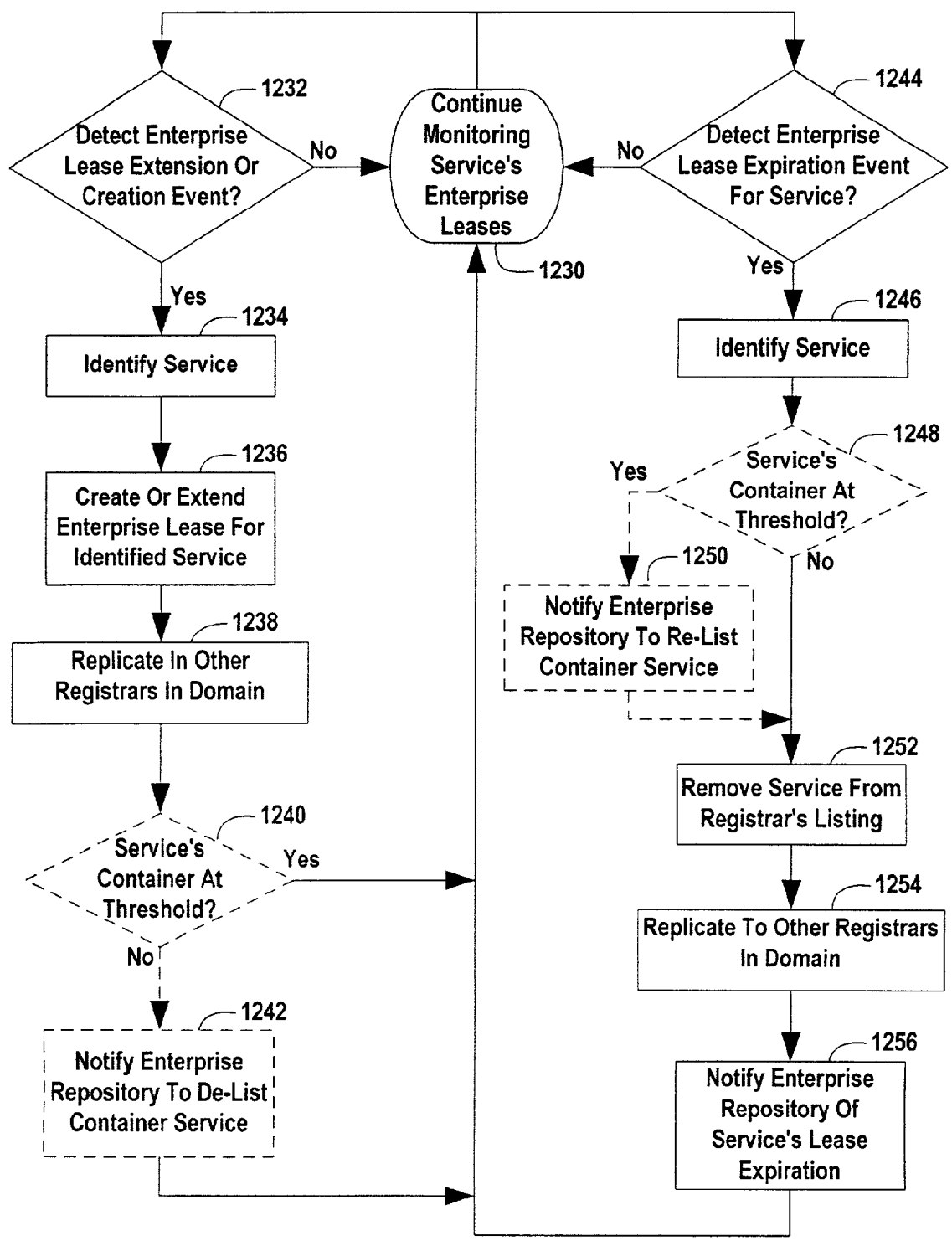
FIG. 12B is a flowchart depicting the process for enterprise leasing in accordance with an exemplary embodiment of the present invention.

FIGS. 12A-12C are flowcharts depicting the methodology implemented in registrar 914 for providing the four primary NW functions in accordance with exemplary embodiments of the present invention. It should be understood that these services (domain level listing/lookup for services; resource leasing; enterprise level service listing/lookup; and replication) are available or necessary for each embodiment of to the present invention. Because some of theses service are performed simultaneously, the four registrar services are illustrated in three separate flowcharts. FIG. 12A is a flowchart depicting the process employed by the registrar for registering services in accordance with an exemplary embodiment of the present invention. FIG. 12B is a flowchart depicting the process for enterprise leasing in accordance with an exemplary embodiment of the present invention, while FIG. 12C is a flowchart depicting a process employed by the registrar for looking up a service in accordance with an exemplary embodiment of the present invention.

The service registration process begins with the registrar in a listening state, waiting for messages to arrive on the network. The signals may be generated by a service (including a container service) or a client (any consumer or user of a service) located in a local or non-local domain or in another registrar in the local domain, thus allowing for many possible permutations for incoming signals. With regard to the exemplary process, a ping( ) is handled first. If, at step 1202, the registrar receives a ping( ), the registrar immediately returns (pong( )) its location to the service initiated the ping( ) (step 1204). The registrar then waits for the service to return its registration information. If, at step 1202, no ping( ) is received, the process flows to step 1206 where a check is made to determine if registration information has been received by the registrar. If the information has not been received by the registrar, the process iteratively reverts to step 1202 until registration information is received. Here it should be understood that the registrar is merely in a listening state, listening for events and messages that it must process. [Checks 1202 and 1206 merely represent an iterative process used to simultaneously listen for both a ping( ) and registration information from a variety of services in the domain.]

Returning to step 1206, if the registrar receives registration information, the process continues to step 1208 where the registrar receives registration information about the service, which may include attributes for helping clients find services such as one or more name, domain-type information, implementation interfaces (i e., what the service does for a client or a description of the service's functions). Additionally, the registration information may contain administrative information for manually administering the service, such as a display icon or a user interface object. Finally, the registration information may contain a serialized proxy object. It is possible for there to be cases where a service registers with only a URL or host name, but as a practical matter, most clients will need a proxy to interact with the service. Clients access the service with the proxy. The proxy could then contain any code which could be executed in a client environment before, after or instead of forwarding the request. The type of proxy, a smart proxy, may invoke services and functionality unknown to the clients. For example, the proxy might call more than one service for concurrently executing the client's request. In another example, the proxy might call for services executing ancillary functions unrelated to the client's service request (e.g., a client might intend to execute a network management function (profit center) and proxy calls billing services (cost center) to perform client and billing procedures that are ancillary to the client's request). The proxy also contains a codebase which is, at least, the URL address of an HTTP server which contains the implementation code for the proxy. That URL is used when the proxy is passed to a client to load the implementation code to the client, unbeknownst to the client.

Regardless of the type of proxy, the registrar may check the lookup for an instance of the service (step 1210). In accordance with one embodiment of the present invention, the domain registrar will receive registration information only from services wishing to register themselves in the registrar's domain. However, in accordance with other embodiments, the domain registrar will receive registration information from another registrar in the local domain through a domain level replication process. The present flowchart envisions either eventuality. Here it should be understood the domain registrar of the present invention is extremely flexible. A domain registrar may communicate changes in its table to any service that is listening, for instance at the local domain to other registrar, re-start services, trawling services, scavenger daemons, enterprise repository lookup services and find services.

If the registration information is from another registrar in the local domain, it might be possible for a record of the service to already exist in the lookup table. This record might exist due to a previous replication from another third registrar, or from a restart and re-registration where the service was not properly communicated to all of the other registrars throughout the local domain. While either of these cases is unlikely, it is good practice to continually monitor the registrar's lookup table for duplicative registrations. Therefore, if a copy of the service's registration information exists in the registrar's lookup table, it should be assumed that the service was re-started and the enterprise lease for the service should then be extended (step 1224). However, with regard to enterprise leasing, it is possible for enterprise leases to be managed independently at each registrar in the local domain (assuming that more than one instance of a registrar exists), or managed at one registrar, typically the registrar that initially registered the service. That registrar would be expected to communicate the lookup information to all registrars throughout the domain. Thus, if the service registration information received by the current registrar is from another registrar in the domain and that registrar manages that service's enterprise lease, the process would then end without renewing the service's lease.

Returning to step 1210, if the service is not listed in the registrar's lookup, the registrar makes an entry for the service in the lookup table (step 1212). Typically, attribute information would be listed in the registrar's lookup table for easy access when looking up services corresponding to clients' requests. Administrative information and the serialized proxy object may be stored separate from the attribute information in another location, but referenced from the attribute information for quick retrieval after a match has been found. Next, the registrar determines whether or not the registration information has been received directly from a newly-launched service or another registrar (step 1214). If the registration information is not directly from the service, the registrar then creates an enterprise lease for the newly-registered service, assuming that each registrar in the domain manages its own leases (step 1224). The process then ends.

Returning to step 1214, if the information has been received from the service directly, it is the responsibility of the registrar to replicate the information in each of the registrars in the domain. In that case, the registrar must update the enterprise repository with registration information from each service wishing to be locally visible in only the local domain (step 1216). Next, the registrar determines whether the service intends to be visible in only the local domain (step 1218). If so, the process reverts to step 1224 where the registrar creates an enterprise lease for the service and then the process ends. Alternatively, at step 1218, if the service intends to be non-locally visible (i.e., in the enterprise, outside the local domain), the registrar passes the registration information to the enterprise repository. As discussed above, finding the location of the enterprise registrar may be performed internally, inside the registrar, or externally via an enterprise repository lookup. If registering with the enterprise repository is handled internally, the registrar merely looks up the enterprise repository's location (step 1220) and passes the device's registration information to the repository step (step 1222). Otherwise, the registrar looks up the location of the enterprise repository lookup and passes the device's registration information to the enterprise repository lookup (step 1220), which in turn passes the device's registration information to the repository (step 1222).

Two things should be made clear here. First, it is apparent that creating an entirely independent lookup just for finding the enterprise repository is counterproductive. That is normally true except in the present case where technology exists to perform some of the registrar's functionality that is usable, but not easily adapted, from a local domain-type environment to an enterprise consisting of multiple domains. One such technology is Jini technology that performs certain registrar functions at a domain level, but is not suited to multi-domain functionality. Secondly, enterprise registration might not be synonymous with domain registration. In some situations it might be acceptable to merely pass the location of the registrar to the enterprise repository. Whenever a client cannot find a service in its own domain and hops to the enterprise repository, the client can pick up the host name, or URL, for a registrar in the service's domain. From there the client can retrieve the serialized proxy in the same manner as if the client had retrieved it from a local registrar. Moreover, it might be that all services have an entry in the enterprise repository, even though some are not visible in non-local domains because it is expected that administrative functions will almost always be performed at the enterprise level. Administrators can then access administrative information, icons, interface and other service tools for services that are not visible in the non-local domains (enterprise) which is especially important for launching a service. Since containers are service, there might be a case where the intent is not to be visible in the enterprise, but be available for administrative use (i.e., launching a new service).

Regardless of whether or not an enterprise repository lookup is used, the registrar must create a lease for the newly-started service (step 1224) prior to ending the process.

Regarding FIG. 12B, a flowchart depicts a process for managing enterprise leases in accordance with a preferred embodiment of the present invention. Every service running in any of the enterprise's domains must have a lease. When the registrar accepts a service registration, it issues a lease for the registration. The service must periodically renew the lease or the registrar will dispose of the registration, thus allowing the registrar to remain stable. If a service goes away or is inoperative, the lease will not be renewed and the registrar will eventually clean up its tables. The principle of lease management is a fundamental principle of the NW infrastructure and is used throughout the GIB. Any GIB service which maintains state about other services or clients should implement a leasing scheme to keep its state clean. Services typically run a background thread that periodically wakes up to perform the lease-renewal chore. A service remains registered only so long as it keeps expressing interest via lease renewal. The renewal is passed, if necessary, from the registering registrar to other local registrars or to the enterprise repository. However, the task of lease maintenance might be left to the registering registrar and renewals are replicated around the enterprise.

Lease maintenance, as depicted in the flowchart, is a continuous process that always reverts to an enterprise lease monitoring state (step 1230). Leases remain valid for a predetermined amount of time. That duration of time may be fixed or specifiable by the service making the enterprise lease. Therefore, the registrar must have a sense of time from which to make expiration determinations, for instance, from outputs from the internal CPU oscillator clock. Whenever a lease is created, a counter may be initialized that, based on the duration time of the lease, counts down to a lease expiration event. The lease expiration event may be circumvented by the service renewing the enterprise lease anytime prior to an expiration event. Therefore, the registrar is cognizant of lease creation or extension events and lease expiration events. If, at step 1232, the registrar detects an enterprise leasing or renewal event, the registrar must first identify the service associated with the event (step 1234). Next, the registrar creates or extends the service's enterprise lease by postponing the lease expiration event for a period of time equal to the preset lease duration (step 1238). The process may end here or in accordance with another exemplary embodiment of the present invention, the registrar may determine if the container running the service is being fully utilized (i.e., the threshold amount of threads are currently being processed (step 1240)). Recall that generic service containers are multi-threaded processes allowing many separate service instances to be run in their own threads. However, if all of the container's threads are used by services, the container cannot support another service and a load error will occur. A threshold number of services may be defined for a container and, whenever the number of services being run exceeds that threshold, the container service simply de-lists itself until some services' leases expire. Thus, if the threshold is not exceeded by the addition of the new enterprise lease, the process reverts to step 1230 where the registrar continues to monitor the enterprise leases. Conversely, if the threshold number of services are now being run in the container, the container can no longer support new services, so the registrar notifies the enterprise repository to make the container service invisible to potential clients (step 1242). It is expected that, in most instances, container services are discovered at the enterprise level most likely by an administrator; thus, the registration must be hidden at least the enterprise level. However, it is also possible that the container service may be discovered at the local domain level so each registration instance of the container service in the local registrars might also be hidden from view, depending upon the discovery process for containers. Once the fully-loaded container service is hidden, the process reverts to step 1230.

The second type event being watched for by the registrar is a lease expiration event (step 1244). If one is detected, the registrar identifies the service whose enterprise lease expired (step 1246). Next, in accordance with an alternative exemplary embodiment of the present invention, the registrar determines if the container service is running at threshold capacity (step 1248). If so, the registrar notifies the enterprise repository to unhide the container service and make the container visible to enterprise clients looking for a service (step 1250). At this point, the registrar's listing of the container service must also be made visible if the container service was hidden in the registrar's lookup. However, the listing of a service whose lease expired must be removed from the lookup (step 1252) and that removal be replicated to the other registrars in the local domain (step 1254). Finally, the registrar must notify the enterprise repository that the service's lease expired and the service's registration information be removed from the enterprise repository (step 1256). The process then reverts to step 1230.

Regarding FIG. 12C, a flowchart depicts a process employed by a registrar in response to a "find" request from a client in accordance with a preferred embodiment of the present invention. The present invention allows a service to register itself with a local registrar by providing service attributes in the registration to make it easier for clients to find and interact with the service. These attributes may include one or more names, domain-type information and/or the interfaces which the service implements. "Finding" a service is potentially a two-hop process for a client, a local hop; and if a suitable service is not found in the local domain, a non-local hop. Registrars store all attribute information for each service running in their respective local domain for finding a service, and a proxy for each running service is passed to a requesting client to use for interacting with the service. While the registrar performs certain functionality associated with finding a service in its local domain, registrars do not provide attribute information for each service running in all non-local domains (i.e., the enterprise). The enterprise repository provides a requesting client with a mechanism for finding a needed service in a non-local domain by listing all running services in the enterprise. A client needing a service that is not running in its local domain can access the enterprise repository for the location of a registrar having a running copy of the service. In accordance with one embodiment of the present invention, the client can then go to that registrar for the service's proxy and interact with the service. In accordance with another embodiment of the present invention, the enterprise repository also maintains a proxy for each running service in the enterprise so the client can get the proxy directly from the enterprise repository rather than going to the service's registrar.

Turning now to FIG. 12C, the process begins with a registrar receiving a "find" request for a particular service (step 1270). It should be understood that the client may be in the registrar's local domain and, in fact, with respect to the first, or local, hop the client is in the registrar's local domain. However, in accordance with some embodiments of the present invention, the "find" request may have been referred to the present registrar by an enterprise repository. The registrar then checks its lookup for service using information in the request, such as service name or any other attribute information in the request (step 1272). Next, the registrar decides whether or not the service is running in the local domain (i.e., if there is a match between the attribute information contained in the "find" request and the service attributes contained in the registrar's lookup table (step 1274)). On the first hop, the service needed by the client may or may not be found in the local domain, and thus registered with the registrar and listed in the lookup table. It is, however, expected that administrators will attempt to locate services proximate to clients that utilize those services; therefore, in many cases the service needed by the client will be found on the first hop in the client's local domain. With respect to the present flowchart, the client may not be local to the registrar, but might have been referred to the present registrar by the enterprise repository. In that case, it is highly unlikely that the service will not be found in the registrar lookup table because the present registrar registers the service with the enterprise repository. In any case, if the service is found in the registrar's lookup, the registrar gets the proxy object for the service from a storage location associated with the lookup table (step 1276) and returns the proxy to the requesting client (step 1278). The process then ends.

Returning to step 1274, if the service cannot be found by the registrar in its lookup table, then the registrar must pass the client request on to another registrar, albeit indirectly, in which the service is registered. Here, two alternate embodiments are possible. The first requires that the registrar track the location of at least one enterprise repository, while the second embodiment involves the registrar merely pointing to an enterprise repository lookup containing the location of an enterprise repository. As discussed above, the alternate embodiments are brought about due to technologies for performing some of the registrar's functionality actually existing, and due to the varying ease in which these technologies may be transformed from a domain-type environment to an enterprise environment consisting of multiple domains. Regardless, if the service information cannot be found in the registrar's lookup, the registrar must get next hop information for the client (step 1280). The next hop information may be either the location of the enterprise repository itself or might instead be the location of the enterprise repository lookup. In that case, the location of the enterprise repository must be acquired from the enterprise repository lookup. In either case, the location of the enterprise repository is found and passed to the client (step 1282) and the process ends. Alternatively, the registrar passes the client's request directly to either the enterprise repository lookup or the enterprise repository to checks it records for a service that is compatible with the client's request. Once found, the client request would then be passed to the service's registrar and the present process would return to step 1270 for the new registrar.

Transaction Processing

With regard to FIGS. 13A-13B, a flowchart depicting the transaction process employed by the transaction manager is illustrated in accordance with a preferred embodiment of the present invention. The process begins with the client sending a transaction request to the transaction manager (step 1302). The transaction manager may be any of transaction managers 912A1-912AN depicted in FIG. 9 and the client may be one of the services being run in containers 906. Upon receiving the request, the transaction manager creates a transaction for the client, issues an enterprise lease for the transaction, and then returns the transaction content to the client as a transaction object (TXN) (step 1304). The transaction manager will manage the transaction only as long as a valid enterprise lease exists for the transaction. Should the enterprise lease expire, the transaction manager will clean up the client's transaction. By using the enterprise leasing concept, the client need not notify the transaction manager in case of a transaction failure. Should the client not be able to complete a transaction, the transaction manager automatically cleans up after the enterprise lease expires. However, if the transaction is proceeding at a slower than expected pace, the client can always renew the enterprise lease with the transaction manager. The enterprise lease maintenance process will not be further described for the transaction manager as the process has been fully described for the registrar with respect to FIG. 11B.

Returning to FIG. 13A, the client then requests various resources to join the transaction by passing the TXN to a resource in a request to join the transaction (step 1306). Recall that the client may be communicating with resources via traditional resource managers or might instead be communicating with NW-enable devices and network elements that are managing a resource. Next, if the resource manager notifies the client that it intends to join the transaction, the process flows to step 1308 where the resource manager also passes a participant interface to the transaction manager (step 1314). The client then determines whether or not another resource is needed in the transaction (step 1316). If another resource is necessary, the process returns to step 1306 where the client invites another resource to join the transaction and the process continues as described immediately above. If, on the other hand, another resource is not necessary for the transaction and the client has joined the necessary resources in the transaction, the client makes a "commit" call to the transaction manager (step 1318). At that point, the transaction manger implements the two-phase commit process which is invoked by the transaction manager on all participants joined in the current transaction (step 1318).

Returning to step 1308, should the resource manager not join the transaction, either expressly or by failing to respond to the client's request, the client may attempt to find another resource (step 1312). The process implemented by the client for finding a resource is similar to that described above with respect to FIG. 10 for finding a service and will be discussed further with respect to the DataBus. Should the client find another resource that is suitable for the transaction, the process reverts to step 1306 and continues as described above. However, if the client cannot find a suitable resource to transact with, the transaction ends. At some point, the transaction's enterprise lease expires with the transaction manager and the transaction manager cleans up itself.

Turning now to FIG. 13B, the two-phase commit process implemented by the transaction manager is described. After the client makes a "commit" call to the transaction manager via the TXN object, the transaction manager makes a "prepare" call to all participants (resource managers) that have joined the transaction with the client (step 1330). If all participants accept the "prepare" call, then the transaction manager issues a "commit" call to all participants (step 1334). Here again, the participant may accept the call or abort the transaction (step 1336). Should every participant acknowledge that it accepts the commit, the participants then perform the requested transaction and the transaction manager notifies the client that the transaction has been accomplished (step 1338), and the process ends. However, at times a participant cannot complete a transaction, thus returning to steps 1332 and 1336. At any time during the two-phase commit process a participant aborts the transaction, the client is notified of the failure (step 1340) and the transaction is rolled back at all of the participants due to the failure (step 1342). Roll back is a mechanism for returning participants to the state in which they each were prior to the participant accepting the transaction request. Rolling the transaction back ensures that no participant has partially completed the transaction.

Service Failures and Self-Healing Services

It is a fundamental principle of NewWave that it is a normal occurrence for the operating environment to be unstable for a time, but that it must return to stability independently. Maintaining a healthy environment depends first on finding out the health of the environment. As such, two techniques are used. The first involves the reporting requirements of all services. All NW service must answer ping( ) and healthcheck( ) requests. The ping( ) only establishes that the service is alive. The healthCheck( ) establishes that the service is alive and is able to perform all of its required functions. This includes accessing any needed resources, such as a database and a transaction manager. It also includes the ability to perform a task in a predetermined time period, depending on the task.

Enterprise leasing provides information to the registrar about the health of the services registered in its tables. If a lease is renewed, the registrar rightly assumes that it is alive, but not its condition. If the lease expires, the registrar assumes that the service is no longer functioning. This information is used to keep the registrar's tables clean and avoid giving out any stale references. The registrar will also notify any interested parties when a change is made to its tables. Certain NewWave infrastructure services monitor the registrar and use lease expirations as information about the state of the environment. Different types of monitoring services take different actions, such as restarting services or replicating registrations outside of the domain of the registrar.

Remote code loading, remote configuration and remote launching of services make easier the task of keeping the NewWave infrastructure and GIB running all of its services. When a service abnormally goes down, it must be restarted without human intervention if at all possible. This is done using an Arch Angel concept—a number of agents whose job it is to watch other services, know what services should be running, and start them if they are not running. The job of the Arch Angel is made easier because services have limited constraints on where they run—if one server goes down, the services that were running on it can usually be immediately re-homed on another server. However, some services have special requirements, local resources and the like.

As discussed above, some services require special resources and find it necessary to maintain mirrored state information in case of a service failure. Some services cannot be re-homed on a different service because those services have some state that must be restored when restarted. If a restarted service must re-establish the previous state, then that state information must be stored or mirrored in a place that would not go away if the server the service is running fails (i.e., on a non-local resource for instance). One solution is using virtual bulletin boards that allocate space to running application or service. State information is updated to a service's space until needed to recover from a failure. One approach for maintaining this type of private state managed by a service and another is for maintaining state that is shared by multiple services.

When a service goes away, it is not enough to just restart it. This may restore the services to the ecosystem, but not the interconnectedness of the ecosystem. There will still be stale references to the old service. So, even if all of the services are running, the NewWave environment may still be broken because collaborative services can no longer get to each other. A simple and effective way to handle this problem is by means of smart proxies, which have been discussed above. Recall that the proxy used to access a service from a client (which may be another service) is provided by the service itself. A proxy can encapsulate any code that can be executed in the client space. Self-healing services provide proxies which handle connection-related errors and re-find their respective target services, and finally re-execute the previous request. In this way, when a service is restarted, the stale references will eventually heal themselves.

Figure 14:
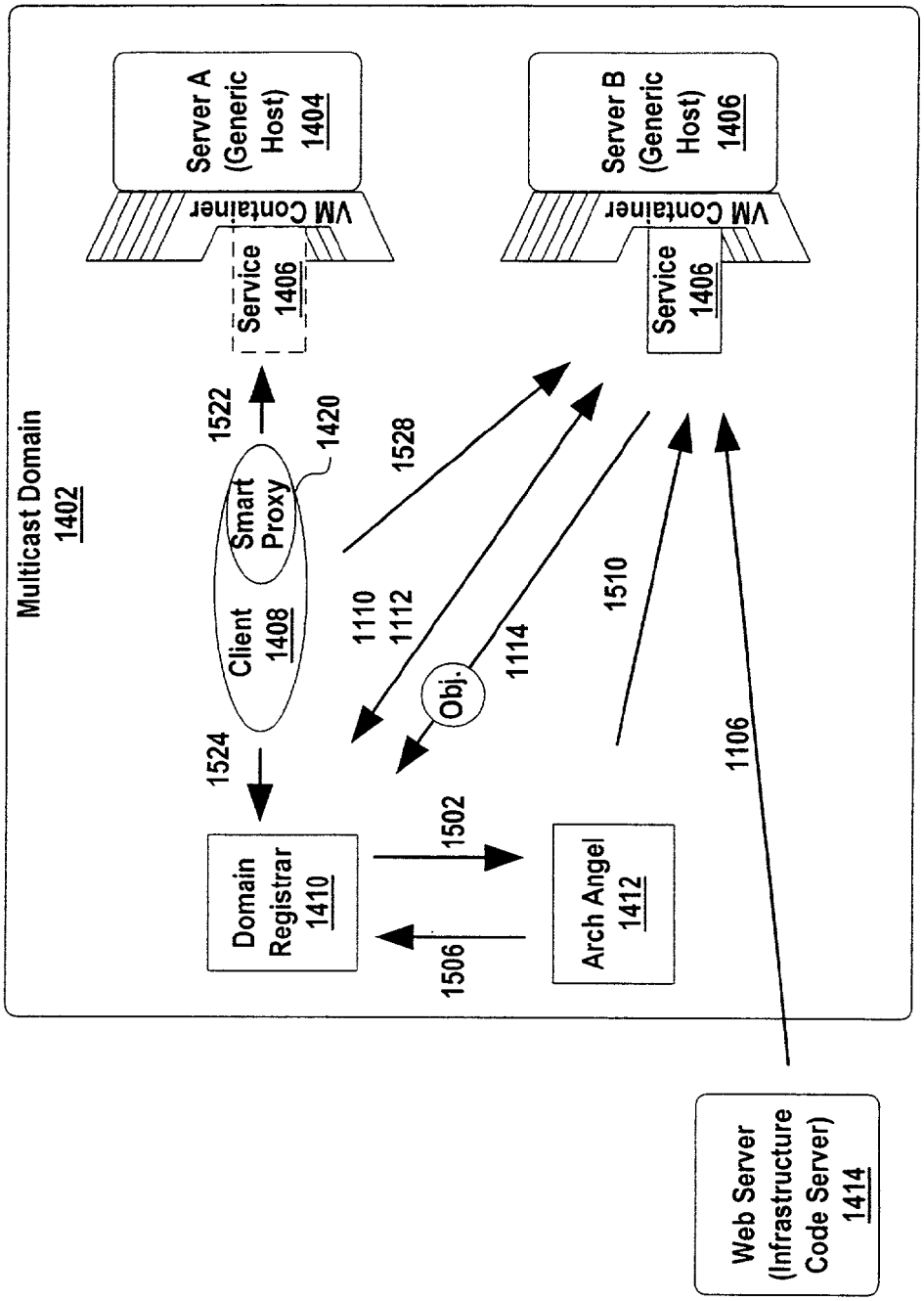
FIG. 14 is a diagram depicting a service failure and re-homing the service to a different server and further depicting self-healing a proxy reference using a smart proxy in a global ecosystem of interrelated services in accordance with an exemplary embodiment of the present invention, and further illustrates self-healing a proxy reference using a smart proxy.
Figure 15A:
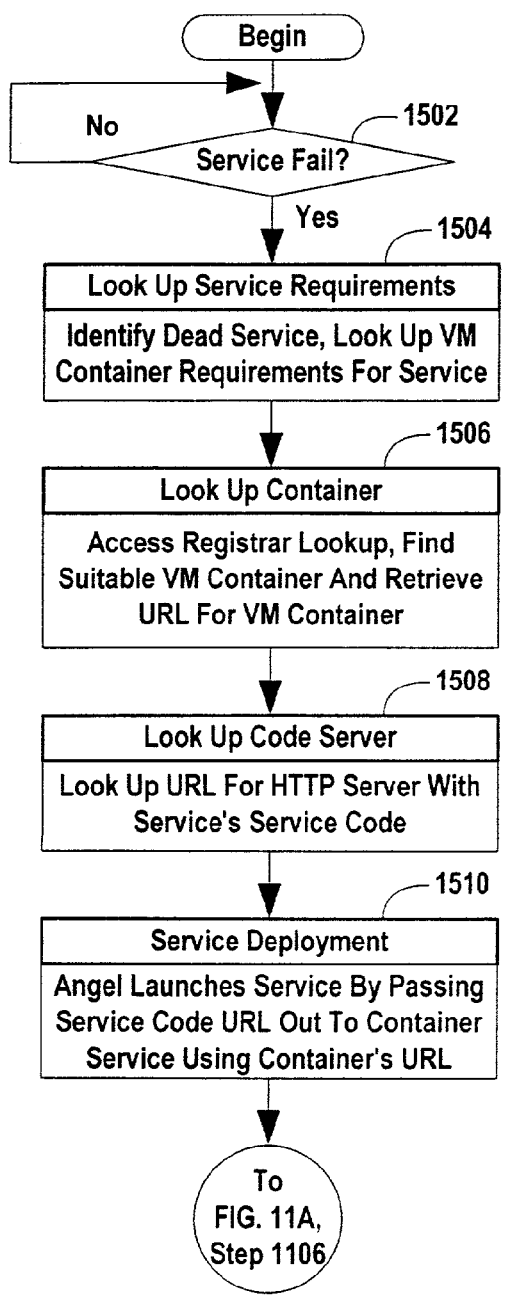
FIG. 15A is a flowchart depicting a service restarting process in a global ecosystem of interrelated services in accordance with the present invention.
Figure 15B:
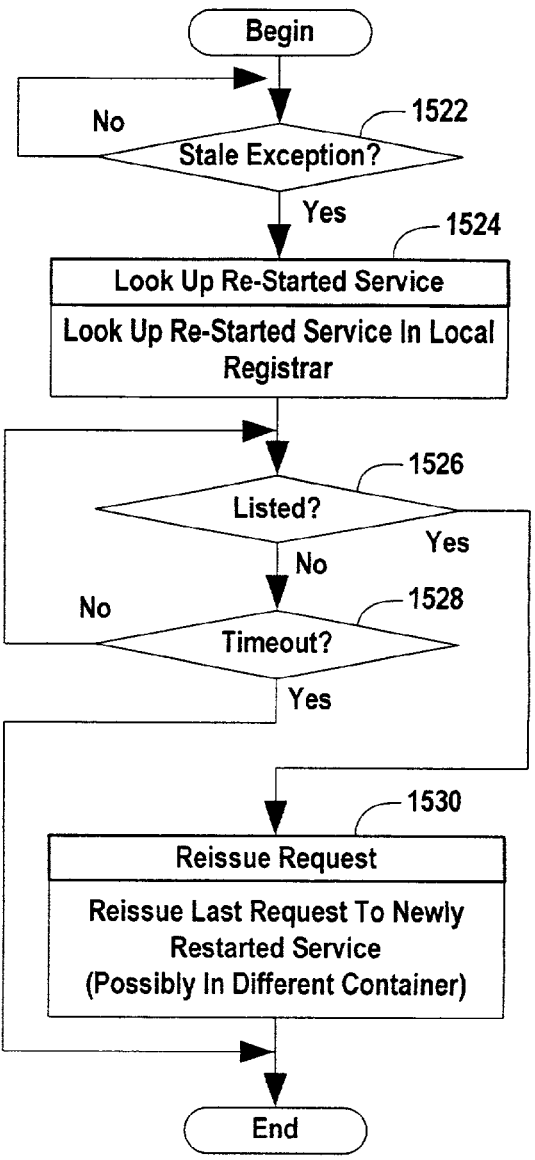
FIG. 15B is a flowchart depicting a process se for self-healing stale references using a smart proxy in accordance with the present invention.

FIG. 14 is a diagram depicting a service failure and re-homing the service to a different server and further depicting self-healing a proxy reference using a smart proxy in a global ecosystem of interrelated services in accordance with an exemplary embodiment of the present invention, and further illustrates self-healing a proxy reference using a smart proxy. FIG. 15A is a flowchart depicting a service restarting process in a global ecosystem of interrelated services in accordance with the present invention, while FIG. 15B is a flowchart depicting a process for self-healing stale references using a smart proxy in accordance with the present invention. With respect to FIGS. 14 and 15A, a monitoring service known as an "Arch Angel" is configured with information about the services for which it has the responsibility of monitoring. At a minimum, Arch Angel 1412 must know the identity of the services being monitored, their VM container requirements (what type of local resources, server platform, etc.), and the location of their service code (an address or reference for the remote HTTP server holding the service's code). Arch Angel 1412 is charged with attempting to restart failed services, ones that die an unnatural death for any reason. However, when a service's natural life is over, it will go away gracefully, executing normal shutdown procedures. In this case, Arch Angel 1412 recognizes that the service must not be restarted. One mechanism used to tell abnormal service failures from normal shutdowns is through enterprise leasing. A lease expiration is considered an abnormal event in the life of a service so if one occurs, the service must be re-started to bring the ecosystem back in balance.

Turning now to FIG. 15A, the process begins with Arch Angel 1412 performing an iterative check to determine if a service, service 1406 for instance, has failed (step 1502). Recall that this check may be precipitated by a variety of events, or even combinations of events. For example, a lease expiration where registrar 1410 notifies, or publishes, a monitor service of lease expiration. Alternatively, service 1406 might fail a healthcheck( ) request while still maintaining its lease(s). Regardless, if the service failure metric is exceeded, service 1406 must be restarted and its previous registrations cleaned up. In that case, Arch Angel 1412 identifies the service that has failed and checks its lookup for any VM container requirements required by the service (step 1504). Next, Arch Angel 1412 must find a suitable container for service 1406 and so it accesses domain registrar 1410's lookup for VM service container service attributes (step 1506). Once a VM container is found that matches the service container attribute needs of service 1406, Arch Angel 1412 retrieves a reference to that container (URL address, etc.). Next, Arch Angel 1412 must lookup the URL for the HTTP server with service 1404's service code (step 1508). Arch Angel 1412 then re-launches service 1406 by passing the service code server's URL out to the container service using the container's URL (step 1510). This is exactly the process employed for manually launching a service for an administrator's console described above with respect to FIG. 11A. The service can then register itself as shown above with respect to FIG. 11A for step 1106. However, in the case of service 1406 being restarted prior to a lease expiration, such as might occur when using the healthcheck( ) request, a number of stale references might still reside in registrar 1410 as well as the enterprise repositories, assuming that service 1406 was registered globally. Therefore, once service 1406 has been successfully re-started, Arch Angel 1412 can issue a shutdown request that appears to the registrar and enterprise repository that service 1406 has executed its normal shutdown procedure. Thus, registrar 1410 and the enterprise repositories can clean their respective lookups of stale references to service 1406 in its previous VM container.

FIG. 15B is a flowchart depicting a process using smart proxy for the self-healing of stale references in accordance with the present invention. This process is performed entirely by the service's smart proxy that was passed to a client during lookup, thus the process is actually performed internal to the client (unbeknownst to the client). The process begins with smart proxy 1420 performing an iterative check to determine if requests to a service, service 1406 for instance, result in a stale exception (step 1522). If not, the check continues to iterate through. If a stale exception is returned, then smart proxy 1420 attempts to relocate service 1460 in its new container (step 1524). Smart proxy 1420 looks up service 14056 in registrar 1410 for an updated URL to service 1406's location. However, merely because the service is not responding to requests from client 1408 does not necessarily mean that service 1406 has been restarted elsewhere in another VM container. If service 1406 is not listed in registrar 1410, then smart proxy 1420 will periodically recheck registrar 1410's lookup for service 1406's new URL, provided the rechecking process does not timeout (step 1528). If the process times out prior to relocating the service, the self-healing process ends and client 1408 will be forced to roll back its operation to whatever state is necessary for finding and using a different service. Returning to step 1526, once service 1406 has been looked up in registrar 1410's lookup, smart proxy reissues the request to newly restarted service 1406 in its new VM container. Once service 1406 responds, the stale reference is healed and the process ends.

DataBus

The traditional approach to data management in an enterprise was that the applications own the data. Independent stovepipe applications are based on this approach as depicted above in FIG. 4. In this approach, data scaled well (divide and conquer), but also led to incoherent data images due to each application having its own, independent view of the data. Additionally, the stovepipe approach limits an enterprise's ability to integrate business, as it tends to wall the enterprise into the current model.

A second approach to data management in an enterprise recognized that new applications invariably need data from older applications, thus data was replicated between applications in a peer-to-peer fashion. The peer-to-peer data transfer approach is depicted above in FIG. 1A and is often considered a type of Enterprise Application Integration (EAI). Because each application has an opportunity to access more than its traditionally owned data, this approach facilitates a more "enterprise view" of the data; however, transferring the data from its current location to where it is needed often makes it problematic. Applications using this approach often have to devote time and resources to wait for necessary data and/or caches for temporarily storing requested data during an execution cycle. Moreover, data replication approaches often require a spaghetti of data feeds between peers to effectively and harmoniously replicate data.

A final approach to data management in an enterprise involved another EAI between stovepipe applications and warehousing application data to make enterprise data centrally accessible to all enterprise clients. The EAI approach to data management using a hub and spoke configuration is depicted above in FIG. 1B. Application integration, using the hub and spoke configuration of feeds, is a mechanism for providing cleaner data transfer than peer-to-peer (i.e., often less spaghetti), but it still emphasizes shuttling data around the enterprise to finally end up in an enterprise data warehouse. This might be the preferred data management mechanism for integrating disparate legacy systems into an enterprise without wholesale migration to a standard enterprise system. Because the enterprise data is ultimately warehoused, the enterprise controls the data and access to it. The enterprise determines the mode of data access and handles security. While the hub and spoke EAI approach may be the best and most widespread data management approach in use, it still suffers from having duplicative data between stovepipe applications and the enterprise warehouse and bottlenecking at the hub. Improvements in the hub and spoke approach include federated architectures wherein the applications are able to statically connect to a single integration server or hub and to exchange information with each other. While the bottlenecking problem has been somewhat alleviated, data transfer is much less clean because an application can transact only with a single hub due to the constraint that each application's messages must be processed on its own hub. Thus, there is more spaghetti between hubs to get all application data to a central enterprise warehouse, a "spaghetti data warehouse."

As briefly discussed above, the DataBus of the present invention provides a mechanism for alleviating the shortcomings in the prior art by decoupling data from the services and applications that historically owned the data. The DataBus makes enterprise data available to all authorized users without consulting with an "owner" application. The DataBus is a data management architecture for the NewWave service platform that presents an architecture for creating a consistent, enterprise-wide data persistence layer which allows clients to access shared enterprise data. The DataBus achieves this enterprise-wide look by decoupling shared enterprise data from specific applications (breaking down the stovepipes) and opening up the data layer to across-the-enterprise access (given proper authorization). The DataBus architecture is designed from the ground up for global scalability and accommodation of evolving business data models in a highly-distributed physical deployment. Scaling is realized predominantly through the partitioning, while individual partitions are mapped to logical data domains that are defined along more relevant dimensions than entity-type dimensions (e.g., geography, line of business, etc.), thus cutting across traditional entity boundaries.

Central to the DataBus data model is the notion that a data layer represents a shared asset of the corporation that is decoupled from the separate production applications requiring access to this data. This view represents a significant departure from currently dominant models where vertical applications have ownership of data described above. In accordance with the DataBus Architecture, a clean separation is made between applications (i.e., the dynamic elements of the system, which carry out use-cases) and the data resources or persistent business objects (i.e., somewhat static, passive elements) that are accessed by those applications. The data tier is an horizontal substrate underlying any and all corporate applications requiring access to that data. Where appropriate, there are, of course, exceptions to allow private data that is truly isolated to specific applications.

Figure 16:
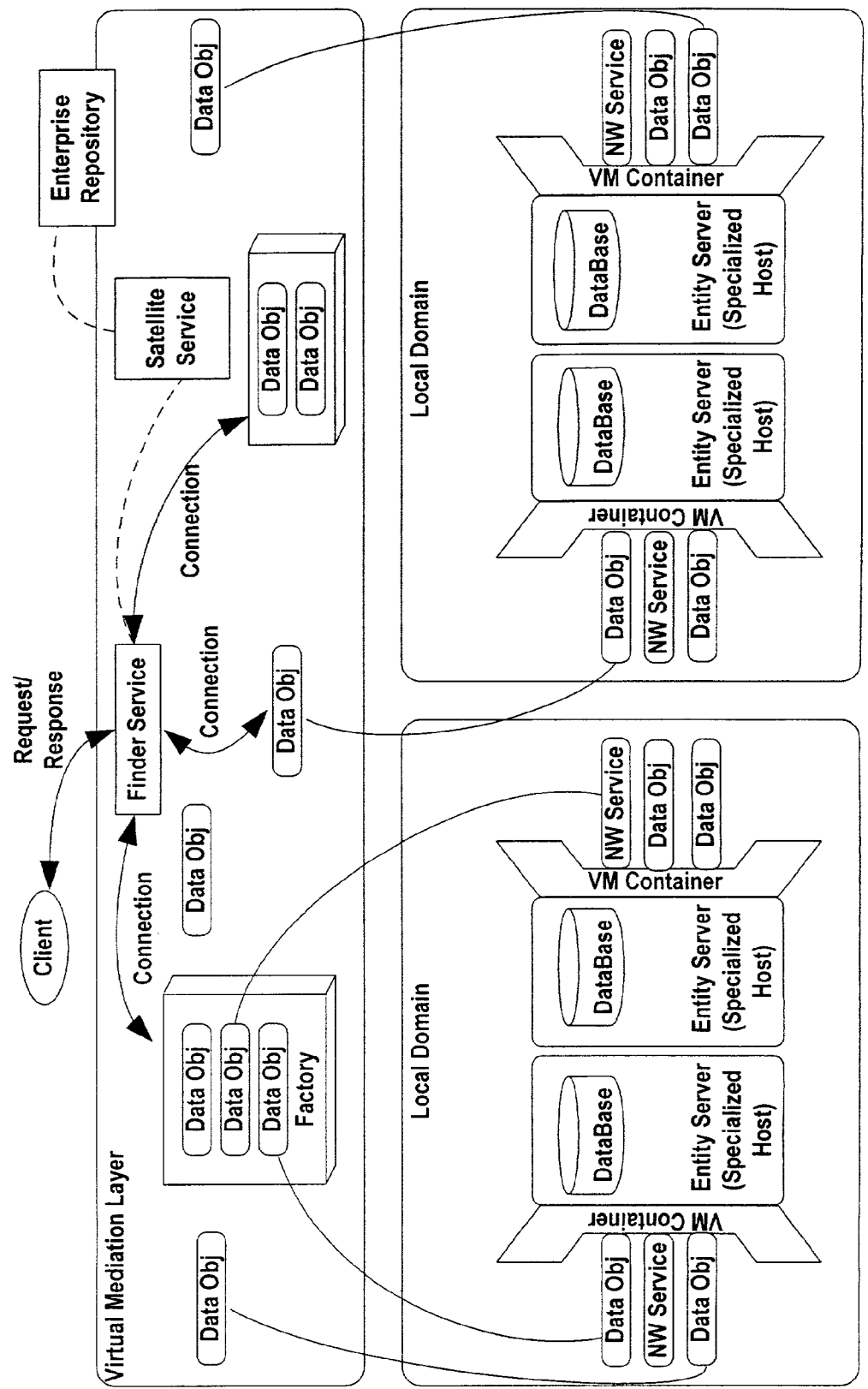
FIG. 16 is a diagram depicting a conceptual realization of the DataBus two-tier infrastructure concept for mediating data transactions and an enterprise-wide data persistence layer which allows clients to access shared enterprise data in accordance with an exemplary embodiment of the present invention.

FIG. 16 is a diagram depicting a conceptual realization of the DataBus two-tier infrastructure concept for mediating data transactions and an enterprise-wide data persistence layer which allows clients to access shared enterprise data in accordance with an exemplary embodiment of the present invention. Briefly, requests for data made by applications or components from the underlying (database) storage technology are mediated in the data mediation layer, the one, pandemic DataBus. The mediation layer further provides uniform, ubiquitous access to corporately-controlled business objects, such as customer, product, service or device, by dissociating data from applications so that no service or product application controls and rations data needed by another application. In the place of application ownership, persistent objects and data are created and a steward entity is given the responsibility for owning and controlling the persistence objects and data. Finally, the DataBus provides shared copies of data and manages updates to data with globally-guaranteed transactions.

Transaction management, and the role of the transaction manager, has been described above with respect to FIGS. 13A and 13B which describe the two-phase commitment process and roll back contingency if all parties do not successfully implement their part of the required change. However, these functions are implemented under a process model used by applications for changing data and data associations.

The DataBus comprises a data layer with an object-oriented interface. All interactions with data are through methods on objects. If relational technology is used for actual backing store, then this implies that the data layer is actually two distinct tiers: 1) a persistent business object layer; and 2) the underlying relational database which stores the state of these business objects. If object-oriented database technology is used, the data layer might be realized as a single tier. In any case, we assume throughout this document that a distributed object-oriented approach is applied to the entire architecture, even if the wording of this document sometimes lapses into database terminology.

Any services contemplated for creating or retrieving instances of business objects must observe some fundamental principles. First, there is the notion that entity types (the nodes in an E-R diagram discussed in detail below) are deployed in runtime container processes. All access to persistent business object data is effected through remote calls to the object interface of the entity instances that are managed by the container. The entity instances are simply Java objects which conform to some strict conventions and live in a container environment. The entity instances themselves will interact with the backing data store, typically via Structured Query Language (SQL) calls to a Relational DataBase Management System (RDBMS). However, all application interaction with data is mediated through the instances, thus applications do not directly interact with the data store level of the DataBus. All entity instances must offer both a home interface and an instance interface. The home interface supports class-level functions, such as creation and initialization of new entity instances; finders allow query for existing entity instances matching specified criteria and methods for permanently deleting existing entities from persistent storage. Finally, the containers should have a sophisticated model for caching entity instances in-core, managing the life-cycle of cached instances as they move in and out of cache and are created and destroyed, management of concurrent access by multiple users, and management of security (access control) and transactions.

All application interactions with entity instances, as well as interactions between entity instances, transpire via remote method calls. In other words, the data objects are fixed in space, and interaction with them occurs over the wire. However, there are situations where it is more desirable to move data out to clients for a local style of interaction. Thus, the remote access mode of data access is supplemented with a mode of access entailing interaction with a local data copy.

The DataBus data architecture combines several main features or facets, such as partitioning, multi-hop finder strategies, externalized associations, object layer mediating access to underlying data storage, support for logical domains and transaction management. These separate facets of the architecture are briefly summarized in the following:

- The proposed solution is Java-centric, with major systems based upon serverside Java and Application Server implementations.
- Entity Partition Containers define a model where container processes provide an environment in which business objects live. Access to business objects is obtained via remote method calls to stationary objects that are fixed to a physical container. Each partition container provides a "home" interface which can be located and used to create or access instances of the class.
- The Data layer allows for an alternative access style where clones of business objects may be streamed out to satellite cache servers or directly into an application's process space. Any number of satellite cache servers can be deployed as needed.
- Loosely-coupled concurrency control idioms are provided, such as optimistic concurrency control, to detect stale data when multiple applications concurrently hold local copies of the same data. This approach allows data replication to many local sites, but operates at the business objects level rather than wholesale replication of database tables. Data is maintained in volatile storage since non-master data does not need the full robustness of a database.
- Scalability is enhanced by the ability to partition any object class or data type across multiple, independent physical stores. Both business object containers (entity partitions) and corresponding database stores can be partitioned (horizontally) and further distributed across different operations centers if desired. Partitioning is emphasized over replication as the means for scalability.
- A central steward assigned for each entity type provides coordination and management of unique primary keys across all partitions. Most operations, other than instance creation, involve no access to the steward. Significant effort is made to prevent the steward from becoming a bottleneck. Given its primary key, a multi-stage finder strategy allows navigation to any entity instance from anywhere in the enterprise. The first stage of the finder provides a "map" from the primary key onto the physical partition where the corresponding entity instance is stored. A second stage operation can then locate the specified object within the partition.
- The information managed by the steward can be cached within the satellite cache servers so that, in most cases, an object is obtained without consulting the central steward.
- The data layer architecture allows logical domains, cutting across entity-type boundaries to be defined and used to scope down the context of operations to a relevant size. Domains are conceptually orthogonal to entities, and serve as a logical overlay on top of the physical partitions. For finder operations more complex than find-by-primary-key, the specification of a domain narrows the range of a search to a small number of relevant physical partitions, thereby avoiding a broad search. Create operations can specify the logical domain to link with the object.
- Externalized associative engines allow the creation of relationships between entity types. These constitute the literal realization of the links in an E-R diagram or object diagram. Foreign keys are not embedded within entities; rather, associations are externalized as first-class persistent objects allowing for a highly de-coupled, adaptive data/object model.
- Existing entities can be made to participate in new associations without impacting existing links. Evolving business needs can be met by appending supplementary business objects to existing core objects through the agency of associations. Since the data storage for associations can itself be partitioned, association storage size grows independently of entity partition size and is not limited in terms of scale. At the same time, the architecture permits entities to be managed entirely from within. To the applications programmer, relationship traversal from entity to entity is completely transparent and seems centralized.
- The proposed infrastructure supports a variety of integrity constraints upon associations, such as cardinality, as needed.
- Subject areas are used to classify entities into broad categories of data areas in the company, such as Customer, Inventory, etc. Within each subject area, there can be many subordinate entities. These subordinate entities can be expected to evolve on a faster time scale as the details of the business evolve; however, the subject area model is expected to be much more stable.
- Each subject area is defined by a principle entity that serves as an anchor point for the remainder of the information within the grouping. These standardized anchor objects represent major corporate elements. Subordinate data classes can be added as needed whenever required by new products and services.
- Subordinate object classes within a given subject area may often have the character of local data; local in a logical sense of being relevant only in the context of a particular line of business. As pointed out above, externalized associations lend a great deal of flexibility for evolving the data model as new entities and relationships are added to the model.
- Alternatively, the data administrators may choose to use more conventional, tightly-coupled intra-database relational mechanisms. However, it is intended that associations across major subject areas are exclusively built using externalized associative constructs.

Replication of databases using conventional commercial products can be used for purposes of fault tolerance and disaster recovery. However, in general, traditional wholesale replication of database tables is not viewed as being a sustainable basis for a scalable architecture. For example, if one database of size N served a company's current needs and the company were to grow ten-fold, the database would need to be of size 10×N. It would also need to be replicated to N distributed copies to hold access rates constant. The total amount of data storage using full replication strategies thus scales as the square of the company size. In the Data layer proposal, the extensive partitioning and distribution of business objects to form a loosely-coupled web or mesh of associated objects is considered to be the path to a sustainable, linearly-scaling data architecture.

Entity-Relationship Model

Figure 17A:
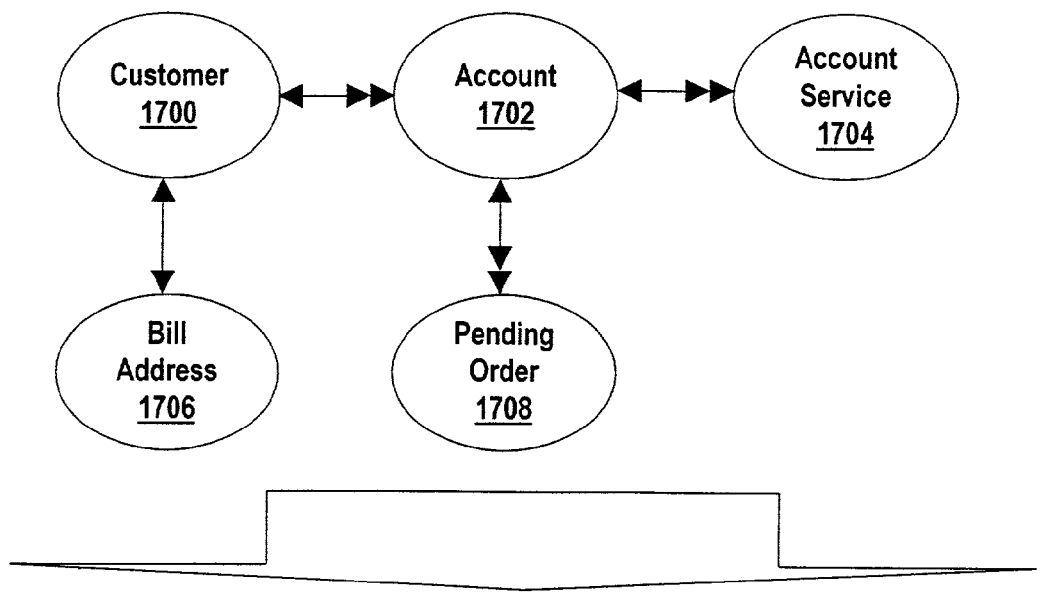
FIG. 17A is a traditional representation of an E-R diagram.

With respect to the present invention, the term "entity" will be understood in the context of a conventional entity-relationship diagram. An entity-relationship (E-R) model is a data modeling technique that creates a graphical representation of entities and the relationships between entities within an information system. The E-R model figures prominently into this data architecture in general. FIG. 17A is a traditional representation of an E-R diagram, nodes 1700, 1702, 1704, 1706 and 1708 represent entity classes for "Customers," "Accounts," "Account Service," "Billing Address" and "Pending Orders," respectively. An "entity" is any person, object, place or event for which data is collected. For example, in a business's information system, entities are business customers 1700, the customers' addresses 1702, orders 1708, etc. The entity is represented in a conventional entity-relationship model as a geometric shape, normally a rectangle, but in this case an ellipse labeled with a singular noun that describes the entity. A relationship is defined as the interaction between the entities. For instance, customer 1700 of the aforementioned business maintains account 1702 and account 1702 lists pending order 1708. Thus, the word "maintains" defines the relationship between a customer and the account or accounts that they maintain, while the word "pending" defines the relationship between an account and the pending order or orders. A relationship is normally denoted in a conventional entity-relationship diagram by either a diamond shape, or more simply, a line terminated with arrowheads which connects the entities. In either case, verbs may be used to label the relationships. Cardinality defines the association between the entities in terms of numbers. An entity may be optional or mandatory. For example, a sales representative could have no customers, or one or many customers, or there must be at least one product listed in an order. There are several different types of cardinality notation, but with respect to FIG. 17A, a single arrowhead represents a unit of one, while a double arrowhead represents a unit of many. The three main cardinal relationships are: 1) one-to-one, expressed as 1:1, representing the relationship between customer 1700 and account 1704; 2) one-to-many, expressed as 1:M, representing the relationship between customer 1700 and bill address 1706; and 3) many-to-many, expressed as M:N (not shown in the Figure).

Figure 17B:
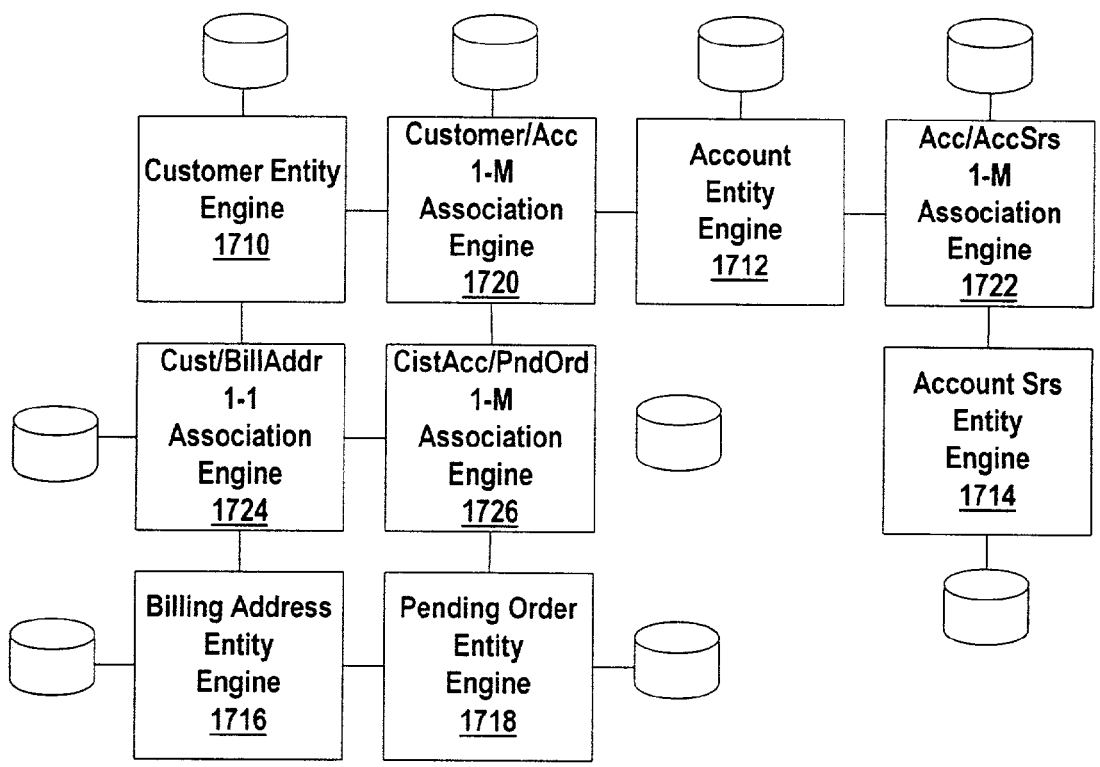
FIG. 17B is a representation of nodes and arcs of the E-R diagram being mapped onto entity engine processes and association engine processes.

A central concept of this data architecture is that the nodes and arcs of the E-R diagram are literally mapped onto entity engine processes and association engine processes on the network. FIG. 17B is a representation of nodes and arcs of the E-R diagram being mapped onto entity engine processes and association engine processes. Customer entity 1700 is mapped to customer entity engine 1710; account entity 1702 is mapped to account entity engine 1712; account service entity 1704 is mapped to service entity engine 1714; billing address entity 1706 is mapped to billing address entity engine 1716; and pending order entity 1708 is mapped to pending order entity engine 1708. Associations between entities can also be externalized. Externalized associative engines allow the creation of relationships between entity types. These relationships constitute the literal realization of the links in an E-R diagram or object diagram. With regard to FIG. 17B, these external associations between entity types are shown as boxes between each entity engine. Three types of association engines are: 1) one-to-one; 2) one-to-many; or 3) many -to-many, depending upon the cardinal relationship between the specific entity classes. For example, each customer entity in customer entity class 1700 is associated with only a single billing address entity within bill address entity class 1706, thus Cust/BillAddr association engine 1724 is a "1-1" association engine, whereas customer entity might be associated with several accounts. Thus, Customer/AccAssociation engine 1720 is a "1-M" association engine serving associations between Acc/AccCustomer entity engine 1710 and account entity engine 1712.

As the FIGS. 17A and 17B illustrate, the E-R diagram of a business object model is directly recognized as a web of processes linked together over the network. This model is similar is some aspects of the so-called "network databases," and to the World Wide Web model where any object can have links to any other object. However, there is greater discipline here in that associations are structured, follow a schema defined by the E-R model, and obey integrity constraints such as cardinality.

Further, FIGS. 17A and 17B underscore the notion that associations and entities receive equal treatment as first class objects supported by deployed processes. Both entity engines and association engines have their own backing store as well. The backing store for entities will typically store records of attributes that represent the state of the various entity instances managed by a given entity engine. The backing store for association engines will contain tables of link records, which are pairs of foreign references to the entities that stand in relation to each other. In database language, the association storage is sometimes called a "correlation table."

Further, with respect to FIG. 17B, the lines connecting the boxes representing the various engines convey two points. First, they connote the foreign references to the entities that the association links together. Second, they correspond to interprocess communication (IPC) channels that are exercised at runtime as applications establish new links between entity instances and traverse existing relationship paths among associated entities. This simplified view of the mapping of E-R diagrams onto process engines has glossed over some details that will be filled in below. In particular, the fact that each given entity class may actually have its instances partitioned horizontally across several distributed stores has been ignored. "Horizontal partitioning" is database jargon for deploying different "rows" in a table across different stores, the image being of a horizontal slice through the table, as opposed to vertical partitioning where different attributes of the same record are stored in separate physical areas.

Entity Partitions

As discussed throughout the present disclosure, the Data-Bus architecture relies very heavily upon data partitioning to achieve the scalability. Data is deployed throughout an enterprise network in a highly decentralized, distributed manner, but at the same time, remains logically unified. Thus, an enterprise user (service, client or even end user) can easily navigate to any data item from anywhere in the enterprise. Even though the data deployment is unconventional, conventional databases are relied upon for implementing highly-independent physical data partitions which have essentially no direct knowledge of each other. As described in detail below, external navigational mechanisms, such as finders and associations (described above and below), are the glue that binds these highly independent partitions together.

Separate entities will generally be housed in separate storage servers. Even a given entity is likely to be physically partitioned across many separate storages. Practically speaking, an enterprise may strive to co-locate partitions of a given entity at a single physical facility, an operations center, for instance, on separate nodes of an SP\2 multiprocessor complex. However, the same entity might often be physically partitioned across geographically-distributed sites (e.g., siting one subset of customer data in the United States, and another in Europe).

Figure 18:
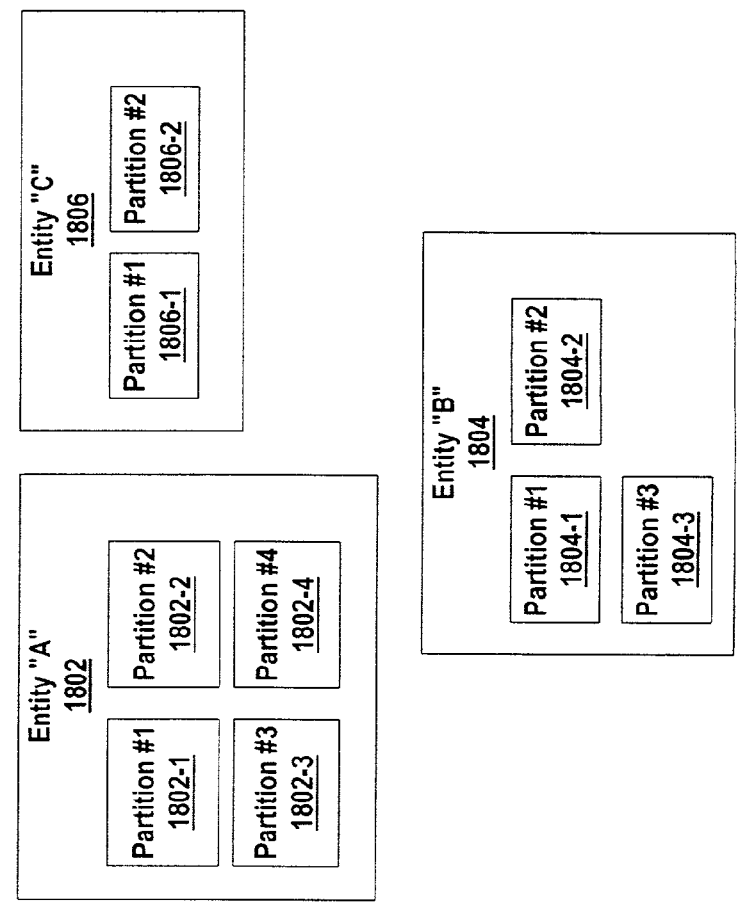
FIG. 18 is a diagram illustrating three entities, entity A 1802, entity B 1804 and entity C 1806 partitioned in accordance with an exemplary embodiment of the present invention.

FIG. 18 is a diagram illustrating entity A 1802, entity B 1804 and entity C 1806 which are partitioned in accordance with an exemplary embodiment of the present invention. Each of entities A-C (1802-1806) is partitioned in as few as two and as many as four separate partitions; however, the diagram is merely illustrative. In practice, an entity might be partitioned in literally hundreds, and possibly thousands, of separate partitions. Note that the grouping of partitions within the entity boxes does not imply physical proximity in actual deployment. In fact, the deployment of some entities may be quite widespread across an enterprise. Remember, it is expected that data which is repeatedly accessed by a client will most likely be physically located proximate to that client. Thus, clients that are geographically disparate, while utilizing records or instances of the same entity, will result in the entity instances being geographically divided up by partitioning the entity.

Figure 19:
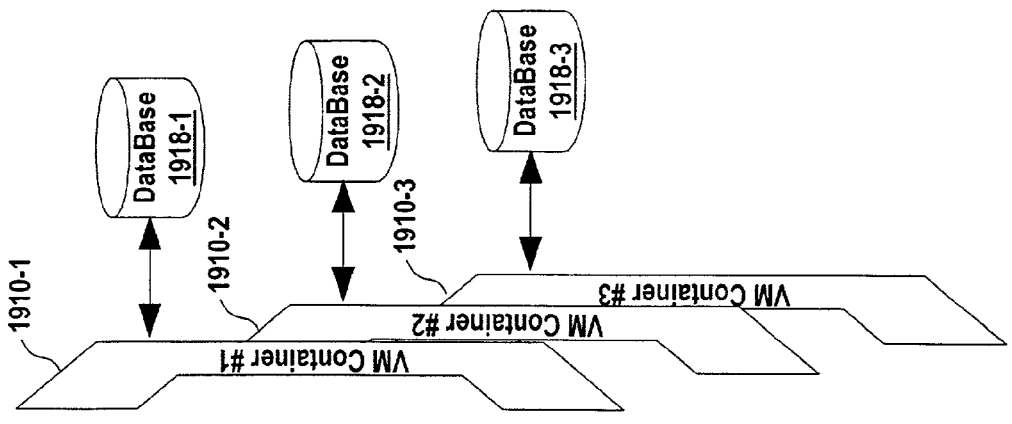
FIG. 19 is a diagram illustrating three container-database partition pair in accordance with an exemplary embodiment of the present invention.

Interestingly, entity partitioning is not limited to the records of the underlying database storage media. Partitioning also includes the entity instance containers that house the object representation of the business entities. In other words, both the business objects tier and the data storage tier of the N-tier DataBus architecture are partitioned. In accordance with one embodiment of the present invention, only one object container instance is deployed for each corresponding database partition. FIG. 19 is a diagram illustrating three container-database partition pair in accordance with an exemplary embodiment of the present invention. Note that VM container 1 (1910-1) is deployed for database 1918-1; VM container 2 (1910-2) is deployed for database 1918-2; and VM container 3 (1910-3) is deployed for database 1918-3. It should be understood that while databases 1918-1-1918-3 are physically partitioned, and likely to be deployed to physically distinct server hosts, deployers may often wish to locate the database and corresponding entity partition container onto the same host. For example, to co-locate container 1910-1 and database 1918-1 on the same host, etc. In fact, it is logical to pair the object instance container and its matching database store on the same processor node so as to make container to database communications very fast.

DataBus Architecture

With DataBus entities highly partitioned across distributed data stores, a suitable strategy or set of strategies for finding any particular object of interest is needed. These strategies include using a multi-stage finder mechanism to find objects given their primary key and employing a scoping mechanism, for limiting the scope of an arbitrary, criteria-based finding operation to a subset to all partitions in which the entity must be found. The final strategy uses an externalized associative engine mechanism for following association links between entities. The multi-hop finder is especially suited for finding an entity instance by primary key from anywhere in the enterprise, regardless of where it is physically located.

Figure 20:
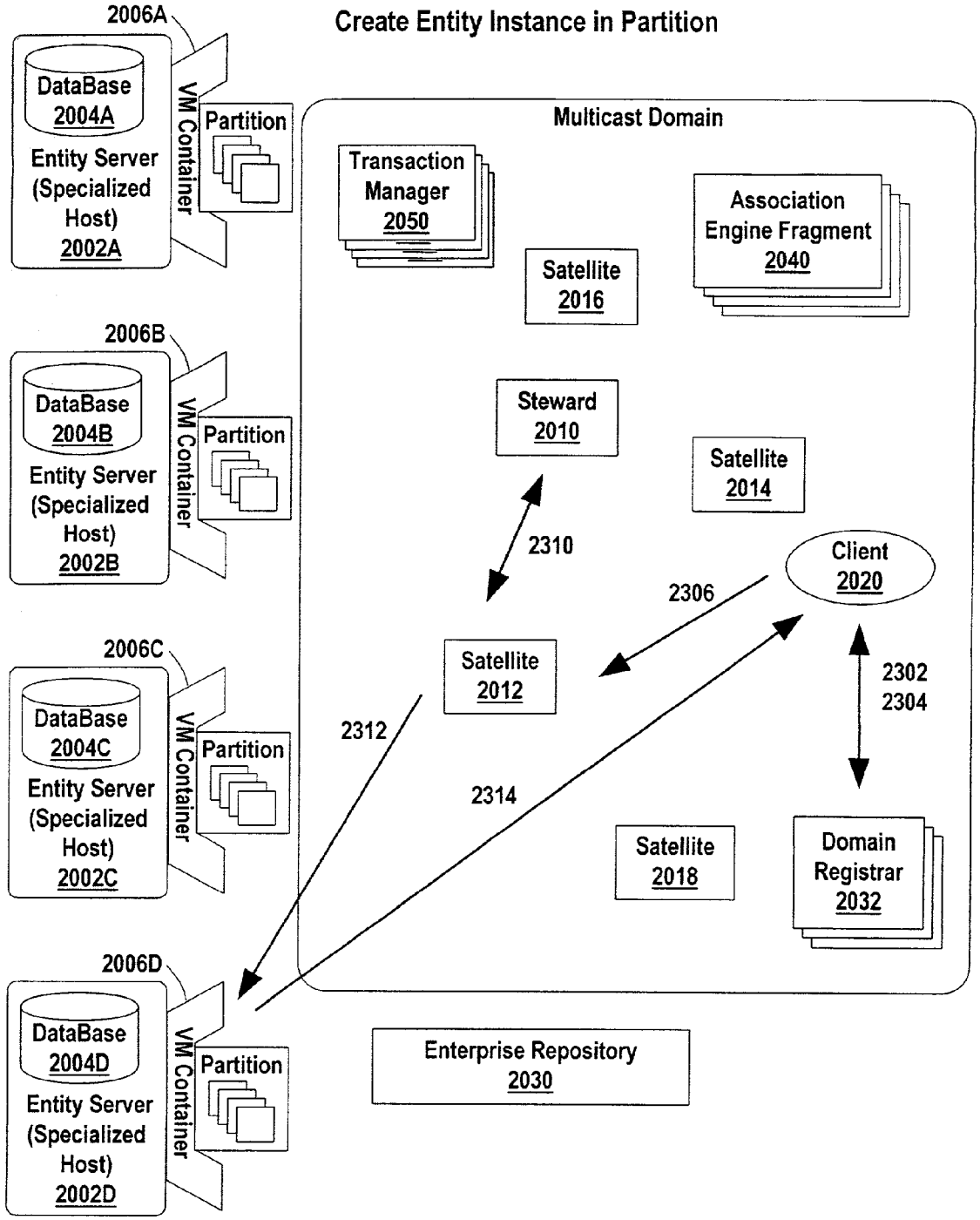
FIG. 20 is a diagram depicting DataBus components necessary for creating an entity instance in accordance with an exemplary embodiment of the present invention.

However, before discussing the multistage finder, it might be helpful to discuss the DataBus architecture in more detail and the process for creating an entity instance in a partition in accordance with an exemplary embodiment of the present invention. FIG. 20 is a diagram depicting DataBus components necessary for creating an entity instance in accordance with an exemplary embodiment of the present invention. For each entity in an enterprise, there exists one steward service, depicted as steward 2010. This steward is logically central, but for access, availability and latency considerations, could be physically composed of federated, cooperating components constituting a logically unified steward service. Within every multicast domain, there exists a plurality of satellites, depicted as satellites 2012-2018. Steward 2010 provides a measure of central management to the present invention. With the storage and container servers for each entity being partitioned and distributed across physically separate server hosts, as described directly above, there is a need for a central manger, one for each entity class. The entity manager serves as a central authority for those aspects of the entity needing to be centralized, as represented in FIG. 20 as steward 2010. In spite of the emphasis of the DataBus architecture on decentralization and distribution, however, is in situations where there is no way of avoiding some central control. This is where the central manager comes into play. While the central manager is necessary, we go to great lengths to avoid this manager becoming a bottleneck to throughput, and avoid excessive accesses to this central steward or manager.

Roles of the Entity Manager

One of the main roles of this central manager is to provide coordination and management of unique primary keys (PKs) across all partitions. In the present architecture, all entities follow the convention of defining a candidate primary key consisting of a unique 64-bit integer called the UID (unique identifier). This UID provides a convenient foreign key that is used by externalized association engines to store references to entity instances, as will be further described below. In accordance with one exemplary embodiment of the present invention, one of the primary responsibilities of central entity manager 2010 is to maintain a block-up counter for generating new UIDs when a new block of primary keys is called for by any of satellites 2012-2018. Satellites 2012-2018 actually issue a primary key whenever an entity instance is created and not steward 2010. This approach avoids the necessity of accessing the manager upon every creation of a new entity instance. The satellite need only consult the steward during entity creation in the event that the satellite runs out of keys in its allocated block of keys. It must then go back to the steward to request another block of keys. This approach avoids the necessity of accessing the manager upon every creation of a new entity instance. In accordance with another exemplary embodiment of the present invention, steward 2010 validates that a primary key proposed by a user for a new instance is not already in use by an existing instance. This latter sort of PK contrasts with the block-up UID generated by the central manager in that its form is dictated by the type of business object it represents. For example, the PK for a given entity might be a string or an integer, or it might be a composite key having more than one component. These domain-specific PKs would often be proposed by the application, or by custom logic within the entity implementation, and checked for uniqueness by the central entity manager, using for example, a hashing or directory service.

In accordance with another exemplary embodiment of the present invention, steward 2010 serves as a place to keep the master data for the mapping of primary keys onto partition identifiers that indicate where each given object is stored. This is an alternative embodiment and is discussed more below with respect to multi-stage finders. However, in that case, when a cache miss is suffered out at a satellite server, the finder service faults over to the master data managed by steward 2010 to determine which partition contains the entity having a given PK. When a new entity is created, steward 2010 places a new entry in its master copy of the PK-to-partition map. This role of steward 2010, as the master record for this mapping, assumes that the multi-hop finder is based on distributed caches. If, as is discussed with respect to another embodiment of the present invention, enterprise repository 2030 is used for storing PK-to-partition maps, then burden for this data management shifts entirely to enterprise repository 2030. However, if, and only if, the embodiment requires steward 2010 to generate new primary keys when new instances are created, and its responsibility for recording the PK-to-partition association, then the central logic of the home interface's create operation can also be located within steward 2010.

Finally, steward 2010 is responsible for finding an instance's partition container if the guidance stage of the find operation fails. As will be discussed above, a find operation may consist of a guidance stance and a local find stage. Steward 2010 issues parallel query to all entity partition containers if a PK-partition map is not listed in the satellite or enterprise repository for the partition holding the instance for the primary key.

Avoiding Entity Manager Becoming a Bottleneck

Despite the central nature of the entity manager within a federation of entity partitions, one is not to think of the steward as being strictly layered over the physical partitions in a top-down sense. In other words, all operations on an entity instance or on the entity home interface are not channeled through the manager. On the contrary, we seek to avoid, as far as we can, directing traffic through the manager, turning only to the entity manager in those situations, such as instance creation, where consulting it cannot be avoided. This point is key to the scalability of the proposed architecture. We wish to avoid having the central entity manager turn into a constriction point.

It should be mentioned that, in contrast with the prior art, when the client application holds a proxy or handle to an entity instance and invokes methods on that instance, steward 2010 is completely bypassed, and the remote invocation goes directly to the partition container where the instance is stored. Thus, instance-level operations entirely short circuit both steward 2010 and satellite 2012-2018.

The find-by-primary-key methods in the entity's home interface are handled by the satellite cache servers as discussed above in the section on multi-hop finders. These caches are consulted first to find the partition where a desired entity instance is located; the entity manager is consulted only whenever there is a cache miss. The hope is that most of the find operations will never need to consult the central entity manager. Association traversal and association creation (link) operations likewise never need to touch the central entity manager.

Finally, in accordance with another exemplary embodiment of the present invention, steward 2010 is responsible for allocating blocks of primary keys to the satellites for its entity class and for locating the partition containing an entity instance, given the instance's primary key in case of cache faults in enterprise repository 2030 and/or at satellites 2012-2018. In accordance with this embodiment, steward 2010 issues parallel query to all entity partition containers only if a PK-partition map does not have a copy of its own or the PK-partition map is not listed in enterprise repository 2030 and/or satellites 2012-2018. In that case, the parallel query is issued and steward 2010 retains a copy for itself prior to sending it to satellites 2012-2018, possibly saving a parallel query in the future.

Satellites 2012-2018, on the other hand, are responsible for two class level tasks.

The first is finding a suitable container for a new partition. Satellites 2012-2018 select a specific partition container to place the entity instance based on some algorithm, such as proximity to the creating client, partition container loading, distribution leveling or some combination of the above. Satellites 2012-2018 also cache the PK-partition map and may pass that information on the steward 2010 after creating an instance.

In addition to client 2030, steward 2010 and satellites 2012-2018, the local multicast domain also contains a plurality of domain registers 2032 for registering and looking up local NW services. External to the local multicast domain is enterprise repository 2030 which maintains enterprise level service and data registration as described above with respect to the processes described in FIGS. 11A, 11C, 12A and 12C. Additionally, enterprise repository may contain PK-partition mapping information as described immediately above.

Also shown in FIG. 20 are servers 2002A-2002D which may be physically located in the local domain, but are more probably scattered throughout the geography of the enterprise. For instance, server 2002A might be situated in Paris, while server 2002B is situated in Moscow. Also depicted in FIG. 20 are arrows depicting the interaction between DataBus components. For the reader's convenience, these lines represent the correspondingly-numbered step in the flowchart depicted in FIG. 25, which will be described below.

Figure 21:
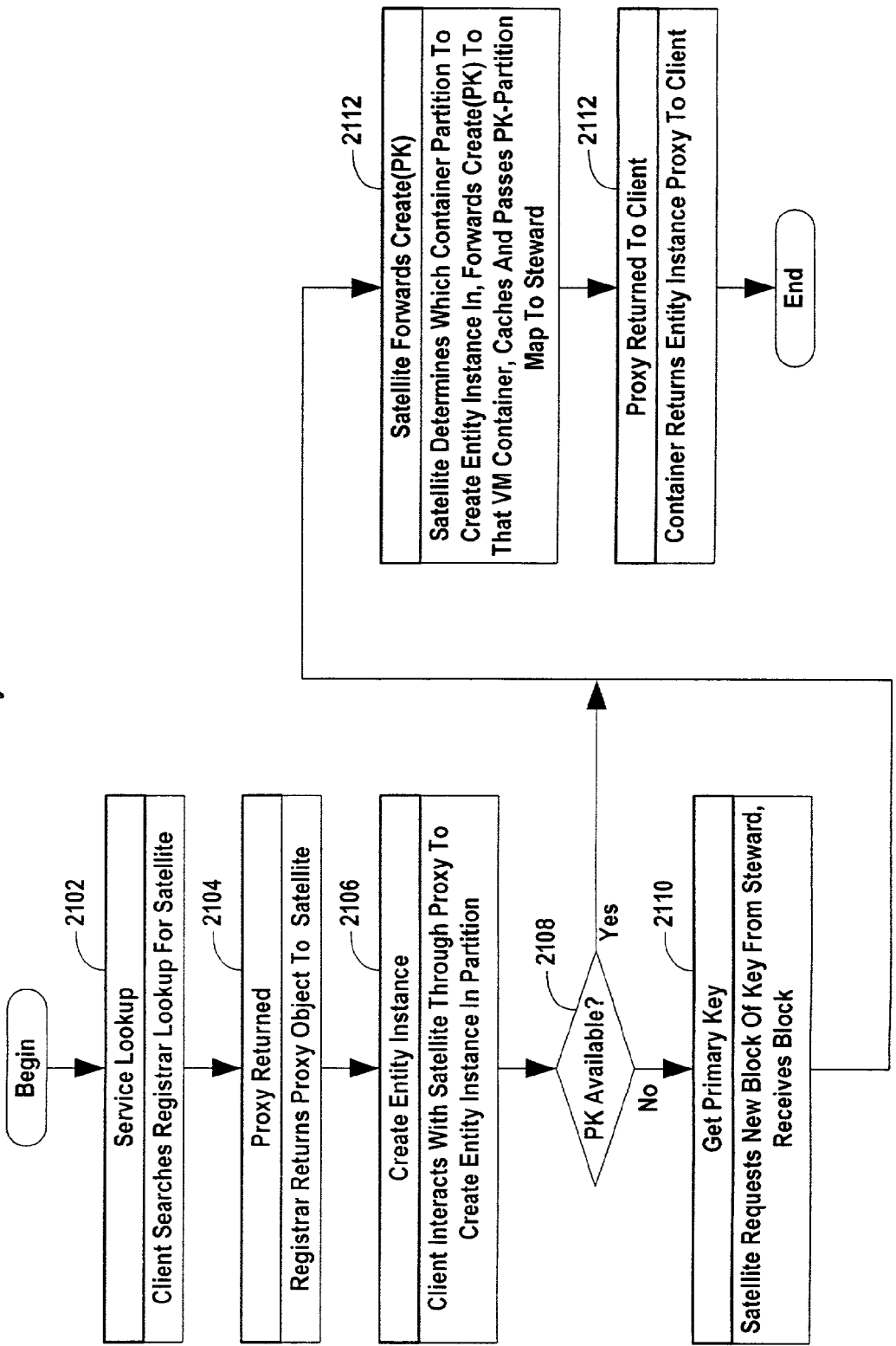
FIG. 21 is a flowchart depicting a process for creating an entity instance in accordance with an exemplary embodiment of the present invention.

FIG. 21 is a flowchart depicting a process for creating an entity instance in accordance with an exemplary embodiment of the present invention. The process begins with client 1920 accessing an interface for interacting with a satellite by finding a satellite service for the entity class in domain registrar 1932 (step 2102). Client 1920 looks up and retrieves the proxy (or a smart proxy) for satellite 1912. It should be understood that because each local domain should have satellite services for each entity class running, it should never be necessary for the client to hop to the enterprise repository for a non-local satellite. Of course, if a satellite service is not found in registrar 1932, client 1920 can find enterprise repository 1930 and then look up a non-local registrar with a listing for a satellite service as described above with respect to FIG. 12C. If client 1920 already has the interface to satellites 1910, then steps 2102 and 2104 can be omitted.

Next, client 1910 requests an entity instance be created in a partition (step 2106). Once the request is received by satellite 2112, it checks its cache for primary keys (step 2108). If satellite 1910 does not have a primary key on hand for creating a new entity instance, it requests a block of key from steward 1910, which is forwarded to satellite 1912 (step 2110). Once satellite 1912 has a key, it determines the best entity container partition to create an entity instance in step 2112. Satellite 1912 might base the decision on proximity to client 1920, container loading or some other quantifiable factor. The partition container may also be specified explicitly by the caller. Or the caller may specify a logical domain where the new entity instance is to be located. In this latter usage, the satellite would query an enterprise mapping of logical domains onto qualifying entity partitions. The steward would select from the set of qualifying partitions belonging to a domain a given partition to house the new entity instance. This selection could be random round-robin or based upon available capacity, determined by policy. Then, satellite 1912 caches the PK-partition mapping, passes it to steward 1910 and forwards the create(PK) request to the selected partition container (step 2112). From there, the partition container creates the entity instance and passes a proxy for the instance to client 2014. Additionally, the newly-created data object can register itself with the enterprise, like services as described above with respect to FIG. 12A. The process then ends.

Once the entity instance has been created, there must be a coherent strategy to find it again when needed by a client. A multi-stage finder strategy allows the navigation to any entity instance from anywhere in the enterprise, given its primary key. The basic idea is that a first stage is used to map the primary key (PK), or candidate PK, onto the partition number where the entity is stored. The second stage is to invoke the "local" finder interface out at the relevant physical partition to produce the actual entity instance of interest. This second stage of the find operation is implemented with a SQL select statement for backing store that uses a RDBMS. However, before discussing the multi-finder strategy, in might be useful to review various protocols employed by the DataBus for accessing and safeguarding data objects.

Modes of Data Access

The present invention envisions three distinct types of data access: 1) remote calls to fixed entities; 2) streaming copies of the data to client; and 3) moving a mobile agent into the entity's space. The core strategy has all client access to business objects effected by remote method calls into stationary data locations, the containers. This mode is similar to that described above with respect to services where a client intending to interact with an entity acquires a proxy to the entity instance and uses the proxy to interact with the instance.

With respect to the data-movement approach, copies of data objects are moved out to the locales of the clients, thereby allowing client applications to exercise the business objects locally. By locale, we might mean a process close to the client, say on the same LAN, or even the process address space of the client application, where there is room for variations. At some point, changes to the copies need to be synchronized back to a master copy of the data. This approach generally implies the possibility that multiple copies corresponding to the same underlying objects may exist concurrently in different users' application spaces. Therefore, this approach to data access requires the adoption of well-thought-out concurrency control strategies.

The third style of access to data, in addition to remote calls to stationary business objects and moving of object copies out to clients, is to again keep the business objects stationary, but dispatch client code in the form of mobile agents out to the business objects. The agent does work on behalf of the client then reports back to the client when there are results. This is somewhat similar in spirit to the familiar stored procedures from the relational database world where an application can install functionality inside the database engine.

Remote Access to Stationary Business Objects

As the remote calls to fixed entities mode of data access has been thoroughly discussed above, the notion is that clients obtain (using create, find, or association methods) remote handles to entity instances. These remote handles are similar in some respects to the familiar RMI proxies or CORBA proxies from ORB computing. However, the remote handles to entity instances are implemented with their own code which may be remotely loaded and hidden from the client in accordance with an exemplary embodiment of the present invention. These handles of remotely-loaded code are the smart proxies discussed above with respect to NewWave services. Recall that a smart proxy is a local object streamed to the client's process space which may contain both local data, logic and behavior, as well as references to remote server-side objects. In accordance with another exemplary embodiment of the present invention, the smart proxy that serves as a remote handle to entity instances encapsulates local state (i.e., the entity primary key), the name of the entity class or the partition number where the entity instance is actually stored. Additionally, the smart proxy will also encapsulate an RMI proxy to the container managing the entity instance.

Streaming Data Copies to Client: Two Variations

Figure 23:
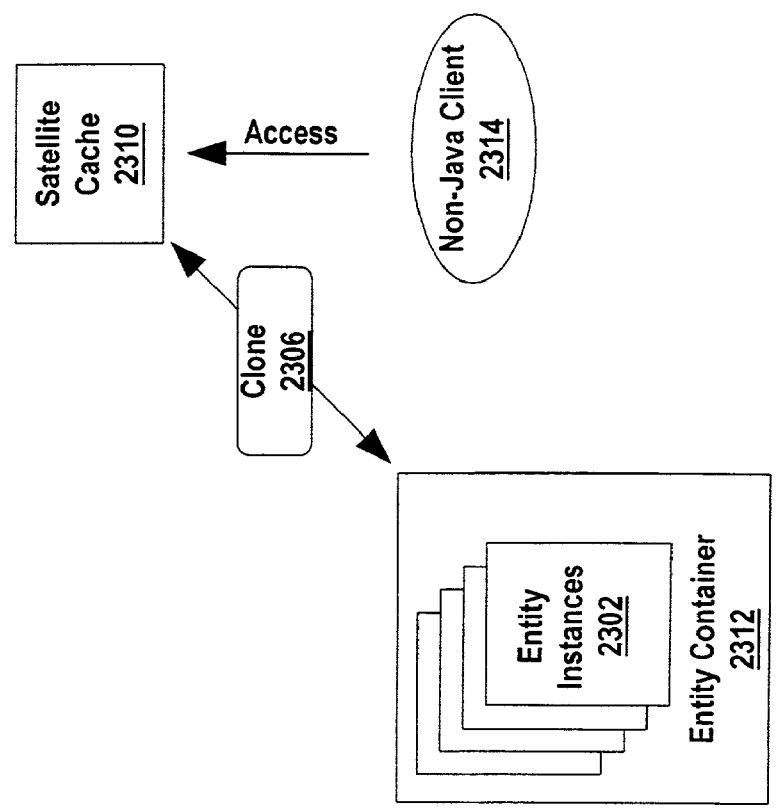
FIG. 23 show the cache server approach where a copy of the entity instance is streamed to a cache server rather than the copy being directly steamed to the client in accordance with an exemplary embodiment of the present invention.
Figure 22:
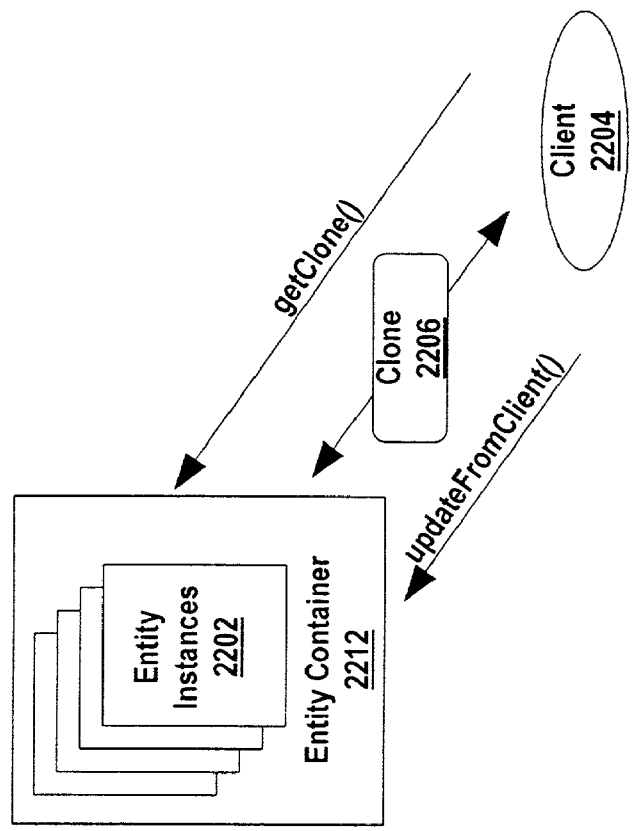
FIG. 22 is a diagram showing a read/write copy of the entity instance being streamed directly to the client in accordance with an exemplary embodiment of the present invention.

In the second mode of access to entities, a copy or clone of the business object is streamed out to the locale of the client application. Two modes of streaming supported by the present invention are direct streaming of a clone object into the process space of the client application and caching the clone object in a satellite cache server. FIGS. 22 and 23 are diagrams depicting both modes of streamed data copies in accordance with an exemplary embodiment of the present invention. FIG. 22 is a diagram showing a read/write copy of the entity instance being streamed directly to the client, while FIG. 23 shows the cache server approach where a copy of the entity instance is streamed to a cache server rather than the copy being directly steamed to the client. In the latter approach, the client accesses the copy via the cache server. With respect to FIG. 22, a copy or clone 2206 is shown streaming from container 2212 directly to client 2204 for the client's use. Client 2204 issues a getclone( ) to container 2212 which obliges with clone 2206. Client 2204 can then interact with the clone of entity instance 2202 including updating the instance using a updateFromClient( ). Here client 2204 is implemented in Java and therefore has the space to accommodate clone 2206.

By contrast, with respect to the cache server approach depicted in FIG. 23, client 2314 does not interact directly with clone 2306. Instead, clone 2306 is streamed to satellite 2310 rather than directly to client 2314. The cache server approach is mandatory if the client application is non-Java client 2314. Some Java "proxy" space is needed to store the clone object on behalf of client 2314.

In order to support this streaming of clones out to the client, the entities must support a convention of supplying a getClone( ) method and an updateFromClone( ) method. For each entity type, there also must also be a serializable clone class defined (sometimes called a state object) which represents the thing that actually gets streamed out to the client. The entity's getClone( ) method creates a ( )clone object reflecting the entity's current state, then streams the clone object out to the caller's address space. The updateFromClone( ) method of the entity takes the clone instance as an argument and updates the state of the master to match the attributes of the clone object.

The above approach of having each entity support a getClone( ) method implies that there is one fixed type of clone object for each entity. In an enterprise, different applications may have differing needs for making up the exact internal data in a clone object (e.g., nested entities to varying levels.) The DataBus architecture accommodates these varying needs by offering a factory mechanism whereby clients can stream a factory object into an entity container during the request to create a clone of an entity. The entity container will ask the custom factory to create the clone, passing a reference to itself (i.e., to the entity) in order that the factory may call back the entity to extract entity state information during the construction of the clone. With this methodology, clients can create customized copies suitable for their purposes. By streaming factory code from clients into the entity containers at runtime, the entity container's abilities for stamping out data copies becomes extensible, much as a computer-controlled machining tool's behavior is extensible through uploading instructions. Note that the factory can imbed, within the primary copy, any number of copies of associated entities to whatever depth of recursion the application deems desirable. Clients can thereby stream into a custom factory that tailors copies to the clients' specific needs. The DataBus uses the approach of streaming client code into "the system" in another context, apart from clone factories. The DataBus also allows the client to provide a filter object during association traversal or find-by-criteria method calls. The filter implements custom Java code that can narrow a result set. In so doing, primarily only "good" objects are returned to the client, rather than all objects that match a "find" or "get" request. Recall that the "getAccountsForCustomer( )" method returns all destination objects that are associated with a given source object and that the solution requires either extra remote calls and data passing, or the client sequencing through the unfiltered array of accounts and performing its own filtering. By contrast, with the factory, the client streams objects into DataBus that act like the SQL "where" clause to perform custom filtering inside the entity container. Thus, the entity containers (the partition services), as well as the association engines, can apply filter objects to narrow results based on some preset criteria determined by the client.

Concurrency Control

Clearly, the streaming of clones to the client mode of data access has potential problems under concurrent usage scenarios. For example, in the lost update problem, two users fetch a copy of an entity instance. The first user modifies one copy and submits the changes. Thereafter, the second user modifies another copy and submits the changes, thus eliminating the modifications made to copy by the first user. The present invention solves the concurrent user problems by implementing one of two mechanisms. The first approach is used in scenarios where the client is using the data copies in a read-only fashion. That approach involves notifying the user of a read-only copy that a modification has been made to the original data and notifies the user of the changes in accordance with one embodiment of the present invention. The second approach is used in scenarios where the client is using the data copy in a read/write fashion. The second approach involves tracking version number of clones and rejecting any updates from clones that are not current in accordance with one embodiment of the present invention.

Figure 25:
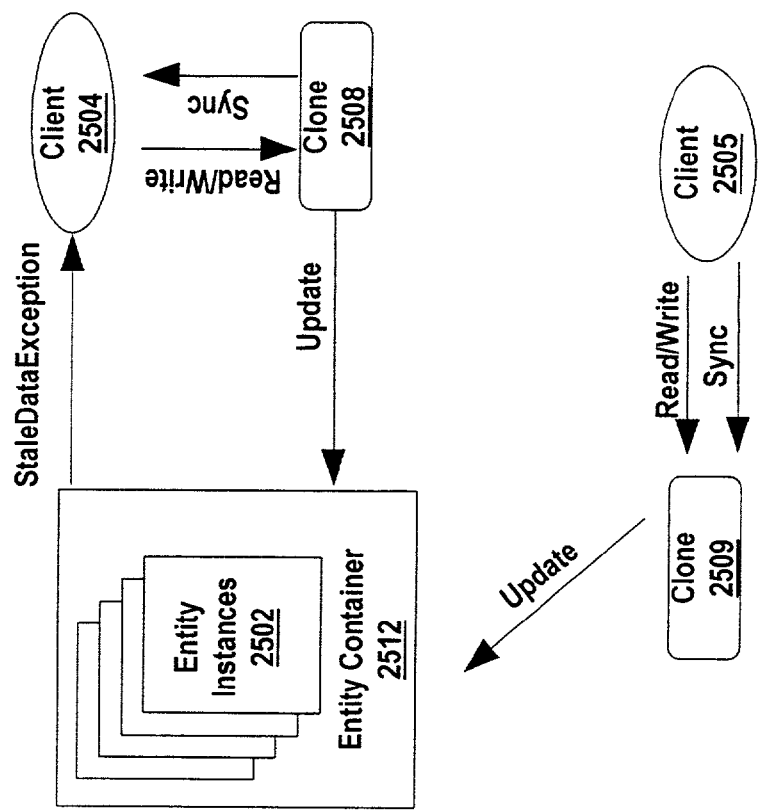
FIG. 25, on the other hand, the optimistic concurrency approach depicts the client using a read/write copy that must stay in sync with a master copy in order for updates to be accepted in accordance with an exemplary embodiment of the present invention.
Figure 24:
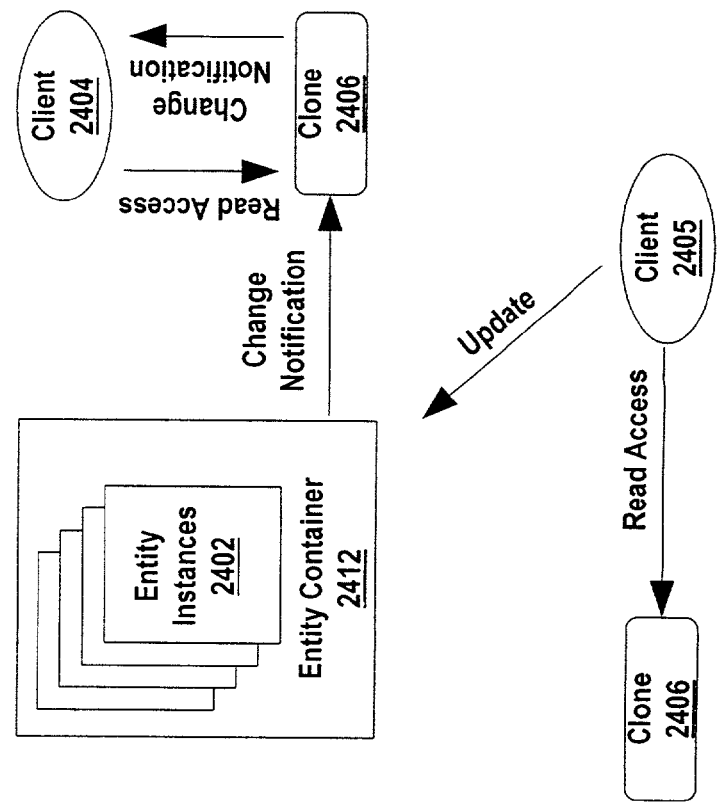
FIG. 24 is a diagram showing the event notification approach where the client is using only read-only copies of the entity instance and receiving change notifications whenever an update is received in accordance with an exemplary embodiment of the present invention.

FIGS. 24 and 25 are diagrams depicting both approaches for maintaining concurrency control implemented by DataBus in accordance with an exemplary embodiment of the present invention. FIG. 24 is a diagram showing the event notification approach where the client is using only read-only copies of the entity instance and receiving change notifications whenever an update is received. The optimistic concurrency approach in FIG. 25, on the other hand, depicts the client using a read/write copy that must stay in sync with a master copy in order for updates to be accepted.

With respect to FIG. 24, client 2404 is using read-only clone 2406, while client 2405 is using a second copy, clone 2406, which is not read only. In the read-only scenario, event services keep the client copy reasonably in sync with the master data 2402. Whenever client 2404 obtains a clone copy 2406, the system registers with the event service the interest of client 2404 in obtaining refresh events whenever the master data gets updated by anyone else. A flag is also set on entity 2402 so that every time an update gets stored to the database, the system publishes a change event to the event bus so that the client is notified of the change. Here, client 2404 takes out an enterprise lease on the event service which, as described above, requires that client 2404 actively renew the lease if interested. Essentially, the event service publishes event notification to any service or clients wanting to subscribe and stay interested as long to the enterprise lease is current. Should client 2404 lose interest and let the lease expire, client 2404's subscriptions of interest are purged. As discussed previously, if client 2404 disappears ungracefully, the lease is expunged from the record; however, should client 2404 eloquently shut down or decide not to take a data copy, the lease is removed gracefully. Recall from the description of FIGS. 13A and 13B that the transaction process implemented by the transaction manager is a two-step commit process. All invited participants must join in the transaction prior to the transaction manager issuing the "prepare" and "commit" commands. Therefore, in accordance with an exemplary embodiment of the present invention, the change notification to client 2404 depends on the update transaction actually being committed. Should all participants in a transaction actually commit to the transaction, as opposed to joining it, the change notification is sent to client 2404. Conversely, should the participants only confirm that the update transaction has been received to (tentative) store back to the database, the change notification is withheld, no matter how certain the impending change looks.

With respect to FIG. 24, client 2404 is using read/write clone 2408, as is client 2405. Thus, either of clients 2404 and 2405 can update master entity instance 2402. The second approach to concurrency control is when there are clone copies in the so-called optimistic concurrency control strategy. This strategy assumes a lack of locking due to the fact that there is optimism that collisions will be infrequent. In the optimistic concurrency-control idiom, a version number (a one-up count will do) is maintained on every entity instance. Each time an update to an instance occurs, the counter is incremented. Whenever a client obtains an entity clone, the clone contains the version number among its attributes. Whenever the client does a copy-back, using the updateFromClone( ) method, the system compares the clone's version number with the current version in the database. If there is an inconsistency, this means that some other user has performed an update since the first user originally fetched their copy. Under these conditions, the updateFromClone( ) method throws a "StaleData" exception and the update is aborted. With respect to FIG. 25, when client 2504 takes clone 2508, the copy comes with a version number. It is assumed that client 2504 will be able to make any necessary modifications to clone 2508 prior to another client, for instance client 2505, taking a clone of entity instance 2502, and thus another version. If so, client 2504 can update instance 2502 without incident. If, however, client 2505 does take out another copy, now clone copy 2509, then updated clone 2508 from client 2504 will not be accepted and a StaleData exception is returned because clone 2508 is not in sync with instance 2502. In that case, client 2504 merely rolls back the entire transaction and runs internal application logic that redoes the use-case on a new version of instance 2502. There is the possibility that the transaction cannot be successfully rolled back and client 2504 is then forced to re-key clone 2508 (i.e., create another instance with its unique primary key). It should be noted that under the optimistic idiom, one generally fetches the clone under one transaction, works with the clone under no transactional control, and then finally updates the original data store from the clone state under a second transaction.

Multi-Hop Finder Process

One aspect of the present invention is that, despite the fact that two stages are involved in the find operation, this fact is hidden from the applications programmer. The find operation appears to the user as a single seamless operation. There is quite a range of possible implementation strategies and technologies that could be used for building the first stage of the finder, sometimes referred to as the guidance stage, for example, relational database tables to correlate keys and partition identifiers. This would really be overkill for a number of reasons. First, there is no real need for the first stage data store to be transactional. Less than 100% clean data is acceptable in the first stage. If the guidance stage occasionally points one to the wrong place, or to nowhere, the find procedure is backed up by a brute force parallel query to all entity class partition containers. Thus, the system can always find out where, if anywhere, the desired object is actually stored. Moreover, directing all find queries to the same database invites bottlenecks.

Additionally, in accordance with an exemplary embodiment of the present invention, a non-transactional guidance stage can be self-healing. Strictly speaking, the guidance stage does not even need to be persistent, but instead can take on the form of cache held in volatile memory. This is so because guidance data is, in principle, recoverable using the parallel query approach outlined above. The PK-partition mapping results returned from the parallel query are replicated down to each entity class satellite. The idea is that distribution and replication of the guidance data (which allows availability and scaling to meet access volumes) is more important than transactional integrity or absolute fault tolerance.

One approach to building a guidance stage of the multi-hop finder is to use an enterprise level directory service, such as an LDAP-based service or the enterprise repository, to store the mapping from PK onto partition number or whatever information uniquely identifies the relevant container where the entity is stored. This approach has the advantage of being automatic because newly-created entity objects can register themselves similar to services whenever they are started. However, due to the increased traffic to the enterprise repository, more repositories must be utilized and the PK-partition mapping replicated across all the enterprise lookups in order to guard against bottlenecking at the enterprise lookup (or LDAP-based service).

An alternative to the enterprise lookup approach is to incorporate a cache architecture in certain entity class components, such as the steward and/or the satellites. In this approach, a cache of PK-to-partitionId entries is maintained in volatile storage out in the various satellite servers that has already been configured for holding streamed object clones. The guidance cache is in the form of a finite size, in-core hash table, following LRU (least recently used) chain semantics typical of caches. One feature is that the satellite caches exist in any number across the enterprise, as appropriate, to prevent the guidance stage from becoming a bottleneck (similar to how the problem of bottlenecking at the domain registrars is handled). The cached guidance stages are largely self-maintaining and present one level of a multi-level faulting approach to handle cache misses. When a find-by-PK operation is invoked by the user, the satellite cache is checked for a match. If found, the find request is sent to the relevant entity partition container. If there is a cache miss at the satellite, the process faults over to a centralized master store of the complete set of guidance data. This store may actually be present in two locations, the enterprise repository and the steward. Thus, the enterprise repository, populated with PK-partition mapping from data object registrations, is free. The other central store of guidance data is maintained by an entity management engine (the steward). It is expected that some embodiments of the present invention will utilize the guidance data in the steward, while others will use the guidance data in both the enterprise lookup and the steward. However, it should be noted that if the enterprise repository is checked, then the steward should also be checked because the process faults over to the steward automatically.

However, if for whatever reason a match is not found in either the steward or enterprise lookup, the process then faults over to a brute force parallel query out to all known entity partitions to find who has the data. Note that it is the steward who remains aware of all current partitions and who is responsible for initiating this brute-force query to all known partitions. Also note that this query to all partitions proceeds in parallel in concurrent threads. In accordance with exemplary alternative embodiments of the present invention, the query takes one of two forms. First, query all known partitions for the partition holding the data that is identified by the specific primary key being sought. Alternatively, the query might instead be a request for all partitions to declare their primary key identifier of all entity instances. In that case, the response will repopulate all guidance data held by the steward, along with PK-partition mapping information held in the satellites.

FIG. 27 is a flowchart depicting a multi-hop find process in accordance with an exemplary embodiment of the present invention described above. FIG. 26 is a diagram depicting DataBus components necessary for performing the multi-hop find process described in the flowchart of FIG. 27. Each of the relevant process steps is depicted in FIG. 26 as an arrow accompanied with the corresponding step number for FIG. 27. The process begins with client 2620 looking up satellite service 2612 in domain registrar 2632 (step 2702). As discussed above with respect to FIG. 12A, a NW service can be found in the lookup table by its attributes rather than by its interface. Client 2620 returns the proxy object for interacting with satellite 2612 (step 2704). Should client 2720 already have the interface for satellite 2612, then steps 2702 and 2704 can be omitted.

The find operation is a two-step process wherein the first step locates the partition holding the entity instance and the second step is a local find where the partition is requested to return an interface for the entity instance. The process begins with client 2620 issuing a findByPk( ) to satellite 2612 via the satellite's proxy (step 2706). If satellite 2612 has the PK-partition mapping listed, the satellite identifies the partition holding the entity instance and the process moves on to the second step wherein the satellite performs the local find (step 2708). If, however, the PK-partition map is not in the satellite 2612's cache, the satellite looks up the primary key in enterprise repository 2630 (step 2710). (Note that the satellite will cache the new information.) If, at this point, satellite 2612 finds the primary key in enterprise repository 2630, the satellite retrieves partition information and performs a local find in that partition (step 2712). If, however, the primary key is not listed in the enterprise repository, the process faults over to steward 2610. Here Steward 2610 can perform various alternative processes. First, if steward 2610 has a listing for the primary key in its cache, it merely passes the partition identifier to satellite 2612. Alternatively, steward 2612 executes a parallel query for the partition holding the primary key. Once the partition identifies itself to steward 2610, that information is again passed to satellite 2612. Further, in accordance with another embodiment of the present invention, steward 2610 executes a parallel query for all entity-class partitions to report the primary keys for their entity instances. In that case, steward 2610 can repopulate its own cache with the PK-partition mappings received from the individual partitions. That information is then passed down to the entity-class satellites (2612-2618) which repopulate their caches with the PK-partition mappings (step 2714).

In any case, at this point satellite 2612 will have identified the partition holding the entity instance and performs a local find (step 2716). Satellite 2612 makes the findByPk( ) to the home interface of the partition identified as having the entity instance. The partition container returns a proxy for the entity instance to client 2620 for interacting with the instance (step 2718). The process then ends.

Figure 28:
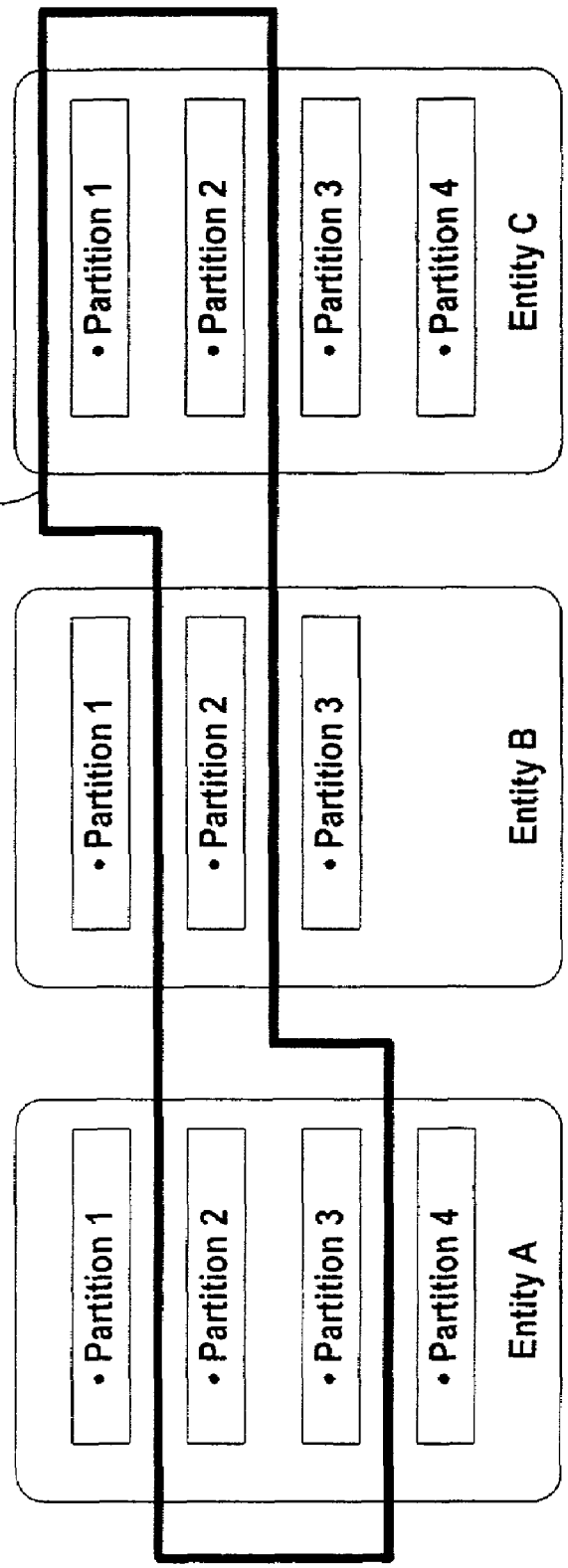
FIG. 28 is a diagram representing a logical domain boundary defined from partitions in each of several entities in accordance with one embodiment of the present invention.

Logical domains are used to narrow the context of an operation to a scope that is smaller than the entire enterprise. FIG. 28 is a diagram representing a logical domain boundary defined from partitions in each of several entities in accordance with one embodiment of the present invention. Domains are, in a sense, orthogonal to the dimension of entity type or subject area cutting across different entity boundaries. Individual domains may be defined along with any pertinent grouping, for example, along geographic lines or along lines of business, or according to some other classification. Logical domains supplement the methods of finding entity instances, such as by using either multi-stage finder strategy using primary keys described above, or to chase relationship paths from a known entity to related entities using the mechanism of externalized associative engines, the description of which follows.

Logical domains are particularly useful with respect to situations in which a user needs to locate one or more entities, starting cold, by criteria that are more complex than a search by primary key. In these situations, the where clause of the SQL select query may be used for the more complex find-by-criteria operations and can be performed in parallel out at the separate partition containers for a given entity, and then the results can be coalesced. However, there is no need to perform these parallel find operations at entity partitions where the entity could not possibly be located by searching a U.K. customer base when trying to find a U.S. customer. In these situations, it is desirable to scope the range of an operation to a logical subset of all partitions. Logical domains provide the means to perform this narrowing of scope.

In formal terms, the organization of data into logical domains is represented by a mapping from the pair (entity class name, domain common-name)

onto the set of all partitions where entities of that type and logical domain are stored:

D: (entity type, domain name)|→{partitions}

Domains are closely related to the notion of data partitions serving as a logical overlay on top of the physical partitions. In the simplest form, a domain could amount to nothing more than an alias for a specific partition of some entity providing a more user-friendly common-name in place of a physical partition identifier. For example, domain "UK" might map onto partition #8 for the Customer entity. However, a given domain for a given entity may span several partitions. More than one domain could coexist and overlap to represent the dissection of the enterprise along different dimensions (e.g., geographic and line of business).

Logical domain mapping may be stored in a directory service that would be used during find operations to identify all the physical partitions that are relevant for a given entity within a desired logical domain. When a partition is created after the fact, the partition can be assigned to one or more logical domains.

At runtime, the use of the logical domains is particularly relevant in the entity creator methods and the entity finder methods. It can be understood from the description of creating an entity as described with respect to FIG. 21 above, that there is no explicit notion of where to create it; the "where" question is answered implicitly by the entity container that the client has an interface to. With respect to the present invention, creator methods are introduced that allow the specification of where to create the instance. Each entity's create interface (implemented by the satellites) needs to supply a createInPartition( ) method that explicitly indicates the physical partition in which the new instance should be created. Also required is a createInDomain(String domain) method that allows the user to specify in which domain the instance should be created. This method would first use directory services to map the specified domain name onto the set of partitions that belonged to that domain. It would then use some policy (e.g., random selection or greatest available capacity) to select one physical partition from the set of qualifying partitions; the new instance would then be created in that partition. In accordance with a further embodiment of the present invention, a createInDomains(String[ ] domains) method searches the directory for all partitions belonging to all specified domains (intersection) to deploy a new entity instance in a partition that concurrently belonged to two or more domains (e.g., placing an entity simultaneously in Europe and Internet LOB domains).

In accordance with another embodiment of the present invention, another major area where domains would be visible in the user interfaces is in the complex finders for an entity. These find-by-criteria methods are given an extra argument for naming one or more domains to be intersected. The find operation is then performed in parallel out at all partitions matching the specified domain(s). The results of the parallel queries would then be coalesced and returned to the requester.

Externalization of Associations

The above-described data architecture externalizes relationships between entities using association data storage that is completely de-coupled from the participating entities themselves. This model departs from traditional relational practice of using foreign keys within entity tables to represent relationships, or the analogous objectoriented practice of "burying" object references within other objects. In essence, the entities themselves have no immediate awareness of the associations in which they participate. This knowledge is completely encapsulated within an outside authority, the association engine that manages the association and ensures that integrity constraints are not violated.

The externalization of associations is extremely flexible in that new associations may be added to existing entities as business models evolve. Thus, new entities can be introduced and associated with existing entities without any impact upon those existing entity classes or the instances themselves. This externalization is possible because neither the entity class nor the entity instance internally track any information relating to associating, or linking through association, to other entities. Rather, the external association engine is modified with association information (the links) for the additional entities which makes for an extremely loosely-coupled fabric of business objects. As an example of this flexibility, a new association can be easily defined to append supplementary information to an existing entity to support the needs of a new service. This is somewhat like object subclassing (inheritance), but is in some ways, more powerful. The supplementary information can even be applied after the fact to entity instances already in deployment which is not possible with object inheritance. Furthermore, externalized associations allow any objects housed in any store across the enterprise to be linked together with any other object in the enterprise. Externalized associations also have less rigidity in the face of evolving business models than does the conventional approach of realizing a data schema as foreign keys within entity tables.

The association engines that manage relationships between entities are built from reusable infrastructure. A number of different specialized association engines are supplied to support the different common association types. For example, specialized association engines will support the common cardinalities of one-to-one, one-to-many and many-to-many relationships. Another possible variation is the addition of an ordering property to one-to-many or many-to-many relationships which is useful in, for example, ordering the circuit legs that comprise the end-to-end path of a complete circuit. Other more specialized associations are possible, such as ternary associations linking triplets of entities.

The following pseudo-code gives a sketch of how an application programmer might find a Customer instance by primary key, then traverse a one-to-many association to fetch all the Account instances belonging to that customer:

```
//
// We assume an interface to a lookup service:
Lookup lookup;
// The Customer PK:
long customerId=1234L;
// Use the lookup service to get a finder interface for
// the Customer entity:
CustomerFinder finder=(CustomerFinder) lookup.getService("entity.finder.Customer");
// Use the lookup service to get the interface to the
// Customer/Account association engine:
CustomerAccountAssoc assoc=(CustomerAccountAssoc) Lookup.getService("assoc.1-m.customer.account");
// Use the finder interface to obtain remote reference to
// relevant Customer entity:
Customer cust=finder.findByPk(customerId);
// Traverse the association from the Customer source object
// to obtain an array of all associated Account objects:
Account[ ]  accounts=assoc.getAccountsForCustomer(cust);
// Exercise the functionality of the Customer and Account
// objects through their remote interfaces:
cust.dosomething( );
// etc.
```

This sample code illustrates the use of class-level entity functionality through an entity's finder interface, the exercising of association functionality through an association engine interface, and the use of an entity's instance-level interface (i.e., cust.doSomething( )). The most striking aspect about this sample code is that the program asks the association interface to return the Accounts related to the Customer, rather than the more familiar object-oriented practice of asking the Customer object for its Accounts. Note that the entity and association engines and their storage might be physically located anywhere across the enterprise, while access should, nevertheless, remain this simple and transparent. Finally, the entity and association engines appear to the client as centralized services deployed somewhere "out there." This centralization is purely logical . . . an illusion that hides the distributed, de-centralized nature of the implementation.

Figure 29:
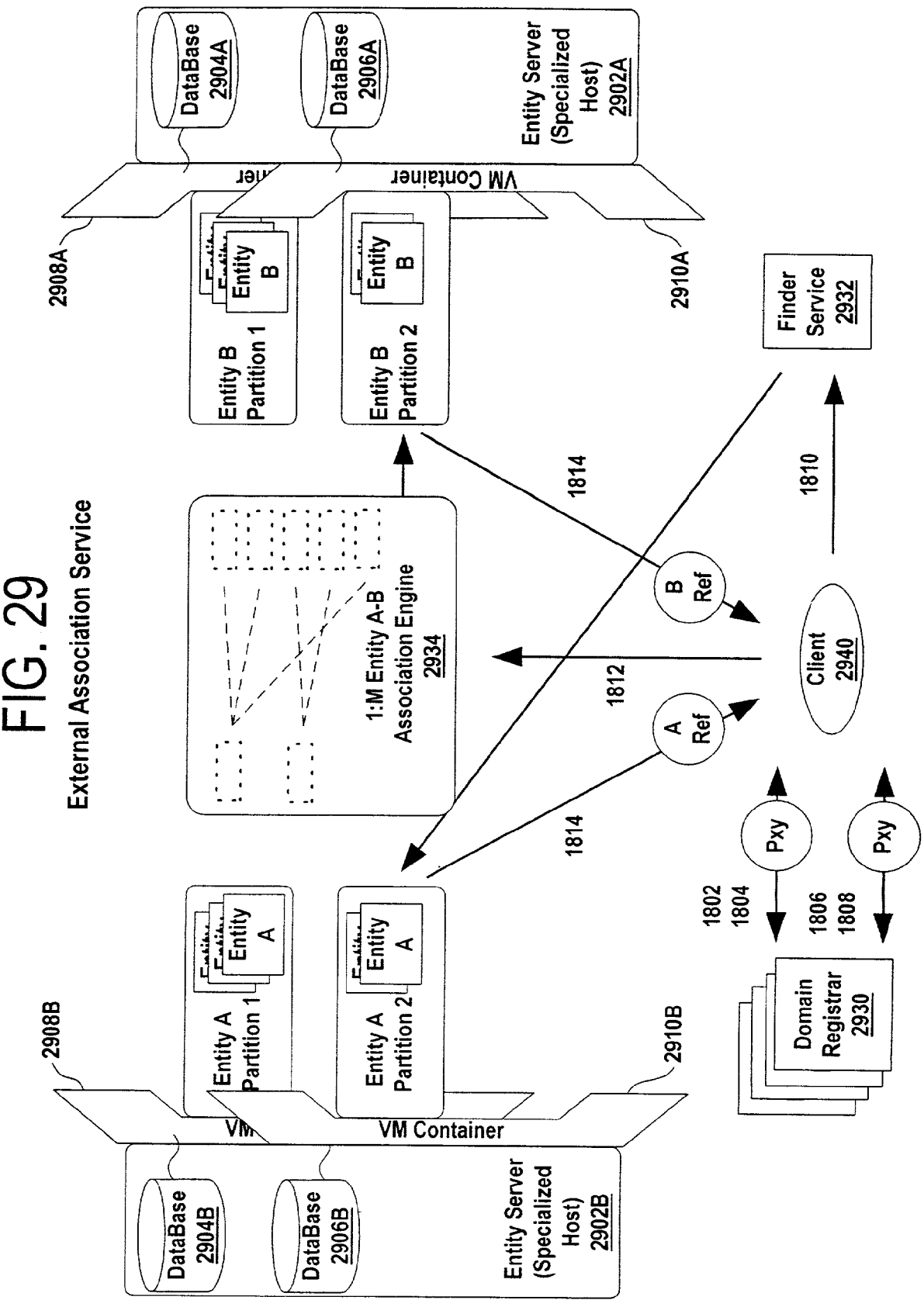
FIG. 29 is a diagram of NW service platform infrastructure of interrelated services relating to an enterprise is illustrated in accordance with an exemplary embodiment of the present invention.
Figure 30:
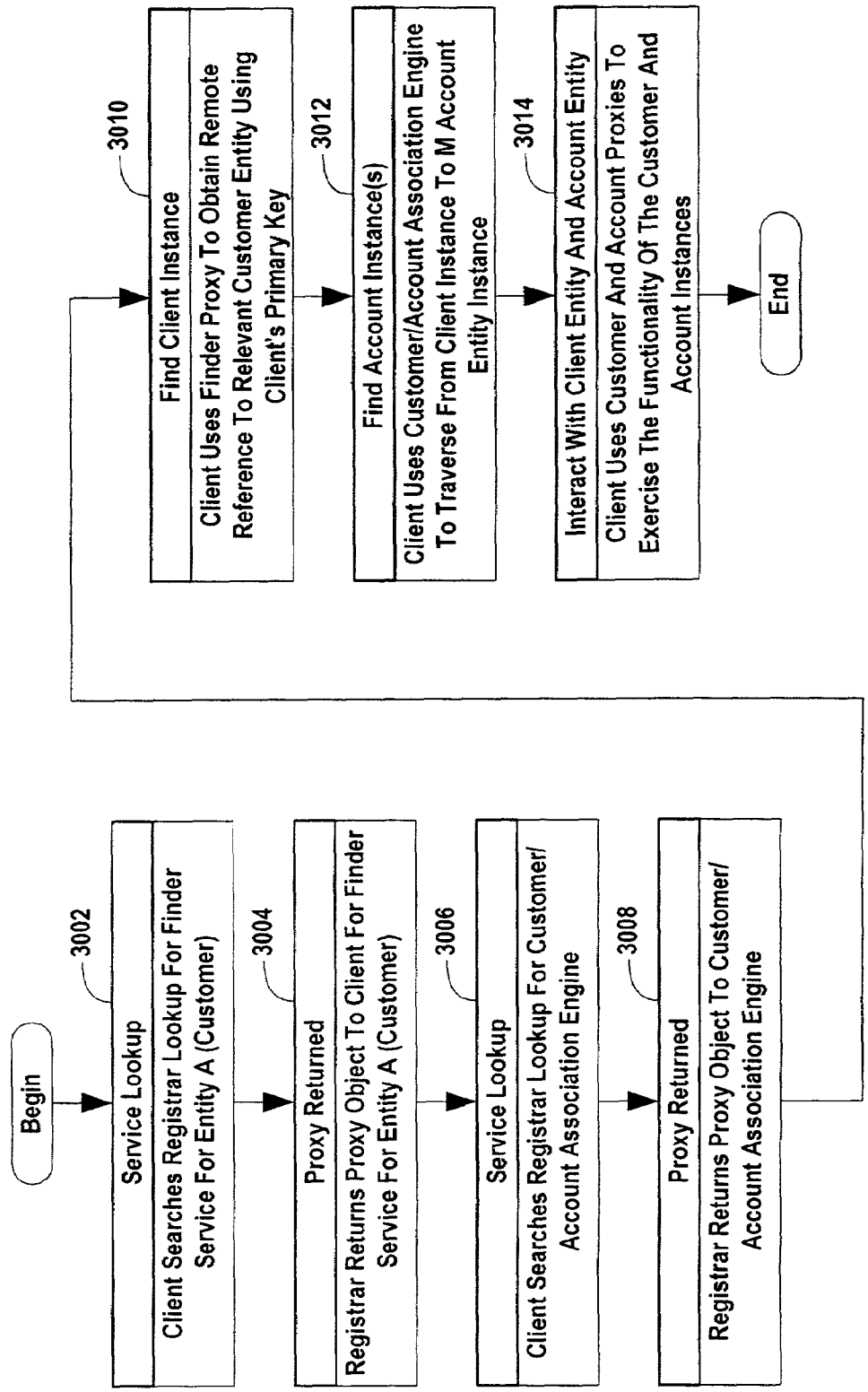
FIG. 30 is a flowchart depicting a process for finding entity instances that are associated with an instance in accordance with exemplary of the present invention.

The above-described routine for navigating to all the Account instances belonging to a particular Customer instance based on the Customer's primary key will now be described in the NewWave environment with respect to FIGS. 29 and 30. FIGS. 29 and 30 are a diagram and a flowchart, respectively, depicting a process for fetching all the Account instances belonging to that Customer instance based on the Customer's primary key in accordance with an exemplary embodiment of the present invention.

With reference to FIG. 29, a diagram of NW service platform infrastructure of interrelated services relating to an enterprise is illustrated in accordance with an exemplary embodiment of the present invention. There, entity servers 2902A and 2902B are shown with the respective databases 2904A and 2906A for server 2902A, while databases 2904B and 2906B are hosted by server 2902B. In the depicted Figure, each server has two VM containers 2908 and 2910 running, and each container has two NW partition services running within. Partitions 2908 and 2910 are responsible for two main things—retrieving one or more instances of a business object and creating a new instance of a business object. Typically, client 2940 would not directly invoke methods of the partition, but would utilize instead a satellite service. Notice that the Figure depicts four entity classes, A-D, representative of, for example, Customer, Account, Billing Address and Pending Order entity classes. Notice also that each of the entity classes is partitioned. With respect to the present Figure, each entity has two partitions, but in practice, most entities would have many more partitions. Each partition is responsible for a plurality of entity instances which are identifiable by a primary key. Also depicted is registrar 2930 which may be a domain registrar as described above with respect to FIG. 9. It is expected that the business objects normally used by a client are proximate to that client, thus a fair assumption is that all components represented in FIG. 29 are in a local domain, such as the local domains defined by a multicast radius as further described above with respect to FIG. 9. However, as has been alluded to above, and which will be described in greater detail below, a client may interact with business objects located anywhere in the enterprise, locally or non-locally. Thus, servers 2902A and 2902B may or may not be local, while registrar 2930 and finder 2932 are local to client 2940. However, the operations that each of these services perform might lead to hops in other non-local domains.

Also shown in FIG. 29 is 1:M entity A-B association engine 2934 which provides the logic and table resources for tracking all instances of class A (Customer class) to instances of class B (Account calls) through 1:M associations between Customer entity instances and Account entity instances. In practice, an association engine service will be available for the enterprise for each association between entities (similar to the association engines depicted in the E-R diagram on FIG. 16B). The table resource list links the instance between the Customer entity class A and the Account entity class B. Each time a customer makes a new enterprise account, a new Account entity is created in a partition and a link is added to engine 2934 from the customer instance to the newly-created account instance.

Finder service 2932 may be a satellite service which will be described below. Briefly stated, a satellite is responsible for two main things, finding existing entity instances and creating new entity instances of the business object. Satellites are helper services to a steward service that allocates blocks of primary keys to the satellites and locates a partition based on a specific primary key. It should be understood that in the enterprise there is only one steward for each entity class in the enterprise, but there might be many satellites distributed across the domain for that entity class whose purpose is to help the steward. Finally, FIG. 29 further depicts the interaction between components with lines that are representative of the correspondingly-numbered step in the flowchart depicted in FIG. 30.

With respect to the process depicted on the flowchart illustrated in FIG. 30, the process begins with client 2940 possessing a primary key that identifies a Customer entity instance for a customer. Client 2940, needing account information for the client, looks up the address (URL, URI) of the finder service 2932 in registrar 2930's lookup (step 3002). As discussed in great detail above, the registrar returns a proxy to finder service 2932 which allows client 2940 to interact with finder service 2932 (step 3004). A similar lookup is performed for the Customer/Account Association Engine service 2934 (step 3006) where an appropriate proxy is returned for client 2940 to interact with engine 2934 (step 3008). Client 2940 then uses the finder service to obtain a remote reference to the customer entity instance identified by the primary key (step 3010). With a reference to the Customer instance, client 2940 can access the data using one of the data access modes to be described below. Next, client 2940 conveys the Customer instance primary key to Association Engine 2934 which traverses its association table and returns references to all Account entity instances associated with (link to) the Customer primary key (step 3012). Alternatively, Association Engine 2934 might pass the primary keys to all associated Account entity instances making client 2940 responsible for looking up each key. Finally, client 2940 uses the reference to the Customer and client entity instances to exercise the functionality of the entity instances (step 3014).

Due to the pattern of relationship traversal implicit in a method like "getAccountsForCustomer( )," the method returns all destination objects that are associated with a given source object. The complete set of entity instances may be more than necessary. A lack of filtering during a relationship traversal is a shortcoming of the proposed network-style of distributed data management in comparison to the fill expressive power of the SQL "where" clause to narrow a join operation. One way of compensating for this shortcoming is to adopt the pattern of implementing narrowing or filtering methods at the class level in entity implementations. A narrowing method would take as an input an array of entity instance references, apply filtering criteria (probably using a SQL select), and return the filtered array of the subset of entities matching the criteria. With such a narrowing method available, the more restricted relationship traversal would be effected by calling upon the association engine to perform the initial traversal, then passing the resulting array of destination objects to the entity home interface for the narrowing operation resulting in extraneous remote calls and data passing. This pattern is illustrated in the following pseudo-code:

// Find all accounts for given customer:
Account[ ]   accounts=assoc.getAccountsForCustomer (cust);
// Look up the Account home interface:
AccountHome acctHome=lookup.getService ("entity-.home.account");
// Filter the accounts to those older than 48 months:
acctHome.narrowToOlderThan(accounts, 48);

As an alternative, a client could also sequence through the unfiltered array of accounts and perform its own filtering via some criteria; however, this approach is very network intensive.

A third alternative, mentioned above, is for the client to pass in a Java filter object to the association engine during association traversal. The filter is a serializable Java object, whole code is fetchable at runtime by the Java language infrastructure from its codebase URL. The association engine can apply the client-supplied, custom filter to an association traversal result set before returning the result set to the client.

Merely gathering a suitably-filtered solution set of entity instances is not the only challenge of the process described above. Another challenge to be overcome is that the architecture depicted in FIG. 29 is not overly scalable. Two factors thwart scalability after a certain point. First, there is an absolute threshold number of entity instances in an entity class that can be supported by association engine 2934. Beyond that number, performance is rapidly reduced. Secondly, the quantity of links between the entity instances is reduced. Obviously, this is not a concern with 1:1 cardinality association engines, but the performance of 1:M and N:M cardinality association engines drops off as the number of links increases. Moreover, 1:M and N:M cardinality association engine performance decreases as a nonlinear rate with increased entity loading because the possible number of links increases by M with the addition of a single entity instance to the data. However, before discussing solutions to the above-described shortcomings, data access and the role partitioning plays in system scalability will be discussed.

The Scaling Problem

As described above, extensive entity partitioning and distribution is central to the DataBus scalability strategy. Entities are scaled to nearly unlimited volumes of data by simply adding more and more partitions of relatively constant size in accordance with the present invention. However, as the volume of data grows, the central association engine must also expand to accommodate the new data and associations. However, at some point this growth becomes constrictive. The centralized nature of the external association engine architecture results in an overall reduction in DataBus navigation capacity due to bottlenecking inefficiencies inherent in handling the shear quantity of entity association requests with a correspondingly scaled central association engine for the data size.

In accordance with one embodiment of the present invention, the bottlenecking problem is alleviated by applying some of the same concepts in the central association engine that are applied to entities for scaling (i e., the association engine is partitioned, or more-properly, "fragmented" by partition). Fragmenting the association does two things. It decentralizes the association engine, allowing the association links to be kept proximate to clients that would normally use them, and reduce to a manageable amount the quantity of association links kept in any one location.

It should be understood that a link record exists to represent every pair of entities involved in an association describes an association relationship between two instances from the respective entities. Of course, with respect to the present invention, each of these instances must be contained in a separate partition (i.e., from the separate entities). Therefore, in accordance with an exemplary embodiment of the present invention, each of these link records is redundantly stored in two locations. The first link record is stored in an association engine fragment that is physically proximate to the entity partition where the source object is located. In fact, the engine fragment is logically coupled to that entity partition. The duplicate link is stored in a second location that is physically proximate to the entity partition in which the destination object is located. It is also referenced or coupled to the entity partition where the destination object resides. Thus, there is a fragment of the association link records co-located with respect to each entity partition. The association engine is logically central, but physically composed of fragments that may be widely dispersed. To traverse a relationship from a specific source object, the association fragment coupled to that source object's partition is used. Likewise, the association storage fragment coupled to the destination entity's partition is used for traversing the relationship in the backward direction. This approach to partitioning the associations allows both the association and entity storage to remain relatively constant in size as one adds more and more partitions.

Figure 31:
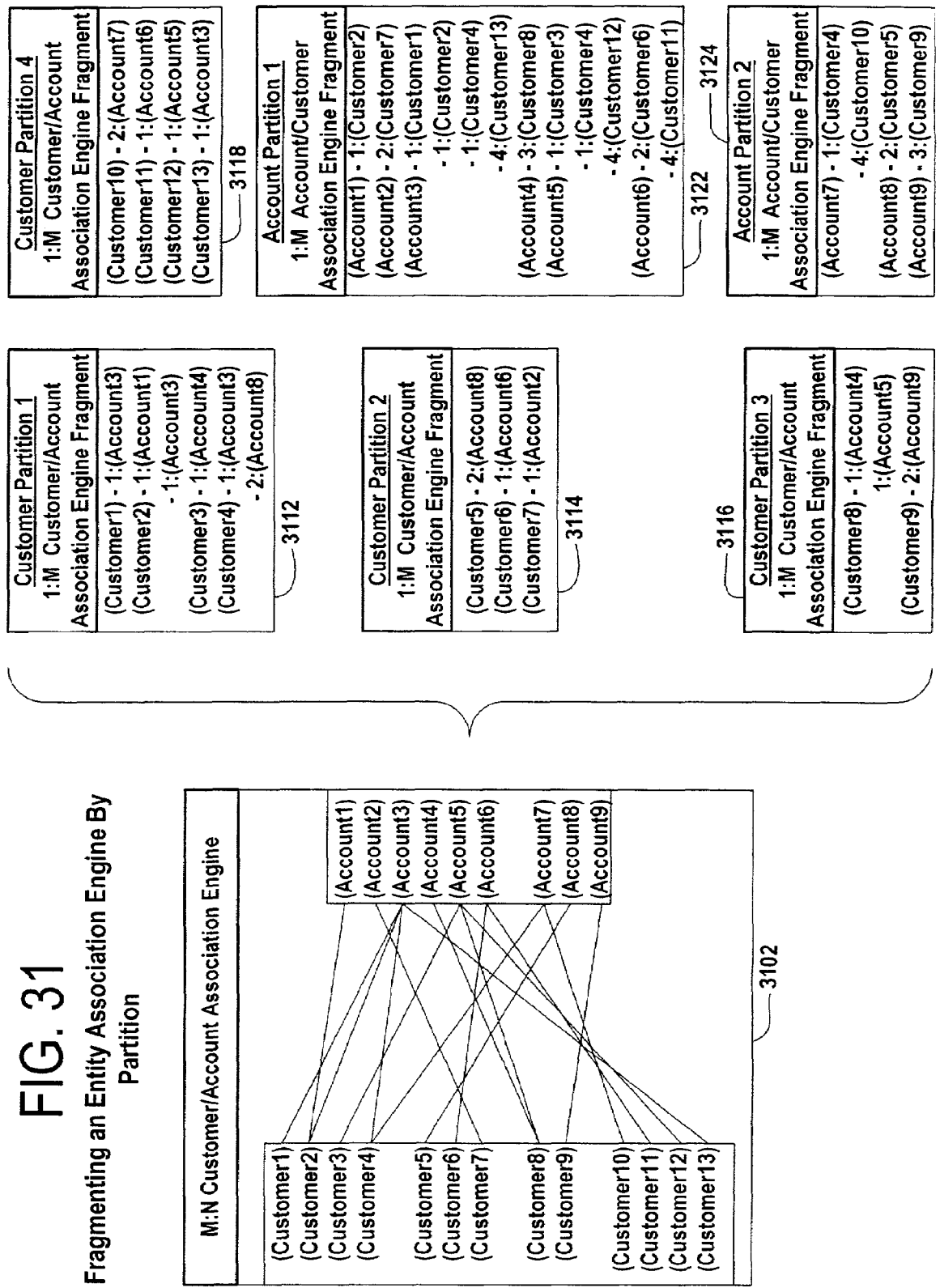
FIG. 31 is a diagram showing external central association engine 3102 which consists of a plurality of link records which describe associative relationships between Customer entity instances and Account entity instances.

The precise structure of the association engine fragments might be better understood with resect to the description of FIG. 31 which is a diagram showing external central association engine 3102 consisting of a plurality of link records which describe associative relationships between Customer entity instances and Account entity instances. A client merely accesses engine 3102 with a unique identifier for a Customer entity and utilizes the association link records to find any association relationships that might exist to any and all Account entity instances. In accordance with an exemplary embodiment of the present invention, external central entity association engine 3102 is "fragmented" into association engine fragments 3112, 3114, 3116, 3118, 3122 and 3124, one for each entity partition from the participating entities. Each association engine fragment is proximately coupled to a specific entity partition. In practice, a partition references its association engine fragment, though this record of links should remain physically close to the partition as the partition will call on the engine fragment for association link records. Association links between entity instances recorded in central engine 3102 are divided up between the partitions' engine fragments resulting in twice as many link records as in central engine 3102. This occurs because each link that was previously recorded for an association between two instances is now recorded in the partition's association engine fragment for each instance's partition. Notice t, although entity instances in central engine 3102 are identified only by their unique identifier (primary key), the entity instances in the engine fragments 3112, 3114, 3116, 3118, 3122 and 3124 are associated with a particular entity partition. It should be understood that this is merely an exemplary embodiment and that destination instances might be identified only by their unique identifiers because the client can always look up the partition container with a find service from the instance's identity as described elsewhere and above.

Storing link records in engine fragments for both the source instance and the destination instance results in doubling the amount of records to be stored. External association engine 3102 is depicted as having sixteen links between instances from two entity classes (thirteen instances in the Customer entity class and nine instances in the Account entity class). Thus, resultant association engine fragments 3112, 3114, 3116, 3118, 3122 and 3124 contain thirty-two association link records, thirteen link records for instances in partition containers for the Customer entity and thirteen link records instances in partition containers for the Account entity.

The quantity of association engine fragments corresponds with the total number of partitions between the entities. If, for instance, one of the participating entities (i.e., Customer) is divided into four partitions, and the other, Account, is partitioned two ways, then six association engine fragments would result. It should be understood that it might be possible for the instances in one or more entity partitions to not have associations with the instances in one or more partitions of a second entity. In that case, the total amount of records would still be twice that of the non-fragmented engine, but one or some of the resultant engine fragments would not have association link records.

Figure 32:
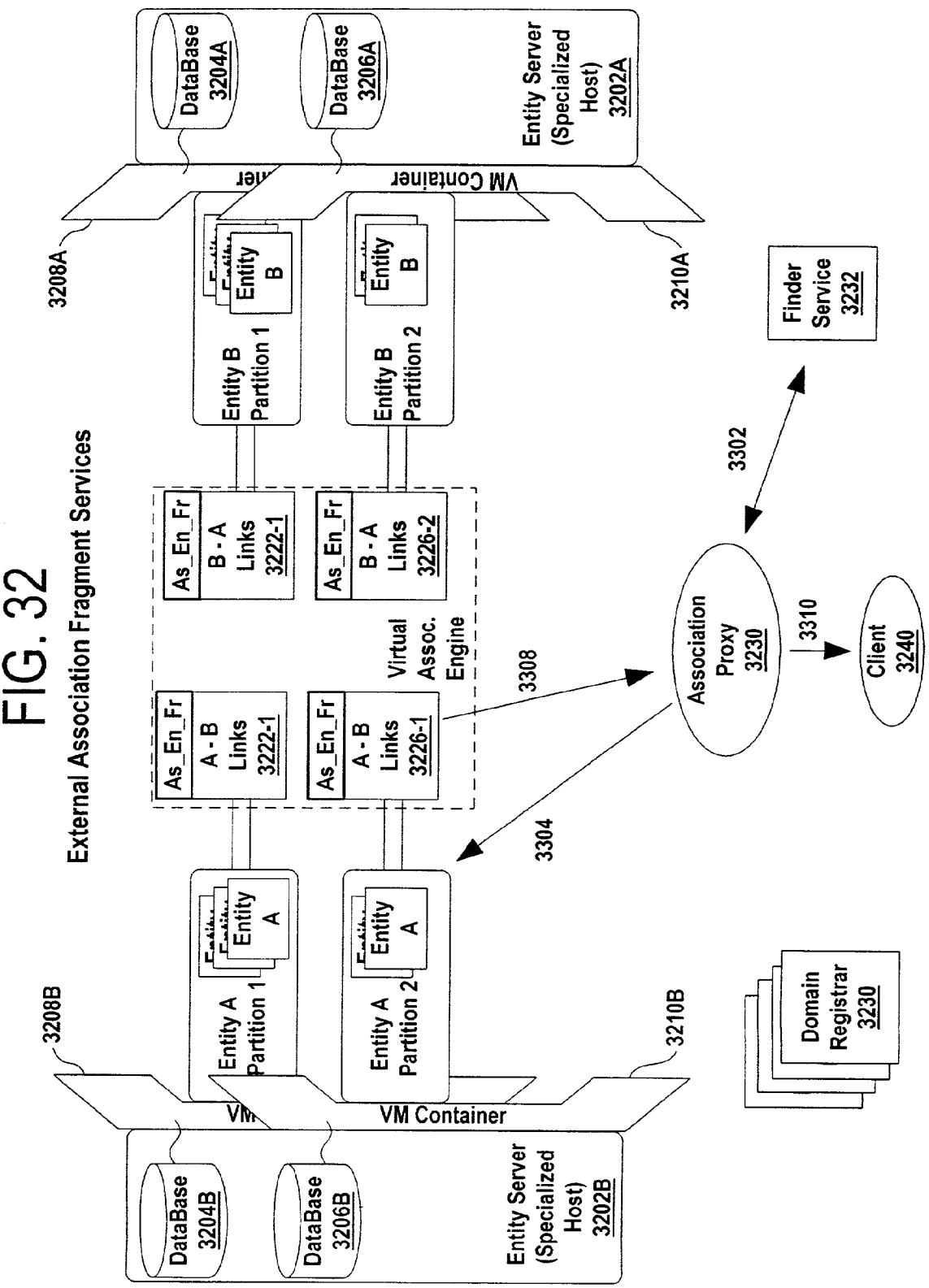
FIG. 32 is a diagram of NW service platform infrastructure of interrelated services relating to an enterprise is illustrated in accordance with an exemplary embodiment of the present invention.

With reference now to FIG. 32, a diagram of NW service platform infrastructure of interrelated services relating to an enterprise is illustrated in accordance with an exemplary embodiment of the present invention. FIG. 32 is identical to FIG. 29 and therefore will not be described further except to add that arrows depicting the interaction between DataBus components are shown with regard to the process described in FIG. 33.

Figure 33:
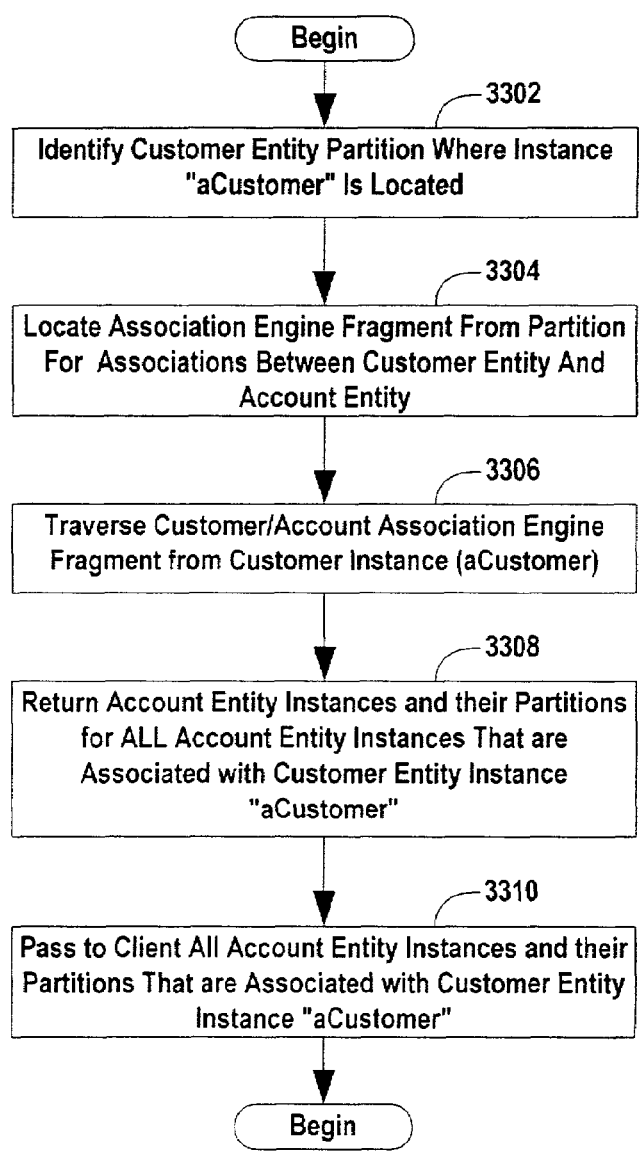
FIG. 33 is a flowchart depicting a process for getting all accounts instances that are associated with an identified customer instance in accordance with an exemplary embodiment of the present invention.

FIG. 33, on the other hand, is a flowchart depicting a process for getting all accounts instances that are associated with an identified customer instance in accordance with an exemplary embodiment of the present invention. It is assumed that the client has already found an association service and has association proxy 3230 to interface with the service. The process begins by identifying the partition container holding the entity instance (step 3302). Although this might be accomplished via finder service 3232, as described above, this extra lookup is not necessary. The smart proxy that serves as a remote handle to an entity actually encapsulates a remote reference (typically an RMI stub) to the entity partition container, as well as other information like PK. In either case, the partition container must be found for the entity instance in order to locate the association engine fragment that is coupled to it (step 3304). Once the container is found, the interface to the coupled association engine fragment is gotten (typically via local registrar service lookup) and the Customer/Account association engine fragment traversed starting from the Customer instance to find all associated Account instances (step 3306). Those instances are then returned to the association engine (step 3308) which passes them on to client 3240 (step 3310). At step 3308, it is assumed that the remote interfaces are returned for the Account instances and the client interacts with the Account instances as need be. In one embodiment of the present invention, the link records held in the association fragment engines consist of the triplets (primary key, entity type, partition number) for both source entity and destination entity that are linked. In traversing the association, the association fragment engine must query its link record store for all link records matching a given source entity. Then, given a set of link records, it must resolve the PK, entity type and partition number for destination entities into remote smart proxies for those entities. This could be done via the multi-hop find-by-PK. In practice, we optimize this by caching, in the association fragment engine, a map from (entity-type, partition #) onto the remote RMI stub to the corresponding entity partitions. Should this stub lookup suffer a cache "miss," the interface to the partition service is fetched via enterprise service lookup described above via a partition naming convention formed from the entity type and partition number. In either case, once remote reference to destination partition or partitions is available, the association fragment engine can request those partitions to return smart proxies corresponding to all the destination entities matching the destination PKs.

In accordance with another embodiment of the present invention, the client need only to be able to identify a particular entity instance to efficiently navigate to all data stores associated with that instance using the association engine fragments. Thus, a client merely invokes an assoc.getAccountsForCustomer(cust) method, just as described above with respect to the process depicted in FIG. 30. It appears to the user that they are exercising a remote interface to a central association engine, while there is in fact no such central association engine. This slight-of-hand is accomplished by using smart proxies, a concept we have already mentioned in a number of other contexts above. Thus, many of the steps described in the process immediately above are being performed out of view from client 3230.

Figure 34:
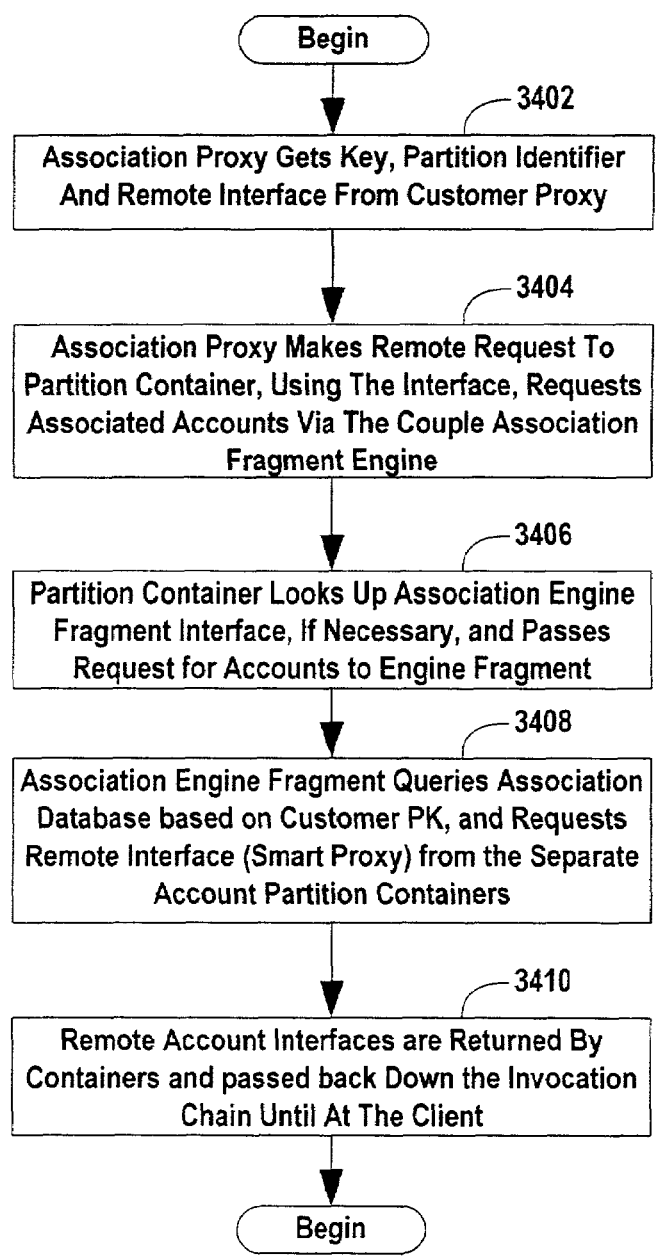
FIG. 34 is a flowchart depicting a process for getting all accounts instances that are associated with an identified customer instance using smart proxies in accordance with an exemplary embodiment of the present invention.

Now, by way of contrast, the process described above from the flowchart in FIG. 33 will be described below, but using smart proxies. FIG. 34 is a flowchart depicting a process for getting all accounts instances that are associated with an identified customer instance using smart proxies in accordance with an exemplary embodiment of the present invention. The process begins with the client invoking a traversal method, assoc.getAccountsForCustomer(aCustomer), with the association engine (not shown). This method invokes logic local to the association smart proxy that queries the Customer entity argument (which is itself a smart proxy) for its primary key, partition identifier and its remote interface to the entity container where the actual Customer entity instance is stored (step 3402). The association smart proxy then makes a remote request to the Customer entity's partition container to traverse the "assoc.1-m.customer.account" association from the source entity with the given PK (step 3404). The Customer entity container has no built-in knowledge of how to traverse a Customer/Account association. Remember that in loosely coupled DataBus architecture, entities know nothing of associations, and new associations can be added at any time without breaking existing entities in deployment. The entity partition container can look up the interface to the association engine fragment for the association named "assoc.1-m.customer.account" which is paired with that entity partition (step 3406). The entity partition can also keep a cache of references to these association fragments so it does not have to go out to a lookup service every time. Once the entity partition has found the remote interface to the relevant association engine fragment, it forwards the association traversal request to that association engine fragment, which in turn can accomplish the relationship traversal (step 3408). The association engine fragment queries association database based on Customer PK and requests remote interface (Smart Proxy) for the separate account partition that holds instances associated with the customer. After the Account remote references are passed to the association engine fragment, they get passed back the invocation chain all the way to the requesting client (step 3410), thus ending the process.

One aspect of one embodiment of the association approach of the current invention is the novel use of smart proxies in the interfaces to the logical association engine services. In this embodiment, the association engines are accessed through a service interface that is implemented with a smart proxy that, itself, contains no inherent remote references (proxies in stubs) to a remote object. The association engine smart proxies "piggyback" on the communications channels of the entity smart proxies that are passed to it as parameters in "link( )" or "traverseAssociation( )" requests. For example, when the association interface is told to "link" entities A and B, the association smart proxy will extract from A and B their remote handles to their respective partition containers. The smart proxy will then proceed to send parallel link requests (in separate threads) to these two entity containers, which in turn forward the requests to the appropriate association fragments. This is a highly novel and a typical example of the use of a smart proxy. It has no communications "channels" of its own, but rather "parasitically" employs the communications channels of objects with which it comes into contact.

Another feature of one embodiment of the present invention is the manner in which the virtual association engine deals with violations of cardinality integrity. Specifically, when a client requests that a one-to-many association add a new link record, the system must check for cardinality violations. Due to the asymmetric nature of a one-to-many association and the DataBus approach of partitioning entities, only the fragment engine on the "many" side can reliably detect a cardinality violation. A simple-minded implementation would serialize the link requests to the association fragments on either side of the relation, first to the "many" side, then only if successful, sending the link request to the "one" side. In one embodiment of the current invention, these link requests are forwarded in parallel (using two background threads) to the two "sides" of the association. If the "many" side detects a cardinality violation, it will throw an exception. The "one" side will, in any case, proceed to add a link record, all-the-while ignorant of whether doing so violates cardinality constraints. But all such link operations are performed under the oversight of a global transaction. Thus, when the caller of the (illegal) link request catches the cardinality exception, they will (according to the "contract" they are expected to obey) "roll back" the global transaction. The "one" side's inappropriate adding of an illegal link record will be effectively undone.

Management Operations Center Overview

The Management Operations Center (MOC) is an application for providing support for people addressing problems similar to those handled in a Network Operations Center (NOC), but not limited to only network problems. As such, it is intended to support problem management in many forms, including those typically handled by customer support centers and tactical assistance centers. The MOC represents a tool that assumes a fundamental re-engineering of the processes and tools used in these environments. It should not be compared directly against the tools that currently support these environments (trouble tickets, workflows, network management consoles, etc.), but should be analyzed as to how it supports the new re-engineered process. As such, it will not support many things currently expected in these environments because some activities are not needed.

The current NOC environment can be described in simple terms as an approach involving monitoring of activity, identification of problems, selection of problems to work on off of a queue, and resolving the problem. By contrast, in accordance with an exemplary embodiment of the present invention, the MOC monitors and identifies problems based on rules set up by experts. Additionally, rather than an ad hoc personnel deployment, the MOC determines the best available personnel for a particular problem based on circumstances and policy rules and then directly invites those persons to work on the problem. Therefore, the work team is composed based on differing roles and skill sets required for the problem, and might involve people from different organizations. Because the MOC is an integration of services, the MOC is able to handle problem cases that are not limited to one area, as is the practice of Network Operations, but to any affected areas. For instance, a problem may bind together a network event, customer tickets, application events, etc. Finally, in accordance with an exemplary embodiment of the present invention, a work event can be worked on and accessed by anyone with connectivity to the NewWave environment, so people involved do not have to be in one center, but could be at home, on the other side of the world, etc. Thus, in stark contrast with prior art attempts, the MOC's emphasis is on collaboration tools and world-wide access.

Operations support systems today tend to be large, closed applications that perform part of the work needed by OSS personnel. OSS personnel usually end up using several systems that overlap and do not talk to each other. As opposed to a closed application that provides merely a partial solution, the MOC of the present invention represents an example of a new way of designing applications: the inside-out design. In this approach to building systems, rather than building monolithic application systems, the "application" is a collaboration of many smaller units acting on common objects, possibly without knowledge of each other, but with their actions affecting each other. This design also makes heavy use of rules external to code executed by rules engines or policy specific objectives. This allows for changing the behavior of the system without changing the code. Those behaviors which represent organizational policy are removed into rules, and can then be managed by experts in those organizations.

Figure 35:
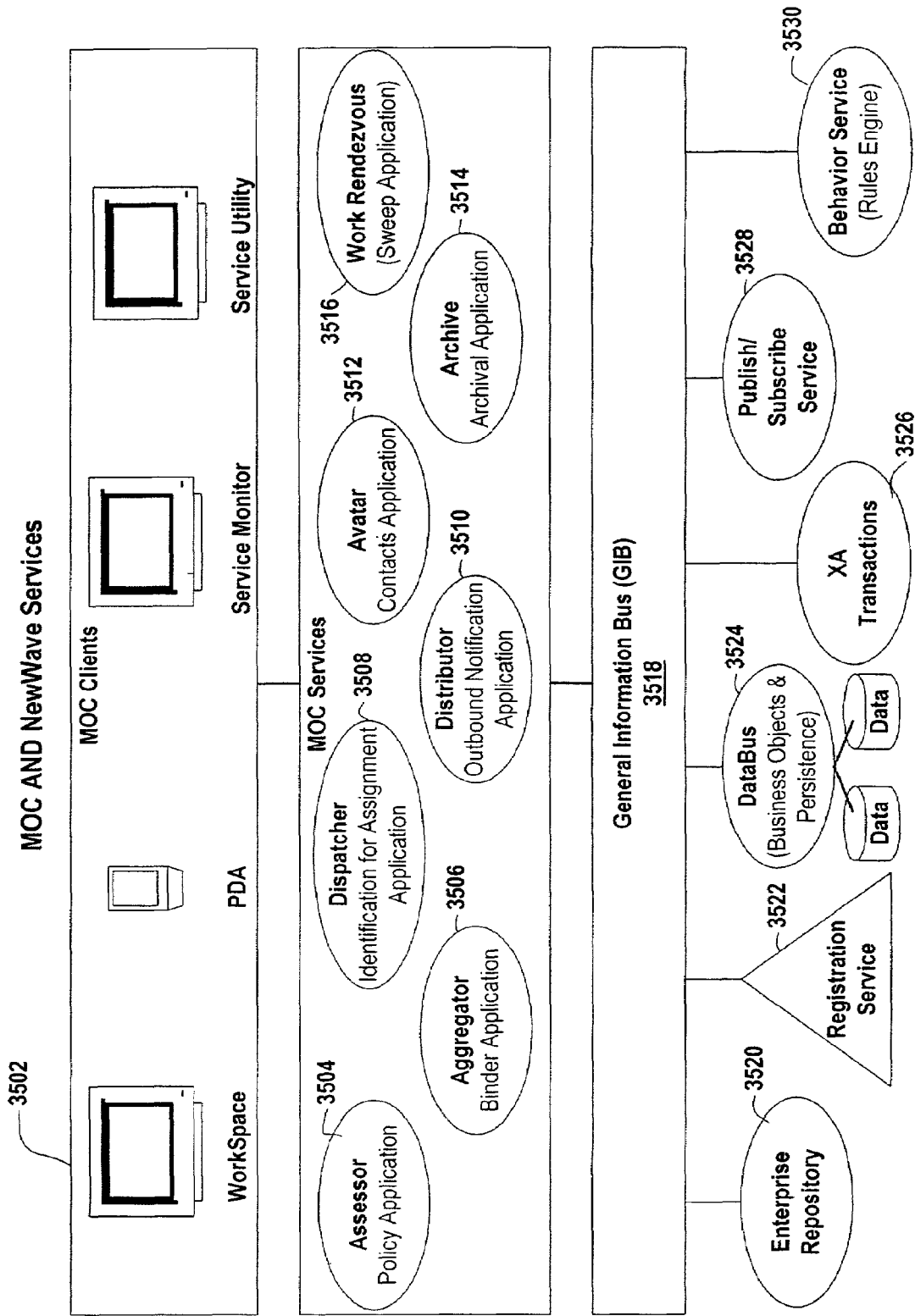
FIG. 35 is a diagram of the MOC and associated NewWave service necessary for collecting events into policy-based work documents, and then directly routing work to the best currently available operations staff that is automatically assembled based on the individual staff members' aptitude for particular tasks in a process flow in accordance with an exemplary embodiment of the present invention.

FIG. 35 is a diagram of the MOC and associated NewWave services necessary for collecting events into policy-based work documents, and then directly routing work to the best currently available operations staff that is automatically assembled based on the individual staff members' aptitude for particular tasks in a process flow in accordance lo with an exemplary embodiment of the present invention. The primary MOC component services are assessor 3504, aggregator 3506, workspace 3502, dispatcher 3508, distributor 3510, avatar 3512, archive 3514 and work rendezvous 3516. Before describing the other aspects of the MOC, the functionality of each of the above identified MOC services will be briefly described. Assessor 3504 initially receives most events from pub/sub bus 3528 and applies operations-specified policy to the treatment of those events using, for example, a rules agent in a commonly shared rule server. Authorized operation staff can change and update policy rules in near-real time using behavior service 3530 described below. Highly distributed and individually customizable, typically many (customized) assessors will exist in the MOC system, thus allowing different treatment of events by different operations teams.

Aggregator 3506 receives event information from pub/sub bus 3528 and assessor 3504 which it associates and binds together according to an operation's requested organization of work integration to produce work document 3630. Aggregator 3506 also provides real-time binding of associated corporate business objects to the document including binding an event to many different documents. To that end, aggregator 3506 contains the templates for documents for, for example, different functional areas/teams. Additionally, many different aggregators will exist and run simultaneously providing different work documents to different teams. Dispatcher 3508 applies current policy rules to associate work documents and events with specific operators, customer contacts and other service care staff. Dispatcher 3508 assigns work with an understanding of who is free and able to do that work and implements priority rules for understanding relative priority, thus dispatcher 3508 can bump work in progress for higher priority tasks. Additionally, dispatcher 3508 implement alternates strategies to handle cases where work is refused or overdue. Distributor 3510 handles outbound and remote communication notifications for the MOC based on decisions from dispatcher 3508.

Each avatar object 3512 represents a virtual image of a specific operator's or customer contact's skills and responsibilities. Operators, provisions, customer contacts, service support staff and any other management-tasked staff in the customer and network care environment will have an avatar. Avatar 3512 provides the MOC with a skills assessment of care staff including reference to a history of past work, interactions and success ratings and a means for contacting and communicating with these individuals.

Archive service 3514 updates and otherwise modifies work documents for or in storage based on recent experiences. Finally, work rendezvous 3516 associates later arriving processed events with events that initially generated a work stream/task. With this service, different people working on the same route or associated task can learn of the complementary work going on. Rendezvous 3516 notifies different work documents about all other references to a common event and associates processed events with a work document that contain a reference to the source event. With respect to FIG. 35, the GIB services have been discussed thoroughly above and will not be discussed again.

The key features of the MOC design are:
Rather than a single monolithic application, the MOC employs an inside-out design in which many small components act largely independently of each other, but affecting each other by:
    directly interacting with shared resources;
    registering for notification of updates to shared resources;
    finding each other and communicating via the GIB services of registration and lookup; and
    publishing messages over the GIB publish/subscribe bus;
Providing a mechanism wherein automation and current policy can be applied to managing process;
Providing a team to analyze the situation and effect the solution, rather than a succession of individuals, doing a piece and handing off to the next in line;
Providing a server side, peer-to-peer interaction environment in which all participants can access the same, real-time information.

In general, the overall behavior of the MOC can be changed by adding new components, work templates, or changing policy rules, without directly modifying existing components. All MOC components are NewWave services, using the NewWave registration, lookup and enterprise lookup services. The MOC extends the behavior of its code through the use of external rules engines using the NewWave behavior service. This allows organizations with the expert knowledge of operations support to be in control of the behaviors implementing operations support policy, instead of programming organizations. The MOC must communicate with systems outside of its direct control. It uses XML messages sent over the GIB publish/subscribe buses to do so in a highly decoupled way. In this way, it uses a common approach for receiving events from disparate sources: external sources such as the network, customer service systems and legacy systems; and internal sources such as MOC or NewWave components. Events received are assessed by an assessing component. It is the job of this assessor to apply organizational policy dealing with how a event should be addressed.

Work documents are constructed by an aggregating component. It is the job of this aggregating component to put together a document (a software construct) containing what information is needed to resolve the problem, including aggregating related network, customer and application events, setting initial milestones, applying rules which deal with the understanding or categorization of the problem, and binding in related information (such as necessary topology information). Work documents are first class objects accessible through the NewWave DataBus. They are not just data, as they have a controlling feature that allows state changes throughout its life. All components are able to interact with and change it using distributed transaction semantics.

People are invited to participate in work groups by a dispatching component running dispatching rules. It is the job of this dispatcher to apply organization policy dealing with who should deal with a problem.

People are represented by in-memory "avatars" which are responsible for knowing the manner in which to communicate with the person, that person's current workload and information about the person. Technologies for communication are encapsulated within the avatar, allowing other components to not be knowledgeable about or bound to those technologies. An avatar is a first-class object running as a service and can be found and interacted with using standard NewWave techniques. A workspace (FIG. 39) is the interaction, peer-to-peer, of those services about a single work item.

Figure 36:
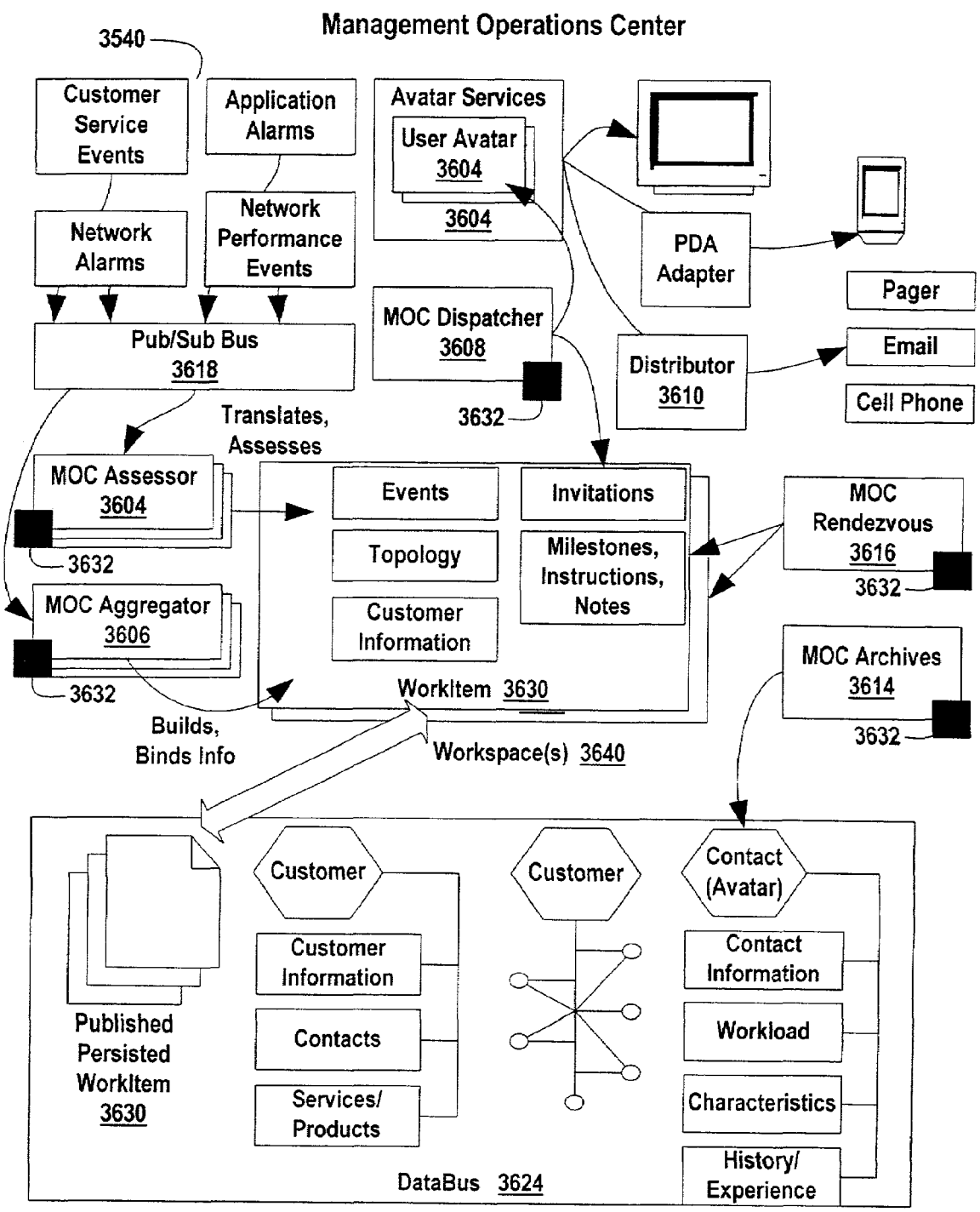
FIG. 36 is a functional diagram of the MOC depicting interactions between key MOC components interact in accordance with an exemplary embodiment of the present invention.

FIG. 36 is a functional diagram of the MOC depicting interactions between key MOC components which interact in accordance with an exemplary embodiment of the present invention. Note that FIG. 36 contains component representations from the MOC, NewWave infrastructure and rule agents 3632. The MOC is responsible for coordinating the response to events which occur within individual components bound into workspace 3640 developed for the NewWave environment. Components in workspace 3640 might be NewWave-enabled devices, and applications and services developed on NewWave or are detected by NewWave surrogates for external systems, for instance, agents monitoring devices or other resources, and bridges to legacy (non-NewWave) systems. None of these components and surrogates have any special knowledge of the MOC or its functionality and thus are not modified in any special way to interact with the MOC. These components and surrogates are responsible only for knowing when a problem has occurred, and for publishing an XML document describing the problem on the publish/subscribe bus. The only coordination which occurs between the MOC and components 3630 is in the definition of the XML document and the topic that it is published with it.

To make any component able to be supported by the MOC, it must be able to interact with the MOC components, even though components 3630 do not have any specific know-upon format and transmission media. To that end, any component wishing to be supported by the MOC must publish events to the GIB publish/subscribe bus, or to an external publish/subscribe bus with a bridge to the GIB, shown generally as pub/sub service 3618. Each event message must use an agreed-upon XML schema for the format and follow an agreed-upon structure for the topic of the event message.

The precise XML document standards are not important for the purposes herein, but some exemplary events are listed below.

FMEvent XML (Fault Management Event) XML document, topic ngn.nfp.fm;
Application Event XML document, topic ngn.service.admin;
Customer Service Event XML document, topic ngn.customerservice; and
UUNet Ping Alarm FMEvent XML document, topic ngn.uunet.fin.

Building a Work Document Describing an Event

Assessing Events

When events are received by the MOC over publish/subscribe bus 3618, they are optionally received by assessor 3604. An assessor is responsible for applying organizational policy dealing with how the organization responds to events of that type. An organization may set policy saying that certain events are ignored; others are problems that must be addressed immediately, etc.

Simply put, assessor 3604 runs rules agent 3632 against an incoming event received from publish/subscribe bus 3618. In accordance with an exemplary embodiment of the present invention, assessor 3604 determines, based on the rules, whether the event is a primary event, which must be investigated and then classified by type. The function of assessor 3604 is then entirely dependent upon the rules that are set up and executed by the rules engine. These rules would be defined by experts in an organization or set of organizations responsible for handling problem events. An exemplary rules engine for implementing policy based rules is Brokat Advisor and the Brokat Advisor Server (both available form Brokat Aktiengesellschaft Industriestrasse 3, D-70565 Stuttgart, Germany). Because the present invention is supported by the NewWave infrastructure, and relies on remote loading of services which in some forms rely on the Java programming language, a rule engine that is also written in Java would better match the operating environment of the MOC in its use of the mobile rules agents.

Figure 37:
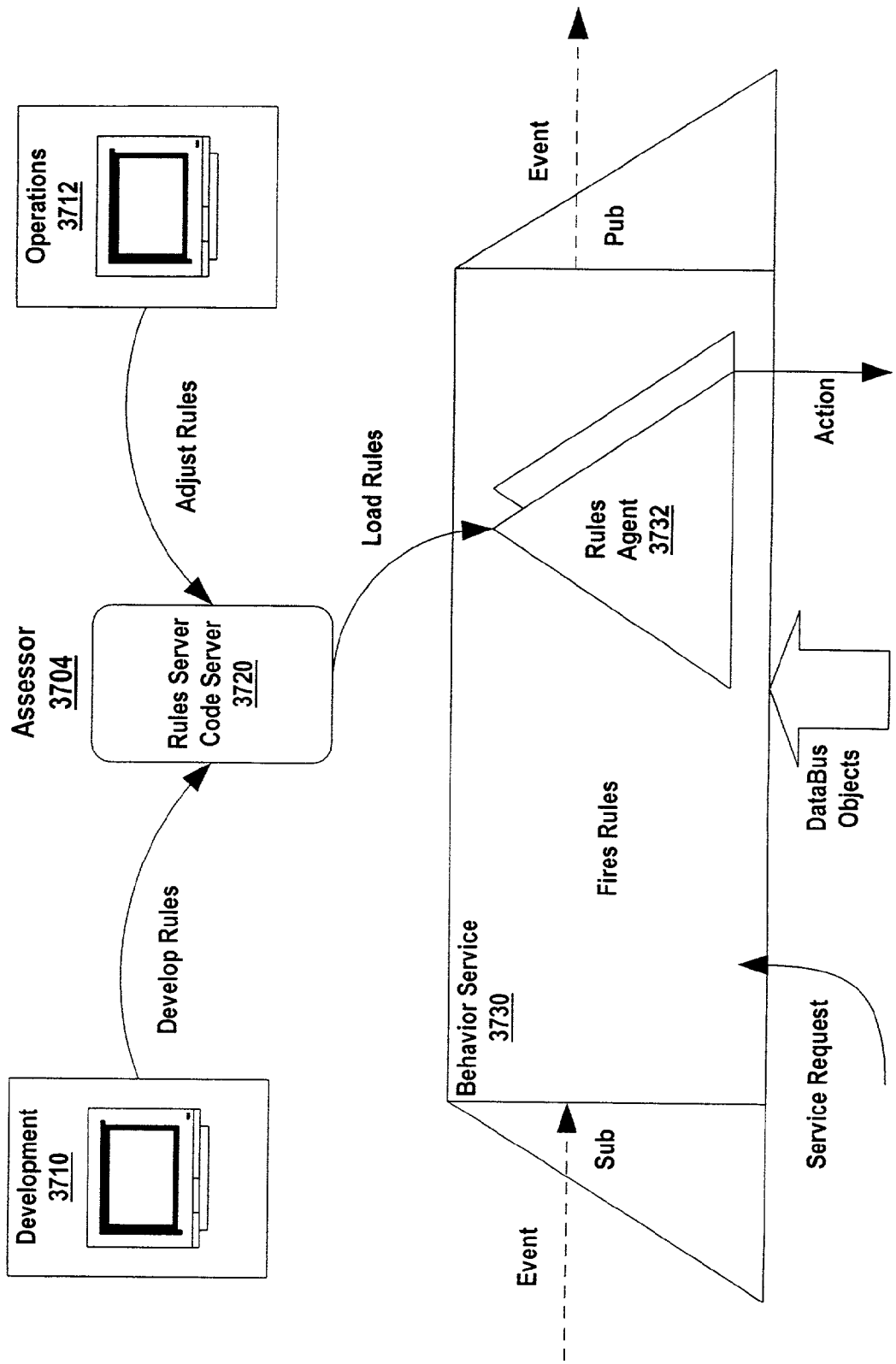
FIG. 37 is a diagram of an assessor for assessing events based on organizational rules in accordance with an exemplary embodiment of the present invention.

Referring to FIG. 37, an assessor is depicted for assessing events based on organizational rules in accordance with an exemplary embodiment of the present invention. Notice that the present invention envisions implementing rules in the normal manner by developers in development 3710. However, the present invention recognizes that the developers are not always the best implementers for rules, nor the timeliest, especially those based on organizational policy, such as from operations 3712. Therefore, the rules may be adjusted, modified, supplemented or even replaced by experts in an organization or set of organizations responsible for handling problem events at, for instance, code server 3720. Code server 3720 then serves up the rules to rules agents in behavior service 3730, which are fired whenever an event is received.

Work Item Aggregation

The primary process involves building the case, involving the separate activities of:
1. the correlation of the primary event and related events into a single bundle;
2. the building of a work document containing the bundled events and the other related information;
3. the running of rules designed to help determine the cause of the problem; and
4. the control of the life of the work to be done including coordinating the actors involved in the process.

A common approach used in both cases to alert the MOC of an anomalous condition is the NewWave publish/subscribe service. As described elsewhere, the publish/subscribe service is part of the NewWave GIB and represents a contract between components for sharing information.

Many separate aggregators will be generally deployed within the MOC. It is entirely reasonable for an aggregator to begin work before the assessor, bringing the case up to a certain point to give the assessor adequate information to make its assessment. Then, it could continue its work conditional on the assessment.

Figure 38:
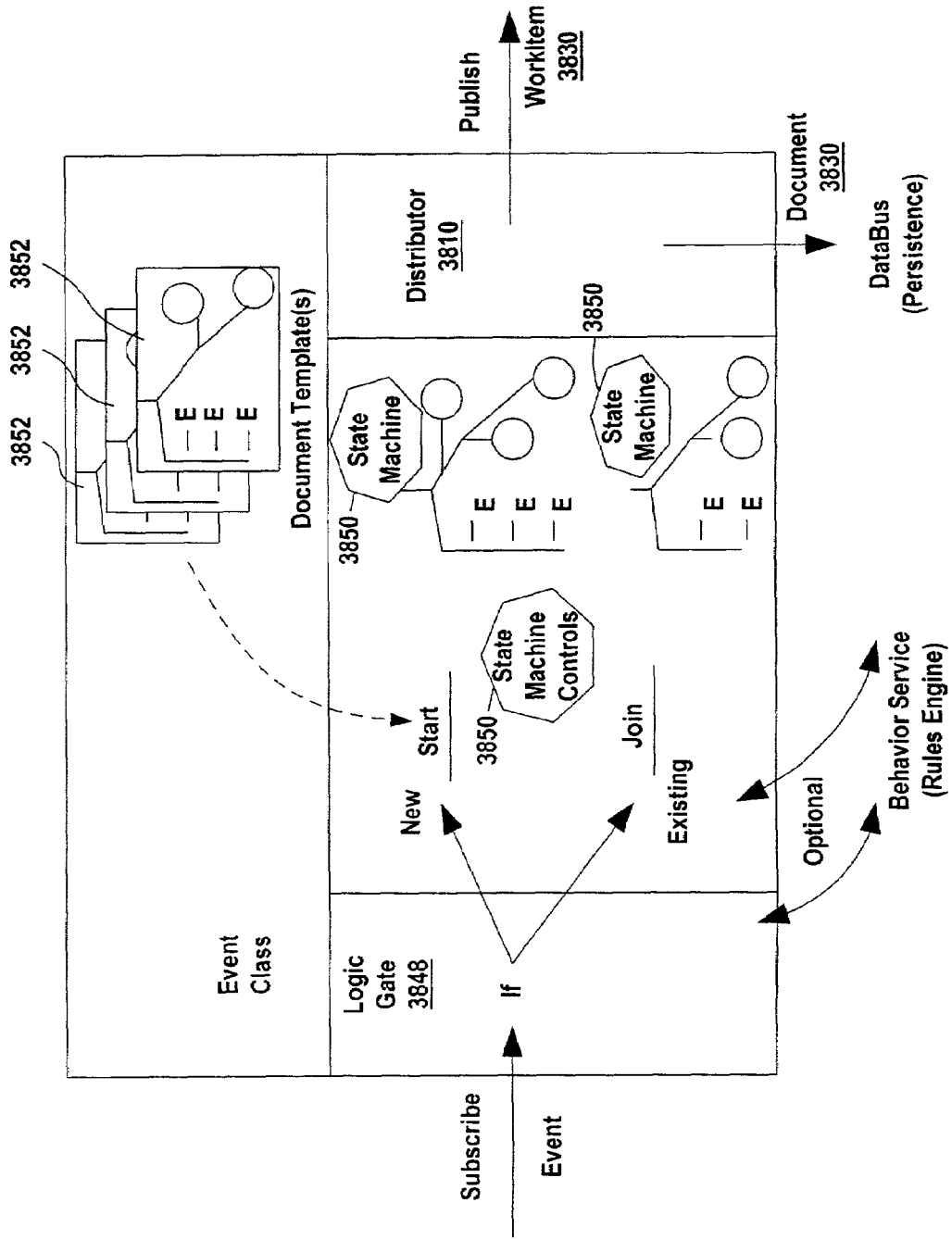
FIG. 38 is a diagram illustrating a basic design of an aggregator in accordance with an exemplary embodiment of the present invention.

The basic design of an aggregator is shown in FIG. 38 in accordance with an exemplary embodiment of the present invention. FIG. 38 also describes the basic workings of aggregator 3606 in accordance with the present invention. Accordingly, events flow into aggregator 3806 and pass through a "gate," logic gate 3748, which applies some logic to determine whether this event represents a new or existing opportunity for packaging work. Logic gate 3748 acts as a logical IF to determine if the event represents new or existing opportunities.

If new, aggregator 3606 starts a new state machine, and the associated bucket for collecting events and data, depicted as state machine 3850, for controlling the work. It must select a template 3848 (FIG. 38) for the state machine that is appropriate for the particular event. For instance, a failure of a Sonet Ring would be handled differently than a failure of a modem. In the MOC, the state machine is a micro-workflow and description of the life cycle of a telecommunications process. State machine 3850 performs a number for functions regarding the event, including determining other related events needing to be bundled with the primary event and what events would signify closure of the primary event. Additionally, the state machine might need additional information so the state machine must be equipped to determine the additional information that is needed, such as topology or customer service level agreement (SLA). Finally, the state machine 3850 must determine what milestones in the life of a particular event are important. The state machine, the events that are to be associated, the milestones, the means of gathering additional information is represented in the template.

If, on the other hand, the event represents an existing opportunity, aggregator 3606 joins the incoming event to running state machine 3850 that has expressed interest in it. At some point, the state machine ultimately produces a work document and makes this document known (publishes it) to other components via distributor 3810. In accordance with another embodiment of the present invention, a behavior engine (rules engine) can be used both to implement logic gate 3848 and by the state machine to control its actions or to provide some root cause analysis of the problem.

Figure 39:
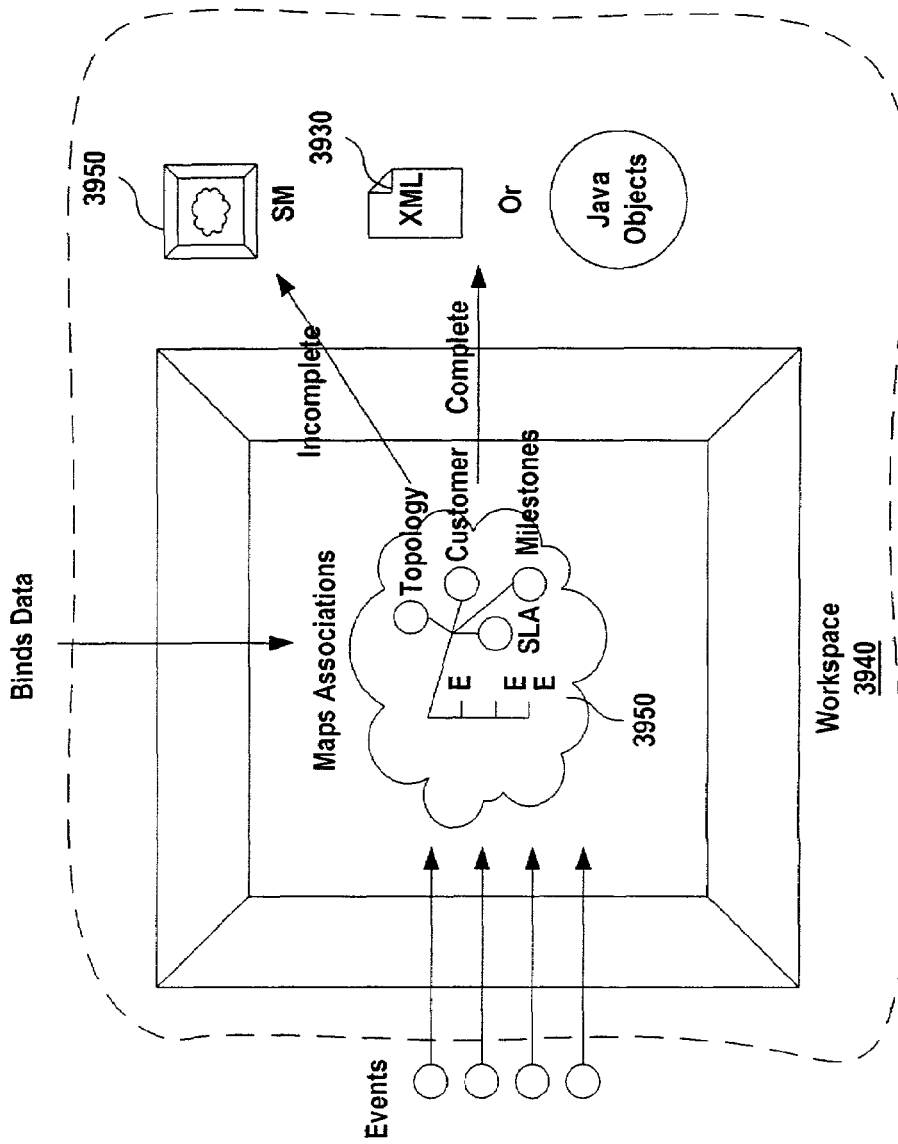
FIG. 39 is a diagram of a simplified version of a workspace in accordance with an exemplary embodiment of the present invention.

FIG. 39 is a diagram of a simplified version of a workspace showing a controlling state machine in accordance with an exemplary embodiment of the present invention. Many separate workspaces may exist simultaneously. State machine 3850 controls the actual work in the aggregator.

As can be seen in FIG. 39, state machine 3950 is responsible for receiving incoming events, binding them together (the tree of E's in the figure) and responding to any state change as a result of the new event, or binding information into the work document (the network of circles in the figure). State machine 3950 continues operating until closure conditions are reached, which may be based on completeness or time elapsed. Then, state machine 3950 publishes the work document in some manner (for instance, persist on DataBus or publish via publish/subscribe) and in some agreed-upon form (for instance, XML document or Java objects).

The aggregator may be implemented in a number of different ways, even by the functional workings of the other services (i.e., in accordance with one embodiment of the present invention, there is no physical component called the aggregator). When a work task is always present, a resource manager can create the required number of workspaces and state machines. In that case, state machine 3950 subscribes with the publish/subscribe bus for the events in which it is interested. As such, state machine 3950 receives the events directly without going through a "gate," thus performing the join function implicitly. Additionally, the MOC rendezvous service, discussed below, is used to prevent an event which has gone directly to state machine 3950 from also causing the creation of a new state machine, thereby also performing the gate function. Finally, the assessor is allowed to create the state machine if the event is determined to be primary and the rendezvous service says it is not being handled already, thus performing the start function of the aggregator.

State machines are a common way of handling a process that goes through many states and responds to events, with the response being dependent upon the current state. Many implementations of state machines exist and many that may be applicable to the present invention could have been used here. The MOC implementation follows along somewhat non-traditional lines because the state transactions are not complex, but the determination of the event coming in is. The implementation, then, does not optimize the state transition (as one would see in, for instance, a source code parser).

In the normal course of action, the state machine continues operating for the life of the work. This is necessary because, even after the document is produced, related events will still keep coming in and need to be joined to the existing work document. Rather than create a new component for doing this function after the work document was created, the state machine continues to live on its own for:

care staff—skills assessment;
customer and network care staff—a reference to history of past work;
interactions and success ratings (knowledge base);
data on domains of responsibility (assignments);
physical location; and
availability.

One exemplary state machine is implemented as an extension of the base class WorkItemActor. The particulars of this exemplary implementation are that the publication of the document is done through publish/subscribe and after publishing the document, the state machine does not go away.

With respect to a given enterprise, many state machine templates 3852 should be developed to handle different classes of problems for the enterprise that share characteristics. With respect to the WorkItemActor state machine example where the enterprise is a telecommunications company, state machines might be developed to handle, for example, SonetLinearFailure, ModemReset, StandbyRequest, and ApplicationRestartFailure. An XML template can then be used to describe the control differences between state machines. The template document contains the settings for milestones, related events, and information to be bound in.

Event and Work Item Rendezvous

As mentioned above, the MOC depends on a rendezvous service to tell if an event is being handled by a work item (or a state machine controlling a work item), represented in FIG. 36 as rendezvous 3616. A rendezvous service is responsible for determining if a given event is already being handled and if the problem represented by a work item document overlaps with an existing work item document. It then routes that event to the proper work item. The client role of the rendezvous service dynamically registers WorkItems for subscriptions to related events. It also finds if any specific event is already registered in the service register as being processed by a state machine/workspace. The server side continuously skims the service register for work items which should be informed of each other or joined into one work process unit.

As with many other MOC components, many rendezvous services can be deployed simultaneously in a MOC environment. Rendezvous service 3616 can use rules to make its determinations, or any appropriate logic. Different rendezvous services may be deployed with different rules for determining overlap by different parameters. For instance, different services could consult different views of topology, for instance, one service could look at layer 2, a second a layer 3, a third looking only at cross domain interactions. By deploying many such rendezvous services, and by allowing work documents already started to be merged together, it is not necessary to apply all rendezvous rules before starting work. Therefore, some rendezvous rules could be quite slow and still result in alerting people to the fact that a problem spans multiple areas. Asynchronous processing allows parallel work to occur in a dynamic environment, at its own pace, and then be merged with other work upon reaching a certain resolution.

In accordance with an uncomplicated implementation of rendezvous service 3616, it applies simple rules to determine if an event has been handled and if there is overlap between different work item documents. Rendezvous service 3616 dynamically subscribes with publish/subscribe services to be made aware of any new work item document as the item is created (but before it is published for all). Rendezvous service 3616 pulls the events off of the document and keeps an index of events based on their type and based on the network element affected. Whenever it is asked about a new event, it can compare the new event against the network element to see if any existing work item document references that element.

The Work Document

WorkItem 3630 in FIG. 36 holds all of the objects, or references to the objects, associated with the item of work (i.e., the problem described in the initial event that is being addressed). In accordance with an exemplary embodiment of the present invention, WorkItem 3630 will have many types of objects, bound in, including:
- events—the primary event and associated/correlated events;
- status information describing the current state of the problem resolution, for instance, status, probable cause, priority, time to resolve, actual cause;
- informational objects, such as:
  - customer information and service level agreement information;
  - topology information;
  - basic instructions regarding the problem;
  - progress notes; and
  - sundry information such as configuration information on the elements in question;
- user avatars for the people participating in the work group;
- proxies to devices or services related to the problem, for instance, a proxy to the device or agent for the device that is reporting the problem; and
- tools needed to resolve the problem, including collaboration tools for interacting with the work group, or getting information about the problem elements.

It should be understood that some of the information in Workspace 3940 and Work Item 3630 are required to be persisted permanently, or for some time, while other objects need only be in memory where they can be accessed. In accordance with one embodiment of the present invention, the work document is the DataBus-enabled WorkItem (implemented, according to DataBus standards, as the WorkItemBean class and related classes). There, WorkItem 3630 is completely persisted on the DataBus. With respect to an alternative embodiment, a technique similar to the Jini Registrar and the Jini JavaSpace is employed for storing any serializable object and also attaching external "attributes" to be used when looking for the object (a serializable object, as described above, is an object which Java is able to "serialize" the object in a form suitable for storing or transporting across processes—this is a standard Java technique). The external attributes are selected by the storer.

The Workspaces

Similar to WorkItem 3630, the MOC design has the concept of the work group space Workspace 3940, a space for the work group collaborating on a problem to share relevant objects. This allows the client's avatars to interact as if the workspace were a peer-to-peer environment. One implementation is to convert WorkItem 3630 into an in-memory work group space with a simple interface for finding objects and retrieving them, and a persistent work item document for persisting data about the work item. This is an in-memory shared space capable of holding objects that the participants may need, including:
- the work item document itself;
- proxies to user avatars for communicating with other participants;
- work flow objects;
- an active object controlling the lifecycle;
- proxies to intelligent devices and agents for devices to directly interact with these devices;
- user interfaces to access the work item information (allowing different user interfaces for different roles—technical support, customer support, etc.); and
- collaboration tools.

The work group space must support the putting of objects into and the getting of objects from the space, the remote downloading of the classes needed to use the objects, the registration for and notification of events relating to the objects, and the tailoring of the contents of the space to the particular problem using rules. These concepts are features of the NewWave infrastructure and GIB architecture, and are easily implemented. Alternatively, with the exception of the rules, this resembles the responsibilities of a Jini JavaSpace, which could be also used as a component in implementing a workspace.

WorkItem 3630 is very similar to the work space concept of the present invention and performs most functions of the work this function; however, as a DataBus object, WorkItem 3630 is not practical to support those objects that are not really intended to be persistent. In accordance with an exemplary embodiment of the present invention, there are three alternative implementations of the work group space. The first implementation is a NewWave service, described in detail above, registers itself in the domain registrar and the enterprise repository. This implementation allows the work group to be accessed via normal administrative tools for services; however, large numbers of work group spaces could get unwieldy. A second implementation involves creating an in-memory DataBus object. This would scale well to large numbers, but would not be directly accessible via normal service administrative methods. Finally, the work group can be implemented as a JavaSpace. This would require the addition of proxies so that one JavaSpace could service a number of work group spaces.

Creating a Work Group to Handle The Event User Avatar Service (User Proxy)

In accordance with an exemplary embodiment of the present invention, contacts (e.g., Operators, Provisions, Customer Contacts, Service Support staff, any other management-tasked staff in the customer and network care environment, Customers, etc.) may participate in the resolution of, or may need notification of, WorkItem 3630. As such, it is necessary to understand what the operations staff is currently working on real-time, what the task priority is, and when is it due to be completed—workload, and how to route messages and work to a contact.

In some cases, additional information is needed in order to support the dispatching function of the MOC:
- for care staff—skills assessment;
- for customer and network care staff—a reference to history of past work, interactions, and success ratings (knowledge base);
- data on domains of responsibility (assignments);
- physical location; and
- availability.

Contact data can then be saved in an appropriate location, for instance, persisted within a Contact DataBus Entity.

Figure 40:
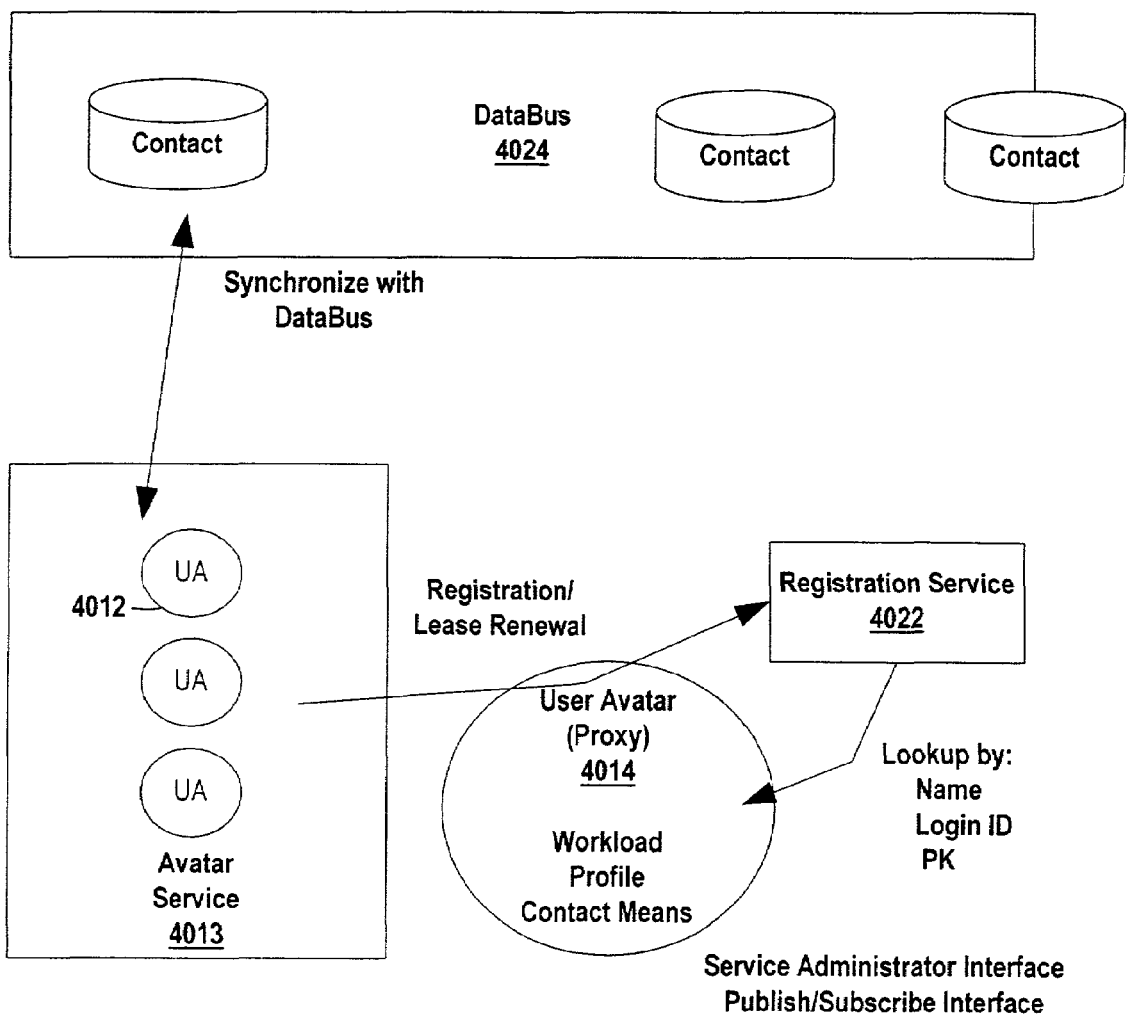
FIG. 40 which depicts a user avatar lookup in accordance with an exemplary embodiment of the present invention.

The user avatar is a representation of a person as a service, invoke-able by other software services; a virtualization of the individual, the current state of the individual and the current interface to the individual. In accordance with an exemplary embodiment of the present invention, a user avatar, depicted as user avatar 3604 on FIG. 36 represents a virtual image of a specific operator's or customer contact's skills and responsibilities. A user avatar is depicted as user avatar 3604 on FIG. 36 that serves as a proxy for a contact within the MOC. Optimally, each contact has an associated user avatar. This concept is better understood with respect to FIG. 40 that depicts a user avatar in accordance with an exemplary embodiment of the present invention.

Lookup

Each UA 4012 registers in registration service 4022, which may be a domain registrar, started with group "Users." UA 4012 is registered with attributes including primary key (PK), login ID and name. Any service requesting information from, or sending messages or work to, UA 4012 locates this proxy using existing NewWave protocols for lookup described above.

Contact DataBus Entity

UA 4012 is initially populated from the Contact DataBus Entity stored in DataBus 4024. Once created, UA 4012 has the ability to synchronize its data with the DataBus. Additionally, UA 4012 provides "helper" convenience methods so that data persisted with the Contact DataBus Entity can be accessed through UA 4012.

Contact Means

As a proxy to the contact, the User Avatar knows all available contact means for a contact and is responsible for forwarding all communications, messages and work to the contact via the appropriate contact mean(s). All logon/logoff requests from the WorkSpace applet (GUI) will be made through UA 4012. A remote proxy to the WorkSpace will be retained as an available contact mean after a "logon" request from the WorkSpace GUI has been successfully processed. Likewise, all logon/logoff requests from the PDA service will be made through UA 4012. Again, a proxy to the PDA Service will be retained as an available contact mean once a "logon" request from the PDA service is successfully processed. Other contact means supported by the current implementation include text messages sent to pagers via email, text messages sent to cellular phones via email, and email.

UA 4012 is also responsible for determining whether a message should be sent via one or more available contact means. This determination is made by evaluating the priority of the message or work. More urgent messages may be distributed via multiple, or even all, available contact means.

Workload

In addition to providing a communication vehicle for a Contact, UA 4012 knows what a Contact is currently working on (workload). Workload is primarily used by dispatching function 3608 to determine the "most available" Contact to participate in the resolution of a WorkItem. Workload is provided by the UserAvatar as XML. Again, workload is defined as what the operations staff is currently working on real-time, the task priority, and when is it due to be completed. Individuals can be participants in more than one workspace at the same time. The UA sees/stores this collection of work of an individual and the workspace client for an individual can reference any work-item for which an invitation is active and/or accepted.

Subscriptions

UA 4012 has the ability to publish and subscribe via the GIB's pub/sub bus 3618. In the MOC, UA 4012 subscribes for WorkItem status changes so that UA 4012 can forward status change messages to the Contact via the available contact means. Contacts also subscribe for items of interest within the MOC via their established contact means. These subscriptions are established with UA 4012 as profile information. Once UA 4012 receives a subscribed item, it is responsible for forwarding the corresponding messages in the proper format to the Contact via the established contact mean(s).

Statistics

UA 4012, just as every other MOC service, implements the MOC's Service Admin interface, and provides statistics as XML including health/heartbeat, and additionally, the MOC specific statistics such as workload and profile information (current subscriptions, contact means, etc.).

Avatar Service (Generic Service)

In the MOC, avatar service 4013 serves as a container for UA(s) 4012. Optimally, one avatar service is deployed for each Contact logical domain. Avatar service 4013 has all of the behavior associated with a NewWave service and therefore can initially create and register (with the domain registrar) the user avatar(s), in addition to maintaining user avatar(s) leases with the registrar. Finally, avatar service 4013 provides convenience methods to the DataBus for the user avatar synchronization functions.

Dispatcher Service

As discussed above, the GIB architecture implements "policy-based" rules that can be modified in "near-real-time" to handle predicate logic requirements. Various off-the-shelf services might be integrated into the GIB architecture to provide this functionality (i.e., the Brokat product(s), Advisor Builder and Advisor Rule Engine). Below is an exemplary description of the function of the dispatching rules in accordance with an exemplary embodiment of the present invention. It should be understood that the account detailed below is merely exemplary and any specific policy might be applied to any policy based MOC component. Also, policy can be implemented in any rules agent as a relocatable service, including as a java object.

It should also be noted that the data, rules, subscriptions, and templates for this described exemplary implementation of the dispatcher service have been limited in scope to a particular telecommunications challenge business scenario to aid in explanation (actual rule sets can be quite large). As such, this explanation is intended to describe this service as a participant in the Management Operations Center (MOC). No attempt has been made to describe all data, rules, subscriptions, and templates needed to support all policy functions necessary for the MOC.

The Dispatcher Service (GenericGIBService) provides the MOC the ability to:

1. apply current policy rules to associate work documents and events with specific operators, customer contacts and other service care staff;
2. assign work (WorkItems) with an understanding of who is free and able to do that work;
3. understand relative priority and can bump work in progress for higher priority tasks; and
4. identify Customer Contact(s) that should be notified of WorkItems based on their Service Level Agreement (SLA).

The Dispatcher Service accomplishes the above stated objectives by implementing the following functions:

1. Register to Receive WorkItem Change Events via the Publish/Subscribe Bus.

As a GenericGIBService, the Dispatcher Service inherits the ability to participate in the publish/subscribe bus. Upon service start-up, the Dispatcher Service registers as a subscriber for WorkItem Events that include, but are not limited to:

WorkItems that have had a status change such as "opened" or "escalated";
WorkItems whose key information has changed requiring a rerun of the dispatching rules;
Invitations to participate in a WorkItem that have been "declined" by a candidate Contact; and
Invitations that have "expired" (i.e., not accepted or declined by a candidate contact), and need to have an alternate contact assigned to the associated role.

Once the Dispatcher Service receives a WorkItem Event, it is ready to run the dispatching rules. As a GenericGIBService, the Dispatcher Service inherits the ability to directly interface with a behavior (rules) engine. The current Dispatcher Service implements the Brokat products to define, via Brokat Advisor, and then process, via Brokat Rules Engine, the dispatching rules.

2. Run Dispatching Rules.

The Dispatcher Service passes the WorkItem to the rules engine for processing. Upon receipt of the WorkItem, the dispatching rules must determine which rules, e.g. rules agent, to run based on the type of WorkItem Event. It is important to understand that this function would run at every milestone in the controlling state machine. In most cases, the first task is for the rule engine to determine:

1. Identification of Contacts that Need to Participate in the WorkItem.

The dispatching rules are responsible for determining which contacts need to be invited to participate in, and ultimately resolve, the WorkItem. In order to define the participation needed to resolve the WorkItem, rules identify roles to be filled by "appropriately skilled" Contact(s). The roles are determined by rules that evaluate the WorkItem's data. Although the WorkItem contains comprehensive information, the event data currently evaluated by the dispatching rules for the purpose of determining roles includes:

the primary event type;
the primary event location;
the type of equipment involved; and
the severity of the primary event.

An example of the roles identified, via rules, for a Sonet Linear Failure network event have been included BELOW:

if the currentWorkItem.primaryEventType "Sonet Linear Failure"
assign role ="Router Technician"
assign role ="Customer Service Representative"
assign role ="Transport Engineer"
assign role ="Dispatch Truck"
assign role ="Supervisor"
end if In addition to evaluating the event data on the WorkItem, the dispatching rules evaluate customers who have been impacted by the event(s). Impacted customers and their corresponding Service Level Agreement information have been bound into the WorkItem prior to receipt of the WorkItem by the Dispatcher Service. The dispatching rules determine whether direct customer participation in the WorkItem is required. Additionally, the dispatching rules determine whether it is necessary to assign a Contact specifically to the impacted customer. The customer participation rules evaluate:

the customer's Service Level Agreement (SLA) to determine whether their notification of the WorkItem is required; or
whether the customer has been located on the customer service special handling list.

A WorkItem status change may identify additional roles through the involvement of additional rules. In the case of the milestone, WorkItem "escalated" status change, management and more highly-skilled personnel may be invited to participate in the WorkItem via the dispatching rules.

Once the roles have been identified by the dispatching rules, a second set of rules are run to determine the "most appropriate" Contact(s) to fill the roles. Contacts can be defined as interested parties, not limited to people, that have been identified by the dispatching rules as being available for participation in a particular WorkItem. In order to determine the "most appropriate" Contact(s), the dispatching rules perform pattern matches on Contacts' characteristics. In this exemplary Dispatcher Service implementation, the dispatching rules define Contact characteristics as:

skills—Does the Contact possess the appropriate skill type and level to fulfill the role?
experiences—Has this Contact solved this problem or a problem like this before—history?
assignments—Is this Contact currently assigned to this Customer, Vendor, System, or piece of equipment?
physical location—Does the fulfillment of this role require physical proximity to the event location?
availability—Does the Contact's current workload allow participation in the WorkItem?

2. Invitation Creation

As each candidate Contact is identified by the rules, a function is invoked to create an Invitation object and bind it to the WorkItem. Each Invitation contains base WorkItem information, such as event type, priority, contact's proposed role, contact's ID and WorkItem ID. The initial invitation status is "ready for dispatch."

3. Instructions/Scripts Bound into the WorkItem

The dispatching rules evaluate the roles, customers' SLAs, and event information to determine whether instructions or scripts need to be bound into the WorkItem for the candidate contacts. Once all contacts have been identified, invitations have been created, and instructions have been bound into the WorkItem, the dispatching rules engine returns to the Dispatcher Service for further processing.

3. Dispatch the Invitation to the Contact's Proxy.

The Dispatcher Service queries the WorkItem for a list of invitations that need to be dispatched and then performs a registrar lookup for the Contact's proxy (UserAvatar) by Contact ID. Upon return of the contact proxy from lookup, the Dispatcher Service performs a "send" request passing the invitation. The contact proxy is responsible for determining where the invitation should be sent and how it should be formatted.

Distributor Services

In accordance with an exemplary embodiment of the present invention, messages in the Management Operations Center (MOC) need to be distributed to contacts. Within the MOC, messages take several formats: XML, HTML, text, and direct communication with a remote proxy. The messages may be disbursed via a variety of communication mechanisms: PDA, email (WorkSpace servlet), pager, mobile phone, and WorkSpace GUI Client (applet).

In order to support the MOC requirement of distributing messages to Contacts using such varied communication mechanisms, adapters have been developed by the team. Adapters are Generic Services that register with a domain registrar. As Generic Services, they inherit all associated behavior. Two such adapters are described below.

Distributor Message Service

The Distributor Message Service of the MOC is responsible for distributing messages via email. This exemplary implementation of the Distributor Service implements the Java Mail classes and distributes messages to mobile phones, pagers, and email.

The Distributor Service implements a simple interface with one public method for sending messages. The send method takes two parameters, the first indicating whether the message is to be sent in HTML or text format, and the second parameter is the message to be sent.

PDA Adapter Service

The PDA Adapter, a service of the MOC, is responsible for distributing messages to a PDA client. This exemplary implementation of the PDA Adapter distributes XML messages to the PDA.

The PDA Adapter implements a simple interface with one public method for sending messages. The send method takes a single parameter which is the message to be sent.

Archiving Work Documents

When a work item is closed, the experience of the people who participated in the work group needs to be updated. An archive service is provided for this and any other cleanup activity that is needed. In fact, multiple archive services could be deployed, each doing different activities such as one concentrating solely on updating experiences; packaging up the work item for long-term storage; calculating statistics for trend analysis, etc.

The exemplary archive service implementation for the MOC performs a simple calculation on the experience level of each person in the role played in the work group. Each time a person participates in a successful resolution of the problem, that person's experience level is modified according to the following formula: current+((max-current)*.5). This gives the person a lot of credit the first time that person is successful, but less credit each time until the score is close to the maximum.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application of the invention and to enable others of ordinary skill in the art to understand the invention for various embodiments with various modifications as are suited to the particular use contemplated.

What is claimed is:

1. A method, executed at least one processor of a system, for aggregating events related to an enterprise comprising:
receiving an event, wherein the event is related to one of a state change or a problem within the enterprise associated with at least one of an operation, function, policy, process or a component thereof related to the enterprise;
analyzing the event;
correlating the event to rules for processing the event, wherein correlation is based on the event;
receiving a plurality of subsequent events;
processing each of the subsequent events by:
analyzing a subsequent event for a relationship with the event, wherein a relationship is based on the rules, and
correlating the event and each of the subsequent events related to the event into a single bundle of events;
incorporating the single bundle of events and other information related to the event into a work protocol based on the rules;
analyzing the work protocol with the subsequent events based on the rules; and
determining closure conditions based on the analysis of the subsequent events.

2. The method recited in claim 1, wherein subsequent to analyzing the event, the method further comprises:
determining whether rules have been selected for processing the event; and
selecting rules for processing the event based on determining that rules have not been selected for the event.

3. The method recited in claim 1, wherein subsequent to analyzing the event, the method further comprises:
determining whether rules have been selected for the event; and
using previously selected rules for processing the event based on determining that rules have been selected for processing the event.

4. The method recited in claim 1, wherein analyzing the event further comprises:
determining whether the event is a primary event; and
treating the event as a subsequent event based on the event not being a primary event.

5. The method recited in claim 4, wherein the treating the event as a subsequent event further comprises:
culling the subsequent event based on no relationship with the event.

6. The method recited in claim 1 further comprises: publishing the work
protocol.

7. The method recited in claim 1, wherein the determining closure conditions based on the analysis of the subsequent events further comprises:
analyzing the work protocol based on classification rules; and
determining whether the work protocol classifies as a primary event.

8. The method recited in claim 1, wherein correlating the event to rules for processing the event further comprises:
selecting a rules agent based on the event;
accessing configuration information for the rules agent, wherein the configuration information includes an address of a rules service;
sending a request to the address of the rules service requesting rules for processing the event; and
receiving the rules.

9. The method recited in claim 1, wherein the analyzing the work protocol with the subsequent events further comprises:
detecting a milestone for at least one of the events, wherein the milestone is incorporated in the work protocol; and
firing the rules based on an occurrence of a milestone for a state change.

10. The method recited in claim 1, wherein the analyzing the work protocol with the subsequent events further comprises:
detecting a cause of said one of a state change or a problem associated within the enterprise; and
incorporating instruction related to the cause into the work protocol.

11. A method, executed by at least one processor of a system, for aggregating events related to enterprise operations comprising:
receiving a plurality of events, wherein each of the events is related to a state change associated with at least one of an operation, function, policy, process or a component thereof related to the enterprise;
determining a classification for each of the events, whether an event is classified as a primary event or not;
grouping a primary event with ones of the events having a relationship to the primary event and which are not themselves a primary event to form a single bundle of events, the relationship being based on rules for processing the primary event;
processing the primary event of the single bundle of events by:
  incorporating the Primary event into a work protocol based on the rules,
  incorporating other information related to the primary event into the work protocol based on the rules, and
  analyzing the work protocol based on the rules;
processing each of the events of the single bundle of events not classified as a primary event by:
  binding each event of the single bundle of events not classified as a primary event to the primary event incorporated into the work protocol, and
  analyzing the work protocol for the primary event based on the rules for processing the primary event; and
determining closure conditions based on an analysis of the events of the single bundle of events.

12. The method recited in claim 11, wherein the grouping a primary event with ones of the events having a relationship to the primary event and which are not themselves a primary event comprises:
determining whether the primary event correlates to the rules for processing the primary event; and
selecting the rules for processing the primary event based on determining that the primary event does not correlate to the rules.

13. The method recited in claim 11, wherein the grouping a primary event with ones of the events having a relationship to the primary event and which are not themselves a primary event comprises:
culling events, wherein the culled events have no relationship with the primary event.

14. The method recited in claim 11 further comprises:
publishing the work protocol.

15. The method recited in claim 11, wherein the determining closure conditions based on an analysis of the events of the single bundle of events further comprises:
recognizing that an event of the single bundle of the events indicates a change in one of a state change associated with at least one of an operation, function, policy, process or a component thereof related to the enterprise.

16. The method recited in claim 11, wherein the grouping a primary event with ones of the events having a relationship to the primary event and which are not themselves a primary event further comprises:
determining whether the primary event correlates to the rules for processing the primary event;
selecting a rules agent based on the primary event;
accessing configuration information for the rules agent, wherein the configuration information includes an address of a rules service;
sending a request to the address of the rules service requesting rules for processing the event; and
receiving the rules for processing the primary event.

17. The method recited in claim 16, wherein subsequent to sending a request to the address of the rules service, the method further comprises:
supplementing rules in the rules service, wherein the supplemental rules are created by expert personnel responsible for handling problem events.

18. The method recited in claim 11, wherein the analyzing the work protocols for the primary event based on the rules further comprises:
detecting a milestone for the primary event;
incorporating the milestone into the work protocol; and
firing the rules based on an occurrence of a milestone for a state change.

19. The method recited in claim 11, wherein the analyzing the work protocol for the primary event based on the rules further comprises:
detecting a cause of said state change associated with the at least one of an operation, function, policy, process or a component thereof related to the enterprise; and
incorporating instruction related to the cause into the work protocol.

20. The method recited in claim 11, wherein the work protocol is a work document embodied in one of an XML document, Java objects or an agreed-upon form.

21. A method, executed by at least one processor of a system, for aggregating events related to an enterprise comprising:
receiving a plurality of events, wherein the events are related to a state change associated with at least one of an operation, function, policy, process or a component thereof related to the enterprise;
grouping one of the events and other ones of the events into a single bundle of events, each of the other ones of the events having a relationship with the one of the events;
analyzing an event of the single bundle of events;
determining whether the event of the single bundle of events corresponds to an existing workitem;
selecting a work template from a plurality of work templates for a workitem based on the event of the single bundle of events not corresponding to an existing workitem, wherein each of said plurality of work templates defines control for processing work associated with a workitem;
binding the event of the single bundle of events to the workitem based on the event of the single bundle of events corresponding to the workitem;
determining whether the event of the single bundle of events represents a milestone for the workitem; and
firing a rule based on the event of the single bundle of events representing a milestone for the workitem.

22. The method recited in claim 21 further comprises:
analyzing an other event of the single bundle of events;
identifying to which existing workitem the other event of the single bundle of events corresponds;
binding the other event of the single bundle of events to the workitem based on the other event of the single bundle of events corresponding to the workitem;
determining whether the other event of the single bundle of events represents a milestone for the workitem; and
firing a rule based on the other event of the single bundle of events representing a milestone for the workitem.

23. The method recited in claim 21, wherein analyzing the event of the single bundle of events further comprises:
determining whether the event of the single bundle of events is a primary event; and treating the event of the single bundle of events as a subsequent event based on the event of the single bundle of events not being a primary event.

24. The method recited in claim 23, wherein the treating the event as a subsequent event comprises:
culling the subsequent event based on no relationship with the one of the events.

25. The method recited in claim 21 further comprises:
publishing the workitem.

26. The method recited in claim 21, wherein the firing a rule based on the event of the single bundle of events representing a milestone for the workitem further comprises:
concluding the workitem based on the milestone representing closure conditions for the workitem.

27. The method recited in claim 21, wherein the rule relates to one of understanding or categorizing the at least one of an operation, function, policy, process or a component thereof related to the enterprise.

28. The method recited in claim 21 further comprises:
creating an additional work template, wherein the additional work template defines control for processing work associated with an additional workitem; and
adding the additional work template to the plurality of work templates for workitems.

29. The method recited in claim 28, wherein creating an additional work template further comprises:
defining an additional milestone for the additional work template; and
associating a rule with the additional milestone.

30. The method recited in claim 29 further comprises:
defining an additional rule for the additional work template;
storing the rule in a remote server location; and
associating the additional rule with the additional milestone.

31. A data processing system implemented program product embodied on a processing system readable medium for implementing a method for aggregating events related to telecommunication operations, said program product comprising:
instruction for receiving a plurality of events, wherein the plurality of events is related to one of a state change or a problem within the enterprise associated with at least one of an operation, function, policy, process or a component thereof related to the enterprise;
instruction for grouping one of the events and other ones of the events into a single bundle of events, each of the other ones of the events having a relationship with the one of the events;
instruction for analyzing an event of the single bundle of events;
instruction for correlating the event of the single bundle of events to rules for processing the event of the single bundle of events, wherein correlation is based on the event of the single bundle of events;
instruction for incorporating the event of the single bundle of events into a work protocol based on the rules;
instruction for incorporating other information related to the event of the single bundle of events into the work protocol based on the rules;
instruction for analyzing the work protocol based on the rules;
instruction for binding an other event of the single bundle of events to the event incorporated into the work protocol based on the relationship with the event;
instruction for analyzing the work protocol with the other event of the single bundle of events based on the rules; and
instruction for determining closure conditions based on an analysis of the other event of the single bundle of events.

32. The program product recited in claim 31 further comprises:
instruction for determining whether rules have been selected for processing the event of the single bundle of events; and
instruction for selecting rules for processing the event of the single bundle of events based on determining that rules have not been selected for the event.

33. The program product recited in claim 31 further comprises:
instruction for determining whether rules have been selected for the event of the single bundle of events; and
instruction for using previously selected rules for processing the event of the single bundle of events based on determining that rules have been selected for processing the event of the single bundle of events.

34. The program product recited in claim 31, wherein the instruction for analyzing the event of the single bundle of events further comprises:
instruction for determining whether the event of the single bundle of events is a primary event; and
instruction for treating the event of the single bundle of events as a subsequent event based on the event not being a primary event.

35. The program product recited in claim 34, wherein the instruction for treating the event as a subsequent event further comprises:
instruction for culling the subsequent event based on no relationship with the event.

36. The program product recited in claim 31 further comprises:
instruction for publishing the work protocol.

37. The program product recited in claim 31, wherein the instruction for determining closure conditions based on an analysis of the other event of the single bundle of events further comprises:
instruction for analyzing the work protocol based on classification rules; and
instruction for determining whether the work protocol classifies as a primary event.

38. The program product recited in claim 31, wherein the instruction for correlating the event of the single bundle of events to rules for processing the event further comprises:
instruction for selecting a rules agent based on the event of the single bundle of events;
instruction for accessing configuration information for the rules agent, wherein the configuration information includes an address of a rules service;
instruction for sending a request to the address of the rules service requesting rules for processing the event of the single bundle of events; and
instruction for receiving the rules.

39. The program product recited in claim 31, further comprises:
instruction for detecting a milestone for the event of the single bundle of events, wherein the milestone is incorporated in the work protocol; and
instruction for firing the rules based on an occurrence of a milestone for a state change.

40. The program product recited in claim 31, further comprises:

instruction for detecting a cause of said one of a state change or a problem associated within the enterprise; and instruction for incorporating instruction related to the cause into the work protocol.

41. A data processing system implemented program product embodied on a processing system readable medium for implementing a method for aggregating events related to telecommunication operations, said program product comprising:

instruction for receiving a plurality of events, wherein each event is related to a state change associated with at least one of an operation, function, policy, process or a component thereof related to the enterprise;

instruction for grouping one of the events and other ones of the events into a single bundle of events, each of the other ones of the events having a relationship with the one of the events, the instruction for grouping including instruction for determining a classification for each of the events, whether an event is classified as a primary event or not;

instruction for processing a primary event of the single bundle of events comprising:
  instruction for determining whether a primary event correlates to rules for processing the primary event,
  instruction for incorporating the primary event into a work protocol based on the rules,
  instruction for incorporating other information related to an event into the work protocol based on the rules, and
  instruction for analyzing the work protocol based on the rules;

instruction for processing each event of the single bundle of events not classified as a primary event comprising:
  instruction for analyzing an event of the single bundle of events for any relationships with any of the primary events, wherein a relationship is based on rules for processing the respective one of any of the primary events,
  instruction for binding the event of the single bundle of events to at least one primary event incorporated into a respective work protocol based on a relationship with the at least one primary event,
  instruction for analyzing work protocols for the at least one primary event based on rules for processing the at least one primary event, and
  instruction for determining closure conditions based on analysis of an event of the single bundle of events.

42. The program product recited in claim 41, wherein the instruction for determining whether a primary event correlates to rules for processing the primary event further comprises:
  instruction for selecting rules for processing the primary event based on determining that rules have not been selected for the primary event.

43. The program product recited in claim 41, wherein the instruction for analyzing an event of the single bundle of events for any relationships with any of the primary events further comprises:
  instruction for culling events, wherein the culled events have no relationship with a primary event.

44. The program product recited in claim 41 further comprises:
  instruction for publishing the work protocol.

45. The program product recited in claim 41, wherein the instruction for determining closure conditions based on analysis of an event of the single bundle of events further comprises:

instruction for recognizing that an event of the single bundle of events indicates a change in a state associated with at least one of an operation, function, policy, process or a component thereof related to the enterprise.

46. The program product recited in claim 41, wherein the instruction for determining whether a primary event correlates to rules for processing the primary event further comprises:
  instruction for selecting a rules agent based on the primary event,
  instruction for accessing configuration information for the rules agent, wherein the configuration information includes an address of a rules service,
  instruction for sending a request to the address of the rules service requesting rules for processing the event, and
  instruction for receiving the rules for processing the primary event.

47. The program product recited in claim 46 further comprises:
  instruction for supplementing rules in the rules service, wherein the supplemental rules are created by expert personnel responsible for handling problem events.

48. The program product recited in claim 41, wherein the instruction for analyzing work protocols for the at least one primary event further comprises:
  instruction for detecting a milestone for the at least one primary event,
  instruction for incorporating the milestone into the work protocol, and
  instruction for firing the rules based on an occurrence of a milestone for a state change.

49. The program product recited in claim 41, wherein the instruction for analyzing work protocols for the at least one primary event further comprises:
  instruction for detecting a cause of said state change associated with the at least one of an operation, function, policy, process or a component thereof related to the enterprise; and
  instruction for incorporating instruction related to the cause into the work protocol.

50. The program product recited in claim 41, wherein the work protocol is a work document embodied in one of an XML document, Java objects or an agreed-upon form.

51. A data processing system implemented program product embodied on a processing system readable medium for implementing a method for aggregating events related to telecommunication operations, said program product comprising:

instruction for receiving a plurality of events, wherein the events are related to a state change associated with at least one of an operation, function, policy, process or a component thereof related to the enterprise;

instruction for grouping one of the events and other ones of the events into a single bundle of events, each of the other ones of the events having a relationship with the one of the events;

instruction for anal in an event of the single bundle of events;

instruction for determining whether the event of the single bundle of events corresponds to an existing workitem;

instruction for selecting a work template from a plurality of work templates for a workitem based on the event of the single bundle of events not corresponding to an existing workitem, wherein each of said plurality of work templates defines control for processing work associated with a workitem;

instruction for binding the event of the single bundle of events to the workitem based on the event corresponding to the workitem;
instruction for determining whether the event of the single bundle of events represents a milestone for the workitem; and
instruction for firing a rule based on the event of the single bundle of events representing a milestone for the workitem.

52. The program product recited in claim 51 further comprises:
instruction for analyzing an other event of the single bundle of events;
instruction for identifying to which existing workitem the other event of the single bundle of events corresponds;
instruction for binding the other event of the single bundle of events to the workitem based on the other event of the single bundle of events corresponding to the workitem;
instruction for determining whether the other event of the single bundle of events represents a milestone for the workitem; and
instruction for firing a rule based on the other event of the single bundle of events representing a milestone for the workitem.

53. The program product recited in claim 51, wherein the instruction for analyzing the event of the single bundle of events further comprises:
instruction for determining whether the event of the single bundle of events is a primary event; and
instruction for treating the event of the single bundle of events as a subsequent event based on the event of the single bundle of events not being a primary event.

54. The program product recited in claim 53, wherein the instruction for treating the event of the single bundle of events further comprises:
instruction for culling the subsequent event based on no relationship with the event.

55. The program product recited in claim 51 further comprises:
instruction for publishing the workitem.

56. The program product recited in claim 51, wherein the instruction for firing a rule based on the event of the single bundle of events representing a milestone for the workitem further comprises:
instruction for concluding the workitem based on the milestone representing closure conditions for the workitem.

57. The program product recited in claim 51, wherein the rule relates to one of understanding or categorizing the at least one of an operation, function, policy, process or a component thereof related to the enterprise.

58. The program product recited in claim 51 further comprises:
instruction for creating an additional work template, wherein the additional work template defines control for processing work associated with an additional workitem; and
instruction for adding the additional work template to the plurality of work templates for workitems.

59. The program product recited in claim 58, wherein the instruction for creating an additional work template further comprises:
instruction for defining an additional milestone for the additional work template; and
instruction for associating a rule with the additional milestone.

60. The program product recited in claim 59 further comprises:
instruction for defining an additional rule for the additional work template;
instruction for storing the rule in a remote server location; and
instruction for associating the additional rule with the additional milestone.

* * * * *